US011526368B2

(12) United States Patent
Karashchuk et al.

(10) Patent No.: US 11,526,368 B2
(45) Date of Patent: Dec. 13, 2022

(54) INTELLIGENT AUTOMATED ASSISTANT IN A MESSAGING ENVIRONMENT

(71) Applicant: Apple Inc., Cupertino, CA (US)

(72) Inventors: Petr Karashchuk, Berkeley, CA (US); Tomas A. Vega Galvez, Sunnyvale, CA (US); Thomas R. Gruber, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/931,384

(22) Filed: May 13, 2020

(65) Prior Publication Data

US 2020/0272485 A1 Aug. 27, 2020

Related U.S. Application Data

(63) Continuation of application No. 15/151,191, filed on May 10, 2016.

(Continued)

(51) Int. Cl.

*G06F 9/451* (2018.01)
*G06Q 10/10* (2012.01)

(Continued)

(52) U.S. Cl.

CPC ............ *G06F 9/453* (2018.02); *G06F 3/0482* (2013.01); *G06F 3/04842* (2013.01);

(Continued)

(58) Field of Classification Search

CPC .... G06F 9/453; G06F 40/166; G06F 3/04883; G06F 3/04886; G06F 3/0482;

(Continued)

(56) References Cited

U.S. PATENT DOCUMENTS

| | | | |
|---|---|---|---|
| 1,559,320 | A | 10/1925 | Hirsh |
| 2,180,522 | A | 11/1939 | Henne |

(Continued)

FOREIGN PATENT DOCUMENTS

| | | | |
|---|---|---|---|
| AU | 2014100581 | B4 | 9/2014 |
| AU | 2015203483 | A1 | 7/2015 |

(Continued)

OTHER PUBLICATIONS

Office Action received for European Patent Application No. 16862616.6, dated Jul. 28, 2020, 14 pages.

(Continued)

*Primary Examiner* — Jennifer N Welch
*Assistant Examiner* — Amy P Hoang
(74) *Attorney, Agent, or Firm* — Dentons US LLP

(57) ABSTRACT

Systems and processes for operating an intelligent automated assistant in a messaging environment are provided. In one example process, a graphical user interface (GUI) having a plurality of previous messages between a user of the electronic device and the digital assistant can be displayed on a display. The plurality of previous messages can be presented in a conversational view. User input can be received and in response to receiving the user input, the user input can be displayed as a first message in the GUI. A contextual state of the electronic device corresponding to the displayed user input can be stored. The process can cause an action to be performed in accordance with a user intent derived from the user input. A response based on the action can be displayed as a second message in the GUI.

81 Claims, 41 Drawing Sheets

Related U.S. Application Data

(60) Provisional application No. 62/252,311, filed on Nov. 6, 2015.

(51) Int. Cl.

| | |
|---|---|
| ***G06F 3/04883*** | (2022.01) |
| ***H04L 51/02*** | (2022.01) |
| ***G06F 3/04886*** | (2022.01) |
| ***H04W 4/12*** | (2009.01) |
| ***G06F 40/166*** | (2020.01) |
| ***H04L 51/216*** | (2022.01) |
| ***H04L 67/52*** | (2022.01) |
| ***G06F 3/0482*** | (2013.01) |
| ***G06F 3/04842*** | (2022.01) |
| ***H04L 51/046*** | (2022.01) |
| *G06Q 50/00* | (2012.01) |
| *G06F 3/16* | (2006.01) |
| *G10L 15/26* | (2006.01) |
| *G10L 15/22* | (2006.01) |
| *H04L 51/10* | (2022.01) |

(52) U.S. Cl.

CPC ...... *G06F 3/04883* (2013.01); *G06F 3/04886* (2013.01); *G06F 40/166* (2020.01); *G06Q 10/107* (2013.01); *G06Q 10/109* (2013.01); *H04L 51/02* (2013.01); *H04L 51/046* (2013.01); *H04L 51/216* (2022.05); *H04L 67/52* (2022.05); *H04W 4/12* (2013.01); *G06F 3/167* (2013.01); *G06F 2203/04105* (2013.01); *G06Q 50/01* (2013.01); *G10L 15/26* (2013.01); *G10L 2015/223* (2013.01); *H04L 51/10* (2013.01)

(58) Field of Classification Search

CPC ....... G06F 3/04842; G06F 2203/04105; G06F 3/167; G06Q 10/107; G06Q 10/109; G06Q 50/01; H04L 51/02; H04L 51/16; H04L 51/046; H04L 67/18; H04L 51/10; H04W 4/12; G10L 15/26; G10L 2015/223

See application file for complete search history.

(56) References Cited

U.S. PATENT DOCUMENTS

| | | | |
|---|---|---|---|
| 2,495,222 | A | 1/1950 | Bierig |
| 3,704,345 | A | 11/1972 | Coker et al. |
| 3,710,321 | A | 1/1973 | Rubenstein |
| 3,787,542 | A | 1/1974 | Gallagher et al. |
| 3,828,132 | A | 8/1974 | Flanagan et al. |
| 3,979,557 | A | 9/1976 | Schulman et al. |
| 4,013,085 | A | 3/1977 | Wright |
| 4,081,631 | A | 3/1978 | Feder |
| 4,090,216 | A | 5/1978 | Constable |
| 4,107,784 | A | 8/1978 | Van Bemmelen |
| 4,108,211 | A | 8/1978 | Tanaka |
| 4,159,536 | A | 6/1979 | Kehoe et al. |
| 4,181,821 | A | 1/1980 | Pirz et al. |
| 4,204,089 | A | 5/1980 | Key et al. |
| 4,241,286 | A | 12/1980 | Gordon |
| 4,253,477 | A | 3/1981 | Eichman |
| 4,278,838 | A | 7/1981 | Antonov |
| 4,282,405 | A | 8/1981 | Taguchi |
| 4,310,721 | A | 1/1982 | Manley et al. |
| 4,332,464 | A | 6/1982 | Bartulis et al. |
| 4,348,553 | A | 9/1982 | Baker et al. |
| 4,384,169 | A | 5/1983 | Mozer et al. |
| 4,386,345 | A | 5/1983 | Narveson et al. |
| 4,433,377 | A | 2/1984 | Eustis et al. |
| 4,451,849 | A | 5/1984 | Fuhrer |
| 4,485,439 | A | 11/1984 | Rothstein |
| 4,495,644 | A | 1/1985 | Parks et al. |
| 4,513,379 | A | 4/1985 | Wilson et al. |
| 4,513,435 | A | 4/1985 | Sakoe et al. |
| 4,555,775 | A | 11/1985 | Pike |
| 4,577,343 | A | 3/1986 | Oura |
| 4,586,158 | A | 4/1986 | Brandle |
| 4,587,670 | A | 5/1986 | Levinson et al. |
| 4,589,022 | A | 5/1986 | Prince et al. |
| 4,611,346 | A | 9/1986 | Bednar et al. |
| 4,615,081 | A | 10/1986 | Lindahl |
| 4,618,984 | A | 10/1986 | Das et al. |
| 4,642,790 | A | 2/1987 | Minshull et al. |
| 4,653,021 | A | 3/1987 | Takagi |
| 4,654,875 | A | 3/1987 | Srihari et al. |
| 4,655,233 | A | 4/1987 | Laughlin |
| 4,658,425 | A | 4/1987 | Julstrom |
| 4,670,848 | A | 6/1987 | Schramm |
| 4,677,570 | A | 6/1987 | Taki |
| 4,680,429 | A | 7/1987 | Murdock et al. |
| 4,680,805 | A | 7/1987 | Scott |
| 4,686,522 | A | 8/1987 | Hernandez et al. |
| 4,688,195 | A | 8/1987 | Thompson et al. |
| 4,692,941 | A | 9/1987 | Jacks et al. |
| 4,698,625 | A | 10/1987 | McCaskill et al. |
| 4,709,390 | A | 11/1987 | Atal et al. |
| 4,713,775 | A | 12/1987 | Scott et al. |
| 4,718,094 | A | 1/1988 | Bahl et al. |
| 4,724,542 | A | 2/1988 | Williford |
| 4,726,065 | A | 2/1988 | Froessl |
| 4,727,354 | A | 2/1988 | Lindsay |
| RE32,632 | E | 3/1988 | Atkinson |
| 4,736,296 | A | 4/1988 | Katayama et al. |
| 4,750,122 | A | 6/1988 | Kaji et al. |
| 4,754,489 | A | 6/1988 | Bokser |
| 4,755,811 | A | 7/1988 | Slavin et al. |
| 4,759,070 | A | 7/1988 | Voroba et al. |
| 4,776,016 | A | 10/1988 | Hansen |
| 4,783,804 | A | 11/1988 | Juang et al. |
| 4,783,807 | A | 11/1988 | Marley |
| 4,785,413 | A | 11/1988 | Atsumi |
| 4,790,028 | A | 12/1988 | Ramage |
| 4,797,930 | A | 1/1989 | Goudie |
| 4,802,223 | A | 1/1989 | Lin et al. |
| 4,803,729 | A | 2/1989 | Baker |
| 4,807,752 | A | 2/1989 | Chodorow |
| 4,811,243 | A | 3/1989 | Racine |
| 4,813,074 | A | 3/1989 | Marcus |
| 4,819,271 | A | 4/1989 | Bahl et al. |
| 4,827,518 | A | 5/1989 | Feustel et al. |
| 4,827,520 | A | 5/1989 | Zeinstra |
| 4,829,576 | A | 5/1989 | Porter |
| 4,829,583 | A | 5/1989 | Monroe et al. |
| 4,831,551 | A | 5/1989 | Schalk et al. |
| 4,833,712 | A | 5/1989 | Bahl et al. |
| 4,833,718 | A | 5/1989 | Sprague |
| 4,837,798 | A | 6/1989 | Cohen et al. |
| 4,837,831 | A | 6/1989 | Gillick et al. |
| 4,839,853 | A | 6/1989 | Deerwester et al. |
| 4,852,168 | A | 7/1989 | Sprague |
| 4,862,504 | A | 8/1989 | Nomura |
| 4,875,187 | A | 10/1989 | Smith |
| 4,878,230 | A | 10/1989 | Murakami et al. |
| 4,887,212 | A | 12/1989 | Zamora et al. |
| 4,896,359 | A | 1/1990 | Yamamoto et al. |
| 4,903,305 | A | 2/1990 | Gillick et al. |
| 4,905,163 | A | 2/1990 | Garber et al. |
| 4,908,867 | A | 3/1990 | Silverman |
| 4,914,586 | A | 4/1990 | Swinehart et al. |
| 4,914,590 | A | 4/1990 | Loatman et al. |
| 4,918,723 | A | 4/1990 | Iggulden et al. |
| 4,926,491 | A | 5/1990 | Maeda et al. |
| 4,928,307 | A | 5/1990 | Lynn |
| 4,931,783 | A | 6/1990 | Atkinson |
| 4,935,954 | A | 6/1990 | Thompson et al. |
| 4,939,639 | A | 7/1990 | Lee et al. |
| 4,941,488 | A | 7/1990 | Marxer et al. |
| 4,944,013 | A | 7/1990 | Gouvianakis et al. |
| 4,945,504 | A | 7/1990 | Nakama et al. |
| 4,953,106 | A | 8/1990 | Gansner et al. |
| 4,955,047 | A | 9/1990 | Morganstein et al. |

(56) References Cited

U.S. PATENT DOCUMENTS

| | | | |
|---|---|---|---|
| 4,965,763 | A | 10/1990 | Zamora |
| 4,972,462 | A | 11/1990 | Shibata |
| 4,974,191 | A | 11/1990 | Amirghodsi et al. |
| 4,975,975 | A | 12/1990 | Filipski |
| 4,977,598 | A | 12/1990 | Doddington et al. |
| 4,980,916 | A | 12/1990 | Zinser |
| 4,985,924 | A | 1/1991 | Matsuura |
| 4,992,972 | A | 2/1991 | Brooks et al. |
| 4,994,966 | A | 2/1991 | Hutchins |
| 4,994,983 | A | 2/1991 | Landell et al. |
| 5,001,774 | A | 3/1991 | Lee |
| 5,003,577 | A | 3/1991 | Ertz et al. |
| 5,007,095 | A | 4/1991 | Nara et al. |
| 5,007,098 | A | 4/1991 | Kumagai |
| 5,010,574 | A | 4/1991 | Wang |
| 5,016,002 | A | 5/1991 | Levanto |
| 5,020,112 | A | 5/1991 | Chou |
| 5,021,971 | A | 6/1991 | Lindsay |
| 5,022,081 | A | 6/1991 | Hirose et al. |
| 5,027,110 | A | 6/1991 | Chang et al. |
| 5,027,406 | A | 6/1991 | Roberts et al. |
| 5,027,408 | A | 6/1991 | Kroeker et al. |
| 5,029,211 | A | 7/1991 | Ozawa |
| 5,031,217 | A | 7/1991 | Nishimura |
| 5,032,989 | A | 7/1991 | Tornetta |
| 5,033,087 | A | 7/1991 | Bahl et al. |
| 5,040,218 | A | 8/1991 | Vitale et al. |
| 5,046,099 | A | 9/1991 | Nishimura |
| 5,047,614 | A | 9/1991 | Bianco |
| 5,047,617 | A | 9/1991 | Shepard et al. |
| 5,050,215 | A | 9/1991 | Nishimura |
| 5,053,758 | A | 10/1991 | Cornett et al. |
| 5,054,084 | A | 10/1991 | Tanaka et al. |
| 5,057,915 | A | 10/1991 | Von Kohorn |
| 5,062,143 | A | 10/1991 | Schmitt |
| 5,067,158 | A | 11/1991 | Arjmand |
| 5,067,503 | A | 11/1991 | Stile |
| 5,075,896 | A | 12/1991 | Wilcox et al. |
| 5,079,723 | A | 1/1992 | Herceg et al. |
| 5,083,119 | A | 1/1992 | Trevett et al. |
| 5,083,268 | A | 1/1992 | Hemphill et al. |
| 5,086,792 | A | 2/1992 | Chodorow |
| 5,090,012 | A | 2/1992 | Kajiyama et al. |
| 5,091,790 | A | 2/1992 | Silverberg |
| 5,091,945 | A | 2/1992 | Kleijn |
| 5,103,498 | A | 4/1992 | Lanier et al. |
| 5,109,509 | A | 4/1992 | Katayama et al. |
| 5,111,423 | A | 5/1992 | Kopec, Jr. et al. |
| 5,119,079 | A | 6/1992 | Hube et al. |
| 5,122,951 | A | 6/1992 | Kamiya |
| 5,123,103 | A | 6/1992 | Ohtaki et al. |
| 5,125,022 | A | 6/1992 | Hunt et al. |
| 5,125,030 | A | 6/1992 | Nomura et al. |
| 5,127,043 | A | 6/1992 | Hunt et al. |
| 5,127,053 | A | 6/1992 | Koch |
| 5,127,055 | A | 6/1992 | Larkey |
| 5,128,672 | A | 7/1992 | Kaehler |
| 5,133,011 | A | 7/1992 | McKiel, Jr. |
| 5,133,023 | A | 7/1992 | Bokser |
| 5,142,584 | A | 8/1992 | Ozawa |
| 5,144,875 | A | 9/1992 | Nakada |
| 5,148,541 | A | 9/1992 | Lee et al. |
| 5,153,913 | A | 10/1992 | Kandefer et al. |
| 5,157,610 | A | 10/1992 | Asano et al. |
| 5,157,779 | A | 10/1992 | Washburn et al. |
| 5,161,102 | A | 11/1992 | Griffin et al. |
| 5,163,809 | A | 11/1992 | Akgun et al. |
| 5,164,900 | A | 11/1992 | Bernath |
| 5,164,982 | A | 11/1992 | Davis |
| 5,165,007 | A | 11/1992 | Bahl et al. |
| 5,167,004 | A | 11/1992 | Netsch et al. |
| 5,175,536 | A | 12/1992 | Aschliman et al. |
| 5,175,803 | A | 12/1992 | Yeh |
| 5,175,814 | A | 12/1992 | Anick et al. |
| 5,179,627 | A | 1/1993 | Sweet et al. |
| 5,179,652 | A | 1/1993 | Rozmanith et al. |
| 5,194,950 | A | 3/1993 | Murakami et al. |
| 5,195,034 | A | 3/1993 | Garneau et al. |
| 5,195,167 | A | 3/1993 | Bahl et al. |
| 5,197,005 | A | 3/1993 | Shwartz et al. |
| 5,199,077 | A | 3/1993 | Wilcox et al. |
| 5,201,034 | A | 4/1993 | Matsuura et al. |
| 5,202,952 | A | 4/1993 | Gillick et al. |
| 5,208,862 | A | 5/1993 | Ozawa |
| 5,210,689 | A | 5/1993 | Baker et al. |
| 5,212,638 | A | 5/1993 | Bernath |
| 5,212,821 | A | 5/1993 | Gorin et al. |
| 5,216,747 | A | 6/1993 | Hardwick et al. |
| 5,218,700 | A | 6/1993 | Beechick |
| 5,220,629 | A | 6/1993 | Kosaka et al. |
| 5,220,639 | A | 6/1993 | Lee |
| 5,220,657 | A | 6/1993 | Bly et al. |
| 5,222,146 | A | 6/1993 | Bahl et al. |
| 5,230,036 | A | 7/1993 | Akamine et al. |
| 5,231,670 | A | 7/1993 | Goldhor et al. |
| 5,235,680 | A | 8/1993 | Bijnagte |
| 5,237,502 | A | 8/1993 | White et al. |
| 5,241,619 | A | 8/1993 | Schwartz et al. |
| 5,252,951 | A | 10/1993 | Tannenbaum et al. |
| 5,253,325 | A | 10/1993 | Clark |
| 5,255,386 | A | 10/1993 | Prager |
| 5,257,387 | A | 10/1993 | Richek et al. |
| 5,260,697 | A | 11/1993 | Barrett et al. |
| 5,266,931 | A | 11/1993 | Tanaka |
| 5,266,949 | A | 11/1993 | Rossi |
| 5,267,345 | A | 11/1993 | Brown et al. |
| 5,268,990 | A | 12/1993 | Cohen et al. |
| 5,274,771 | A | 12/1993 | Hamilton et al. |
| 5,274,818 | A | 12/1993 | Vasilevsky et al. |
| 5,276,616 | A | 1/1994 | Kuga et al. |
| 5,276,794 | A | 1/1994 | Lamb, Jr. |
| 5,278,980 | A | 1/1994 | Pedersen et al. |
| 5,282,265 | A | 1/1994 | Rohra Suda et al. |
| 5,283,818 | A | 2/1994 | Klausner et al. |
| 5,287,448 | A | 2/1994 | Nicol et al. |
| 5,289,562 | A | 2/1994 | Mizuta et al. |
| RE34,562 | E | 3/1994 | Murakami et al. |
| 5,291,286 | A | 3/1994 | Murakami et al. |
| 5,293,254 | A | 3/1994 | Eschbach |
| 5,293,448 | A | 3/1994 | Honda |
| 5,293,452 | A | 3/1994 | Picone et al. |
| 5,296,642 | A | 3/1994 | Konishi |
| 5,297,170 | A | 3/1994 | Eyuboglu et al. |
| 5,297,194 | A | 3/1994 | Hunt et al. |
| 5,299,125 | A | 3/1994 | Baker et al. |
| 5,299,284 | A | 3/1994 | Roy |
| 5,301,109 | A | 4/1994 | Landauer et al. |
| 5,303,406 | A | 4/1994 | Hansen et al. |
| 5,305,205 | A | 4/1994 | Weber et al. |
| 5,305,421 | A | 4/1994 | Li et al. |
| 5,305,768 | A | 4/1994 | Gross et al. |
| 5,309,359 | A | 5/1994 | Katz et al. |
| 5,315,689 | A | 5/1994 | Kanazawa et al. |
| 5,317,507 | A | 5/1994 | Gallant |
| 5,317,647 | A | 5/1994 | Pagallo |
| 5,325,297 | A | 6/1994 | Bird et al. |
| 5,325,298 | A | 6/1994 | Gallant |
| 5,325,462 | A | 6/1994 | Farrett |
| 5,326,270 | A | 7/1994 | Ostby et al. |
| 5,327,342 | A | 7/1994 | Roy |
| 5,327,498 | A | 7/1994 | Hamon |
| 5,329,608 | A | 7/1994 | Bocchieri et al. |
| 5,333,236 | A | 7/1994 | Bahl et al. |
| 5,333,266 | A | 7/1994 | Boaz et al. |
| 5,333,275 | A | 7/1994 | Wheatley et al. |
| 5,335,011 | A | 8/1994 | Addeo et al. |
| 5,335,276 | A | 8/1994 | Thompson et al. |
| 5,341,293 | A | 8/1994 | Vertelney et al. |
| 5,341,466 | A | 8/1994 | Perlin et al. |
| 5,345,536 | A | 9/1994 | Hoshimi et al. |
| 5,349,645 | A | 9/1994 | Zhao |
| 5,353,374 | A | 10/1994 | Wilson et al. |
| 5,353,376 | A | 10/1994 | Oh et al. |
| 5,353,377 | A | 10/1994 | Kuroda et al. |

(56) References Cited

U.S. PATENT DOCUMENTS

| | | | |
|---|---|---|---|
| 5,353,408 | A | 10/1994 | Kato et al. |
| 5,353,432 | A | 10/1994 | Richek et al. |
| 5,357,431 | A | 10/1994 | Nakada et al. |
| 5,367,640 | A | 11/1994 | Hamilton et al. |
| 5,369,575 | A | 11/1994 | Lamberti et al. |
| 5,369,577 | A | 11/1994 | Kadashevich et al. |
| 5,371,853 | A | 12/1994 | Kao et al. |
| 5,371,901 | A | 12/1994 | Reed et al. |
| 5,373,566 | A | 12/1994 | Murdock |
| 5,377,103 | A | 12/1994 | Lamberti et al. |
| 5,377,301 | A | 12/1994 | Rosenberg et al. |
| 5,377,303 | A | 12/1994 | Firman |
| 5,384,671 | A | 1/1995 | Fisher |
| 5,384,892 | A | 1/1995 | Strong |
| 5,384,893 | A | 1/1995 | Hutchins |
| 5,386,494 | A | 1/1995 | White |
| 5,386,556 | A | 1/1995 | Hedin et al. |
| 5,390,236 | A | 2/1995 | Klausner et al. |
| 5,390,279 | A | 2/1995 | Strong |
| 5,390,281 | A | 2/1995 | Luciw et al. |
| 5,392,419 | A | 2/1995 | Walton |
| 5,396,625 | A | 3/1995 | Parkes |
| 5,400,434 | A | 3/1995 | Pearson |
| 5,404,295 | A | 4/1995 | Katz et al. |
| 5,406,305 | A | 4/1995 | Shimomura et al. |
| 5,408,060 | A | 4/1995 | Muurinen |
| 5,412,756 | A | 5/1995 | Bauman et al. |
| 5,412,804 | A | 5/1995 | Krishna |
| 5,412,806 | A | 5/1995 | Du et al. |
| 5,418,951 | A | 5/1995 | Damashek |
| 5,422,656 | A | 6/1995 | Allard et al. |
| 5,424,947 | A | 6/1995 | Nagao et al. |
| 5,425,108 | A | 6/1995 | Hwang et al. |
| 5,428,731 | A | 6/1995 | Powers, III |
| 5,434,777 | A | 7/1995 | Luciw |
| 5,440,615 | A | 8/1995 | Caccuro et al. |
| 5,442,598 | A | 8/1995 | Haikawa et al. |
| 5,442,780 | A | 8/1995 | Takanashi et al. |
| 5,444,823 | A | 8/1995 | Nguyen |
| 5,449,368 | A | 9/1995 | Kuzmak |
| 5,450,523 | A | 9/1995 | Zhao |
| 5,455,888 | A | 10/1995 | Iyengar et al. |
| 5,457,768 | A | 10/1995 | Tsuboi et al. |
| 5,459,488 | A | 10/1995 | Geiser |
| 5,463,696 | A | 10/1995 | Beernink et al. |
| 5,463,725 | A | 10/1995 | Henckel et al. |
| 5,465,401 | A | 11/1995 | Thompson |
| 5,469,529 | A | 11/1995 | Bimbot et al. |
| 5,471,611 | A | 11/1995 | McGregor |
| 5,473,728 | A | 12/1995 | Luginbuhl et al. |
| 5,475,587 | A | 12/1995 | Anick et al. |
| 5,475,796 | A | 12/1995 | Iwata |
| 5,477,447 | A | 12/1995 | Luciw et al. |
| 5,477,448 | A | 12/1995 | Golding et al. |
| 5,477,451 | A | 12/1995 | Brown et al. |
| 5,479,488 | A | 12/1995 | Lennig et al. |
| 5,481,739 | A | 1/1996 | Staats |
| 5,483,261 | A | 1/1996 | Yasutake |
| 5,485,372 | A | 1/1996 | Golding et al. |
| 5,485,543 | A | 1/1996 | Aso |
| 5,488,204 | A | 1/1996 | Mead et al. |
| 5,488,727 | A | 1/1996 | Agrawal et al. |
| 5,490,234 | A | 2/1996 | Narayan |
| 5,491,758 | A | 2/1996 | Bellegarda et al. |
| 5,491,772 | A | 2/1996 | Hardwick et al. |
| 5,493,677 | A | 2/1996 | Balogh et al. |
| 5,495,604 | A | 2/1996 | Harding et al. |
| 5,497,319 | A | 3/1996 | Chong et al. |
| 5,500,903 | A | 3/1996 | Gulli |
| 5,500,905 | A | 3/1996 | Martin et al. |
| 5,500,937 | A | 3/1996 | Thompson-Rohrlich |
| 5,502,774 | A | 3/1996 | Bellegarda et al. |
| 5,502,790 | A | 3/1996 | Yi |
| 5,502,791 | A | 3/1996 | Nishimura et al. |
| 5,506,951 | A | 4/1996 | Ishikawa |
| 5,515,475 | A | 5/1996 | Gupta et al. |
| 5,521,816 | A | 5/1996 | Roche et al. |
| 5,524,140 | A | 6/1996 | Klausner et al. |
| 5,530,861 | A | 6/1996 | Diamant et al. |
| 5,533,182 | A | 7/1996 | Bates et al. |
| 5,535,121 | A | 7/1996 | Roche et al. |
| 5,536,902 | A | 7/1996 | Serra et al. |
| 5,537,317 | A | 7/1996 | Schabes et al. |
| 5,537,618 | A | 7/1996 | Boulton et al. |
| 5,537,647 | A | 7/1996 | Hermansky et al. |
| 5,543,588 | A | 8/1996 | Bisset et al. |
| 5,543,897 | A | 8/1996 | Altrieth, III |
| 5,544,264 | A | 8/1996 | Bellegarda et al. |
| 5,548,507 | A | 8/1996 | Martino et al. |
| 5,555,343 | A | 9/1996 | Luther |
| 5,555,344 | A | 9/1996 | Zunkler |
| 5,559,301 | A | 9/1996 | Bryan, Jr. et al. |
| 5,559,945 | A | 9/1996 | Beaudet et al. |
| 5,564,446 | A | 10/1996 | Wiltshire |
| 5,565,888 | A | 10/1996 | Selker |
| 5,568,536 | A | 10/1996 | Tiller et al. |
| 5,568,540 | A | 10/1996 | Greco et al. |
| 5,570,324 | A | 10/1996 | Geil |
| 5,572,576 | A | 11/1996 | Klausner et al. |
| 5,574,823 | A | 11/1996 | Hassanein et al. |
| 5,574,824 | A | 11/1996 | Slyh et al. |
| 5,577,135 | A | 11/1996 | Grajski et al. |
| 5,577,164 | A | 11/1996 | Kaneko et al. |
| 5,577,241 | A | 11/1996 | Spencer |
| 5,578,808 | A | 11/1996 | Taylor |
| 5,579,037 | A | 11/1996 | Tahara et al. |
| 5,579,436 | A | 11/1996 | Chou et al. |
| 5,581,484 | A | 12/1996 | Prince |
| 5,581,652 | A | 12/1996 | Abe et al. |
| 5,581,655 | A | 12/1996 | Cohen et al. |
| 5,583,993 | A | 12/1996 | Foster et al. |
| 5,584,024 | A | 12/1996 | Shwartz |
| 5,586,540 | A | 12/1996 | Marzec et al. |
| 5,594,641 | A | 1/1997 | Kaplan et al. |
| 5,596,260 | A | 1/1997 | Moravec et al. |
| 5,596,676 | A | 1/1997 | Swaminathan et al. |
| 5,596,994 | A | 1/1997 | Bro |
| 5,608,624 | A | 3/1997 | Luciw |
| 5,608,698 | A | 3/1997 | Yamanoi et al. |
| 5,608,841 | A | 3/1997 | Tsuboka |
| 5,610,812 | A | 3/1997 | Schabes et al. |
| 5,613,036 | A | 3/1997 | Strong |
| 5,613,122 | A | 3/1997 | Burnard et al. |
| 5,615,378 | A | 3/1997 | Nishino et al. |
| 5,615,384 | A | 3/1997 | Allard et al. |
| 5,616,876 | A | 4/1997 | Cluts |
| 5,617,386 | A | 4/1997 | Choi |
| 5,617,507 | A | 4/1997 | Lee et al. |
| 5,617,539 | A | 4/1997 | Ludwig et al. |
| 5,619,583 | A | 4/1997 | Page et al. |
| 5,619,694 | A | 4/1997 | Shimazu |
| 5,621,859 | A | 4/1997 | Schwartz et al. |
| 5,621,903 | A | 4/1997 | Luciw et al. |
| 5,627,939 | A | 5/1997 | Huang et al. |
| 5,634,084 | A | 5/1997 | Malsheen et al. |
| 5,636,325 | A | 6/1997 | Farrett |
| 5,638,425 | A | 6/1997 | Meador, III et al. |
| 5,638,489 | A | 6/1997 | Tsuboka |
| 5,638,523 | A | 6/1997 | Mullet et al. |
| 5,640,487 | A | 6/1997 | Lau et al. |
| 5,642,464 | A | 6/1997 | Yue et al. |
| 5,642,466 | A | 6/1997 | Narayan |
| 5,642,519 | A | 6/1997 | Martin |
| 5,644,656 | A | 7/1997 | Akra et al. |
| 5,644,727 | A | 7/1997 | Atkins |
| 5,644,735 | A | 7/1997 | Luciw et al. |
| 5,649,060 | A | 7/1997 | Ellozy et al. |
| 5,652,828 | A | 7/1997 | Silverman |
| 5,652,884 | A | 7/1997 | Palevich |
| 5,652,897 | A | 7/1997 | Linebarger et al. |
| 5,661,787 | A | 8/1997 | Pocock |
| 5,664,055 | A | 9/1997 | Kroon |
| 5,664,206 | A | 9/1997 | Murow et al. |
| 5,670,985 | A | 9/1997 | Cappels, Sr. et al. |

(56) References Cited

U.S. PATENT DOCUMENTS 5,675,704 A 10/1997 Juang et al.
5,675,819 A 10/1997 Schuetze
5,678,039 A 10/1997 Hinks et al.
5,678,053 A 10/1997 Anderson
5,682,475 A 10/1997 Johnson et al.
5,682,539 A 10/1997 Conrad et al.
5,684,513 A 11/1997 Decker
5,687,077 A 11/1997 Gough, Jr.
5,689,287 A 11/1997 Mackinlay et al.
5,689,616 A 11/1997 Li
5,689,618 A 11/1997 Gasper et al.
5,692,205 A 11/1997 Berry et al.
5,696,962 A 12/1997 Kupiec
5,697,793 A 12/1997 Huffman et al.
5,699,082 A 12/1997 Marks et al.
5,701,400 A 12/1997 Amado
5,706,442 A 1/1998 Anderson et al.
5,708,659 A 1/1998 Rostoker et al.
5,708,822 A 1/1998 Wical
5,710,886 A 1/1998 Christensen et al.
5,710,922 A 1/1998 Alley et al.
5,712,949 A 1/1998 Kato et al.
5,712,957 A 1/1998 Waibel et al.
5,715,468 A 2/1998 Budzinski
5,717,877 A 2/1998 Orton et al.
5,721,827 A 2/1998 Logan et al.
5,721,949 A 2/1998 Smith et al.
5,724,406 A 3/1998 Juster
5,724,985 A 3/1998 Snell et al.
5,726,672 A 3/1998 Hernandez et al.
5,727,950 A 3/1998 Cook et al.
5,729,694 A 3/1998 Holzrichter et al.
5,729,704 A 3/1998 Stone et al.
5,732,216 A 3/1998 Logan et al.
5,732,390 A 3/1998 Katayanagi et al.
5,732,395 A 3/1998 Silverman
5,734,750 A 3/1998 Arai et al.
5,734,791 A 3/1998 Acero et al.
5,736,974 A 4/1998 Selker
5,737,487 A 4/1998 Bellegarda et al.
5,737,609 A 4/1998 Reed et al.
5,737,734 A 4/1998 Schultz
5,739,451 A 4/1998 Winksy et al.
5,740,143 A 4/1998 Suetomi
5,742,705 A 4/1998 Parthasarathy
5,742,736 A 4/1998 Haddock
5,745,116 A 4/1998 Pisutha-Arnond
5,745,843 A 4/1998 Wetters et al.
5,745,873 A 4/1998 Braida et al.
5,748,512 A 5/1998 Vargas
5,748,974 A 5/1998 Johnson
5,749,071 A 5/1998 Silverman
5,749,081 A 5/1998 Whiteis
5,751,906 A 5/1998 Silverman
5,757,358 A 5/1998 Osga
5,757,979 A 5/1998 Hongo et al.
5,758,024 A 5/1998 Alieva
5,758,079 A 5/1998 Ludwig et al.
5,758,083 A 5/1998 Singh et al.
5,758,314 A 5/1998 McKenna
5,758,318 A 5/1998 Kojima et al.
5,759,101 A 6/1998 Von Kohorn
5,761,640 A 6/1998 Kalyanswamy et al.
5,761,687 A 6/1998 Hon et al.
5,764,852 A 6/1998 Williams
5,765,131 A 6/1998 Stentiford et al.
5,765,168 A 6/1998 Burrows
5,771,276 A 6/1998 Wolf
5,774,834 A 6/1998 Visser
5,774,855 A 6/1998 Foti et al.
5,774,859 A 6/1998 Houser et al.
5,777,614 A 7/1998 Ando et al.
5,778,405 A 7/1998 Ogawa
5,790,978 A 8/1998 Olive et al.
5,794,050 A 8/1998 Dahlgren et al.
5,794,182 A 8/1998 Manduchi et al.
5,794,207 A 8/1998 Walker et al.
5,794,237 A 8/1998 Gore, Jr.
5,797,008 A 8/1998 Burrows
5,799,268 A 8/1998 Boguraev
5,799,269 A 8/1998 Schabes et al.
5,799,276 A 8/1998 Komissarchik et al.
5,799,279 A 8/1998 Gould et al.
5,801,692 A 9/1998 Muzio et al.
5,802,466 A 9/1998 Gallant et al.
5,802,526 A 9/1998 Fawcett et al.
5,806,021 A 9/1998 Chen et al.
5,812,697 A 9/1998 Sakai et al.
5,812,698 A 9/1998 Platt et al.
5,815,142 A 9/1998 Allard et al.
5,815,225 A 9/1998 Nelson
5,818,142 A 10/1998 Edleblute et al.
5,818,451 A 10/1998 Bertram et al.
5,818,924 A 10/1998 King et al.
5,822,288 A 10/1998 Shinada
5,822,720 A 10/1998 Bookman et al.
5,822,730 A 10/1998 Roth et al.
5,822,743 A 10/1998 Gupta et al.
5,825,349 A 10/1998 Meier et al.
5,825,352 A 10/1998 Bisset et al.
5,825,881 A 10/1998 Colvin, Sr.
5,826,261 A 10/1998 Spencer
5,828,768 A 10/1998 Eatwell et al.
5,828,999 A 10/1998 Bellegarda et al.
5,832,428 A 11/1998 Chow et al.
5,832,433 A 11/1998 Yashchin et al.
5,832,435 A 11/1998 Silverman
5,833,134 A 11/1998 Ho et al.
5,835,077 A 11/1998 Dao et al.
5,835,079 A 11/1998 Shieh
5,835,721 A 11/1998 Donahue et al.
5,835,732 A 11/1998 Kikinis et al.
5,835,893 A 11/1998 Ushioda
5,839,106 A 11/1998 Bellegarda
5,841,902 A 11/1998 Tu
5,842,165 A 11/1998 Raman et al.
5,845,255 A 12/1998 Mayaud
5,848,410 A 12/1998 Walls et al.
5,850,480 A 12/1998 Scanlon
5,850,629 A 12/1998 Holm et al.
5,852,801 A 12/1998 Hon et al.
5,854,893 A 12/1998 Ludwig et al.
5,855,000 A 12/1998 Waibel et al.
5,857,184 A 1/1999 Lynch
5,859,636 A 1/1999 Pandit
5,860,063 A 1/1999 Gorin et al.
5,860,064 A 1/1999 Henton
5,860,075 A 1/1999 Hashizume et al.
5,862,223 A 1/1999 Walker et al.
5,862,233 A 1/1999 Poletti
5,864,806 A 1/1999 Mokbel et al.
5,864,815 A 1/1999 Rozak et al.
5,864,844 A 1/1999 James et al.
5,864,855 A 1/1999 Ruocco et al.
5,867,799 A 2/1999 Lang et al.
5,870,710 A 2/1999 Ozawa et al.
5,873,056 A 2/1999 Liddy et al.
5,873,064 A 2/1999 De Armas et al.
5,875,427 A 2/1999 Yamazaki
5,875,429 A 2/1999 Douglas
5,875,437 A 2/1999 Atkins
5,876,396 A 3/1999 Lo et al.
5,877,751 A 3/1999 Kanemitsu et al.
5,877,757 A 3/1999 Baldwin et al.
5,878,393 A 3/1999 Hata et al.
5,878,394 A 3/1999 Muhling
5,878,396 A 3/1999 Henton
5,880,411 A 3/1999 Gillespie et al.
5,880,731 A 3/1999 Liles et al.
5,884,039 A 3/1999 Ludwig et al.
5,884,262 A 3/1999 Wise et al.
5,884,323 A 3/1999 Hawkins et al.
5,890,117 A 3/1999 Silverman
5,890,122 A 3/1999 Van et al.

(56) References Cited

U.S. PATENT DOCUMENTS 5,891,180 A 4/1999 Greeninger et al.
5,893,126 A 4/1999 Drews et al.
5,893,132 A 4/1999 Huffman et al.
5,895,448 A 4/1999 Vysotsky et al.
5,895,464 A 4/1999 Bhandari et al.
5,895,466 A 4/1999 Goldberg et al.
5,896,321 A 4/1999 Miller et al.
5,896,500 A 4/1999 Ludwig et al.
5,899,972 A 5/1999 Miyazawa et al.
5,905,498 A 5/1999 Diament et al.
5,907,597 A 5/1999 Mark
5,909,666 A 6/1999 Gould et al.
5,912,951 A 6/1999 Checchio et al.
5,912,952 A 6/1999 Brendzel
5,913,185 A 6/1999 Martino et al.
5,913,193 A 6/1999 Huang et al.
5,915,001 A 6/1999 Uppaluru et al.
5,915,236 A 6/1999 Gould et al.
5,915,238 A 6/1999 Tjaden
5,915,249 A 6/1999 Spencer
5,917,487 A 6/1999 Ulrich
5,918,303 A 6/1999 Yamaura et al.
5,920,327 A 7/1999 Seidensticker, Jr.
5,920,836 A 7/1999 Gould et al.
5,920,837 A 7/1999 Gould et al.
5,923,757 A 7/1999 Hocker et al.
5,924,068 A 7/1999 Richard et al.
5,926,769 A 7/1999 Valimaa et al.
5,926,789 A 7/1999 Barbara et al.
5,930,408 A 7/1999 Seto
5,930,751 A 7/1999 Cohrs et al.
5,930,754 A 7/1999 Karaali et al.
5,930,769 A 7/1999 Rose
5,930,783 A 7/1999 Li et al.
5,933,477 A 8/1999 Wu
5,933,806 A 8/1999 Beyerlein et al.
5,933,822 A 8/1999 Braden-Harder et al.
5,936,926 A 8/1999 Yokouchi et al.
5,937,163 A 8/1999 Lee et al.
5,940,811 A 8/1999 Norris
5,940,841 A 8/1999 Schmuck et al.
5,941,944 A 8/1999 Messerly
5,943,043 A 8/1999 Furuhata et al.
5,943,049 A 8/1999 Matsubara et al.
5,943,052 A 8/1999 Allen et al.
5,943,429 A 8/1999 Haendel et al.
5,943,443 A 8/1999 Itonori et al.
5,943,670 A 8/1999 Prager
5,946,647 A 8/1999 Miller et al.
5,946,648 A 8/1999 Halstead et al.
5,948,040 A 9/1999 DeLorme et al.
5,949,961 A 9/1999 Sharman
5,950,123 A 9/1999 Schwelb et al.
5,952,992 A 9/1999 Helms
5,953,541 A 9/1999 King et al.
5,956,021 A 9/1999 Kubota et al.
5,956,699 A 9/1999 Wong et al.
5,960,385 A 9/1999 Skiena et al.
5,960,394 A 9/1999 Gould et al.
5,960,422 A 9/1999 Prasad
5,963,208 A 10/1999 Dolan et al.
5,963,924 A 10/1999 Williams et al.
5,963,964 A 10/1999 Nielsen
5,966,126 A 10/1999 Szabo
5,970,446 A 10/1999 Goldberg et al.
5,970,451 A 10/1999 Lewis et al.
5,970,460 A 10/1999 Bunce et al.
5,970,474 A 10/1999 LeRoy et al.
5,973,612 A 10/1999 Deo et al.
5,973,676 A 10/1999 Kawakura
5,974,146 A 10/1999 Randle et al.
5,977,950 A 11/1999 Rhyne
5,982,352 A 11/1999 Pryor
5,982,370 A 11/1999 Kamper
5,982,891 A 11/1999 Ginter et al.
5,982,902 A 11/1999 Terano
5,983,179 A 11/1999 Gould et al.
5,983,184 A 11/1999 Noguchi
5,983,216 A 11/1999 Kirsch et al.
5,987,132 A 11/1999 Rowney
5,987,140 A 11/1999 Rowney et al.
5,987,401 A 11/1999 Trudeau
5,987,404 A 11/1999 Della Pietra et al.
5,987,440 A 11/1999 O'Neil et al.
5,990,887 A 11/1999 Redpath et al.
5,991,441 A 11/1999 Jourjine
5,995,460 A 11/1999 Takagi et al.
5,995,590 A 11/1999 Brunet et al.
5,995,918 A 11/1999 Kendall et al.
5,998,972 A 12/1999 Gong
5,999,169 A 12/1999 Lee
5,999,895 A 12/1999 Forest
5,999,908 A 12/1999 Abelow
5,999,927 A 12/1999 Tukey et al.
6,005,495 A 12/1999 Connolly et al.
6,006,274 A 12/1999 Hawkins et al.
6,009,237 A 12/1999 Hirabayashi et al.
6,011,585 A 1/2000 Anderson
6,014,428 A 1/2000 Wolf
6,016,471 A 1/2000 Kuhn et al.
6,017,219 A 1/2000 Adams, Jr. et al.
6,018,705 A 1/2000 Gaudet
6,018,711 A 1/2000 French-St. George et al.
6,020,881 A 2/2000 Naughton et al.
6,023,536 A 2/2000 Visser
6,023,676 A 2/2000 Erell
6,023,684 A 2/2000 Pearson
6,024,288 A 2/2000 Gottlich et al.
6,026,345 A 2/2000 Shah et al.
6,026,375 A 2/2000 Hall et al.
6,026,388 A 2/2000 Liddy et al.
6,026,393 A 2/2000 Gupta et al.
6,029,132 A 2/2000 Kuhn et al.
6,029,135 A 2/2000 Krasle
6,035,267 A 3/2000 Watanabe et al.
6,035,303 A 3/2000 Baer et al.
6,035,336 A 3/2000 Lu et al.
6,038,533 A 3/2000 Buchsbaum et al.
6,040,824 A 3/2000 Maekawa et al.
6,041,023 A 3/2000 Lakhansingh
6,047,255 A 4/2000 Williamson
6,047,300 A 4/2000 Walfish et al.
6,052,654 A 4/2000 Gaudet et al.
6,052,656 A 4/2000 Suda et al.
6,054,990 A 4/2000 Tran
6,055,514 A 4/2000 Wren
6,055,531 A 4/2000 Bennett et al.
6,061,646 A 5/2000 Martino et al.
6,064,767 A 5/2000 Muir et al.
6,064,951 A 5/2000 Park et al.
6,064,959 A 5/2000 Young et al.
6,064,960 A 5/2000 Bellegarda et al.
6,064,963 A 5/2000 Gainsboro
6,067,519 A 5/2000 Lowry
6,069,648 A 5/2000 Suso et al.
6,070,138 A 5/2000 Iwata
6,070,139 A 5/2000 Miyazawa et al.
6,070,140 A 5/2000 Tran
6,070,147 A 5/2000 Harms et al.
6,073,033 A 6/2000 Campo
6,073,036 A 6/2000 Heikkinen et al.
6,073,091 A 6/2000 Kanevsky et al.
6,073,097 A 6/2000 Gould et al.
6,076,051 A 6/2000 Messerly et al.
6,076,060 A 6/2000 Lin et al.
6,076,088 A 6/2000 Paik et al.
6,078,885 A 6/2000 Beutnagel
6,078,914 A 6/2000 Redfern
6,081,750 A 6/2000 Hoffberg et al.
6,081,774 A 6/2000 de Hita et al.
6,081,780 A 6/2000 Lumelsky
6,085,204 A 7/2000 Chijiwa et al.
6,088,671 A 7/2000 Gould et al.
6,088,731 A 7/2000 Kiraly et al.

(56) References Cited

U.S. PATENT DOCUMENTS

| | | | |
|---|---|---|---|
| 6,092,036 | A | 7/2000 | Hamann et al. |
| 6,092,038 | A | 7/2000 | Kanevsky et al. |
| 6,092,043 | A | 7/2000 | Squires et al. |
| 6,094,649 | A | 7/2000 | Bowen et al. |
| 6,097,391 | A | 8/2000 | Wilcox |
| 6,101,468 | A | 8/2000 | Gould et al. |
| 6,101,470 | A | 8/2000 | Eide et al. |
| 6,105,865 | A | 8/2000 | Hardesty |
| 6,108,627 | A | 8/2000 | Sabourin |
| 6,108,640 | A | 8/2000 | Slotznick |
| 6,111,562 | A | 8/2000 | Downs et al. |
| 6,111,572 | A | 8/2000 | Blair et al. |
| 6,115,686 | A | 9/2000 | Chung et al. |
| 6,116,907 | A | 9/2000 | Baker et al. |
| 6,119,101 | A | 9/2000 | Peckover |
| 6,121,960 | A | 9/2000 | Carroll et al. |
| 6,122,340 | A | 9/2000 | Darley et al. |
| 6,122,614 | A | 9/2000 | Kahn et al. |
| 6,122,616 | A | 9/2000 | Henton |
| 6,122,647 | A | 9/2000 | Horowitz et al. |
| 6,125,284 | A | 9/2000 | Moore et al. |
| 6,125,346 | A | 9/2000 | Nishimura et al. |
| 6,125,356 | A | 9/2000 | Brockman et al. |
| 6,129,582 | A | 10/2000 | Wilhite et al. |
| 6,138,098 | A | 10/2000 | Shieber et al. |
| 6,138,158 | A | 10/2000 | Boyle et al. |
| 6,141,642 | A | 10/2000 | Oh |
| 6,141,644 | A | 10/2000 | Kuhn et al. |
| 6,144,377 | A | 11/2000 | Oppermann et al. |
| 6,144,380 | A | 11/2000 | Shwarts et al. |
| 6,144,938 | A | 11/2000 | Surace et al. |
| 6,144,939 | A | 11/2000 | Pearson et al. |
| 6,151,401 | A | 11/2000 | Annaratone |
| 6,154,551 | A | 11/2000 | Frenkel |
| 6,154,720 | A | 11/2000 | Onishi et al. |
| 6,157,935 | A | 12/2000 | Tran et al. |
| 6,161,084 | A | 12/2000 | Messerly et al. |
| 6,161,087 | A | 12/2000 | Wightman et al. |
| 6,161,944 | A | 12/2000 | Leman |
| 6,163,769 | A | 12/2000 | Acero et al. |
| 6,163,809 | A | 12/2000 | Buckley |
| 6,167,369 | A | 12/2000 | Schulze |
| 6,169,538 | B1 | 1/2001 | Nowlan et al. |
| 6,172,948 | B1 | 1/2001 | Keller et al. |
| 6,173,194 | B1 | 1/2001 | Vanttila |
| 6,173,251 | B1 | 1/2001 | Ito et al. |
| 6,173,261 | B1 | 1/2001 | Arai et al. |
| 6,173,263 | B1 | 1/2001 | Conkie |
| 6,173,279 | B1 | 1/2001 | Levin et al. |
| 6,177,905 | B1 | 1/2001 | Welch |
| 6,177,931 | B1 | 1/2001 | Alexander et al. |
| 6,179,432 | B1 | 1/2001 | Zhang et al. |
| 6,182,028 | B1 | 1/2001 | Karaali et al. |
| 6,182,099 | B1 | 1/2001 | Nakasato |
| 6,185,533 | B1 | 2/2001 | Holm et al. |
| 6,188,391 | B1 | 2/2001 | Seely et al. |
| 6,188,967 | B1 | 2/2001 | Kurtzberg et al. |
| 6,188,999 | B1 | 2/2001 | Moody |
| 6,191,939 | B1 | 2/2001 | Burnett |
| 6,192,253 | B1 | 2/2001 | Charlier et al. |
| 6,192,340 | B1 | 2/2001 | Abecassis |
| 6,195,641 | B1 | 2/2001 | Loring et al. |
| 6,199,076 | B1 | 3/2001 | Logan et al. |
| 6,205,456 | B1 | 3/2001 | Nakao |
| 6,208,044 | B1 | 3/2001 | Viswanadham et al. |
| 6,208,932 | B1 | 3/2001 | Ohmura et al. |
| 6,208,956 | B1 | 3/2001 | Motoyama |
| 6,208,964 | B1 | 3/2001 | Sabourin |
| 6,208,967 | B1 | 3/2001 | Pauws et al. |
| 6,208,971 | B1 | 3/2001 | Bellegarda et al. |
| 6,212,564 | B1 | 4/2001 | Harter et al. |
| 6,216,102 | B1 | 4/2001 | Martino et al. |
| 6,216,131 | B1 | 4/2001 | Liu et al. |
| 6,217,183 | B1 | 4/2001 | Shipman |
| 6,222,347 | B1 | 4/2001 | Gong |
| 6,226,403 | B1 | 5/2001 | Parthasarathy |
| 6,226,533 | B1 | 5/2001 | Akahane |
| 6,226,614 | B1 | 5/2001 | Mizuno et al. |
| 6,226,655 | B1 | 5/2001 | Borman et al. |
| 6,230,322 | B1 | 5/2001 | Saib et al. |
| 6,232,539 | B1 | 5/2001 | Looney et al. |
| 6,232,966 | B1 | 5/2001 | Kurlander |
| 6,233,545 | B1 | 5/2001 | Datig |
| 6,233,547 | B1 | 5/2001 | Denber et al. |
| 6,233,559 | B1 | 5/2001 | Balakrishnan |
| 6,233,578 | B1 | 5/2001 | Machihara et al. |
| 6,237,025 | B1 | 5/2001 | Ludwig et al. |
| 6,240,303 | B1 | 5/2001 | Katzur |
| 6,243,681 | B1 | 6/2001 | Guji et al. |
| 6,246,981 | B1 | 6/2001 | Papineni et al. |
| 6,249,606 | B1 | 6/2001 | Kiraly et al. |
| 6,259,436 | B1 | 7/2001 | Moon et al. |
| 6,259,826 | B1 | 7/2001 | Pollard et al. |
| 6,260,011 | B1 | 7/2001 | Heckerman et al. |
| 6,260,013 | B1 | 7/2001 | Sejnoha |
| 6,260,016 | B1 | 7/2001 | Holm et al. |
| 6,260,024 | B1 | 7/2001 | Shkedy |
| 6,266,098 | B1 | 7/2001 | Cove et al. |
| 6,266,637 | B1 | 7/2001 | Donovan et al. |
| 6,268,859 | B1 | 7/2001 | Andresen et al. |
| 6,269,712 | B1 | 8/2001 | Zentmyer |
| 6,271,835 | B1 | 8/2001 | Hoeksma |
| 6,272,456 | B1 | 8/2001 | De Campos |
| 6,272,464 | B1 | 8/2001 | Kiraz et al. |
| 6,275,795 | B1 | 8/2001 | Tzirkel-Hancock |
| 6,275,824 | B1 | 8/2001 | O'Flaherty et al. |
| 6,278,443 | B1 | 8/2001 | Amro et al. |
| 6,278,970 | B1 | 8/2001 | Milner |
| 6,282,507 | B1 | 8/2001 | Horiguchi et al. |
| 6,282,511 | B1 | 8/2001 | Mayer |
| 6,285,785 | B1 | 9/2001 | Bellegarda et al. |
| 6,285,786 | B1 | 9/2001 | Seni et al. |
| 6,289,085 | B1 | 9/2001 | Miyashita et al. |
| 6,289,124 | B1 | 9/2001 | Okamoto |
| 6,289,301 | B1 | 9/2001 | Higginbotham et al. |
| 6,289,353 | B1 | 9/2001 | Hazlehurst et al. |
| 6,292,772 | B1 | 9/2001 | Kantrowitz |
| 6,292,778 | B1 | 9/2001 | Sukkar |
| 6,295,390 | B1 | 9/2001 | Kobayashi et al. |
| 6,295,541 | B1 | 9/2001 | Bodnar et al. |
| 6,297,818 | B1 | 10/2001 | Ulrich et al. |
| 6,298,314 | B1 | 10/2001 | Blackadar et al. |
| 6,298,321 | B1 | 10/2001 | Karlov et al. |
| 6,300,947 | B1 | 10/2001 | Kanevsky |
| 6,304,844 | B1 | 10/2001 | Pan et al. |
| 6,304,846 | B1 | 10/2001 | George et al. |
| 6,307,548 | B1 | 10/2001 | Flinchem et al. |
| 6,308,149 | B1 | 10/2001 | Gaussier et al. |
| 6,310,610 | B1 | 10/2001 | Beaton et al. |
| 6,311,152 | B1 | 10/2001 | Bai et al. |
| 6,311,157 | B1 | 10/2001 | Strong |
| 6,311,189 | B1 | 10/2001 | deVries et al. |
| 6,317,237 | B1 | 11/2001 | Nakao et al. |
| 6,317,594 | B1 | 11/2001 | Gossman et al. |
| 6,317,707 | B1 | 11/2001 | Bangalore et al. |
| 6,317,831 | B1 | 11/2001 | King |
| 6,321,092 | B1 | 11/2001 | Fitch et al. |
| 6,321,179 | B1 | 11/2001 | Glance et al. |
| 6,323,846 | B1 | 11/2001 | Westerman et al. |
| 6,324,499 | B1 | 11/2001 | Lewis et al. |
| 6,324,502 | B1 | 11/2001 | Handel et al. |
| 6,324,512 | B1 | 11/2001 | Junqua et al. |
| 6,324,514 | B2 | 11/2001 | Matulich et al. |
| 6,330,538 | B1 | 12/2001 | Breen |
| 6,331,867 | B1 | 12/2001 | Eberhard et al. |
| 6,332,175 | B1 | 12/2001 | Birrell et al. |
| 6,334,103 | B1 | 12/2001 | Surace et al. |
| 6,335,722 | B1 | 1/2002 | Tani et al. |
| 6,336,365 | B1 | 1/2002 | Blackadar et al. |
| 6,336,727 | B1 | 1/2002 | Kim |
| 6,340,937 | B1 | 1/2002 | Stepita-Klauco |
| 6,341,316 | B1 | 1/2002 | Kloba et al. |
| 6,343,267 | B1 | 1/2002 | Kuhn et al. |
| 6,345,240 | B1 | 2/2002 | Havens |

(56) References Cited

U.S. PATENT DOCUMENTS

| | | | |
|---|---|---|---|
| 6,345,250 | B1 | 2/2002 | Martin |
| 6,351,522 | B1 | 2/2002 | Vitikainen |
| 6,351,762 | B1 | 2/2002 | Ludwig et al. |
| 6,353,442 | B1 | 3/2002 | Masui |
| 6,353,794 | B1 | 3/2002 | Davis et al. |
| 6,356,287 | B1 | 3/2002 | Ruberry et al. |
| 6,356,854 | B1 | 3/2002 | Schubert et al. |
| 6,356,864 | B1 | 3/2002 | Foltz et al. |
| 6,356,905 | B1 | 3/2002 | Gershman et al. |
| 6,357,147 | B1 | 3/2002 | Darley et al. |
| 6,359,572 | B1 | 3/2002 | Vale |
| 6,359,970 | B1 | 3/2002 | Burgess |
| 6,360,227 | B1 | 3/2002 | Aggarwal et al. |
| 6,360,237 | B1 | 3/2002 | Schulz et al. |
| 6,363,348 | B1 | 3/2002 | Besling et al. |
| 6,366,883 | B1 | 4/2002 | Campbell et al. |
| 6,366,884 | B1 | 4/2002 | Bellegarda et al. |
| 6,374,217 | B1 | 4/2002 | Bellegarda |
| 6,374,226 | B1 | 4/2002 | Hunt et al. |
| 6,377,530 | B1 | 4/2002 | Burrows |
| 6,377,925 | B1 | 4/2002 | Greene, Jr. et al. |
| 6,377,928 | B1 | 4/2002 | Saxena et al. |
| 6,381,593 | B1 | 4/2002 | Yano et al. |
| 6,385,586 | B1 | 5/2002 | Dietz |
| 6,385,662 | B1 | 5/2002 | Moon et al. |
| 6,389,114 | B1 | 5/2002 | Dowens et al. |
| 6,397,183 | B1 | 5/2002 | Baba et al. |
| 6,397,186 | B1 | 5/2002 | Bush et al. |
| 6,400,806 | B1 | 6/2002 | Uppaluru |
| 6,400,996 | B1 | 6/2002 | Hoffberg et al. |
| 6,401,065 | B1 | 6/2002 | Kanevsky et al. |
| 6,401,085 | B1 | 6/2002 | Gershman et al. |
| 6,405,169 | B1 | 6/2002 | Kondo et al. |
| 6,405,238 | B1 | 6/2002 | Votipka |
| 6,408,272 | B1 | 6/2002 | White et al. |
| 6,411,924 | B1 | 6/2002 | De Hita et al. |
| 6,411,932 | B1 | 6/2002 | Molnar et al. |
| 6,415,250 | B1 | 7/2002 | Van Den Akker |
| 6,417,873 | B1 | 7/2002 | Fletcher et al. |
| 6,418,431 | B1 | 7/2002 | Mahajan et al. |
| 6,421,305 | B1 | 7/2002 | Gioscia et al. |
| 6,421,672 | B1 | 7/2002 | McAllister et al. |
| 6,421,707 | B1 | 7/2002 | Miller et al. |
| 6,424,944 | B1 | 7/2002 | Hikawa |
| 6,430,531 | B1 | 8/2002 | Polish |
| 6,430,551 | B1 | 8/2002 | Thelen et al. |
| 6,434,522 | B1 | 8/2002 | Tsuboka |
| 6,434,524 | B1 | 8/2002 | Weber |
| 6,434,529 | B1 | 8/2002 | Walker et al. |
| 6,434,604 | B1 | 8/2002 | Harada et al. |
| 6,437,818 | B1 | 8/2002 | Ludwig et al. |
| 6,438,523 | B1 | 8/2002 | Oberteuffer et al. |
| 6,442,518 | B1 | 8/2002 | Van Thong et al. |
| 6,442,523 | B1 | 8/2002 | Siegel |
| 6,446,076 | B1 | 9/2002 | Burkey et al. |
| 6,448,485 | B1 | 9/2002 | Barile |
| 6,448,986 | B1 | 9/2002 | Smith |
| 6,449,620 | B1 | 9/2002 | Draper et al. |
| 6,453,281 | B1 | 9/2002 | Walters et al. |
| 6,453,292 | B2 | 9/2002 | Ramaswamy et al. |
| 6,453,312 | B1 | 9/2002 | Goiffon et al. |
| 6,453,315 | B1 | 9/2002 | Weissman et al. |
| 6,456,616 | B1 | 9/2002 | Rantanen |
| 6,456,972 | B1 | 9/2002 | Gladstein et al. |
| 6,460,015 | B1 | 10/2002 | Hetherington et al. |
| 6,460,029 | B1 | 10/2002 | Fries et al. |
| 6,462,778 | B1 | 10/2002 | Abram et al. |
| 6,463,128 | B1 | 10/2002 | Elwin |
| 6,463,413 | B1 | 10/2002 | Applebaum et al. |
| 6,466,654 | B1 | 10/2002 | Cooper et al. |
| 6,467,924 | B2 | 10/2002 | Shipman |
| 6,469,712 | B1 | 10/2002 | Hilpert, Jr. et al. |
| 6,469,722 | B1 | 10/2002 | Kinoe et al. |
| 6,469,732 | B1 | 10/2002 | Chang et al. |
| 6,470,347 | B1 | 10/2002 | Gillam |
| 6,473,630 | B1 | 10/2002 | Baranowski et al. |
| 6,473,754 | B1 | 10/2002 | Matsubayashi et al. |
| 6,477,488 | B1 | 11/2002 | Bellegarda |
| 6,477,494 | B2 | 11/2002 | Hyde-Thomson et al. |
| 6,487,533 | B2 | 11/2002 | Hyde-Thomson et al. |
| 6,487,534 | B1 | 11/2002 | Thelen et al. |
| 6,487,663 | B1 | 11/2002 | Jaisimha et al. |
| 6,489,951 | B1 | 12/2002 | Wong et al. |
| 6,490,547 | B1 | 12/2002 | Atkin et al. |
| 6,490,560 | B1 | 12/2002 | Ramaswamy et al. |
| 6,493,006 | B1 | 12/2002 | Gourdol et al. |
| 6,493,428 | B1 | 12/2002 | Hillier |
| 6,493,652 | B1 | 12/2002 | Ohlenbusch et al. |
| 6,493,667 | B1 | 12/2002 | De Souza et al. |
| 6,499,013 | B1 | 12/2002 | Weber |
| 6,499,014 | B1 | 12/2002 | Chihara |
| 6,499,016 | B1 | 12/2002 | Anderson et al. |
| 6,501,937 | B1 | 12/2002 | Ho et al. |
| 6,502,194 | B1 | 12/2002 | Berman et al. |
| 6,505,158 | B1 | 1/2003 | Conkie |
| 6,505,175 | B1 | 1/2003 | Silverman et al. |
| 6,505,183 | B1 | 1/2003 | Loofbourrow et al. |
| 6,507,829 | B1 | 1/2003 | Richards et al. |
| 6,510,406 | B1 | 1/2003 | Marchisio |
| 6,510,412 | B1 | 1/2003 | Sasai et al. |
| 6,510,417 | B1 | 1/2003 | Woods et al. |
| 6,513,006 | B2 | 1/2003 | Howard et al. |
| 6,513,008 | B2 | 1/2003 | Pearson et al. |
| 6,513,063 | B1 | 1/2003 | Julia et al. |
| 6,519,565 | B1 | 2/2003 | Clements et al. |
| 6,519,566 | B1 | 2/2003 | Boyer et al. |
| 6,523,026 | B1 | 2/2003 | Gillis |
| 6,523,061 | B1 | 2/2003 | Halverson et al. |
| 6,523,172 | B1 | 2/2003 | Martinez-Guerra et al. |
| 6,526,351 | B2 | 2/2003 | Whitham |
| 6,526,382 | B1 | 2/2003 | Yuschik |
| 6,526,395 | B1 | 2/2003 | Morris |
| 6,529,592 | B1 | 3/2003 | Khan |
| 6,529,608 | B2 | 3/2003 | Gersabeck et al. |
| 6,532,444 | B1 | 3/2003 | Weber |
| 6,532,446 | B1 | 3/2003 | King |
| 6,535,610 | B1 | 3/2003 | Stewart |
| 6,535,852 | B2 | 3/2003 | Eide |
| 6,535,983 | B1 | 3/2003 | McCormack et al. |
| 6,536,139 | B2 | 3/2003 | Darley et al. |
| 6,538,665 | B2 | 3/2003 | Crow et al. |
| 6,542,171 | B1 | 4/2003 | Satou et al. |
| 6,542,584 | B1 | 4/2003 | Sherwood et al. |
| 6,542,868 | B1 | 4/2003 | Badt et al. |
| 6,546,262 | B1 | 4/2003 | Freadman |
| 6,546,367 | B2 | 4/2003 | Otsuka |
| 6,546,388 | B1 | 4/2003 | Edlund et al. |
| 6,549,497 | B2 | 4/2003 | Miyamoto et al. |
| 6,553,343 | B1 | 4/2003 | Kagoshima et al. |
| 6,553,344 | B2 | 4/2003 | Bellegarda et al. |
| 6,556,971 | B1 | 4/2003 | Rigsby et al. |
| 6,556,983 | B1 | 4/2003 | Altschuler et al. |
| 6,560,903 | B1 | 5/2003 | Darley |
| 6,563,769 | B1 | 5/2003 | Van Der Meulen |
| 6,564,186 | B1 | 5/2003 | Kiraly et al. |
| 6,567,549 | B1 | 5/2003 | Marianetti et al. |
| 6,570,557 | B1 | 5/2003 | Westerman et al. |
| 6,570,596 | B2 | 5/2003 | Frederiksen |
| 6,582,342 | B2 | 6/2003 | Kaufman |
| 6,583,806 | B2 | 6/2003 | Ludwig et al. |
| 6,584,464 | B1 | 6/2003 | Warthen |
| 6,587,403 | B1 | 7/2003 | Keller et al. |
| 6,587,404 | B1 | 7/2003 | Keller et al. |
| 6,590,303 | B1 | 7/2003 | Austin et al. |
| 6,591,379 | B1 | 7/2003 | LeVine et al. |
| 6,594,673 | B1 | 7/2003 | Smith et al. |
| 6,594,688 | B2 | 7/2003 | Ludwig et al. |
| 6,597,345 | B2 | 7/2003 | Hirshberg |
| 6,598,021 | B1 | 7/2003 | Shambaugh et al. |
| 6,598,022 | B2 | 7/2003 | Yuschik |
| 6,598,039 | B1 | 7/2003 | Livowsky |
| 6,598,054 | B2 | 7/2003 | Schuetze et al. |
| 6,601,026 | B2 | 7/2003 | Appelt et al. |
| 6,601,234 | B1 | 7/2003 | Bowman-Amuah |

(56) References Cited

U.S. PATENT DOCUMENTS 6,603,837 B1 8/2003 Kesanupalli et al.
6,604,059 B2 8/2003 Strubbe et al.
6,606,101 B1 8/2003 Malamud et al.
6,606,388 B1 8/2003 Townsend et al.
6,606,632 B1 8/2003 Saulpaugh et al.
6,611,789 B1 8/2003 Darley
6,615,172 B1 9/2003 Bennett et al.
6,615,175 B1 9/2003 Gazdzinski
6,615,176 B2 9/2003 Lewis et al.
6,615,220 B1 9/2003 Austin et al.
6,621,768 B1 9/2003 Keller et al.
6,621,892 B1 9/2003 Banister et al.
6,622,121 B1 9/2003 Crepy et al.
6,622,136 B2 9/2003 Russell
6,623,529 B1 9/2003 Lakritz
6,625,583 B1 9/2003 Silverman et al.
6,628,808 B1 9/2003 Bach et al.
6,631,186 B1 10/2003 Adams et al.
6,631,346 B1 10/2003 Karaorman et al.
6,633,741 B1 10/2003 Posa et al.
6,633,846 B1 10/2003 Bennett et al.
6,633,932 B1 10/2003 Bork et al.
6,642,940 B1 11/2003 Dakss et al.
6,643,401 B1 11/2003 Kashioka et al.
6,643,824 B1 11/2003 Bates et al.
6,647,260 B2 11/2003 Dusse et al.
6,650,735 B2 11/2003 Burton et al.
6,651,042 B1 11/2003 Field et al.
6,651,218 B1 11/2003 Adler et al.
6,654,740 B2 11/2003 Tokuda et al.
6,658,389 B1 12/2003 Alpdemir
6,658,408 B2 12/2003 Yano et al.
6,658,577 B2 12/2003 Huppi et al.
6,661,438 B1 12/2003 Shiraishi et al.
6,662,023 B1 12/2003 Helle
6,665,639 B2 12/2003 Mozer et al.
6,665,640 B1 12/2003 Bennett et al.
6,665,641 B1 12/2003 Coorman et al.
6,671,672 B1 12/2003 Heck
6,671,683 B2 12/2003 Kanno
6,675,169 B1 1/2004 Bennett et al.
6,675,233 B1 1/2004 Du et al.
6,677,932 B1 1/2004 Westerman
6,680,675 B1 1/2004 Suzuki
6,684,187 B1 1/2004 Conkie
6,684,376 B1 1/2004 Kerzman et al.
6,690,387 B2 2/2004 Zimmerman et al.
6,690,800 B2 2/2004 Resnick
6,690,828 B2 2/2004 Meyers
6,691,064 B2 2/2004 Vroman
6,691,090 B1 2/2004 Laurila et al.
6,691,111 B2 2/2004 Lazaridis et al.
6,691,151 B1 2/2004 Cheyer et al.
6,694,295 B2 2/2004 Lindholm et al.
6,694,297 B2 2/2004 Sato
6,697,780 B1 2/2004 Beutnagel et al.
6,697,824 B1 2/2004 Bowman-Amuah
6,701,294 B1 3/2004 Ball et al.
6,701,305 B1 3/2004 Holt et al.
6,701,318 B2 3/2004 Fox et al.
6,704,015 B1 3/2004 Bovarnick et al.
6,704,034 B1 3/2004 Rodriguez et al.
6,704,698 B1 3/2004 Paulsen, Jr. et al.
6,704,710 B2 3/2004 Strong
6,708,153 B2 3/2004 Brittan et al.
6,711,585 B1 3/2004 Copperman et al.
6,714,221 B1 3/2004 Christie et al.
6,716,139 B1 4/2004 Hosseinzadeh-Dolkhani et al.
6,718,324 B2 4/2004 Edlund et al.
6,718,331 B2 4/2004 Davis et al.
6,720,980 B1 4/2004 Lui et al.
6,721,728 B2 4/2004 McGreevy
6,721,734 B1 4/2004 Subasic et al.
6,724,370 B2 4/2004 Dutta et al.
6,725,197 B1 4/2004 Wuppermann et al.
6,728,675 B1 4/2004 Maddalozzo, Jr. et al.
6,728,681 B2 4/2004 Whitham
6,728,729 B1 4/2004 Jawa et al.
6,731,312 B2 5/2004 Robbin
6,732,142 B1 5/2004 Bates et al.
6,735,562 B1 5/2004 Zhang et al.
6,735,632 B1 5/2004 Kiraly et al.
6,738,738 B2 5/2004 Henton
6,738,742 B2 5/2004 Badt et al.
6,741,264 B1 5/2004 Lesser
6,742,021 B1 5/2004 Halverson et al.
6,751,592 B1 6/2004 Shiga
6,751,595 B2 6/2004 Busayapongchai et al.
6,751,621 B1 6/2004 Calistri-Yeh et al.
6,754,504 B1 6/2004 Reed
6,757,362 B1 6/2004 Cooper et al.
6,757,365 B1 6/2004 Bogard
6,757,646 B2 6/2004 Marchisio
6,757,653 B2 6/2004 Buth et al.
6,757,718 B1 6/2004 Halverson et al.
6,760,412 B1 7/2004 Loucks
6,760,700 B2 7/2004 Lewis et al.
6,760,754 B1 7/2004 Isaacs et al.
6,762,741 B2 7/2004 Weindorf
6,762,777 B2 7/2004 Carroll
6,763,089 B2 7/2004 Feigenbaum
6,766,294 B2 7/2004 MacGinite et al.
6,766,295 B1 7/2004 Murveit et al.
6,766,320 B1 7/2004 Wang et al.
6,766,324 B2 7/2004 Carlson et al.
6,768,979 B1 7/2004 Menendez-Pidal et al.
6,771,982 B1 8/2004 Toupin
6,772,123 B2 8/2004 Cooklev et al.
6,772,195 B1 8/2004 Hatlelid et al.
6,772,394 B1 8/2004 Kamada
6,775,358 B1 8/2004 Breitenbach et al.
6,778,951 B1 8/2004 Contractor
6,778,952 B2 8/2004 Bellegarda
6,778,962 B1 8/2004 Kasai et al.
6,778,970 B2 8/2004 Au
6,778,979 B2 8/2004 Grefenstette et al.
6,782,510 B1 8/2004 Gross et al.
6,784,901 B1 8/2004 Harvey et al.
6,789,094 B2 9/2004 Rudoff et al.
6,789,231 B1 9/2004 Reynar et al.
6,790,704 B2 9/2004 Doyle et al.
6,792,082 B1 9/2004 Levine
6,792,083 B2 9/2004 Dams et al.
6,792,086 B1 9/2004 Saylor et al.
6,792,407 B2 9/2004 Kibre et al.
6,794,566 B2 9/2004 Pachet
6,795,059 B2 9/2004 Endo
6,799,162 B1 9/2004 Goronzy et al.
6,799,226 B1 9/2004 Robbin et al.
6,801,604 B2 10/2004 Maes et al.
6,801,964 B1 10/2004 Mahdavi
6,803,905 B1 10/2004 Capps et al.
6,804,649 B2 10/2004 Miranda
6,804,677 B2 10/2004 Shadmon et al.
6,807,536 B2 10/2004 Achlioptas et al.
6,807,574 B1 10/2004 Partovi et al.
6,809,724 B1 10/2004 Shiraishi et al.
6,810,379 B1 10/2004 Vermeulen et al.
6,813,218 B1 11/2004 Antonelli et al.
6,813,491 B1 11/2004 McKinney
6,813,607 B1 11/2004 Faruquie et al.
6,816,578 B1 11/2004 Kredo et al.
6,820,055 B2 11/2004 Saindon et al.
6,829,018 B2 12/2004 Lin et al.
6,829,603 B1 12/2004 Chai et al.
6,832,194 B1 12/2004 Mozer et al.
6,832,381 B1 12/2004 Mathur et al.
6,836,651 B2 12/2004 Segal et al.
6,836,760 B1 12/2004 Bellegarda et al.
6,839,464 B2 1/2005 Hawkins et al.
6,839,669 B1 1/2005 Gould et al.
6,839,670 B1 1/2005 Stammler et al.
6,839,742 B1 1/2005 Dyer et al.
6,842,767 B1 1/2005 Partovi et al.

(56) References Cited

U.S. PATENT DOCUMENTS 6,847,966 B1 1/2005 Sommer et al.
6,847,979 B2 1/2005 Allemang et al.
6,850,775 B1 2/2005 Berg
6,850,887 B2 2/2005 Epstein et al.
6,851,115 B1 2/2005 Cheyer et al.
6,856,259 B1 2/2005 Sharp
6,857,800 B2 2/2005 Zhang et al.
6,859,931 B1 2/2005 Cheyer et al.
6,862,568 B2 3/2005 Case
6,862,710 B1 3/2005 Marchisio
6,862,713 B1 3/2005 Kraft et al.
6,865,533 B2 3/2005 Addison et al.
6,868,045 B1 3/2005 Schroder
6,868,385 B1 3/2005 Gerson
6,870,529 B1 3/2005 Davis
6,871,346 B1 3/2005 Kumbalimutt et al.
6,873,953 B1 3/2005 Lennig
6,873,986 B2 3/2005 McConnell et al.
6,876,947 B1 4/2005 Darley et al.
6,877,003 B2 4/2005 Ho et al.
6,879,957 B1 4/2005 Pechter et al.
6,882,335 B2 4/2005 Saarinen
6,882,337 B2 4/2005 Shelter
6,882,747 B2 4/2005 Thawonmas et al.
6,882,955 B1 4/2005 Ohlenbusch et al.
6,882,971 B2 4/2005 Craner
6,885,734 B1 4/2005 Eberle et al.
6,889,361 B1 5/2005 Bates et al.
6,895,084 B1 5/2005 Saylor et al.
6,895,257 B2 5/2005 Boman et al.
6,895,380 B2 5/2005 Sepe, Jr.
6,895,558 B1 5/2005 Loveland
6,898,550 B1 5/2005 Blackadar et al.
6,901,364 B2 5/2005 Nguyen et al.
6,901,399 B1 5/2005 Corston et al.
6,904,405 B2 6/2005 Suominen
6,907,112 B1 6/2005 Guedalia et al.
6,907,140 B2 6/2005 Matsugu et al.
6,910,004 B2 6/2005 Tarbouriech et al.
6,910,007 B2 6/2005 Stylianou et al.
6,910,012 B2 6/2005 Hartley et al.
6,910,186 B2 6/2005 Kim
6,911,971 B2 6/2005 Suzuki et al.
6,912,407 B1 6/2005 Clarke et al.
6,912,498 B2 6/2005 Stevens et al.
6,912,499 B1 6/2005 Sabourin et al.
6,915,138 B2 7/2005 Kraft
6,915,246 B2 7/2005 Gusler et al.
6,915,294 B1 7/2005 Singh et al.
6,917,373 B2 7/2005 Vong et al.
6,918,677 B2 7/2005 Shipman
6,924,828 B1 8/2005 Hirsch
6,925,438 B2 8/2005 Mohamed et al.
6,928,149 B1 8/2005 Panjwani et al.
6,928,614 B1 8/2005 Everhart
6,931,255 B2 8/2005 Mekuria
6,931,384 B1 8/2005 Horvitz et al.
6,932,708 B2 8/2005 Yamashita et al.
6,933,928 B1 8/2005 Lilienthal et al.
6,934,394 B1 8/2005 Anderson
6,934,684 B2 8/2005 Alpdemir et al.
6,934,756 B2 8/2005 Maes
6,934,812 B1 8/2005 Robbin et al.
6,937,975 B1 8/2005 Elworthy
6,937,986 B2 8/2005 Denenberg et al.
6,944,593 B2 9/2005 Kuzunuki et al.
6,944,846 B2 9/2005 Ryzhov
6,948,094 B2 9/2005 Schultz et al.
6,950,087 B2 9/2005 Knox et al.
6,950,502 B1 9/2005 Jenkins
6,952,799 B2 10/2005 Edwards et al.
6,954,755 B2 10/2005 Reisman
6,954,899 B1 10/2005 Anderson
6,956,845 B2 10/2005 Baker et al.
6,957,076 B2 10/2005 Hunzinger
6,957,183 B2 10/2005 Malayath et al.
6,960,734 B1 11/2005 Park
6,961,699 B1 11/2005 Kahn et al.
6,961,912 B2 11/2005 Aoki et al.
6,963,759 B1 11/2005 Gerson
6,963,841 B2 11/2005 Handal et al.
6,964,023 B2 11/2005 Maes et al.
6,965,376 B2 11/2005 Tani et al.
6,965,863 B1 11/2005 Zuberec et al.
6,968,311 B2 11/2005 Knockeart et al.
6,970,820 B2 11/2005 Junqua et al.
6,970,881 B1 11/2005 Mohan et al.
6,970,915 B1 11/2005 Partovi et al.
6,970,935 B1 11/2005 Maes
6,976,090 B2 12/2005 Ben-Shaul et al.
6,978,127 B1 12/2005 Bulthuis et al.
6,978,239 B2 12/2005 Chu et al.
6,980,949 B2 12/2005 Ford
6,980,953 B1 12/2005 Kanevsky et al.
6,980,955 B2 12/2005 Okutani et al.
6,983,251 B1 1/2006 Umemoto et al.
6,985,858 B2 1/2006 Frey et al.
6,985,865 B1 1/2006 Packingham et al.
6,985,958 B2 1/2006 Zwiegincew et al.
6,988,063 B2 1/2006 Tokuda et al.
6,988,071 B1 1/2006 Gazdzinski
6,990,450 B2 1/2006 Case et al.
6,996,520 B2 2/2006 Levin
6,996,531 B2 2/2006 Korall et al.
6,996,575 B2 2/2006 Cox et al.
6,999,066 B2 2/2006 Litwiller
6,999,914 B1 2/2006 Boerner et al.
6,999,925 B2 2/2006 Fischer et al.
6,999,927 B2 2/2006 Mozer et al.
7,000,189 B2 2/2006 Dutta et al.
7,002,556 B2 2/2006 Tsukada et al.
7,003,099 B1 2/2006 Zhang et al.
7,003,463 B1 2/2006 Maes et al.
7,003,522 B1 2/2006 Reynar et al.
7,006,969 B2 2/2006 Atal
7,006,973 B1 2/2006 Genly et al.
7,007,026 B2 2/2006 Wilkinson et al.
7,007,239 B1 2/2006 Hawkins et al.
7,010,581 B2 3/2006 Brown et al.
7,013,289 B2 3/2006 Horn et al.
7,013,308 B1 3/2006 Tunstall-Pedoe
7,013,429 B2 3/2006 Fujimoto et al.
7,015,894 B2 3/2006 Morohoshi
7,020,685 B1 3/2006 Chen et al.
7,024,363 B1 4/2006 Comerford et al.
7,024,364 B2 4/2006 Guerra et al.
7,024,366 B1 4/2006 Deyoe et al.
7,024,460 B2 4/2006 Koopmas et al.
7,027,568 B1 4/2006 Simpson et al.
7,027,974 B1 4/2006 Busch et al.
7,027,990 B2 4/2006 Sussman
7,028,252 B1 4/2006 Baru et al.
7,030,861 B1 4/2006 Westerman et al.
7,031,530 B2 4/2006 Driggs et al.
7,031,909 B2 4/2006 Mao et al.
7,035,794 B2 4/2006 Sirivara
7,035,801 B2 4/2006 Jimenez-Feltstrom
7,035,807 B1 4/2006 Brittain et al.
7,036,128 B1 4/2006 Julia et al.
7,036,681 B2 5/2006 Suda et al.
7,038,659 B2 5/2006 Rajkowski
7,039,588 B2 5/2006 Okutani et al.
7,043,420 B2 5/2006 Ratnaparkhi
7,043,422 B2 5/2006 Gao et al.
7,046,230 B2 5/2006 Zadesky et al.
7,046,850 B2 5/2006 Braspenning et al.
7,047,193 B1 5/2006 Bellegarda
7,050,550 B2 5/2006 Steinbiss et al.
7,050,976 B1 5/2006 Packingham
7,050,977 B1 5/2006 Bennett
7,051,096 B1 5/2006 Krawiec et al.
7,054,419 B2 5/2006 Culliss
7,054,888 B2 5/2006 LaChapelle et al.
7,057,607 B2 6/2006 Mayoraz et al.

(56) References Cited

U.S. PATENT DOCUMENTS 7,058,569 B2 6/2006 Coorman et al.
7,058,888 B1 6/2006 Gjerstad et al.
7,058,889 B2 6/2006 Trovato et al.
7,062,223 B2 6/2006 Gerber et al.
7,062,225 B2 6/2006 White
7,062,428 B2 6/2006 Hogenhout et al.
7,062,438 B2 6/2006 Kobayashi et al.
7,065,185 B1 6/2006 Koch
7,065,485 B1 6/2006 Chong-White et al.
7,069,213 B2 6/2006 Thompson
7,069,220 B2 6/2006 Coffman et al.
7,069,560 B1 6/2006 Cheyer et al.
7,072,686 B1 7/2006 Schrager
7,072,941 B2 7/2006 Griffin et al.
7,076,527 B2 7/2006 Bellegarda et al.
7,079,713 B2 7/2006 Simmons
7,082,322 B2 7/2006 Harano
7,084,758 B1 8/2006 Cole
7,084,856 B2 8/2006 Huppi
7,085,723 B2 8/2006 Ross et al.
7,085,960 B2 8/2006 Bouat et al.
7,088,345 B2 8/2006 Robinson et al.
7,089,292 B1 8/2006 Roderick et al.
7,092,370 B2 8/2006 Jiang et al.
7,092,887 B2 8/2006 Mozer et al.
7,092,928 B1 8/2006 Elad et al.
7,092,950 B2 8/2006 Wong et al.
7,093,693 B1 8/2006 Gazdzinski
7,095,733 B1 8/2006 Yarlagadda et al.
7,096,183 B2 8/2006 Junqua
7,100,117 B1 8/2006 Chwa et al.
7,103,548 B2 9/2006 Squibbs et al.
7,107,204 B1 9/2006 Liu et al.
7,110,998 B1 9/2006 Bhandari et al.
7,111,248 B2 9/2006 Mulvey et al.
7,111,774 B2 9/2006 Song
7,113,803 B2 9/2006 Dehlin
7,113,943 B2 9/2006 Bradford et al.
7,115,035 B2 10/2006 Tanaka
7,117,231 B2 10/2006 Fischer et al.
7,120,865 B1 10/2006 Horvitz et al.
7,123,696 B2 10/2006 Lowe
7,124,081 B1 10/2006 Bellegarda
7,124,082 B2 10/2006 Freedman
7,124,164 B1 10/2006 Chemtob
7,127,046 B1 10/2006 Smith et al.
7,127,394 B2 10/2006 Strong et al.
7,127,396 B2 10/2006 Chu et al.
7,127,403 B1 10/2006 Saylor et al.
7,129,932 B1 10/2006 Klarlund et al.
7,133,900 B1 11/2006 Szeto
7,136,710 B1 11/2006 Hoffberg et al.
7,136,818 B1 11/2006 Cosatto et al.
7,137,126 B1 11/2006 Coffman et al.
7,139,697 B2 11/2006 Hakkinen et al.
7,139,714 B2 11/2006 Bennett et al.
7,139,722 B2 11/2006 Perrella et al.
7,143,028 B2 11/2006 Hillis et al.
7,143,038 B2 11/2006 Katae
7,143,040 B2 11/2006 Durston et al.
7,146,319 B2 12/2006 Hunt
7,146,437 B2 12/2006 Robbin et al.
7,149,319 B2 12/2006 Roeck
7,149,695 B1 12/2006 Bellegarda
7,149,964 B1 12/2006 Cottrille et al.
7,152,070 B1 12/2006 Musick et al.
7,152,093 B2 12/2006 Ludwig et al.
7,154,526 B2 12/2006 Foote et al.
7,155,668 B2 12/2006 Holland et al.
7,158,647 B2 1/2007 Azima et al.
7,159,174 B2 1/2007 Johnson et al.
7,162,412 B2 1/2007 Yamada et al.
7,162,482 B1 1/2007 Dunning
7,165,073 B2 1/2007 Vandersluis
7,166,791 B2 1/2007 Robbin et al.
7,171,350 B2 1/2007 Lin et al.
7,171,360 B2 1/2007 Huang et al.
7,174,042 B1 2/2007 Simmons et al.
7,174,295 B1 2/2007 Kivimaki
7,174,297 B2 2/2007 Guerra et al.
7,174,298 B2 2/2007 Sharma
7,177,794 B2 2/2007 Mani et al.
7,177,798 B2 2/2007 Hsu et al.
7,177,817 B1 2/2007 Khosla et al.
7,181,386 B2 2/2007 Mohri et al.
7,181,388 B2 2/2007 Tian
7,184,064 B2 2/2007 Zimmerman et al.
7,185,276 B2 2/2007 Keswa
7,188,085 B2 3/2007 Pelletier
7,190,351 B1 3/2007 Goren
7,190,794 B2 3/2007 Hinde
7,191,118 B2 3/2007 Bellegarda
7,191,131 B1 3/2007 Nagao
7,193,615 B2 3/2007 Kim et al.
7,194,186 B1 3/2007 Strub et al.
7,194,413 B2 3/2007 Mahoney et al.
7,194,471 B1 3/2007 Nagatsuka et al.
7,194,611 B2 3/2007 Bear et al.
7,194,699 B2 3/2007 Thomson et al.
7,197,120 B2 3/2007 Luehrig et al.
7,197,460 B1 3/2007 Gupta et al.
7,200,550 B2 4/2007 Menezes et al.
7,200,558 B2 4/2007 Kato et al.
7,200,559 B2 4/2007 Wang
7,203,297 B2 4/2007 Vitikainen et al.
7,203,646 B2 4/2007 Bennett
7,206,809 B2 4/2007 Ludwig et al.
7,212,827 B1 5/2007 Veschl et al.
7,216,008 B2 5/2007 Sakata
7,216,066 B2 5/2007 Di et al.
7,216,073 B2 5/2007 Lavi et al.
7,216,080 B2 5/2007 Tsiao et al.
7,218,920 B2 5/2007 Hyon
7,218,943 B2 5/2007 Klassen et al.
7,219,063 B2 5/2007 Schalk et al.
7,219,123 B1 5/2007 Fiechter et al.
7,225,125 B2 5/2007 Bennett et al.
7,228,278 B2 6/2007 Nguyen et al.
7,231,343 B1 6/2007 Treadgold et al.
7,231,597 B1 6/2007 Braun et al.
7,233,790 B2 6/2007 Kjellberg et al.
7,233,904 B2 6/2007 Luisi
7,234,026 B2 6/2007 Robbin et al.
7,236,932 B1 6/2007 Grajski
7,240,002 B2 7/2007 Minamino et al.
7,243,130 B2 7/2007 Horvitz et al.
7,243,305 B2 7/2007 Schabes et al.
7,246,118 B2 7/2007 Chastain et al.
7,246,151 B2 7/2007 Isaacs et al.
7,248,900 B2 7/2007 Deeds et al.
7,251,313 B1 7/2007 Miller et al.
7,251,454 B2 7/2007 White
7,254,773 B2 8/2007 Bates et al.
7,257,537 B2 8/2007 Ross et al.
7,259,752 B1 8/2007 Simmons
7,260,529 B1 8/2007 Lengen
7,260,567 B2 8/2007 Parikh et al.
7,263,373 B2 8/2007 Mattisson
7,266,189 B1 9/2007 Day
7,266,495 B1 9/2007 Beaufays et al.
7,266,496 B2 9/2007 Wang et al.
7,266,499 B2 9/2007 Surace et al.
7,269,544 B2 9/2007 Simske
7,269,556 B2 9/2007 Kiss et al.
7,272,224 B1 9/2007 Normile et al.
7,275,063 B2 9/2007 Horn
7,277,088 B2 10/2007 Robinson et al.
7,277,854 B2 10/2007 Bennett et al.
7,277,855 B1 10/2007 Acker et al.
7,280,958 B2 10/2007 Pavlov et al.
7,283,072 B1 10/2007 Plachta et al.
7,289,102 B2 10/2007 Hinckley et al.
7,290,039 B1 10/2007 Lisitsa et al.
7,292,579 B2 11/2007 Morris

(56) References Cited

U.S. PATENT DOCUMENTS 7,292,979 B2 11/2007 Karas et al.
7,292,980 B1 11/2007 August et al.
7,296,019 B1 11/2007 Chandrasekar et al.
7,296,230 B2 11/2007 Fukatsu et al.
7,299,033 B2 11/2007 Kjellberg et al.
7,302,392 B1 11/2007 Thenthiruperai et al.
7,302,394 B1 11/2007 Baray et al.
7,302,686 B2 11/2007 Togawa
7,308,404 B2 12/2007 Venkataraman et al.
7,308,408 B1 12/2007 Stifelman et al.
7,310,329 B2 12/2007 Vieri et al.
7,310,600 B1 12/2007 Garner et al.
7,310,605 B2 12/2007 Janakiraman et al.
7,313,523 B1 12/2007 Bellegarda et al.
7,315,809 B2 1/2008 Xun
7,315,818 B2 1/2008 Stevens et al.
7,318,020 B1 1/2008 Kim
7,319,957 B2 1/2008 Robinson et al.
7,321,783 B2 1/2008 Kim
7,322,023 B2 1/2008 Shulman et al.
7,324,833 B2 1/2008 White et al.
7,324,947 B2 1/2008 Jordan et al.
7,328,155 B2 2/2008 Endo et al.
7,328,250 B2 2/2008 Wang et al.
7,345,670 B2 3/2008 Armstrong
7,345,671 B2 3/2008 Robbin et al.
7,349,953 B2 3/2008 Lisitsa et al.
7,353,139 B1 4/2008 Burrell et al.
7,359,493 B1 4/2008 Wang et al.
7,359,671 B2 4/2008 Richenstein et al.
7,359,851 B2 4/2008 Tong et al.
7,360,158 B1 4/2008 Beeman
7,362,738 B2 4/2008 Taube et al.
7,363,227 B2 4/2008 Mapes-Riordan et al.
7,363,586 B1 4/2008 Briggs et al.
7,365,260 B2 4/2008 Kawashima
7,366,461 B1 4/2008 Brown
7,373,291 B2 5/2008 Garst
7,373,612 B2 5/2008 Risch et al.
7,376,556 B2 5/2008 Bennett
7,376,632 B1 5/2008 Sadek et al.
7,376,645 B2 5/2008 Bernard
7,378,963 B1 5/2008 Begault et al.
7,379,874 B2 5/2008 Schmid et al.
7,380,203 B2 5/2008 Keely et al.
7,383,170 B2 6/2008 Mills et al.
7,386,438 B1 6/2008 Franz et al.
7,386,449 B2 6/2008 Sun et al.
7,386,799 B1 6/2008 Clanton et al.
7,389,224 B1 6/2008 Elworthy
7,389,225 B1 6/2008 Jensen et al.
7,392,185 B2 6/2008 Bennett
7,394,947 B2 7/2008 Li et al.
7,398,209 B2 7/2008 Kennewick et al.
7,401,300 B2 7/2008 Nurmi
7,403,938 B2 7/2008 Harrison et al.
7,403,941 B2 7/2008 Bedworth et al.
7,404,143 B2 7/2008 Freelander et al.
7,409,337 B1 8/2008 Potter et al.
7,409,347 B1 8/2008 Bellegarda
7,412,389 B2 8/2008 Yang
7,412,470 B2 8/2008 Masuno et al.
7,415,100 B2 8/2008 Cooper et al.
7,415,469 B2 8/2008 Singh et al.
7,418,389 B2 8/2008 Chu et al.
7,418,392 B1 8/2008 Mozer et al.
7,426,467 B2 9/2008 Nashida et al.
7,426,468 B2 9/2008 Coifman et al.
7,427,024 B1 9/2008 Gazdzinski et al.
7,428,541 B2 9/2008 Houle
7,433,869 B2 10/2008 Gollapudi
7,433,921 B2 10/2008 Ludwig et al.
7,436,947 B2 10/2008 Wadler et al.
7,441,184 B2 10/2008 Frerebeau et al.
7,443,316 B2 10/2008 Lim
7,444,589 B2 10/2008 Zellner
7,447,360 B2 11/2008 Li et al.
7,447,624 B2 11/2008 Fuhrmann et al.
7,447,635 B1 11/2008 Konopka et al.
7,447,637 B1 11/2008 Grant et al.
7,451,081 B1 11/2008 Gajic et al.
7,454,351 B2 11/2008 Jeschke et al.
7,460,652 B2 12/2008 Chang
7,461,043 B2 12/2008 Hess
7,467,087 B1 12/2008 Gillick et al.
7,467,164 B2 12/2008 Marsh
7,472,061 B1 12/2008 Alewine et al.
7,472,065 B2 12/2008 Aaron et al.
7,475,010 B2 1/2009 Chao
7,475,015 B2 1/2009 Epstein et al.
7,475,063 B2 1/2009 Datta et al.
7,477,238 B2 1/2009 Fux et al.
7,477,240 B2 1/2009 Yanagisawa
7,478,037 B2 1/2009 Strong
7,478,091 B2 1/2009 Mojsilovic et al.
7,478,129 B1 1/2009 Chemtob
7,479,948 B2 1/2009 Kim et al.
7,479,949 B2 1/2009 Jobs et al.
7,483,832 B2 1/2009 Tischer
7,483,894 B2 1/2009 Cao
7,487,089 B2 2/2009 Mozer
7,487,093 B2 2/2009 Mutsuno et al.
7,490,034 B2 2/2009 Finnigan et al.
7,490,039 B1 2/2009 Shaffer et al.
7,493,560 B1 2/2009 Kipnes et al.
7,496,498 B2 2/2009 Chu et al.
7,496,512 B2 2/2009 Zhao et al.
7,499,923 B2 3/2009 Kawatani
7,502,738 B2 3/2009 Kennewick et al.
7,505,795 B1 3/2009 Lim et al.
7,508,324 B2 3/2009 Suraqui
7,508,373 B2 3/2009 Lin et al.
7,516,123 B2 4/2009 Betz et al.
7,519,327 B2 4/2009 White
7,519,398 B2 4/2009 Hirose
7,522,927 B2 4/2009 Fitch et al.
7,523,036 B2 4/2009 Akabane et al.
7,523,108 B2 4/2009 Cao
7,526,466 B2 4/2009 Au
7,526,738 B2 4/2009 Ording et al.
7,528,713 B2 5/2009 Singh et al.
7,529,671 B2 5/2009 Rockenbeck et al.
7,529,676 B2 5/2009 Koyama
7,535,997 B1 5/2009 McQuaide, Jr. et al.
7,536,029 B2 5/2009 Choi et al.
7,536,565 B2 5/2009 Girish et al.
7,538,685 B1 5/2009 Cooper et al.
7,539,619 B1 5/2009 Seligman et al.
7,539,656 B2 5/2009 Fratkina et al.
7,541,940 B2 6/2009 Upton
7,542,967 B2 6/2009 Hurst-Hiller et al.
7,542,971 B2 6/2009 Thione et al.
7,543,232 B2 6/2009 Easton, Jr. et al.
7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.
7,558,381 B1 7/2009 Ali et al.
7,558,730 B2 7/2009 Davis et al.
7,559,026 B2 7/2009 Girish et al.
7,561,069 B2 7/2009 Horstemeyer
7,562,007 B2 7/2009 Hwang
7,562,032 B2 7/2009 Abbosh et al.
7,565,104 B1 7/2009 Brown et al.
7,565,380 B1 7/2009 Venkatachary
7,571,092 B1 8/2009 Nieh
7,571,106 B2 8/2009 Cao et al.
7,577,522 B2 8/2009 Rosenberg
7,580,551 B1 8/2009 Srihari et al.
7,580,576 B2 8/2009 Wang et al.
7,580,839 B2 8/2009 Tamura et al.

(56) References Cited

U.S. PATENT DOCUMENTS

| | | | |
|---|---|---|---|
| 7,584,093 | B2 | 9/2009 | Potter et al. |
| 7,584,278 | B2 | 9/2009 | Rajarajan et al. |
| 7,584,429 | B2 | 9/2009 | Fabritius |
| 7,593,868 | B2 | 9/2009 | Margiloff et al. |
| 7,596,269 | B2 | 9/2009 | King et al. |
| 7,596,499 | B2 | 9/2009 | Anguera et al. |
| 7,596,606 | B2 | 9/2009 | Codignotto |
| 7,596,765 | B2 | 9/2009 | Almas |
| 7,599,918 | B2 | 10/2009 | Shen et al. |
| 7,603,349 | B1 | 10/2009 | Kraft et al. |
| 7,603,381 | B2 | 10/2009 | Burke et al. |
| 7,606,444 | B1 | 10/2009 | Erol et al. |
| 7,609,179 | B2 | 10/2009 | Diaz-Gutierrez et al. |
| 7,610,258 | B2 | 10/2009 | Yuknewicz et al. |
| 7,613,264 | B2 | 11/2009 | Wells et al. |
| 7,614,008 | B2 | 11/2009 | Ording |
| 7,617,094 | B2 | 11/2009 | Aoki et al. |
| 7,620,407 | B1 | 11/2009 | Donald et al. |
| 7,620,549 | B2 | 11/2009 | Di Cristo et al. |
| 7,620,894 | B1 | 11/2009 | Kahn |
| 7,623,119 | B2 | 11/2009 | Autio et al. |
| 7,624,007 | B2 | 11/2009 | Bennett |
| 7,627,481 | B1 | 12/2009 | Kuo et al. |
| 7,630,901 | B2 | 12/2009 | Omi |
| 7,633,076 | B2 | 12/2009 | Huppi et al. |
| 7,634,409 | B2 | 12/2009 | Kennewick et al. |
| 7,634,413 | B1 | 12/2009 | Kuo et al. |
| 7,634,718 | B2 | 12/2009 | Nakajima |
| 7,634,732 | B1 | 12/2009 | Blagsvedt et al. |
| 7,636,657 | B2 | 12/2009 | Ju et al. |
| 7,640,158 | B2 | 12/2009 | Detlef et al. |
| 7,640,160 | B2 | 12/2009 | Di Cristo et al. |
| 7,643,990 | B1 | 1/2010 | Bellegarda |
| 7,647,225 | B2 | 1/2010 | Bennett et al. |
| 7,649,454 | B2 | 1/2010 | Singh et al. |
| 7,649,877 | B2 | 1/2010 | Vieri et al. |
| 7,653,883 | B2 | 1/2010 | Hotelling et al. |
| 7,656,393 | B2 | 2/2010 | King et al. |
| 7,657,424 | B2 | 2/2010 | Bennett |
| 7,657,430 | B2 | 2/2010 | Ogawa |
| 7,657,828 | B2 | 2/2010 | Lucas et al. |
| 7,657,844 | B2 | 2/2010 | Gibson et al. |
| 7,657,849 | B2 | 2/2010 | Chaudhri et al. |
| 7,660,715 | B1 | 2/2010 | Thambiratnam |
| 7,663,607 | B2 | 2/2010 | Hotelling et al. |
| 7,664,558 | B2 | 2/2010 | Lindahl et al. |
| 7,664,638 | B2 | 2/2010 | Cooper et al. |
| 7,668,710 | B2 | 2/2010 | Doyle |
| 7,669,134 | B1 | 2/2010 | Christie et al. |
| 7,672,841 | B2 | 3/2010 | Bennett |
| 7,672,952 | B2 | 3/2010 | Isaacson et al. |
| 7,673,238 | B2 | 3/2010 | Girish et al. |
| 7,673,251 | B1 | 3/2010 | Wibisono |
| 7,673,340 | B1 | 3/2010 | Cohen et al. |
| 7,676,026 | B1 | 3/2010 | Baxter, Jr. |
| 7,676,365 | B2 | 3/2010 | Hwang et al. |
| 7,676,463 | B2 | 3/2010 | Thompson et al. |
| 7,679,534 | B2 | 3/2010 | Kay et al. |
| 7,680,649 | B2 | 3/2010 | Park |
| 7,681,126 | B2 | 3/2010 | Roose |
| 7,683,886 | B2 | 3/2010 | Willey |
| 7,683,893 | B2 | 3/2010 | Kim |
| 7,684,985 | B2 | 3/2010 | Dominach et al. |
| 7,684,990 | B2 | 3/2010 | Caskey et al. |
| 7,684,991 | B2 | 3/2010 | Stohr et al. |
| 7,689,245 | B2 | 3/2010 | Cox et al. |
| 7,689,408 | B2 | 3/2010 | Chen et al. |
| 7,689,409 | B2 | 3/2010 | Heinecke |
| 7,689,412 | B2 | 3/2010 | Wu et al. |
| 7,689,421 | B2 | 3/2010 | Li et al. |
| 7,689,916 | B1 | 3/2010 | Goel et al. |
| 7,693,715 | B2 | 4/2010 | Hwang et al. |
| 7,693,717 | B2 | 4/2010 | Kahn et al. |
| 7,693,719 | B2 | 4/2010 | Chu et al. |
| 7,693,720 | B2 | 4/2010 | Kennewick et al. |
| 7,698,131 | B2 | 4/2010 | Bennett |
| 7,698,136 | B1 | 4/2010 | Nguyen et al. |
| 7,702,500 | B2 | 4/2010 | Blaedow |
| 7,702,508 | B2 | 4/2010 | Bennett |
| 7,703,091 | B1 | 4/2010 | Martin et al. |
| 7,706,510 | B2 | 4/2010 | Ng |
| 7,707,026 | B2 | 4/2010 | Liu |
| 7,707,027 | B2 | 4/2010 | Balchandran et al. |
| 7,707,032 | B2 | 4/2010 | Wang et al. |
| 7,707,221 | B1 | 4/2010 | Dunning et al. |
| 7,707,226 | B1 | 4/2010 | Tonse |
| 7,707,267 | B2 | 4/2010 | Lisitsa et al. |
| 7,710,262 | B2 | 5/2010 | Ruha |
| 7,711,129 | B2 | 5/2010 | Lindahl et al. |
| 7,711,550 | B1 | 5/2010 | Feinberg et al. |
| 7,711,565 | B1 | 5/2010 | Gazdzinski |
| 7,711,672 | B2 | 5/2010 | Au |
| 7,712,053 | B2 | 5/2010 | Bradford et al. |
| 7,716,056 | B2 | 5/2010 | Weng et al. |
| 7,716,077 | B1 | 5/2010 | Mikurak |
| 7,716,216 | B1 | 5/2010 | Harik et al. |
| 7,720,674 | B2 | 5/2010 | Kaiser et al. |
| 7,720,683 | B1 | 5/2010 | Vermeulen et al. |
| 7,721,226 | B2 | 5/2010 | Barabe et al. |
| 7,721,301 | B2 | 5/2010 | Wong et al. |
| 7,724,242 | B2 | 5/2010 | Hillis et al. |
| 7,724,696 | B1 | 5/2010 | Parekh |
| 7,725,307 | B2 | 5/2010 | Bennett |
| 7,725,318 | B2 | 5/2010 | Gavalda et al. |
| 7,725,320 | B2 | 5/2010 | Bennett |
| 7,725,321 | B2 | 5/2010 | Bennett |
| 7,725,419 | B2 | 5/2010 | Lee et al. |
| 7,725,838 | B2 | 5/2010 | Williams |
| 7,729,904 | B2 | 6/2010 | Bennett |
| 7,729,916 | B2 | 6/2010 | Coffman et al. |
| 7,734,461 | B2 | 6/2010 | Kwak et al. |
| 7,735,012 | B2 | 6/2010 | Naik |
| 7,739,588 | B2 | 6/2010 | Reynar et al. |
| 7,742,953 | B2 | 6/2010 | King et al. |
| 7,743,188 | B2 | 6/2010 | Haitani et al. |
| 7,747,616 | B2 | 6/2010 | Yamada et al. |
| 7,752,152 | B2 | 7/2010 | Paek et al. |
| 7,756,707 | B2 | 7/2010 | Garner et al. |
| 7,756,708 | B2 | 7/2010 | Cohen et al. |
| 7,756,868 | B2 | 7/2010 | Lee |
| 7,756,871 | B2 | 7/2010 | Yacoub et al. |
| 7,757,173 | B2 | 7/2010 | Beaman |
| 7,757,176 | B2 | 7/2010 | Vakil et al. |
| 7,757,182 | B2 | 7/2010 | Elliott et al. |
| 7,761,296 | B1 | 7/2010 | Bakis et al. |
| 7,763,842 | B2 | 7/2010 | Hsu et al. |
| 7,770,104 | B2 | 8/2010 | Scopes |
| 7,774,202 | B2 | 8/2010 | Spengler et al. |
| 7,774,204 | B2 | 8/2010 | Mozer et al. |
| 7,774,388 | B1 | 8/2010 | Runchey |
| 7,774,753 | B1 | 8/2010 | Reilly et al. |
| 7,777,717 | B2 | 8/2010 | Fux et al. |
| 7,778,432 | B2 | 8/2010 | Larsen |
| 7,778,595 | B2 | 8/2010 | White et al. |
| 7,778,632 | B2 | 8/2010 | Kurlander et al. |
| 7,778,830 | B2 | 8/2010 | Davis et al. |
| 7,779,069 | B2 | 8/2010 | Frid-Nielsen et al. |
| 7,779,353 | B2 | 8/2010 | Grigoriu et al. |
| 7,779,356 | B2 | 8/2010 | Griesmer |
| 7,779,357 | B2 | 8/2010 | Naik |
| 7,783,283 | B2 | 8/2010 | Kuusinen et al. |
| 7,783,486 | B2 | 8/2010 | Rosser et al. |
| 7,788,590 | B2 | 8/2010 | Taboada et al. |
| 7,788,663 | B2 | 8/2010 | Illowsky et al. |
| 7,796,980 | B1 | 9/2010 | McKinney et al. |
| 7,797,265 | B2 | 9/2010 | Brinker et al. |
| 7,797,269 | B2 | 9/2010 | Rieman et al. |
| 7,797,331 | B2 | 9/2010 | Theimer et al. |
| 7,797,338 | B2 | 9/2010 | Feng et al. |
| 7,797,629 | B2 | 9/2010 | Fux et al. |
| 7,801,721 | B2 | 9/2010 | Rosart et al. |
| 7,801,728 | B2 | 9/2010 | Ben-David et al. |
| 7,801,729 | B2 | 9/2010 | Mozer |
| 7,805,299 | B2 | 9/2010 | Coifman |

(56) References Cited

U.S. PATENT DOCUMENTS 7,809,550 B1 10/2010 Barrows
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,813,729 B2 10/2010 Lee et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.
7,836,437 B2 11/2010 Kacmarcik et al.
7,840,348 B2 11/2010 Kim et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,861,164 B2 12/2010 Qin
7,865,817 B2 1/2011 Ryan et al.
7,869,998 B1 1/2011 Fabbrizio et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,523 B2 1/2011 Potter et al.
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,329 B2 2/2011 Wu et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,364 B2 3/2011 Yacoub
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,933,399 B2 4/2011 Knott et al.
7,936,339 B2 5/2011 Marggraff et al.
7,936,861 B2 5/2011 Martin et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 White et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,176 B2 7/2011 Latzina et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,001,125 B1 8/2011 Magdalin et al.
8,005,664 B2 8/2011 Hanumanthappa
8,005,679 B2 8/2011 Jordan et al.
8,006,180 B2 8/2011 Tunning et al.
8,010,367 B2 8/2011 Muschett et al.
8,010,614 B1 8/2011 Musat et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,032,409 B1 10/2011 Mikurak
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,231 B2 10/2011 Hirota et al.
8,046,363 B2 10/2011 Cha et al.
8,046,374 B1 10/2011 Bromwich et al.
8,050,500 B1 11/2011 Batty et al.
8,050,919 B2 11/2011 Das
8,054,180 B1 11/2011 Scofield et al.
8,055,296 B1 11/2011 Persson et al.
8,055,502 B2 11/2011 Clark et al.

(56) References Cited

U.S. PATENT DOCUMENTS

| | | | |
|---|---|---|---|
| 8,055,708 | B2 | 11/2011 | Chitsaz et al. |
| 8,056,070 | B2 | 11/2011 | Goller et al. |
| 8,060,824 | B2 | 11/2011 | Brownrigg, Jr. et al. |
| 8,064,753 | B2 | 11/2011 | Freeman |
| 8,065,143 | B2 | 11/2011 | Yanagihara |
| 8,065,155 | B1 | 11/2011 | Gazdzinski |
| 8,065,156 | B2 | 11/2011 | Gazdzinski |
| 8,068,604 | B2 | 11/2011 | Leeds et al. |
| 8,069,046 | B2 | 11/2011 | Kennewick et al. |
| 8,069,422 | B2 | 11/2011 | Sheshagiri et al. |
| 8,073,681 | B2 | 12/2011 | Baldwin et al. |
| 8,073,695 | B1 | 12/2011 | Hendricks et al. |
| 8,077,153 | B2 | 12/2011 | Benko et al. |
| 8,078,473 | B1 | 12/2011 | Gazdzinski |
| 8,078,978 | B2 | 12/2011 | Perry et al. |
| 8,082,153 | B2 | 12/2011 | Coffman et al. |
| 8,082,498 | B2 | 12/2011 | Salamon et al. |
| 8,090,571 | B2 | 1/2012 | Elshishiny et al. |
| 8,095,364 | B2 | 1/2012 | Longe et al. |
| 8,099,289 | B2 | 1/2012 | Mozer et al. |
| 8,099,395 | B2 | 1/2012 | Pabla et al. |
| 8,099,418 | B2 | 1/2012 | Inoue et al. |
| 8,103,510 | B2 | 1/2012 | Sato |
| 8,103,947 | B2 | 1/2012 | Lunt et al. |
| 8,107,401 | B2 | 1/2012 | John et al. |
| 8,112,275 | B2 | 2/2012 | Kennewick et al. |
| 8,112,280 | B2 | 2/2012 | Lu |
| 8,117,026 | B2 | 2/2012 | Lee et al. |
| 8,117,037 | B2 | 2/2012 | Gazdzinski |
| 8,117,542 | B2 | 2/2012 | Radtke et al. |
| 8,121,413 | B2 | 2/2012 | Hwang et al. |
| 8,121,837 | B2 | 2/2012 | Agapi et al. |
| 8,122,094 | B1 | 2/2012 | Kotab |
| 8,122,353 | B2 | 2/2012 | Bouta |
| 8,130,929 | B2 | 3/2012 | Wilkes et al. |
| 8,131,557 | B2 | 3/2012 | Davis et al. |
| 8,135,115 | B1 | 3/2012 | Hogg, Jr. et al. |
| 8,138,912 | B2 | 3/2012 | Singh et al. |
| 8,140,330 | B2 | 3/2012 | Cevik et al. |
| 8,140,335 | B2 | 3/2012 | Kennewick et al. |
| 8,140,368 | B2 | 3/2012 | Eggenberger et al. |
| 8,140,567 | B2 | 3/2012 | Padovitz et al. |
| 8,145,489 | B2 | 3/2012 | Freeman et al. |
| 8,150,694 | B2 | 4/2012 | Kennewick et al. |
| 8,150,700 | B2 | 4/2012 | Shin et al. |
| 8,155,956 | B2 | 4/2012 | Cho et al. |
| 8,156,005 | B2 | 4/2012 | Vieri |
| 8,160,877 | B1 | 4/2012 | Nucci et al. |
| 8,160,883 | B2 | 4/2012 | Lecoeuche |
| 8,165,321 | B2 | 4/2012 | Paquier et al. |
| 8,165,886 | B1 | 4/2012 | Gagnon et al. |
| 8,166,019 | B1 | 4/2012 | Lee et al. |
| 8,166,032 | B2 | 4/2012 | Sommer et al. |
| 8,170,790 | B2 | 5/2012 | Lee et al. |
| 8,170,966 | B1 | 5/2012 | Musat et al. |
| 8,171,137 | B1 | 5/2012 | Parks et al. |
| 8,175,872 | B2 | 5/2012 | Kristjansson et al. |
| 8,175,876 | B2 | 5/2012 | Bou-ghazale et al. |
| 8,179,370 | B1 | 5/2012 | Yamasani et al. |
| 8,188,856 | B2 | 5/2012 | Singh et al. |
| 8,190,359 | B2 | 5/2012 | Bourne |
| 8,190,596 | B2 | 5/2012 | Nambiar et al. |
| 8,194,827 | B2 | 6/2012 | Jaiswal et al. |
| 8,195,460 | B2 | 6/2012 | Degani et al. |
| 8,195,467 | B2 | 6/2012 | Mozer et al. |
| 8,195,468 | B2 | 6/2012 | Kennewick et al. |
| 8,200,489 | B1 | 6/2012 | Baggenstoss |
| 8,200,495 | B2 | 6/2012 | Braho et al. |
| 8,201,109 | B2 | 6/2012 | Van Os et al. |
| 8,204,238 | B2 | 6/2012 | Mozer |
| 8,205,788 | B1 | 6/2012 | Gazdzinski et al. |
| 8,209,183 | B1 | 6/2012 | Patel et al. |
| 8,213,911 | B2 | 7/2012 | Williams et al. |
| 8,219,115 | B1 | 7/2012 | Nelissen |
| 8,219,406 | B2 | 7/2012 | Yu et al. |
| 8,219,407 | B1 | 7/2012 | Roy et al. |
| 8,219,555 | B1 | 7/2012 | Mianji |
| 8,219,608 | B2 | 7/2012 | alSafadi et al. |
| 8,224,649 | B2 | 7/2012 | Chaudhari et al. |
| 8,224,757 | B2 | 7/2012 | Bohle |
| 8,228,299 | B1 | 7/2012 | Maloney et al. |
| 8,233,919 | B2 | 7/2012 | Haag et al. |
| 8,234,111 | B2 | 7/2012 | Lloyd et al. |
| 8,239,206 | B1 | 8/2012 | LeBeau et al. |
| 8,239,207 | B2 | 8/2012 | Seligman et al. |
| 8,244,545 | B2 | 8/2012 | Paek et al. |
| 8,244,712 | B2 | 8/2012 | Serlet et al. |
| 8,250,071 | B1 | 8/2012 | Killalea et al. |
| 8,254,829 | B1 | 8/2012 | Kindred et al. |
| 8,255,216 | B2 | 8/2012 | White |
| 8,255,217 | B2 | 8/2012 | Stent et al. |
| 8,260,117 | B1 | 9/2012 | Xu et al. |
| 8,260,247 | B2 | 9/2012 | Lazaridis et al. |
| 8,260,617 | B2 | 9/2012 | Dhanakshirur et al. |
| 8,260,619 | B1 | 9/2012 | Bansal et al. |
| 8,270,933 | B2 | 9/2012 | Riemer et al. |
| 8,271,287 | B1 | 9/2012 | Kermani |
| 8,275,621 | B2 | 9/2012 | Alewine et al. |
| 8,275,736 | B2 | 9/2012 | Guo et al. |
| 8,279,171 | B2 | 10/2012 | Hirai et al. |
| 8,280,438 | B2 | 10/2012 | Barbera |
| 8,285,546 | B2 | 10/2012 | Reich |
| 8,285,551 | B2 | 10/2012 | Gazdzinski |
| 8,285,553 | B2 | 10/2012 | Gazdzinski |
| 8,285,737 | B1 | 10/2012 | Lynn et al. |
| 8,290,777 | B1 | 10/2012 | Nguyen et al. |
| 8,290,778 | B2 | 10/2012 | Gazdzinski |
| 8,290,781 | B2 | 10/2012 | Gazdzinski |
| 8,296,124 | B1 | 10/2012 | Holsztynska et al. |
| 8,296,145 | B2 | 10/2012 | Clark et al. |
| 8,296,146 | B2 | 10/2012 | Gazdzinski |
| 8,296,153 | B2 | 10/2012 | Gazdzinski |
| 8,296,380 | B1 | 10/2012 | Kelly et al. |
| 8,296,383 | B2 | 10/2012 | Lindahl |
| 8,300,776 | B2 | 10/2012 | Davies et al. |
| 8,300,801 | B2 | 10/2012 | Sweeney et al. |
| 8,301,456 | B2 | 10/2012 | Gazdzinski |
| 8,311,189 | B2 | 11/2012 | Champlin et al. |
| 8,311,834 | B1 | 11/2012 | Gazdzinski |
| 8,311,835 | B2 | 11/2012 | Lecoeuche |
| 8,311,838 | B2 | 11/2012 | Lindahl et al. |
| 8,312,017 | B2 | 11/2012 | Martin et al. |
| 8,321,786 | B2 | 11/2012 | Lunati et al. |
| 8,326,627 | B2 | 12/2012 | Kennewick et al. |
| 8,332,205 | B2 | 12/2012 | Krishnan et al. |
| 8,332,218 | B2 | 12/2012 | Cross et al. |
| 8,332,224 | B2 | 12/2012 | Di Cristo et al. |
| 8,332,748 | B1 | 12/2012 | Karam |
| 8,335,689 | B2 | 12/2012 | Wittenstein et al. |
| 8,340,975 | B1 | 12/2012 | Rosenberger |
| 8,345,665 | B2 | 1/2013 | Vieri et al. |
| 8,346,563 | B1 | 1/2013 | Hjelm et al. |
| 8,346,757 | B1 | 1/2013 | Lamping et al. |
| 8,352,183 | B2 | 1/2013 | Thota et al. |
| 8,352,268 | B2 | 1/2013 | Naik et al. |
| 8,352,272 | B2 | 1/2013 | Rogers et al. |
| 8,355,919 | B2 | 1/2013 | Silverman et al. |
| 8,359,234 | B2 | 1/2013 | Vieri |
| 8,370,145 | B2 | 2/2013 | Endo et al. |
| 8,370,158 | B2 | 2/2013 | Gazdzinski |
| 8,371,503 | B2 | 2/2013 | Gazdzinski |
| 8,374,871 | B2 | 2/2013 | Ehsani et al. |
| 8,375,320 | B2 | 2/2013 | Kotler et al. |
| 8,380,504 | B1 | 2/2013 | Peden et al. |
| 8,380,507 | B2 | 2/2013 | Herman et al. |
| 8,381,107 | B2 | 2/2013 | Rottler et al. |
| 8,381,135 | B2 | 2/2013 | Hotelling et al. |
| 8,386,485 | B2 | 2/2013 | Kerschberg et al. |
| 8,386,926 | B1 | 2/2013 | Matsuoka |
| 8,391,844 | B2 | 3/2013 | Lamiraux et al. |
| 8,396,714 | B2 | 3/2013 | Rogers et al. |
| 8,396,715 | B2 | 3/2013 | Odell et al. |
| 8,401,163 | B1 | 3/2013 | Kirchhoff et al. |
| 8,406,745 | B1 | 3/2013 | Upadhyay et al. |

(56) References Cited

U.S. PATENT DOCUMENTS 8,407,239 B2 3/2013 Dean et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,453,058 B1 5/2013 Coccaro et al.
8,457,959 B2 6/2013 Kaiser
8,458,115 B2 6/2013 Cai et al.
8,458,278 B2 6/2013 Christie et al.
8,463,592 B2 6/2013 Lu et al.
8,464,150 B2 6/2013 Davidson et al.
8,473,289 B2 6/2013 Jitkoff et al.
8,473,485 B2 6/2013 Wong et al.
8,477,323 B2 7/2013 Low et al.
8,478,816 B2 7/2013 Parks et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,736 B1 8/2013 Duta
8,515,750 B1 8/2013 Lei et al.
8,521,513 B2 8/2013 Millett et al.
8,521,526 B1 8/2013 Lloyd et al.
8,521,531 B1 8/2013 Kim
8,527,276 B1 9/2013 Senior et al.
8,533,266 B2 9/2013 Koulomzin et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 10/2013 Park et al.
8,560,366 B2 10/2013 Mikurak
8,571,528 B1 10/2013 Channakeshava
8,571,851 B1 10/2013 Tickner et al.
8,577,683 B2 11/2013 Dewitt
8,583,416 B2 11/2013 Huang et al.
8,583,511 B2 11/2013 Hendrickson
8,583,638 B2 11/2013 Donelli
8,589,156 B2 11/2013 Burke et al.
8,589,374 B2 11/2013 Chaudhari
8,589,869 B2 11/2013 Wolfram
8,589,911 B1 11/2013 Sharkey et al.
8,595,004 B2 11/2013 Koshinaka
8,595,642 B1 11/2013 Lagassey
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,606,577 B1 12/2013 Stewart et al.
8,615,221 B1 12/2013 Cosenza et al.
8,620,659 B2 12/2013 Di Cristo et al.
8,620,662 B2 12/2013 Bellegarda
8,626,681 B1 1/2014 Jurca et al.
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,687,777 B1 4/2014 Lavian et al.
8,688,446 B2 4/2014 Yanagihara et al.
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,712,778 B1 4/2014 Thenthiruperai
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,751,971 B2 6/2014 Fleizach et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,177 B1 7/2014 Heigold et al.
8,775,931 B2 7/2014 Fux et al.
8,781,456 B2 7/2014 Prociw
8,781,841 B1 7/2014 Wang
8,793,301 B2 7/2014 Wegenkittl et al.
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,825,474 B1 9/2014 Zhai et al.
8,831,947 B2 9/2014 Wasserblat et al.
8,831,949 B1 9/2014 Smith et al.
8,838,457 B2 9/2014 Cerra et al.
8,855,915 B2 10/2014 Furuhata et al.
8,861,925 B1 10/2014 Ohme
8,862,252 B2 10/2014 Rottler et al.
8,868,111 B1 10/2014 Kahn et al.
8,868,409 B1 10/2014 Mengibar et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.

(56) References Cited

U.S. PATENT DOCUMENTS 8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 3/2015 Freeman et al.
8,983,383 B1 3/2015 Haskin
8,989,713 B2 3/2015 Doulton
8,990,235 B2 3/2015 King et al.
8,994,660 B2 3/2015 Neels et al.
8,995,972 B1 3/2015 Cronin
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,002,714 B2 4/2015 Kim et al.
9,009,046 B1 4/2015 Stewart
9,015,036 B2 4/2015 Karov Zangvil et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-jefri et al.
9,043,208 B2 5/2015 Koch et al.
9,043,211 B2 5/2015 Haiut et al.
9,046,932 B2 6/2015 Medlock et al.
9,049,255 B2 6/2015 Macfarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,094,636 B1 7/2015 Sanders et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,208,153 B1 12/2015 Zaveri et al.
9,213,754 B1 12/2015 Zhan et al.
9,218,122 B2 12/2015 Thoma et al.
9,218,809 B2 12/2015 Bellegarda
9,218,819 B1 12/2015 Stekkelpa et al.
9,223,537 B2 12/2015 Brown et al.
9,236,047 B2 1/2016 Rasmussen
9,241,073 B1 1/2016 Rensburg et al.
9,251,713 B1 2/2016 Giovanniello et al.
9,255,812 B2 2/2016 Maeoka et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,280,535 B2 3/2016 Varma et al.
9,282,211 B2 3/2016 Osawa
9,286,910 B1 3/2016 Li et al.
9,292,487 B1 3/2016 Weber
9,292,489 B1 3/2016 Sak et al.
9,292,492 B2 3/2016 Sarikaya et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 5/2016 Van Os et al.
9,342,930 B1 * 5/2016 Kraft .................. G06F 3/04842
9,349,368 B1 5/2016 LeBeau et al.
9,355,472 B2 5/2016 Kocienda et al.
9,361,084 B1 6/2016 Costa
9,367,541 B1 6/2016 Servan et al.
9,368,114 B2 6/2016 Larson et al.
9,377,871 B2 6/2016 Waddell et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,401,147 B2 7/2016 Jitkoff et al.
9,406,224 B1 8/2016 Sanders et al.
9,406,299 B2 8/2016 Gollan et al.
9,408,182 B1 8/2016 Hurley et al.
9,412,392 B2 8/2016 Lindahl
9,418,650 B2 8/2016 Bharadwaj et al.
9,423,266 B2 8/2016 Clark et al.
9,424,246 B2 8/2016 Spencer et al.
9,424,840 B1 8/2016 Hart et al.
9,431,021 B1 8/2016 Scalise et al.
9,432,499 B2 8/2016 Hajdu et al.
9,436,918 B2 9/2016 Pantel et al.
9,437,186 B1 9/2016 Liu et al.
9,437,189 B2 9/2016 Epstein et al.
9,442,687 B2 9/2016 Park et al.
9,443,527 B1 9/2016 Watanabe et al.
9,454,599 B2 9/2016 Golden et al.
9,454,957 B1 9/2016 Mathias et al.
9,465,798 B2 10/2016 Lin
9,465,833 B2 10/2016 Aravamudan et al.
9,465,864 B2 10/2016 Hu et al.
9,466,027 B2 10/2016 Byrne et al.
9,466,294 B1 10/2016 Tunstall-Pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,519,453 B2 12/2016 Perkuhn et al.
9,524,355 B2 12/2016 Forbes et al.
9,531,862 B1 12/2016 Vadodaria
9,535,906 B2 1/2017 Lee et al.
9,536,527 B1 1/2017 Carlson
9,547,647 B2 1/2017 Badaskar
9,548,050 B2 1/2017 Gruber et al.
9,548,979 B1 1/2017 Johnson et al.

(56) References Cited

U.S. PATENT DOCUMENTS 9,569,549 B1 2/2017 Jenkins et al.
9,575,964 B2 2/2017 Yadgar et al.
9,578,173 B2 2/2017 Sanghavi et al.
9,607,612 B2 3/2017 Deleeuw
9,619,200 B2 4/2017 Chakladar et al.
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Li et al.
9,665,662 B1 5/2017 Gautam et al.
9,668,121 B2 5/2017 Naik et al.
9,672,725 B2 6/2017 Dotan-Cohen et al.
9,691,161 B1 * 6/2017 Yalniz .................. G06K 9/2027
9,691,378 B1 6/2017 Meyers et al.
9,697,822 B1 7/2017 Naik et al.
9,697,827 B1 7/2017 Lilly et al.
9,698,999 B2 7/2017 Mutagi
9,720,907 B2 8/2017 Bangalore et al.
9,721,566 B2 8/2017 Newendorp et al.
9,723,130 B2 8/2017 Rand
9,734,817 B1 8/2017 Putrycz
9,734,839 B1 8/2017 Adams
9,741,343 B1 8/2017 Miles et al.
9,747,083 B1 8/2017 Roman et al.
9,747,093 B2 8/2017 Latino et al.
9,755,605 B1 9/2017 Li et al.
9,767,710 B2 9/2017 Lee et al.
9,786,271 B1 10/2017 Combs et al.
9,792,907 B2 10/2017 Bocklet et al.
9,812,128 B2 11/2017 Mixter et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,830,044 B2 11/2017 Brown et al.
9,830,449 B1 11/2017 Wagner
9,842,584 B1 12/2017 Hart et al.
9,846,685 B2 12/2017 Li
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,916,839 B1 3/2018 Scalise et al.
9,922,642 B2 3/2018 Pitschel et al.
9,934,777 B1 4/2018 Joseph et al.
9,934,785 B1 4/2018 Hulaud
9,946,862 B2 4/2018 Yun et al.
9,948,728 B2 4/2018 Linn et al.
9,959,129 B2 5/2018 Kannan et al.
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,984,686 B1 5/2018 Mutagi et al.
9,986,419 B2 5/2018 Naik et al.
9,990,176 B1 6/2018 Gray
9,998,552 B1 6/2018 Ledet
10,001,817 B2 6/2018 Zambetti et al.
10,013,416 B1 7/2018 Bhardwaj et al.
10,013,654 B1 7/2018 Levy et al.
10,013,979 B1 7/2018 Roma et al.
10,019,436 B2 7/2018 Huang
10,032,451 B1 7/2018 Mamkina et al.
10,032,455 B2 7/2018 Newman et al.
10,037,758 B2 7/2018 Jing et al.
10,043,516 B2 8/2018 Saddler et al.
10,049,161 B2 8/2018 Kaneko
10,049,663 B2 8/2018 Orr et al.
10,049,668 B2 8/2018 Huang et al.
10,055,681 B2 8/2018 Brown et al.
10,074,360 B2 9/2018 Kim
10,074,371 B1 9/2018 Wang et al.
10,083,213 B1 9/2018 Podgorny et al.
10,083,690 B2 9/2018 Giuli et al.
10,088,972 B2 10/2018 Brown et al.
10,089,072 B2 10/2018 Piersol et al.
10,096,319 B1 10/2018 Jin et al.
10,101,887 B2 10/2018 Bernstein et al.
10,102,359 B2 10/2018 Cheyer
10,127,901 B2 11/2018 Zhao et al.
10,127,908 B1 11/2018 Deller et al.
10,134,425 B1 11/2018 Johnson, Jr.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,199,051 B2 2/2019 Binder et al.
10,200,824 B2 2/2019 Gross et al.
10,216,351 B2 2/2019 Yang
10,216,832 B2 2/2019 Bangalore et al.
10,223,066 B2 3/2019 Martel et al.
10,225,711 B2 3/2019 Parks et al.
10,229,356 B1 3/2019 Liu et al.
10,248,308 B2 4/2019 Karunamuni et al.
10,255,922 B1 4/2019 Sharifi et al.
10,269,345 B2 4/2019 Castillo Sanchez et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,332,513 B1 6/2019 D'souza et al.
10,332,518 B2 6/2019 Garg et al.
10,346,753 B2 7/2019 Soon-Shiong et al.
10,353,975 B2 7/2019 Oh et al.
10,354,677 B2 7/2019 Mohamed et al.
10,356,243 B2 7/2019 Sanghavi et al.
10,366,692 B1 7/2019 Adams et al.
10,372,814 B2 8/2019 Gliozzo et al.
10,389,876 B2 8/2019 Engelke et al.
10,402,066 B2 9/2019 Kawana
10,403,283 B1 9/2019 Schramm et al.
10,410,637 B2 9/2019 Paulik et al.
10,417,037 B2 9/2019 Gruber et al.
10,417,554 B2 9/2019 Scheffler
10,446,142 B2 10/2019 Lim et al.
10,469,665 B1 11/2019 Bell et al.
10,474,961 B2 11/2019 Brigham et al.
10,496,705 B1 12/2019 Irani et al.
10,497,365 B2 12/2019 Gruber et al.
10,504,518 B1 12/2019 Irani et al.
10,521,946 B1 12/2019 Roche et al.
10,568,032 B2 2/2020 Freeman et al.
10,659,851 B2 5/2020 Lister et al.
10,757,499 B1 8/2020 Vautrin et al.
2001/0005859 A1 6/2001 Okuyama et al.
2001/0020259 A1 9/2001 Sekiguchi et al.
2001/0027394 A1 10/2001 Theimer
2001/0027396 A1 10/2001 Sato
2001/0029455 A1 10/2001 Chin et al.
2001/0030660 A1 10/2001 Zainoulline
2001/0032080 A1 10/2001 Fukada
2001/0041021 A1 11/2001 Boyle et al.
2001/0042107 A1 11/2001 Palm

(56) References Cited

U.S. PATENT DOCUMENTS

| | | | |
|---|---|---|---|
| 2001/0044724 | A1 | 11/2001 | Hon et al. |
| 2001/0047264 | A1 | 11/2001 | Roundtree |
| 2001/0055963 | A1 | 12/2001 | Cloutier |
| 2001/0056342 | A1 | 12/2001 | Piehn et al. |
| 2001/0056347 | A1 | 12/2001 | Chazan et al. |
| 2002/0001395 | A1 | 1/2002 | Davis et al. |
| 2002/0002039 | A1 | 1/2002 | Qureshey et al. |
| 2002/0002413 | A1 | 1/2002 | Tokue |
| 2002/0002461 | A1 | 1/2002 | Tetsumoto |
| 2002/0002465 | A1 | 1/2002 | Maes |
| 2002/0004703 | A1 | 1/2002 | Gaspard, II |
| 2002/0010581 | A1 | 1/2002 | Euler et al. |
| 2002/0010584 | A1 | 1/2002 | Schultz et al. |
| 2002/0010589 | A1 | 1/2002 | Nashida et al. |
| 2002/0010726 | A1 | 1/2002 | Rogson |
| 2002/0010798 | A1 | 1/2002 | Ben-Shaul et al. |
| 2002/0013707 | A1 | 1/2002 | Shaw et al. |
| 2002/0013784 | A1 | 1/2002 | Swanson |
| 2002/0013852 | A1 | 1/2002 | Janik |
| 2002/0015024 | A1 | 2/2002 | Westerman et al. |
| 2002/0015064 | A1 | 2/2002 | Robotham et al. |
| 2002/0026315 | A1 | 2/2002 | Miranda |
| 2002/0026456 | A1 | 2/2002 | Bradford |
| 2002/0031254 | A1 | 3/2002 | Lantrip et al. |
| 2002/0031262 | A1 | 3/2002 | Imagawa et al. |
| 2002/0032048 | A1 | 3/2002 | Kitao et al. |
| 2002/0032564 | A1 | 3/2002 | Ehsani et al. |
| 2002/0032591 | A1 | 3/2002 | Mahaffy et al. |
| 2002/0032751 | A1 | 3/2002 | Bharadwaj |
| 2002/0035467 | A1 | 3/2002 | Morimoto et al. |
| 2002/0035469 | A1 | 3/2002 | Holzapfel |
| 2002/0035474 | A1 | 3/2002 | Alpdemir |
| 2002/0040297 | A1 | 4/2002 | Tsiao et al. |
| 2002/0040359 | A1 | 4/2002 | Green et al. |
| 2002/0042707 | A1 | 4/2002 | Zhao et al. |
| 2002/0045438 | A1 | 4/2002 | Tagawa et al. |
| 2002/0045961 | A1 | 4/2002 | Gibbs et al. |
| 2002/0046025 | A1 | 4/2002 | Hain |
| 2002/0046315 | A1 | 4/2002 | Miller et al. |
| 2002/0052730 | A1 | 5/2002 | Nakao |
| 2002/0052740 | A1 | 5/2002 | Charlesworth et al. |
| 2002/0052746 | A1 | 5/2002 | Handelman |
| 2002/0052747 | A1 | 5/2002 | Sarukkai |
| 2002/0052913 | A1 | 5/2002 | Yamada et al. |
| 2002/0054094 | A1 | 5/2002 | Matsuda |
| 2002/0055844 | A1 | 5/2002 | L'Esperance et al. |
| 2002/0055934 | A1 | 5/2002 | Lipscomb et al. |
| 2002/0057293 | A1 | 5/2002 | Liao |
| 2002/0059066 | A1 | 5/2002 | O'hagan |
| 2002/0059068 | A1 | 5/2002 | Rose et al. |
| 2002/0065659 | A1 | 5/2002 | Isono et al. |
| 2002/0065797 | A1 | 5/2002 | Meidan et al. |
| 2002/0067308 | A1 | 6/2002 | Robertson |
| 2002/0069063 | A1 | 6/2002 | Buchner et al. |
| 2002/0069071 | A1 | 6/2002 | Knockeart et al. |
| 2002/0069220 | A1 | 6/2002 | Tran |
| 2002/0072816 | A1 | 6/2002 | Shdema et al. |
| 2002/0072908 | A1 | 6/2002 | Case et al. |
| 2002/0072914 | A1 | 6/2002 | Alshawi et al. |
| 2002/0072915 | A1 | 6/2002 | Bower |
| 2002/0073177 | A1 | 6/2002 | Clark et al. |
| 2002/0077082 | A1 | 6/2002 | Cruickshank |
| 2002/0077817 | A1 | 6/2002 | Atal |
| 2002/0078041 | A1 | 6/2002 | Wu |
| 2002/0080163 | A1 | 6/2002 | Morey |
| 2002/0083068 | A1 | 6/2002 | Quass et al. |
| 2002/0085037 | A1 | 7/2002 | Leavitt et al. |
| 2002/0086680 | A1 | 7/2002 | Hunzinger |
| 2002/0087306 | A1 | 7/2002 | Lee et al. |
| 2002/0087508 | A1 | 7/2002 | Hull et al. |
| 2002/0087974 | A1 | 7/2002 | Sprague et al. |
| 2002/0091511 | A1 | 7/2002 | Hellwig et al. |
| 2002/0091529 | A1 | 7/2002 | Whitham |
| 2002/0095286 | A1 | 7/2002 | Ross et al. |
| 2002/0095290 | A1 | 7/2002 | Kahn et al. |
| 2002/0099547 | A1 | 7/2002 | Chu et al. |
| 2002/0099552 | A1 | 7/2002 | Rubin et al. |
| 2002/0101447 | A1 | 8/2002 | Carro |
| 2002/0103641 | A1 | 8/2002 | Kuo et al. |
| 2002/0103644 | A1 | 8/2002 | Brocious et al. |
| 2002/0103646 | A1 | 8/2002 | Kochanski et al. |
| 2002/0107684 | A1 | 8/2002 | Gao |
| 2002/0109709 | A1 | 8/2002 | Sagar |
| 2002/0110248 | A1 | 8/2002 | Kovales et al. |
| 2002/0111198 | A1 | 8/2002 | Heie et al. |
| 2002/0111810 | A1 | 8/2002 | Khan et al. |
| 2002/0116082 | A1 | 8/2002 | Gudorf |
| 2002/0116171 | A1 | 8/2002 | Russell |
| 2002/0116185 | A1 | 8/2002 | Cooper et al. |
| 2002/0116189 | A1 | 8/2002 | Yeh et al. |
| 2002/0116420 | A1 | 8/2002 | Allam et al. |
| 2002/0117384 | A1 | 8/2002 | Marchant |
| 2002/0120697 | A1 | 8/2002 | Generous et al. |
| 2002/0120925 | A1 | 8/2002 | Logan |
| 2002/0122053 | A1 | 9/2002 | Dutta et al. |
| 2002/0123891 | A1 | 9/2002 | Epstein et al. |
| 2002/0123894 | A1 | 9/2002 | Woodward |
| 2002/0126097 | A1 | 9/2002 | Savolainen |
| 2002/0128821 | A1 | 9/2002 | Ehsani et al. |
| 2002/0128827 | A1 | 9/2002 | Bu et al. |
| 2002/0128840 | A1 | 9/2002 | Hinde et al. |
| 2002/0129057 | A1 | 9/2002 | Spielberg |
| 2002/0133347 | A1 | 9/2002 | Schoneburg et al. |
| 2002/0133348 | A1 | 9/2002 | Pearson et al. |
| 2002/0135565 | A1 | 9/2002 | Gordon et al. |
| 2002/0135618 | A1 | 9/2002 | Maes et al. |
| 2002/0137505 | A1 | 9/2002 | Eiche et al. |
| 2002/0138254 | A1 | 9/2002 | Isaka et al. |
| 2002/0138265 | A1 | 9/2002 | Stevens et al. |
| 2002/0138270 | A1 | 9/2002 | Bellegarda et al. |
| 2002/0138616 | A1 | 9/2002 | Basson et al. |
| 2002/0140679 | A1 | 10/2002 | Wen |
| 2002/0143533 | A1 | 10/2002 | Lucas et al. |
| 2002/0143542 | A1 | 10/2002 | Eide |
| 2002/0143551 | A1 | 10/2002 | Sharma et al. |
| 2002/0143826 | A1 | 10/2002 | Day et al. |
| 2002/0151297 | A1 | 10/2002 | Remboski et al. |
| 2002/0152045 | A1 | 10/2002 | Dowling et al. |
| 2002/0152255 | A1 | 10/2002 | Smith et al. |
| 2002/0154160 | A1 | 10/2002 | Hosokawa |
| 2002/0156771 | A1 | 10/2002 | Frieder et al. |
| 2002/0161865 | A1 | 10/2002 | Nguyen |
| 2002/0163544 | A1 | 11/2002 | Baker et al. |
| 2002/0164000 | A1 | 11/2002 | Cohen et al. |
| 2002/0165918 | A1 | 11/2002 | Bettis |
| 2002/0166123 | A1 | 11/2002 | Schrader et al. |
| 2002/0167534 | A1 | 11/2002 | Burke |
| 2002/0169592 | A1 | 11/2002 | Aityan |
| 2002/0169605 | A1 | 11/2002 | Damiba et al. |
| 2002/0173273 | A1 | 11/2002 | Spurgat et al. |
| 2002/0173889 | A1 | 11/2002 | Odinak et al. |
| 2002/0173961 | A1 | 11/2002 | Guerra |
| 2002/0173962 | A1 | 11/2002 | Tang et al. |
| 2002/0173966 | A1 | 11/2002 | Henton |
| 2002/0177993 | A1 | 11/2002 | Veditz et al. |
| 2002/0184003 | A1 | 12/2002 | Hakkinen et al. |
| 2002/0184015 | A1 | 12/2002 | Li et al. |
| 2002/0184027 | A1 | 12/2002 | Brittan et al. |
| 2002/0184189 | A1 | 12/2002 | Hay et al. |
| 2002/0189426 | A1 | 12/2002 | Hirade et al. |
| 2002/0191029 | A1 | 12/2002 | Gillespie et al. |
| 2002/0193996 | A1 | 12/2002 | Squibbs et al. |
| 2002/0196911 | A1 | 12/2002 | Gao et al. |
| 2002/0198714 | A1 | 12/2002 | Zhou |
| 2002/0198715 | A1 | 12/2002 | Belrose |
| 2003/0001881 | A1 | 1/2003 | Mannheimer et al. |
| 2003/0002632 | A1 | 1/2003 | Bhogal et al. |
| 2003/0003609 | A1 | 1/2003 | Sauer et al. |
| 2003/0003897 | A1 | 1/2003 | Hyon |
| 2003/0004968 | A1 | 1/2003 | Romer et al. |
| 2003/0009459 | A1 | 1/2003 | Chastain et al. |
| 2003/0013483 | A1 | 1/2003 | Ausems et al. |
| 2003/0016770 | A1 | 1/2003 | Trans et al. |
| 2003/0018475 | A1 | 1/2003 | Basu et al. |

(56) References Cited

U.S. PATENT DOCUMENTS

2003/0020760 A1 1/2003 Takatsu et al.
2003/0023420 A1 1/2003 Goodman et al.
2003/0023426 A1 1/2003 Pun et al.
2003/0025676 A1 2/2003 Cappendijk
2003/0026392 A1 2/2003 Brown et al.
2003/0026402 A1 2/2003 Clapper
2003/0028380 A1 2/2003 Freeland et al.
2003/0030645 A1 2/2003 Ribak et al.
2003/0033148 A1 2/2003 Silverman et al.
2003/0033152 A1 2/2003 Cameron
2003/0033153 A1 2/2003 Olson et al.
2003/0033214 A1 2/2003 Mikkelsen et al.
2003/0036909 A1 2/2003 Kato
2003/0037073 A1 2/2003 Tokuda et al.
2003/0037077 A1 2/2003 Brill et al.
2003/0037254 A1 2/2003 Fischer et al.
2003/0038786 A1 2/2003 Nguyen et al.
2003/0040908 A1 2/2003 Yang et al.
2003/0046075 A1 3/2003 Stone
2003/0046401 A1 3/2003 Abbott et al.
2003/0046434 A1 3/2003 Flanagin et al.
2003/0048881 A1 3/2003 Trajkovic et al.
2003/0050781 A1 3/2003 Tamura et al.
2003/0051136 A1 3/2003 Curtis et al.
2003/0055537 A1 3/2003 Odinak et al.
2003/0055623 A1 3/2003 Epstein et al.
2003/0061317 A1 3/2003 Brown et al.
2003/0061570 A1 3/2003 Hatori et al.
2003/0063073 A1 4/2003 Geaghan et al.
2003/0069893 A1 4/2003 Kanai et al.
2003/0074195 A1 4/2003 Bartosik et al.
2003/0074198 A1 4/2003 Sussman
2003/0074457 A1 4/2003 Kluth
2003/0076301 A1 4/2003 Tsuk et al.
2003/0078766 A1 4/2003 Appelt et al.
2003/0078779 A1 4/2003 Desai et al.
2003/0078780 A1 4/2003 Kochanski et al.
2003/0078969 A1 4/2003 Sprague et al.
2003/0079024 A1 4/2003 Hough et al.
2003/0079038 A1 4/2003 Robbin et al.
2003/0080991 A1 5/2003 Crow et al.
2003/0083113 A1 5/2003 Chua et al.
2003/0083878 A1 5/2003 Lee et al.
2003/0083884 A1 5/2003 Odinak et al.
2003/0084350 A1 5/2003 Eibach et al.
2003/0085870 A1 5/2003 Hinckley
2003/0086699 A1 5/2003 Benyamin et al.
2003/0088414 A1 5/2003 Huang et al.
2003/0088421 A1 5/2003 Maes et al.
2003/0090467 A1 5/2003 Hohl et al.
2003/0090474 A1 5/2003 Schaefer
2003/0095096 A1 5/2003 Robbin et al.
2003/0097210 A1 5/2003 Horst et al.
2003/0097379 A1 5/2003 Ireton
2003/0097407 A1 5/2003 Litwin et al.
2003/0097408 A1 5/2003 Kageyama et al.
2003/0098892 A1 5/2003 Hiipakka
2003/0099335 A1 5/2003 Tanaka et al.
2003/0101045 A1 5/2003 Moffatt et al.
2003/0101054 A1 5/2003 Davis et al.
2003/0115060 A1 6/2003 Junqua et al.
2003/0115064 A1 6/2003 Gusler et al.
2003/0115186 A1 6/2003 Wilkinson et al.
2003/0115289 A1 6/2003 Chinn et al.
2003/0115552 A1 6/2003 Jahnke et al.
2003/0117365 A1 6/2003 Shteyn
2003/0120494 A1 6/2003 Jost et al.
2003/0122652 A1 7/2003 Himmelstein et al.
2003/0122787 A1 7/2003 Zimmerman et al.
2003/0125927 A1 7/2003 Seme
2003/0125945 A1 7/2003 Doyle
2003/0125955 A1 7/2003 Arnold et al.
2003/0126559 A1 7/2003 Fuhrmann
2003/0128819 A1 7/2003 Lee et al.
2003/0130847 A1 7/2003 Case et al.
2003/0131320 A1 7/2003 Kumhyr et al.
2003/0133694 A1 7/2003 Yeo
2003/0134678 A1 7/2003 Tanaka
2003/0135501 A1 7/2003 Frerebeau et al.
2003/0135740 A1 7/2003 Talmor et al.
2003/0140088 A1 7/2003 Robinson et al.
2003/0144846 A1 7/2003 Denenberg et al.
2003/0145285 A1 7/2003 Miyahira et al.
2003/0147512 A1 8/2003 Abburi
2003/0149557 A1 8/2003 Cox et al.
2003/0149567 A1 8/2003 Schmitz et al.
2003/0149978 A1 8/2003 Plotnick
2003/0152203 A1 8/2003 Berger et al.
2003/0152894 A1 8/2003 Townshend
2003/0154079 A1 8/2003 Ota et al.
2003/0154081 A1 8/2003 Chu et al.
2003/0157968 A1 8/2003 Boman et al.
2003/0158732 A1 8/2003 Pi et al.
2003/0158735 A1 8/2003 Yamada et al.
2003/0158737 A1 8/2003 Csicsatka
2003/0160702 A1 8/2003 Tanaka
2003/0160830 A1 8/2003 Degross
2003/0163316 A1 8/2003 Addison et al.
2003/0164848 A1 9/2003 Dutta et al.
2003/0167167 A1 9/2003 Gong
2003/0167318 A1 9/2003 Robbin et al.
2003/0167335 A1 9/2003 Alexander
2003/0171928 A1 9/2003 Falcon et al.
2003/0171936 A1 9/2003 Sall et al.
2003/0174830 A1 9/2003 Boyer et al.
2003/0177046 A1 9/2003 Socha-Leialoha et al.
2003/0179222 A1 9/2003 Noma et al.
2003/0182115 A1 9/2003 Malayath et al.
2003/0182131 A1 9/2003 Arnold et al.
2003/0187655 A1 10/2003 Dunsmuir
2003/0187659 A1 10/2003 Cho et al.
2003/0187775 A1 10/2003 Du et al.
2003/0187844 A1 10/2003 Li et al.
2003/0187925 A1 10/2003 Inala et al.
2003/0188005 A1 10/2003 Yoneda et al.
2003/0188192 A1 10/2003 Tang et al.
2003/0190074 A1 10/2003 Loudon et al.
2003/0191625 A1 10/2003 Gorin et al.
2003/0191645 A1 10/2003 Zhou
2003/0193481 A1 10/2003 Sokolsky
2003/0194080 A1 10/2003 Michaelis et al.
2003/0195741 A1 10/2003 Mani et al.
2003/0197736 A1 10/2003 Murphy
2003/0197744 A1 10/2003 Irvine
2003/0200085 A1 10/2003 Nguyen et al.
2003/0200452 A1 10/2003 Tagawa et al.
2003/0200858 A1 10/2003 Xie
2003/0202697 A1 10/2003 Simard et al.
2003/0204392 A1 10/2003 Finnigan et al.
2003/0204492 A1 10/2003 Wolf et al.
2003/0206199 A1 11/2003 Pusa et al.
2003/0208756 A1 11/2003 Macrae et al.
2003/0210266 A1 11/2003 Cragun et al.
2003/0212543 A1 11/2003 Epstein et al.
2003/0212961 A1 11/2003 Soin et al.
2003/0214519 A1 11/2003 Smith et al.
2003/0216919 A1 11/2003 Roushar
2003/0221198 A1 11/2003 Sloo et al.
2003/0224760 A1 12/2003 Day
2003/0228863 A1 12/2003 Vander Veen et al.
2003/0228909 A1 12/2003 Tanaka et al.
2003/0229490 A1 12/2003 Etter
2003/0229616 A1 12/2003 Wong
2003/0233230 A1 12/2003 Ammicht et al.
2003/0233237 A1 12/2003 Garside et al.
2003/0233240 A1 12/2003 Kaatrasalo
2003/0234824 A1 12/2003 Litwiller
2003/0236663 A1 12/2003 Dimitrova et al.
2004/0001396 A1 1/2004 Keller et al.
2004/0006467 A1 1/2004 Anisimovich et al.
2004/0008277 A1 1/2004 Nagaishi et al.
2004/0010484 A1 1/2004 Foulger et al.
2004/0012556 A1 1/2004 Yong et al.
2004/0013252 A1 1/2004 Craner

(56) References Cited

U.S. PATENT DOCUMENTS

| | | | |
|---|---|---|---|
| 2004/0015342 | A1 | 1/2004 | Garst et al. |
| 2004/0021676 | A1 | 2/2004 | Chen et al. |
| 2004/0022369 | A1 | 2/2004 | Vitikainen et al. |
| 2004/0022373 | A1 | 2/2004 | Suder et al. |
| 2004/0023643 | A1 | 2/2004 | Vander Veen et al. |
| 2004/0030551 | A1 | 2/2004 | Marcu et al. |
| 2004/0030554 | A1 | 2/2004 | Boxberger-Oberoi et al. |
| 2004/0030556 | A1 | 2/2004 | Bennett |
| 2004/0030559 | A1 | 2/2004 | Payne et al. |
| 2004/0030996 | A1 | 2/2004 | Van Liempd et al. |
| 2004/0036715 | A1 | 2/2004 | Warren |
| 2004/0048627 | A1 | 3/2004 | Olvera-Hernandez |
| 2004/0049388 | A1 | 3/2004 | Roth et al. |
| 2004/0049391 | A1 | 3/2004 | Polanyi et al. |
| 2004/0051729 | A1 | 3/2004 | Borden, IV |
| 2004/0052338 | A1 | 3/2004 | Celi, Jr. et al. |
| 2004/0054530 | A1 | 3/2004 | Davis et al. |
| 2004/0054533 | A1 | 3/2004 | Bellegarda |
| 2004/0054534 | A1 | 3/2004 | Junqua |
| 2004/0054535 | A1 | 3/2004 | Mackie et al. |
| 2004/0054541 | A1 | 3/2004 | Kryze et al. |
| 2004/0054690 | A1 | 3/2004 | Hillerbrand et al. |
| 2004/0055446 | A1 | 3/2004 | Robbin et al. |
| 2004/0056899 | A1 | 3/2004 | Sinclair, II et al. |
| 2004/0059577 | A1 | 3/2004 | Pickering |
| 2004/0059790 | A1 | 3/2004 | Austin-Lane et al. |
| 2004/0061717 | A1 | 4/2004 | Menon et al. |
| 2004/0062367 | A1 | 4/2004 | Fellenstein et al. |
| 2004/0064593 | A1 | 4/2004 | Sinclair et al. |
| 2004/0069122 | A1 | 4/2004 | Wilson |
| 2004/0070567 | A1 | 4/2004 | Longe et al. |
| 2004/0070612 | A1 | 4/2004 | Sinclair et al. |
| 2004/0073427 | A1 | 4/2004 | Moore |
| 2004/0073428 | A1 | 4/2004 | Zlokarnik et al. |
| 2004/0076086 | A1 | 4/2004 | Keller et al. |
| 2004/0078382 | A1 | 4/2004 | Mercer et al. |
| 2004/0085162 | A1 | 5/2004 | Agarwal et al. |
| 2004/0085368 | A1 | 5/2004 | Johnson, Jr. et al. |
| 2004/0086120 | A1 | 5/2004 | Akins, III et al. |
| 2004/0093213 | A1 | 5/2004 | Conkie |
| 2004/0093215 | A1 | 5/2004 | Gupta et al. |
| 2004/0093328 | A1 | 5/2004 | Damle |
| 2004/0094018 | A1 | 5/2004 | Ueshima et al. |
| 2004/0096105 | A1 | 5/2004 | Holtsberg |
| 2004/0098250 | A1 | 5/2004 | Kimchi et al. |
| 2004/0100479 | A1 | 5/2004 | Nakano et al. |
| 2004/0106432 | A1 | 6/2004 | Kanamori et al. |
| 2004/0107169 | A1 | 6/2004 | Lowe |
| 2004/0111266 | A1 | 6/2004 | Coorman et al. |
| 2004/0111332 | A1 | 6/2004 | Baar et al. |
| 2004/0114731 | A1 | 6/2004 | Gillett et al. |
| 2004/0120476 | A1 | 6/2004 | Harrison et al. |
| 2004/0122656 | A1 | 6/2004 | Abir |
| 2004/0122664 | A1 | 6/2004 | Lorenzo et al. |
| 2004/0122673 | A1 | 6/2004 | Park et al. |
| 2004/0124583 | A1 | 7/2004 | Landis |
| 2004/0125088 | A1 | 7/2004 | Zimmerman et al. |
| 2004/0125922 | A1 | 7/2004 | Specht |
| 2004/0127198 | A1 | 7/2004 | Roskind et al. |
| 2004/0127241 | A1 | 7/2004 | Shostak |
| 2004/0128137 | A1 | 7/2004 | Bush et al. |
| 2004/0128614 | A1 | 7/2004 | Andrews et al. |
| 2004/0133817 | A1 | 7/2004 | Choi |
| 2004/0135701 | A1 | 7/2004 | Yasuda et al. |
| 2004/0135774 | A1 | 7/2004 | La Monica |
| 2004/0136510 | A1 | 7/2004 | Vander Veen |
| 2004/0138869 | A1 | 7/2004 | Heinecke |
| 2004/0145607 | A1 | 7/2004 | Alderson |
| 2004/0148154 | A1 | 7/2004 | Acero et al. |
| 2004/0152054 | A1 | 8/2004 | Gleissner et al. |
| 2004/0153306 | A1 | 8/2004 | Tanner et al. |
| 2004/0155869 | A1 | 8/2004 | Robinson et al. |
| 2004/0160419 | A1 | 8/2004 | Padgitt |
| 2004/0162741 | A1 | 8/2004 | Flaxer et al. |
| 2004/0170379 | A1 | 9/2004 | Yao et al. |
| 2004/0174399 | A1 | 9/2004 | Wu et al. |
| 2004/0174434 | A1 | 9/2004 | Walker et al. |
| 2004/0176958 | A1 | 9/2004 | Salmenkaita et al. |
| 2004/0177319 | A1 | 9/2004 | Horn |
| 2004/0178994 | A1 | 9/2004 | Kairls, Jr. |
| 2004/0181392 | A1 | 9/2004 | Parikh et al. |
| 2004/0183833 | A1 | 9/2004 | Chua |
| 2004/0186713 | A1 | 9/2004 | Gomas et al. |
| 2004/0186714 | A1 | 9/2004 | Baker |
| 2004/0186777 | A1 | 9/2004 | Margiloff et al. |
| 2004/0186857 | A1 | 9/2004 | Serlet et al. |
| 2004/0193398 | A1 | 9/2004 | Chu et al. |
| 2004/0193420 | A1 | 9/2004 | Kennewick et al. |
| 2004/0193421 | A1 | 9/2004 | Blass |
| 2004/0193426 | A1 | 9/2004 | Maddux et al. |
| 2004/0196256 | A1 | 10/2004 | Wobbrock et al. |
| 2004/0198436 | A1 | 10/2004 | Alden |
| 2004/0199375 | A1 | 10/2004 | Ehsani et al. |
| 2004/0199387 | A1 | 10/2004 | Wang et al. |
| 2004/0199663 | A1 | 10/2004 | Horvitz et al. |
| 2004/0203520 | A1 | 10/2004 | Schirtzinger et al. |
| 2004/0205151 | A1 | 10/2004 | Sprigg et al. |
| 2004/0205671 | A1 | 10/2004 | Sukehiro et al. |
| 2004/0208302 | A1 | 10/2004 | Urban et al. |
| 2004/0210442 | A1 | 10/2004 | Glynn et al. |
| 2004/0210634 | A1 | 10/2004 | Ferrer et al. |
| 2004/0213419 | A1 | 10/2004 | Varma et al. |
| 2004/0215731 | A1 | 10/2004 | Tzann-en Szeto |
| 2004/0216049 | A1 | 10/2004 | Lewis et al. |
| 2004/0218451 | A1 | 11/2004 | Said et al. |
| 2004/0220798 | A1 | 11/2004 | Chi et al. |
| 2004/0220809 | A1 | 11/2004 | Wang et al. |
| 2004/0221235 | A1 | 11/2004 | Marchisio et al. |
| 2004/0223485 | A1 | 11/2004 | Arellano et al. |
| 2004/0223599 | A1 | 11/2004 | Bear et al. |
| 2004/0224638 | A1 | 11/2004 | Fadell et al. |
| 2004/0225501 | A1 | 11/2004 | Cutaia et al. |
| 2004/0225504 | A1 | 11/2004 | Junqua et al. |
| 2004/0225650 | A1 | 11/2004 | Cooper et al. |
| 2004/0225746 | A1 | 11/2004 | Niell et al. |
| 2004/0230420 | A1 | 11/2004 | Kadambe et al. |
| 2004/0230637 | A1 | 11/2004 | Lecoueche et al. |
| 2004/0236778 | A1 | 11/2004 | Junqua et al. |
| 2004/0242286 | A1 | 12/2004 | Benco et al. |
| 2004/0243412 | A1 | 12/2004 | Gupta et al. |
| 2004/0243419 | A1 | 12/2004 | Wang |
| 2004/0249629 | A1 | 12/2004 | Webster |
| 2004/0249637 | A1 | 12/2004 | Baker et al. |
| 2004/0249667 | A1 | 12/2004 | Oon |
| 2004/0252119 | A1 | 12/2004 | Hunleth et al. |
| 2004/0252604 | A1 | 12/2004 | Johnson et al. |
| 2004/0252966 | A1 | 12/2004 | Holloway et al. |
| 2004/0254791 | A1 | 12/2004 | Coifman et al. |
| 2004/0254792 | A1 | 12/2004 | Busayapongchai et al. |
| 2004/0257432 | A1 | 12/2004 | Girish et al. |
| 2004/0259536 | A1 | 12/2004 | Keskar et al. |
| 2004/0260438 | A1 | 12/2004 | Chernetsky et al. |
| 2004/0260547 | A1 | 12/2004 | Cohen et al. |
| 2004/0260718 | A1 | 12/2004 | Fedorov et al. |
| 2004/0261023 | A1 | 12/2004 | Bier |
| 2004/0262051 | A1 | 12/2004 | Carro |
| 2004/0263636 | A1 | 12/2004 | Cutler et al. |
| 2004/0267825 | A1 | 12/2004 | Novak et al. |
| 2004/0268253 | A1 | 12/2004 | Demello et al. |
| 2004/0268262 | A1 | 12/2004 | Gupta et al. |
| 2005/0002507 | A1 | 1/2005 | Timmins et al. |
| 2005/0010409 | A1 | 1/2005 | Hull et al. |
| 2005/0012723 | A1 | 1/2005 | Pallakoff |
| 2005/0015254 | A1 | 1/2005 | Beaman |
| 2005/0015751 | A1 | 1/2005 | Grassens |
| 2005/0015772 | A1 | 1/2005 | Saare et al. |
| 2005/0021330 | A1 | 1/2005 | Mano et al. |
| 2005/0022114 | A1 | 1/2005 | Shanahan et al. |
| 2005/0024341 | A1 | 2/2005 | Gillespie et al. |
| 2005/0024345 | A1 | 2/2005 | Eastty et al. |
| 2005/0027385 | A1 | 2/2005 | Yueh |
| 2005/0030175 | A1 | 2/2005 | Wolfe |
| 2005/0031106 | A1 | 2/2005 | Henderson |
| 2005/0033582 | A1 | 2/2005 | Gadd et al. |

(56) References Cited

U.S. PATENT DOCUMENTS

2005/0033771 A1 2/2005 Schmitter et al.
2005/0034164 A1 2/2005 Sano et al.
2005/0038657 A1 2/2005 Roth et al.
2005/0039141 A1 2/2005 Burke et al.
2005/0042591 A1 2/2005 Bloom et al.
2005/0043946 A1 2/2005 Ueyama et al.
2005/0043949 A1 2/2005 Roth et al.
2005/0044569 A1 2/2005 Marcus
2005/0045373 A1 3/2005 Born
2005/0049862 A1 3/2005 Choi et al.
2005/0049870 A1 3/2005 Zhang et al.
2005/0049880 A1 3/2005 Roth et al.
2005/0055212 A1 3/2005 Nagao
2005/0055403 A1 3/2005 Brittan
2005/0058438 A1 3/2005 Hayashi
2005/0060155 A1 3/2005 Chu et al.
2005/0071165 A1 3/2005 Hofstader et al.
2005/0071332 A1 3/2005 Ortega et al.
2005/0071437 A1 3/2005 Bear et al.
2005/0074113 A1 4/2005 Mathew et al.
2005/0075881 A1 4/2005 Rigazio et al.
2005/0080613 A1 4/2005 Colledge et al.
2005/0080620 A1 4/2005 Rao et al.
2005/0080625 A1 4/2005 Bennett et al.
2005/0080632 A1 4/2005 Endo et al.
2005/0080780 A1 4/2005 Colledge et al.
2005/0086059 A1 4/2005 Bennett
2005/0086255 A1 4/2005 Schran et al.
2005/0086605 A1 4/2005 Ferrer et al.
2005/0091118 A1 4/2005 Fano
2005/0091604 A1 4/2005 Davis et al.
2005/0094475 A1 5/2005 Naoi
2005/0099398 A1 5/2005 Garside et al.
2005/0100214 A1 5/2005 Zhang et al.
2005/0102144 A1 5/2005 Rapoport
2005/0102614 A1 5/2005 Brockett et al.
2005/0102625 A1 5/2005 Lee et al.
2005/0105712 A1 5/2005 Williams et al.
2005/0108001 A1 5/2005 Aarskog
2005/0108017 A1 5/2005 Esser et al.
2005/0108074 A1 5/2005 Bloechl et al.
2005/0108338 A1 5/2005 Simske et al.
2005/0108344 A1 5/2005 Tafoya et al.
2005/0108642 A1 5/2005 Sinclair et al.
2005/0114124 A1 5/2005 Liu et al.
2005/0114140 A1 5/2005 Brackett et al.
2005/0114306 A1 5/2005 Shu et al.
2005/0114791 A1 5/2005 Bollenbacher et al.
2005/0119890 A1 6/2005 Hirose
2005/0119897 A1 6/2005 Bennett et al.
2005/0125216 A1 6/2005 Chitrapura et al.
2005/0125226 A1 6/2005 Magee
2005/0125235 A1 6/2005 Lazay et al.
2005/0131951 A1 6/2005 Zhang et al.
2005/0132301 A1 6/2005 Ikeda
2005/0136949 A1 6/2005 Barnes
2005/0138305 A1 6/2005 Zellner
2005/0140504 A1 6/2005 Marshall et al.
2005/0143972 A1 6/2005 Gopalakrishnan et al.
2005/0144003 A1 6/2005 Iso-Sipila
2005/0144070 A1 6/2005 Cheshire
2005/0144568 A1 6/2005 Gruen et al.
2005/0148356 A1 7/2005 Ferguson et al.
2005/0149214 A1 7/2005 Yoo et al.
2005/0149330 A1 7/2005 Katae
2005/0149332 A1 7/2005 Kuzunuki et al.
2005/0149510 A1 7/2005 Shafrir
2005/0152558 A1 7/2005 Van Tassel
2005/0152602 A1 7/2005 Chen et al.
2005/0154578 A1 7/2005 Tong et al.
2005/0154580 A1 7/2005 Horowitz et al.
2005/0154591 A1 7/2005 Lecoeuche
2005/0159939 A1 7/2005 Mohler et al.
2005/0159957 A1 7/2005 Roth et al.
2005/0162395 A1 7/2005 Unruh
2005/0165015 A1 7/2005 Ncube et al.
2005/0165607 A1 7/2005 Di Fabbrizio et al.
2005/0166153 A1 7/2005 Eytchison et al.
2005/0177445 A1 8/2005 Church
2005/0181770 A1 8/2005 Helferich
2005/0182616 A1 8/2005 Kotipalli
2005/0182627 A1 8/2005 Tanaka et al.
2005/0182628 A1 8/2005 Choi
2005/0182629 A1 8/2005 Coorman et al.
2005/0182630 A1 8/2005 Miro et al.
2005/0182765 A1 8/2005 Liddy
2005/0184958 A1 8/2005 Gnanamgari et al.
2005/0187770 A1 8/2005 Kompe et al.
2005/0187773 A1 8/2005 Filoche et al.
2005/0190970 A1 9/2005 Griffin
2005/0192801 A1 9/2005 Lewis et al.
2005/0192812 A1 9/2005 Buchholz et al.
2005/0195077 A1 9/2005 Mcculloch et al.
2005/0195429 A1 9/2005 Archbold
2005/0196733 A1 9/2005 Budra et al.
2005/0201572 A1 9/2005 Lindahl et al.
2005/0202854 A1 9/2005 Kortum et al.
2005/0203738 A1 9/2005 Hwang
2005/0203747 A1 9/2005 Lecoeuche
2005/0203991 A1 9/2005 Kawamura et al.
2005/0209848 A1 9/2005 Ishii
2005/0210394 A1 9/2005 Crandall et al.
2005/0216331 A1 9/2005 Ahrens et al.
2005/0222843 A1 10/2005 Kahn et al.
2005/0222973 A1 10/2005 Kaiser
2005/0228665 A1 10/2005 Kobayashi et al.
2005/0245243 A1 11/2005 Zuniga
2005/0246350 A1 11/2005 Canaran
2005/0246365 A1 11/2005 Lowles et al.
2005/0246686 A1 11/2005 Seshadri et al.
2005/0246726 A1 11/2005 Labrou et al.
2005/0251572 A1 11/2005 McMahan et al.
2005/0254481 A1 11/2005 Vishik et al.
2005/0261901 A1 11/2005 Davis et al.
2005/0262440 A1 11/2005 Stanciu et al.
2005/0267738 A1 12/2005 Wilkinson et al.
2005/0267757 A1 12/2005 Iso-Sipila et al.
2005/0268247 A1 12/2005 Baneth
2005/0271216 A1 12/2005 Lashkari
2005/0273332 A1 12/2005 Scott et al.
2005/0273337 A1 12/2005 Erell et al.
2005/0273626 A1 12/2005 Pearson et al.
2005/0278297 A1 12/2005 Nelson
2005/0278643 A1 12/2005 Ukai et al.
2005/0278647 A1 12/2005 Leavitt et al.
2005/0283363 A1 12/2005 Weng et al.
2005/0283364 A1 12/2005 Longe et al.
2005/0283726 A1 12/2005 Lunati
2005/0283729 A1 12/2005 Morris et al.
2005/0288934 A1 12/2005 Omi
2005/0288936 A1 12/2005 Busayapongchai et al.
2005/0289458 A1 12/2005 Kylmanen
2005/0289463 A1 12/2005 Wu et al.
2006/0001652 A1 1/2006 Chiu et al.
2006/0004570 A1 1/2006 Ju et al.
2006/0004640 A1* 1/2006 Swierczek ......... G06Q 30/0625
705/26.8
2006/0004744 A1 1/2006 Nevidomski et al.
2006/0007174 A1 1/2006 Shen
2006/0009973 A1 1/2006 Nguyen et al.
2006/0013414 A1 1/2006 Shih
2006/0013446 A1 1/2006 Stephens
2006/0015326 A1 1/2006 Mori et al.
2006/0015341 A1 1/2006 Baker
2006/0015484 A1 1/2006 Weng et al.
2006/0015819 A1 1/2006 Hawkins et al.
2006/0018446 A1 1/2006 Schmandt et al.
2006/0018492 A1 1/2006 Chiu et al.
2006/0020890 A1 1/2006 Kroll et al.
2006/0025999 A1 2/2006 Feng et al.
2006/0026233 A1 2/2006 Tenembaum et al.
2006/0026521 A1 2/2006 Hotelling et al.
2006/0026535 A1 2/2006 Hotelling et al.
2006/0026536 A1 2/2006 Hotelling et al.

(56) References Cited

U.S. PATENT DOCUMENTS

2006/0033724 A1 2/2006 Chaudhri et al.
2006/0035632 A1 2/2006 Sorvari et al.
2006/0036946 A1 2/2006 Radtke et al.
2006/0041424 A1 2/2006 Todhunter et al.
2006/0041431 A1 2/2006 Maes
2006/0041590 A1 2/2006 King et al.
2006/0047632 A1 3/2006 Zhang
2006/0050865 A1 3/2006 Kortum et al.
2006/0052141 A1 3/2006 Suzuki
2006/0053007 A1 3/2006 Niemisto et al.
2006/0053365 A1 3/2006 Hollander et al.
2006/0053379 A1 3/2006 Henderson et al.
2006/0053387 A1 3/2006 Ording
2006/0058999 A1 3/2006 Barker et al.
2006/0059424 A1 3/2006 Petri et al.
2006/0059437 A1 3/2006 Conklin
2006/0060762 A1 3/2006 Chan et al.
2006/0061488 A1 3/2006 Dunton
2006/0064693 A1 3/2006 Messer et al.
2006/0067535 A1 3/2006 Culbert et al.
2006/0067536 A1 3/2006 Culbert et al.
2006/0069567 A1 3/2006 Tischer et al.
2006/0069664 A1 3/2006 Ling et al.
2006/0072248 A1 4/2006 Watanabe et al.
2006/0072716 A1 4/2006 Pham
2006/0074628 A1 4/2006 Elbaz et al.
2006/0074651 A1 4/2006 Arun et al.
2006/0074660 A1 4/2006 Waters et al.
2006/0074674 A1 4/2006 Zhang et al.
2006/0074750 A1 4/2006 Clark et al.
2006/0074898 A1 4/2006 Gavalda et al.
2006/0075429 A1 4/2006 Istvan et al.
2006/0077055 A1 4/2006 Basir
2006/0080098 A1 4/2006 Campbell
2006/0085187 A1 4/2006 Barquilla
2006/0085465 A1 4/2006 Nori et al.
2006/0085757 A1 4/2006 Andre et al.
2006/0093998 A1 5/2006 Vertegaal
2006/0095265 A1 5/2006 Chu et al.
2006/0095790 A1 5/2006 Nguyen et al.
2006/0095846 A1 5/2006 Nurmi
2006/0095848 A1 5/2006 Naik
2006/0097991 A1 5/2006 Hotelling et al.
2006/0100848 A1 5/2006 Cozzi et al.
2006/0100849 A1 5/2006 Chan
2006/0101354 A1 5/2006 Hashimoto et al.
2006/0103633 A1 5/2006 Gioeli
2006/0106592 A1 5/2006 Brockett et al.
2006/0106594 A1 5/2006 Brockett et al.
2006/0106595 A1 5/2006 Brockett et al.
2006/0111906 A1 5/2006 Cross et al.
2006/0111909 A1 5/2006 Maes et al.
2006/0116874 A1 6/2006 Samuelsson et al.
2006/0116877 A1 6/2006 Pickering et al.
2006/0117002 A1 6/2006 Swen
2006/0119582 A1 6/2006 Ng et al.
2006/0122834 A1 6/2006 Bennett
2006/0122836 A1 6/2006 Cross et al.
2006/0129379 A1 6/2006 Ramsey et al.
2006/0129929 A1 6/2006 Weber et al.
2006/0130006 A1 6/2006 Chitale
2006/0132812 A1 6/2006 Barnes et al.
2006/0135214 A1 6/2006 Zhang et al.
2006/0136213 A1 6/2006 Hirose et al.
2006/0136280 A1 6/2006 Cho et al.
2006/0136352 A1 6/2006 Brun et al.
2006/0141990 A1 6/2006 Zak et al.
2006/0142576 A1 6/2006 Meng et al.
2006/0142993 A1 6/2006 Menendez-Pidal et al.
2006/0143007 A1 6/2006 Koh et al.
2006/0143559 A1 6/2006 Spielberg et al.
2006/0143576 A1 6/2006 Gupta et al.
2006/0148520 A1 7/2006 Baker et al.
2006/0149557 A1 7/2006 Kaneko et al.
2006/0149558 A1 7/2006 Kahn et al.
2006/0150087 A1 7/2006 Cronenberger et al.
2006/0152496 A1 7/2006 Knaven
2006/0153040 A1 7/2006 Girish et al.
2006/0156252 A1 7/2006 Sheshagiri et al.
2006/0156307 A1 7/2006 Kunjithapatham et al.
2006/0161870 A1 7/2006 Hotelling et al.
2006/0161871 A1 7/2006 Hotelling et al.
2006/0161872 A1 7/2006 Rytivaara et al.
2006/0165105 A1 7/2006 Shenfield et al.
2006/0167676 A1 7/2006 Plumb
2006/0168150 A1 7/2006 Naik et al.
2006/0168507 A1 7/2006 Hansen
2006/0168539 A1 7/2006 Hawkins et al.
2006/0172720 A1 8/2006 Islam et al.
2006/0173683 A1 8/2006 Roth et al.
2006/0173684 A1 8/2006 Fischer et al.
2006/0174207 A1 8/2006 Deshpande
2006/0178868 A1 8/2006 Billerey-Mosier
2006/0181519 A1 8/2006 Vernier et al.
2006/0183466 A1 8/2006 Lee et al.
2006/0184886 A1 8/2006 Chung et al.
2006/0187073 A1 8/2006 Lin et al.
2006/0190269 A1 8/2006 Tessel et al.
2006/0190436 A1 8/2006 Richardson et al.
2006/0190577 A1 8/2006 Yamada
2006/0193518 A1 8/2006 Dong
2006/0194181 A1 8/2006 Rosenberg
2006/0195206 A1 8/2006 Moon et al.
2006/0195323 A1 8/2006 Monne et al.
2006/0197753 A1 9/2006 Hotelling
2006/0197755 A1 9/2006 Bawany
2006/0200253 A1 9/2006 Hoffberg et al.
2006/0200342 A1 9/2006 Corston-Oliver et al.
2006/0200347 A1 9/2006 Kim et al.
2006/0205432 A1 9/2006 Hawkins et al.
2006/0206313 A1 9/2006 Xu et al.
2006/0206454 A1 9/2006 Forstall et al.
2006/0206724 A1 9/2006 Schaufele et al.
2006/0212415 A1 9/2006 Backer et al.
2006/0217967 A1 9/2006 Goertzen et al.
2006/0218244 A1 9/2006 Rasmussen et al.
2006/0221738 A1 10/2006 Park et al.
2006/0221788 A1 10/2006 Lindahl et al.
2006/0224570 A1 10/2006 Quiroga et al.
2006/0229802 A1 10/2006 Vertelney et al.
2006/0229870 A1 10/2006 Kobal
2006/0229876 A1 10/2006 Aaron et al.
2006/0230350 A1 10/2006 Baluja
2006/0230410 A1 10/2006 Kurganov et al.
2006/0234680 A1 10/2006 Doulton
2006/0235550 A1 10/2006 Csicsatka et al.
2006/0235700 A1 10/2006 Wong et al.
2006/0235841 A1 10/2006 Betz et al.
2006/0236262 A1 10/2006 Bathiche et al.
2006/0239419 A1 10/2006 Joseph et al.
2006/0239471 A1 10/2006 Mao et al.
2006/0240866 A1 10/2006 Eilts et al.
2006/0241948 A1 10/2006 Abrash et al.
2006/0242190 A1 10/2006 Wnek
2006/0246955 A1 11/2006 Nirhamo et al.
2006/0247931 A1 11/2006 Caskey et al.
2006/0252457 A1 11/2006 Schrager
2006/0253210 A1 11/2006 Rosenberg
2006/0253787 A1 11/2006 Fogg
2006/0256934 A1 11/2006 Mazor
2006/0258376 A1 11/2006 Ewell et al.
2006/0262876 A1 11/2006 LaDue
2006/0265208 A1 11/2006 Assadollahi
2006/0265503 A1 11/2006 Jones et al.
2006/0265648 A1 11/2006 Rainisto et al.
2006/0271627 A1 11/2006 Szczepanek
2006/0274051 A1 12/2006 Longe et al.
2006/0274905 A1 12/2006 Lindahl et al.
2006/0277031 A1 12/2006 Ramsey et al.
2006/0277058 A1 12/2006 J'maev et al.
2006/0282264 A1 12/2006 Denny et al.
2006/0282415 A1 12/2006 Shibata et al.
2006/0282455 A1 12/2006 Lee et al.
2006/0286527 A1 12/2006 Morel

(56) References Cited

U.S. PATENT DOCUMENTS

| | | | |
|---|---|---|---|
| 2006/0287864 | A1 | 12/2006 | Pusa et al. |
| 2006/0288024 | A1 | 12/2006 | Braica |
| 2006/0291666 | A1 | 12/2006 | Ball et al. |
| 2006/0293876 | A1 | 12/2006 | Kamatani et al. |
| 2006/0293880 | A1 | 12/2006 | Elshishiny et al. |
| 2006/0293886 | A1 | 12/2006 | Odell et al. |
| 2006/0293889 | A1 | 12/2006 | Kiss et al. |
| 2007/0003026 | A1 | 1/2007 | Hodge et al. |
| 2007/0004451 | A1 | 1/2007 | C. Anderson |
| 2007/0005849 | A1 | 1/2007 | Oliver |
| 2007/0006098 | A1 | 1/2007 | Krumm et al. |
| 2007/0011154 | A1 | 1/2007 | Musgrove et al. |
| 2007/0014280 | A1 | 1/2007 | Cormier et al. |
| 2007/0016563 | A1 | 1/2007 | Omoigui |
| 2007/0016865 | A1 | 1/2007 | Johnson et al. |
| 2007/0021956 | A1 | 1/2007 | Qu et al. |
| 2007/0022380 | A1 | 1/2007 | Swartz et al. |
| 2007/0025704 | A1 | 2/2007 | Tsukazaki et al. |
| 2007/0026852 | A1 | 2/2007 | Logan et al. |
| 2007/0027732 | A1 | 2/2007 | Hudgens |
| 2007/0028009 | A1 | 2/2007 | Robbin et al. |
| 2007/0030824 | A1 | 2/2007 | Ribaudo et al. |
| 2007/0032247 | A1 | 2/2007 | Shaffer et al. |
| 2007/0033003 | A1 | 2/2007 | Morris |
| 2007/0033005 | A1 | 2/2007 | Cristo et al. |
| 2007/0033026 | A1 | 2/2007 | Bartosik et al. |
| 2007/0033054 | A1 | 2/2007 | Snitkovskiy et al. |
| 2007/0036117 | A1 | 2/2007 | Taube et al. |
| 2007/0036286 | A1 | 2/2007 | Champlin et al. |
| 2007/0036294 | A1 | 2/2007 | Chaudhuri et al. |
| 2007/0038436 | A1 | 2/2007 | Cristo et al. |
| 2007/0038609 | A1 | 2/2007 | Wu |
| 2007/0040813 | A1 | 2/2007 | Kushler et al. |
| 2007/0041361 | A1 | 2/2007 | Iso-Sipila |
| 2007/0042812 | A1 | 2/2007 | Basir et al. |
| 2007/0043568 | A1 | 2/2007 | Dhanakshirur et al. |
| 2007/0043687 | A1 | 2/2007 | Bodart et al. |
| 2007/0043820 | A1 | 2/2007 | George et al. |
| 2007/0044038 | A1 | 2/2007 | Horentrup et al. |
| 2007/0046641 | A1 | 3/2007 | Lim |
| 2007/0047719 | A1 | 3/2007 | Dhawan et al. |
| 2007/0050184 | A1 | 3/2007 | Drucker et al. |
| 2007/0050191 | A1 | 3/2007 | Weider et al. |
| 2007/0050393 | A1 | 3/2007 | Vogel et al. |
| 2007/0050712 | A1 | 3/2007 | Hull et al. |
| 2007/0052586 | A1 | 3/2007 | Horstemeyer |
| 2007/0055493 | A1 | 3/2007 | Lee |
| 2007/0055508 | A1 | 3/2007 | Zhao et al. |
| 2007/0055514 | A1 | 3/2007 | Beattie et al. |
| 2007/0055525 | A1 | 3/2007 | Kennewick et al. |
| 2007/0055529 | A1 | 3/2007 | Kanevsky et al. |
| 2007/0058832 | A1 | 3/2007 | Hug et al. |
| 2007/0060107 | A1 | 3/2007 | Day |
| 2007/0060118 | A1 | 3/2007 | Guyette |
| 2007/0061487 | A1 | 3/2007 | Moore et al. |
| 2007/0061712 | A1 | 3/2007 | Bodin et al. |
| 2007/0061754 | A1 | 3/2007 | Ardhanari et al. |
| 2007/0067173 | A1 | 3/2007 | Bellegarda |
| 2007/0067272 | A1 | 3/2007 | Flynt et al. |
| 2007/0073540 | A1 | 3/2007 | Hirakawa et al. |
| 2007/0073541 | A1 | 3/2007 | Tian |
| 2007/0073745 | A1 | 3/2007 | Scott et al. |
| 2007/0074131 | A1 | 3/2007 | Assadollahi et al. |
| 2007/0075965 | A1 | 4/2007 | Huppi et al. |
| 2007/0079027 | A1 | 4/2007 | Marriott et al. |
| 2007/0080936 | A1 | 4/2007 | Tsuk et al. |
| 2007/0083467 | A1 | 4/2007 | Lindahl et al. |
| 2007/0083623 | A1 | 4/2007 | Nishimura et al. |
| 2007/0088556 | A1 | 4/2007 | Andrew |
| 2007/0089132 | A1 | 4/2007 | Qureshey et al. |
| 2007/0089135 | A1 | 4/2007 | Qureshey et al. |
| 2007/0093277 | A1 | 4/2007 | Cavacuiti et al. |
| 2007/0094026 | A1 | 4/2007 | Ativanichayaphong et al. |
| 2007/0098195 | A1 | 5/2007 | Holmes |
| 2007/0100206 | A1 | 5/2007 | Lin et al. |
| 2007/0100602 | A1 | 5/2007 | Kim |
| 2007/0100619 | A1 | 5/2007 | Purho et al. |
| 2007/0100624 | A1 | 5/2007 | Weng et al. |
| 2007/0100635 | A1 | 5/2007 | Mahajan et al. |
| 2007/0100709 | A1 | 5/2007 | Lee et al. |
| 2007/0100790 | A1 | 5/2007 | Cheyer et al. |
| 2007/0100814 | A1 | 5/2007 | Lee et al. |
| 2007/0100883 | A1 | 5/2007 | Rose et al. |
| 2007/0106491 | A1 | 5/2007 | Carter et al. |
| 2007/0106497 | A1 | 5/2007 | Ramsey et al. |
| 2007/0106512 | A1 | 5/2007 | Acero et al. |
| 2007/0106513 | A1 | 5/2007 | Boillot et al. |
| 2007/0106657 | A1 | 5/2007 | Brzeski et al. |
| 2007/0106685 | A1 | 5/2007 | Houh et al. |
| 2007/0112562 | A1 | 5/2007 | Vainio et al. |
| 2007/0116195 | A1 | 5/2007 | Thompson et al. |
| 2007/0118351 | A1 | 5/2007 | Sumita |
| 2007/0118377 | A1 | 5/2007 | Badino et al. |
| 2007/0118378 | A1 | 5/2007 | Skuratovsky |
| 2007/0121846 | A1 | 5/2007 | Altberg et al. |
| 2007/0124131 | A1 | 5/2007 | Chino et al. |
| 2007/0124132 | A1 | 5/2007 | Takeuchi et al. |
| 2007/0124149 | A1 | 5/2007 | Shen et al. |
| 2007/0124291 | A1 | 5/2007 | Hassan et al. |
| 2007/0124676 | A1 | 5/2007 | Amundsen et al. |
| 2007/0127888 | A1 | 6/2007 | Hayashi et al. |
| 2007/0128777 | A1 | 6/2007 | Yin et al. |
| 2007/0129059 | A1 | 6/2007 | Nadarajah et al. |
| 2007/0130014 | A1 | 6/2007 | Altberg et al. |
| 2007/0130128 | A1 | 6/2007 | Garg et al. |
| 2007/0132738 | A1 | 6/2007 | Lowles et al. |
| 2007/0133771 | A1 | 6/2007 | Stifelman et al. |
| 2007/0135187 | A1 | 6/2007 | Kreiner et al. |
| 2007/0135949 | A1 | 6/2007 | Snover et al. |
| 2007/0136064 | A1 | 6/2007 | Carroll |
| 2007/0136778 | A1 | 6/2007 | Birger et al. |
| 2007/0143163 | A1 | 6/2007 | Weiss et al. |
| 2007/0149252 | A1 | 6/2007 | Jobs et al. |
| 2007/0150403 | A1 | 6/2007 | Mock et al. |
| 2007/0150444 | A1 | 6/2007 | Chesnais et al. |
| 2007/0150842 | A1 | 6/2007 | Chaudhri et al. |
| 2007/0152978 | A1 | 7/2007 | Kocienda et al. |
| 2007/0152980 | A1 | 7/2007 | Kocienda et al. |
| 2007/0155346 | A1 | 7/2007 | Mijatovic et al. |
| 2007/0156410 | A1 | 7/2007 | Stohr et al. |
| 2007/0156627 | A1 | 7/2007 | D'Alicandro |
| 2007/0157089 | A1 | 7/2007 | Van Os et al. |
| 2007/0157268 | A1 | 7/2007 | Girish et al. |
| 2007/0162274 | A1 | 7/2007 | Ruiz et al. |
| 2007/0162296 | A1 | 7/2007 | Altberg et al. |
| 2007/0162414 | A1 | 7/2007 | Horowitz et al. |
| 2007/0165003 | A1 | 7/2007 | Fux et al. |
| 2007/0167136 | A1 | 7/2007 | Groth |
| 2007/0168922 | A1 | 7/2007 | Kaiser et al. |
| 2007/0173233 | A1 | 7/2007 | Vander Veen et al. |
| 2007/0173267 | A1 | 7/2007 | Klassen et al. |
| 2007/0174057 | A1 | 7/2007 | Genly |
| 2007/0174188 | A1 | 7/2007 | Fish |
| 2007/0174350 | A1 | 7/2007 | Pell et al. |
| 2007/0174396 | A1 | 7/2007 | Kumar et al. |
| 2007/0179776 | A1 | 8/2007 | Segond et al. |
| 2007/0179778 | A1 | 8/2007 | Gong et al. |
| 2007/0180383 | A1 | 8/2007 | Naik |
| 2007/0182595 | A1 | 8/2007 | Ghasabian |
| 2007/0185551 | A1 | 8/2007 | Meadows et al. |
| 2007/0185754 | A1 | 8/2007 | Schmidt |
| 2007/0185831 | A1 | 8/2007 | Churcher |
| 2007/0185917 | A1 | 8/2007 | Prahlad et al. |
| 2007/0188901 | A1 | 8/2007 | Heckerman et al. |
| 2007/0192026 | A1 | 8/2007 | Lee et al. |
| 2007/0192027 | A1 | 8/2007 | Lee et al. |
| 2007/0192105 | A1 | 8/2007 | Neeracher et al. |
| 2007/0192179 | A1 | 8/2007 | Van et al. |
| 2007/0192293 | A1 | 8/2007 | Swen |
| 2007/0192403 | A1 | 8/2007 | Heine et al. |
| 2007/0192744 | A1 | 8/2007 | Reponen |
| 2007/0198267 | A1 | 8/2007 | Jones et al. |
| 2007/0198269 | A1 | 8/2007 | Braho et al. |
| 2007/0198273 | A1 | 8/2007 | Hennecke |

(56) References Cited

U.S. PATENT DOCUMENTS

2007/0198566 A1 8/2007 Sustik
2007/0203955 A1 8/2007 Pomerantz
2007/0207785 A1 9/2007 Chatterjee et al.
2007/0208555 A1 9/2007 Blass et al.
2007/0208569 A1 9/2007 Subramanian et al.
2007/0208579 A1 9/2007 Peterson
2007/0208726 A1 9/2007 Krishnaprasad et al.
2007/0211071 A1 9/2007 Slotznick et al.
2007/0213099 A1 9/2007 Bast
2007/0213857 A1 9/2007 Bodin et al.
2007/0213984 A1 9/2007 Ativanichayaphong et al.
2007/0213986 A1 9/2007 Bodin et al.
2007/0217693 A1 9/2007 Kretzschmar Jr.
2007/0219645 A1 9/2007 Thomas et al.
2007/0219777 A1 9/2007 Chu et al.
2007/0219801 A1 9/2007 Sundaram et al.
2007/0219803 A1 9/2007 Chiu et al.
2007/0219983 A1 9/2007 Fish
2007/0225980 A1 9/2007 Sumita
2007/0225984 A1 9/2007 Milstein et al.
2007/0226652 A1 9/2007 Kikuchi et al.
2007/0229323 A1 10/2007 Plachta et al.
2007/0230729 A1 10/2007 Naylor et al.
2007/0233484 A1 10/2007 Coelho et al.
2007/0233487 A1 10/2007 Cohen et al.
2007/0233490 A1 10/2007 Yao
2007/0233497 A1 10/2007 Paek et al.
2007/0233692 A1 10/2007 Lisa et al.
2007/0233725 A1 10/2007 Michmerhuizen et al.
2007/0238488 A1 10/2007 Scott
2007/0238489 A1 10/2007 Scott
2007/0238520 A1 10/2007 Kacmarcik
2007/0239429 A1 10/2007 Johnson et al.
2007/0239453 A1 10/2007 Paek et al.
2007/0240043 A1 10/2007 Fux et al.
2007/0240044 A1 10/2007 Fux et al.
2007/0240045 A1 10/2007 Fux et al.
2007/0241885 A1 10/2007 Clipsham et al.
2007/0244702 A1 10/2007 Kahn et al.
2007/0244976 A1 10/2007 Carroll et al.
2007/0247441 A1 10/2007 Kim et al.
2007/0255435 A1 11/2007 Cohen et al.
2007/0255979 A1 11/2007 Deily et al.
2007/0257890 A1 11/2007 Hotelling et al.
2007/0258642 A1 11/2007 Thota
2007/0260460 A1 11/2007 Hyatt
2007/0260595 A1 11/2007 Beatty et al.
2007/0260822 A1 11/2007 Adams
2007/0261080 A1 11/2007 Saetti
2007/0265831 A1 11/2007 Dinur et al.
2007/0265850 A1 11/2007 Kennewick et al.
2007/0271104 A1 11/2007 McKay
2007/0271510 A1 11/2007 Grigoriu et al.
2007/0274468 A1 11/2007 Cai
2007/0276651 A1 11/2007 Bliss et al.
2007/0276714 A1 11/2007 Beringer
2007/0276810 A1 11/2007 Rosen
2007/0277088 A1 11/2007 Bodin et al.
2007/0282595 A1 12/2007 Tunning et al.
2007/0285958 A1 12/2007 Platchta et al.
2007/0286363 A1 12/2007 Burg et al.
2007/0286399 A1 12/2007 Ramamoorthy et al.
2007/0288238 A1 12/2007 Hetherington et al.
2007/0288241 A1 12/2007 Cross et al.
2007/0288449 A1 12/2007 Datta et al.
2007/0291108 A1 12/2007 Huber et al.
2007/0294077 A1 12/2007 Narayanan et al.
2007/0294083 A1 12/2007 Bellegarda et al.
2007/0294199 A1 12/2007 Nelken et al.
2007/0294263 A1 12/2007 Punj et al.
2007/0299664 A1 12/2007 Peters et al.
2007/0299831 A1 12/2007 Williams et al.
2007/0300140 A1 12/2007 Makela et al.
2008/0001785 A1 1/2008 Elizarov et al.
2008/0010355 A1 1/2008 Vieri et al.
2008/0010605 A1 1/2008 Frank et al.
2008/0012950 A1 1/2008 Lee et al.
2008/0013751 A1 1/2008 Hiselius
2008/0015863 A1 1/2008 Agapi et al.
2008/0015864 A1 1/2008 Ross et al.
2008/0016575 A1 1/2008 Vincent et al.
2008/0021708 A1 1/2008 Bennett et al.
2008/0021886 A1 1/2008 Wang-Aryattanwanich et al.
2008/0022208 A1 1/2008 Morse
2008/0027726 A1 1/2008 Hansen et al.
2008/0031475 A1 2/2008 Goldstein
2008/0033719 A1 2/2008 Hall et al.
2008/0034032 A1 2/2008 Healey et al.
2008/0034044 A1 2/2008 Bhakta et al.
2008/0036743 A1 2/2008 Westerman et al.
2008/0039120 A1* 2/2008 Gad .................. G01C 21/3679 455/456.2
2008/0040339 A1 2/2008 Zhou et al.
2008/0042970 A1 2/2008 Liang et al.
2008/0043936 A1 2/2008 Liebermann
2008/0043943 A1 2/2008 Sipher et al.
2008/0046239 A1 2/2008 Boo
2008/0046250 A1 2/2008 Agapi et al.
2008/0046422 A1 2/2008 Lee et al.
2008/0046820 A1 2/2008 Lee et al.
2008/0046948 A1 2/2008 Verosub
2008/0048908 A1 2/2008 Sato
2008/0052063 A1 2/2008 Bennett et al.
2008/0052073 A1 2/2008 Goto et al.
2008/0052077 A1 2/2008 Bennett et al.
2008/0052080 A1 2/2008 Narayanan et al.
2008/0052262 A1 2/2008 Kosinov et al.
2008/0055194 A1 3/2008 Baudino et al.
2008/0056459 A1 3/2008 Vallier et al.
2008/0056579 A1 3/2008 Guha
2008/0057922 A1 3/2008 Kokes et al.
2008/0059190 A1 3/2008 Chu et al.
2008/0059200 A1 3/2008 Puli
2008/0059876 A1 3/2008 Hantler et al.
2008/0062141 A1 3/2008 Chaudhri
2008/0065382 A1 3/2008 Gerl et al.
2008/0065387 A1 3/2008 Cross et al.
2008/0071529 A1 3/2008 Silverman et al.
2008/0071544 A1 3/2008 Beaufays et al.
2008/0075296 A1 3/2008 Lindahl et al.
2008/0076972 A1 3/2008 Dorogusker et al.
2008/0077310 A1 3/2008 Murlidar et al.
2008/0077384 A1 3/2008 Agapi et al.
2008/0077386 A1 3/2008 Gao et al.
2008/0077391 A1 3/2008 Chino et al.
2008/0077393 A1 3/2008 Gao et al.
2008/0077406 A1 3/2008 Ganong, III
2008/0077859 A1 3/2008 Schabes et al.
2008/0079566 A1 4/2008 Singh et al.
2008/0080411 A1 4/2008 Cole
2008/0082332 A1 4/2008 Mallett et al.
2008/0082338 A1 4/2008 O'Neil et al.
2008/0082390 A1 4/2008 Hawkins et al.
2008/0082576 A1 4/2008 Bodin et al.
2008/0082651 A1 4/2008 Singh et al.
2008/0084974 A1 4/2008 Dhanakshirur
2008/0091406 A1 4/2008 Baldwin et al.
2008/0091426 A1 4/2008 Rempel et al.
2008/0091443 A1 4/2008 Strope et al.
2008/0096531 A1 4/2008 Mcquaide et al.
2008/0096726 A1 4/2008 Riley et al.
2008/0097937 A1 4/2008 Hadjarian
2008/0098302 A1 4/2008 Roose
2008/0098480 A1 4/2008 Henry et al.
2008/0100579 A1 5/2008 Robinson et al.
2008/0101584 A1 5/2008 Gray et al.
2008/0103774 A1 5/2008 White
2008/0109222 A1 5/2008 Liu
2008/0109402 A1 5/2008 Wang et al.
2008/0114480 A1 5/2008 Harb
2008/0114598 A1 5/2008 Prieto et al.
2008/0114604 A1 5/2008 Wei et al.
2008/0114841 A1 5/2008 Lambert
2008/0115084 A1 5/2008 Scott et al.

(56) References Cited

U.S. PATENT DOCUMENTS

2008/0118143 A1 5/2008 Gordon et al.
2008/0119953 A1 5/2008 Reed
2008/0120102 A1 5/2008 Rao
2008/0120112 A1 5/2008 Jordan et al.
2008/0120196 A1 5/2008 Reed et al.
2008/0120311 A1 5/2008 Reed
2008/0120312 A1 5/2008 Reed
2008/0120330 A1 5/2008 Reed
2008/0120342 A1 5/2008 Reed et al.
2008/0122796 A1 5/2008 Jobs et al.
2008/0124695 A1 5/2008 Myers et al.
2008/0126075 A1 5/2008 Thorn et al.
2008/0126077 A1 5/2008 Thorn
2008/0126091 A1 5/2008 Clark et al.
2008/0126093 A1 5/2008 Sivadas
2008/0126100 A1 5/2008 Grost et al.
2008/0126491 A1 5/2008 Portele et al.
2008/0129520 A1 6/2008 Lee
2008/0130867 A1 6/2008 Bowen
2008/0131006 A1 6/2008 Oliver
2008/0132221 A1 6/2008 Willey et al.
2008/0133215 A1 6/2008 Sarukkai
2008/0133228 A1 6/2008 Rao
2008/0133230 A1 6/2008 Herforth et al.
2008/0133241 A1 6/2008 Baker et al.
2008/0133956 A1 6/2008 Fadell
2008/0140413 A1 6/2008 Millman et al.
2008/0140416 A1 6/2008 Shostak
2008/0140652 A1 6/2008 Millman et al.
2008/0140657 A1 6/2008 Azvine et al.
2008/0140702 A1 6/2008 Reed et al.
2008/0141125 A1 6/2008 Ghassabian et al.
2008/0141180 A1 6/2008 Reed et al.
2008/0141182 A1 6/2008 Barsness et al.
2008/0146245 A1 6/2008 Appaji
2008/0146290 A1 6/2008 Sreeram et al.
2008/0147408 A1 6/2008 Da Palma et al.
2008/0147411 A1 6/2008 Dames et al.
2008/0147874 A1 6/2008 Yoneda et al.
2008/0150900 A1 6/2008 Han
2008/0154577 A1 6/2008 Kim et al.
2008/0154600 A1 6/2008 Tian et al.
2008/0154612 A1 6/2008 Evermann et al.
2008/0154828 A1 6/2008 Antebi et al.
2008/0157867 A1 7/2008 Krah
2008/0161113 A1 7/2008 Hansen et al.
2008/0162120 A1 7/2008 Mactavish et al.
2008/0163119 A1 7/2008 Kim et al.
2008/0163131 A1 7/2008 Hirai et al.
2008/0165144 A1 7/2008 Forstall et al.
2008/0165980 A1 7/2008 Pavlovic et al.
2008/0165994 A1 7/2008 Caren et al.
2008/0167013 A1 7/2008 Novick et al.
2008/0167858 A1 7/2008 Christie et al.
2008/0168366 A1 7/2008 Kocienda et al.
2008/0183473 A1 7/2008 Nagano et al.
2008/0186960 A1 8/2008 Kocheisen et al.
2008/0189099 A1 8/2008 Friedman et al.
2008/0189106 A1 8/2008 Low et al.
2008/0189110 A1 8/2008 Freeman et al.
2008/0189114 A1 8/2008 Fail et al.
2008/0189606 A1 8/2008 Rybak
2008/0195312 A1 8/2008 Aaron et al.
2008/0195388 A1 8/2008 Bower et al.
2008/0195391 A1 8/2008 Marple et al.
2008/0195601 A1 8/2008 Ntoulas et al.
2008/0195630 A1 8/2008 Exartier et al.
2008/0195940 A1 8/2008 Gail et al.
2008/0200142 A1 8/2008 Abdel-Kader et al.
2008/0201306 A1 8/2008 Cooper et al.
2008/0201375 A1 8/2008 Khedouri et al.
2008/0204379 A1 8/2008 Perez-Noguera
2008/0207176 A1 8/2008 Brackbill et al.
2008/0208585 A1 8/2008 Ativanichayaphong et al.
2008/0208587 A1 8/2008 Ben-David et al.
2008/0208864 A1 8/2008 Cucerzan et al.
2008/0212796 A1 9/2008 Denda
2008/0215678 A1 9/2008 Coletrane et al.
2008/0219641 A1 9/2008 Sandrew et al.
2008/0221866 A1 9/2008 Katragadda et al.
2008/0221879 A1 9/2008 Cerra et al.
2008/0221880 A1 9/2008 Cerra et al.
2008/0221887 A1 9/2008 Rose et al.
2008/0221889 A1 9/2008 Cerra et al.
2008/0221903 A1 9/2008 Kanevsky et al.
2008/0222118 A1 9/2008 Scian et al.
2008/0226130 A1 9/2008 Kansal et al.
2008/0228463 A1 9/2008 Mori et al.
2008/0228485 A1 9/2008 Owen
2008/0228490 A1 9/2008 Fischer et al.
2008/0228495 A1 9/2008 Cross et al.
2008/0228496 A1 9/2008 Yu et al.
2008/0228928 A1 9/2008 Donelli et al.
2008/0229185 A1 9/2008 Lynch
2008/0229218 A1 9/2008 Maeng
2008/0235017 A1 9/2008 Satomura et al.
2008/0235024 A1 9/2008 Goldberg et al.
2008/0235027 A1 9/2008 Cross
2008/0240569 A1 10/2008 Tonouchi
2008/0242280 A1 10/2008 Shapiro et al.
2008/0244390 A1 10/2008 Fux et al.
2008/0244446 A1 10/2008 Lefevre et al.
2008/0247519 A1 10/2008 Abella et al.
2008/0247529 A1 10/2008 Barton et al.
2008/0248797 A1 10/2008 Freeman et al.
2008/0249770 A1 10/2008 Kim et al.
2008/0249778 A1 10/2008 Barton et al.
2008/0253577 A1 10/2008 Eppolito
2008/0254425 A1 10/2008 Cohen et al.
2008/0255837 A1 10/2008 Kahn et al.
2008/0255842 A1 10/2008 Simhi et al.
2008/0255845 A1 10/2008 Bennett
2008/0256613 A1 10/2008 Grover
2008/0259022 A1 10/2008 Mansfield et al.
2008/0262828 A1 10/2008 Och et al.
2008/0262838 A1 10/2008 Nurminen et al.
2008/0262846 A1 10/2008 Burns et al.
2008/0263139 A1 10/2008 Martin
2008/0270118 A1 10/2008 Kuo et al.
2008/0270138 A1 10/2008 Knight et al.
2008/0270139 A1 10/2008 Shi et al.
2008/0270140 A1 10/2008 Hertz et al.
2008/0270151 A1 10/2008 Mahoney et al.
2008/0277473 A1 11/2008 Kotlarsky et al.
2008/0281510 A1 11/2008 Shahine
2008/0288259 A1 11/2008 Chambers et al.
2008/0288460 A1 11/2008 Poniatowski et al.
2008/0292112 A1 11/2008 Valenzuela et al.
2008/0294418 A1 11/2008 Cleary et al.
2008/0294651 A1 11/2008 Masuyama et al.
2008/0294981 A1 11/2008 Balzano et al.
2008/0298563 A1 12/2008 Rondeau et al.
2008/0298766 A1 12/2008 Wen et al.
2008/0299523 A1 12/2008 Chai et al.
2008/0300871 A1 12/2008 Gilbert
2008/0300878 A1 12/2008 Bennett
2008/0303645 A1 12/2008 Seymour et al.
2008/0306727 A1 12/2008 Thurmair et al.
2008/0312909 A1 12/2008 Hermansen et al.
2008/0312928 A1 12/2008 Goebel et al.
2008/0313335 A1 12/2008 Jung et al.
2008/0316183 A1 12/2008 Westerman et al.
2008/0319738 A1 12/2008 Liu et al.
2008/0319753 A1 12/2008 Hancock
2008/0319763 A1 12/2008 Di Fabbrizio et al.
2008/0319783 A1 12/2008 Yao et al.
2009/0003115 A1 1/2009 Lindahl et al.
2009/0005012 A1 1/2009 Van Heugten
2009/0005891 A1 1/2009 Batson et al.
2009/0006097 A1 1/2009 Etezadi et al.
2009/0006099 A1 1/2009 Sharpe et al.
2009/0006100 A1 1/2009 Badger et al.
2009/0006343 A1 1/2009 Platt et al.
2009/0006345 A1 1/2009 Platt et al.

(56) References Cited

U.S. PATENT DOCUMENTS

2009/0006488 A1 1/2009 Lindahl et al.
2009/0006671 A1 1/2009 Batson et al.
2009/0007001 A1 1/2009 Morin et al.
2009/0011709 A1 1/2009 Akasaka et al.
2009/0012748 A1 1/2009 Beish et al.
2009/0012775 A1 1/2009 El Hady et al.
2009/0018828 A1 1/2009 Nakadai et al.
2009/0018829 A1 1/2009 Kuperstein
2009/0018834 A1 1/2009 Cooper et al.
2009/0018835 A1 1/2009 Cooper et al.
2009/0018839 A1 1/2009 Cooper et al.
2009/0018840 A1 1/2009 Lutz et al.
2009/0022329 A1 1/2009 Mahowald
2009/0024595 A1 1/2009 Chen
2009/0028435 A1 1/2009 Wu et al.
2009/0030800 A1 1/2009 Grois
2009/0030978 A1 1/2009 Johnson et al.
2009/0043580 A1 2/2009 Mozer et al.
2009/0043583 A1 2/2009 Agapi et al.
2009/0043763 A1 2/2009 Peng
2009/0044094 A1 2/2009 Rapp et al.
2009/0048821 A1 2/2009 Yam et al.
2009/0048845 A1 2/2009 Burckart et al.
2009/0049067 A1 2/2009 Murray
2009/0055168 A1 2/2009 Wu et al.
2009/0055175 A1 2/2009 Terrell et al.
2009/0055179 A1 2/2009 Cho et al.
2009/0055186 A1 2/2009 Lance et al.
2009/0055381 A1 2/2009 Wu et al.
2009/0058823 A1 3/2009 Kocienda
2009/0058860 A1 3/2009 Fong et al.
2009/0060351 A1 3/2009 Li et al.
2009/0060472 A1 3/2009 Bull et al.
2009/0063974 A1 3/2009 Bull et al.
2009/0064031 A1 3/2009 Bull et al.
2009/0070097 A1 3/2009 Wu et al.
2009/0070102 A1 3/2009 Maegawa
2009/0070109 A1 3/2009 Didcock et al.
2009/0070114 A1 3/2009 Staszak
2009/0074214 A1 3/2009 Bradford et al.
2009/0076792 A1 3/2009 Lawson-Tancred
2009/0076796 A1 3/2009 Daraselia
2009/0076819 A1 3/2009 Wouters et al.
2009/0076821 A1 3/2009 Brenner et al.
2009/0076825 A1 3/2009 Bradford et al.
2009/0077165 A1 3/2009 Rhodes et al.
2009/0079622 A1 3/2009 Seshadri et al.
2009/0083034 A1 3/2009 Hernandez et al.
2009/0083035 A1 3/2009 Huang et al.
2009/0083036 A1 3/2009 Zhao et al.
2009/0083037 A1 3/2009 Gleason et al.
2009/0083047 A1 3/2009 Lindahl et al.
2009/0089058 A1 4/2009 Bellegarda
2009/0092239 A1 4/2009 Macwan et al.
2009/0092260 A1 4/2009 Powers
2009/0092261 A1 4/2009 Bard
2009/0092262 A1 4/2009 Costa et al.
2009/0094029 A1 4/2009 Koch et al.
2009/0094033 A1 4/2009 Mozer et al.
2009/0097634 A1 4/2009 Nambiar et al.
2009/0097637 A1 4/2009 Boscher et al.
2009/0100049 A1 4/2009 Cao
2009/0100454 A1 4/2009 Weber
2009/0104898 A1 4/2009 Harris
2009/0106026 A1 4/2009 Ferrieux
2009/0106376 A1 4/2009 Tom et al.
2009/0106397 A1 4/2009 O'Keefe
2009/0112572 A1 4/2009 Thorn
2009/0112576 A1 4/2009 Jackson et al.
2009/0112592 A1 4/2009 Candelore et al.
2009/0112677 A1 4/2009 Rhett
2009/0112892 A1 4/2009 Cardie et al.
2009/0119587 A1 5/2009 Allen et al.
2009/0123021 A1 5/2009 Jung et al.
2009/0123071 A1 5/2009 Iwasaki
2009/0125477 A1 5/2009 Lu et al.
2009/0128505 A1 5/2009 Partridge et al.
2009/0132253 A1 5/2009 Bellegarda
2009/0132255 A1 5/2009 Lu
2009/0137286 A1 5/2009 Luke et al.
2009/0138736 A1 5/2009 Chin
2009/0138828 A1 5/2009 Schultz et al.
2009/0144049 A1 6/2009 Haddad et al.
2009/0144428 A1 6/2009 Bowater et al.
2009/0144609 A1 6/2009 Liang et al.
2009/0146848 A1 6/2009 Ghassabian
2009/0150147 A1 6/2009 Jacoby et al.
2009/0150156 A1 6/2009 Kennewick et al.
2009/0152349 A1 6/2009 Bonev et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0158200 A1 6/2009 Palahnuk et al.
2009/0158323 A1 6/2009 Bober et al.
2009/0158423 A1 6/2009 Orlassino et al.
2009/0160803 A1 6/2009 Hashimoto
2009/0164301 A1 6/2009 O'Sullivan et al.
2009/0164441 A1 6/2009 Cheyer
2009/0164655 A1 6/2009 Pettersson et al.
2009/0164937 A1 6/2009 Alviar et al.
2009/0167508 A1 7/2009 Fadell et al.
2009/0167509 A1 7/2009 Fadell et al.
2009/0171578 A1 7/2009 Kim et al.
2009/0171662 A1 7/2009 Huang et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0177966 A1 7/2009 Chaudhri
2009/0182445 A1 7/2009 Girish et al.
2009/0187402 A1 7/2009 Scholl
2009/0187577 A1 7/2009 Reznik et al.
2009/0187950 A1 7/2009 Nicas et al.
2009/0191895 A1 7/2009 Singh et al.
2009/0192782 A1 7/2009 Drewes
2009/0192787 A1 7/2009 Roon
2009/0198497 A1 8/2009 Kwon
2009/0204409 A1 8/2009 Mozer et al.
2009/0204478 A1 8/2009 Kaib et al.
2009/0204596 A1 8/2009 Brun et al.
2009/0204601 A1 8/2009 Grasset
2009/0204620 A1 8/2009 Thione et al.
2009/0210230 A1 8/2009 Schwarz et al.
2009/0210232 A1 8/2009 Sanchez et al.
2009/0213134 A1 8/2009 Stephanick et al.
2009/0215503 A1 8/2009 Zhang et al.
2009/0216396 A1 8/2009 Yamagata
2009/0216540 A1 8/2009 Tessel et al.
2009/0216704 A1 8/2009 Zheng et al.
2009/0221274 A1 9/2009 Venkatakrishnan et al.
2009/0222257 A1 9/2009 Sumita et al.
2009/0222270 A2 9/2009 Likens et al.
2009/0222488 A1 9/2009 Boerries et al.
2009/0228126 A1 9/2009 Spielberg et al.
2009/0228273 A1 9/2009 Wang et al.
2009/0228277 A1 9/2009 Bonforte et al.
2009/0228281 A1 9/2009 Singleton et al.
2009/0228439 A1 9/2009 Manolescu et al.
2009/0228792 A1 9/2009 Van Os et al.
2009/0228842 A1 9/2009 Westerman et al.
2009/0234638 A1 9/2009 Ranjan et al.
2009/0234655 A1 9/2009 Kwon
2009/0235280 A1 9/2009 Tannier et al.
2009/0239202 A1 9/2009 Stone
2009/0239552 A1 9/2009 Churchill et al.
2009/0240485 A1 9/2009 Dalal et al.
2009/0241054 A1 9/2009 Hendricks
2009/0241760 A1 10/2009 Georges
2009/0247237 A1 10/2009 Mittleman et al.

(56) References Cited

U.S. PATENT DOCUMENTS

2009/0248182 A1 10/2009 Logan et al.
2009/0248395 A1 10/2009 Alewine et al.
2009/0248402 A1 10/2009 Ito et al.
2009/0248420 A1 10/2009 Basir et al.
2009/0248422 A1 10/2009 Li et al.
2009/0249198 A1 10/2009 Davis et al.
2009/0249247 A1 10/2009 Tseng et al.
2009/0252350 A1 10/2009 Seguin
2009/0253457 A1 10/2009 Seguin
2009/0253463 A1 10/2009 Shin et al.
2009/0254339 A1 10/2009 Seguin
2009/0254345 A1 10/2009 Fleizach et al.
2009/0254819 A1 10/2009 Song et al.
2009/0254823 A1 10/2009 Barrett
2009/0259969 A1 10/2009 Pallakoff
2009/0265368 A1 10/2009 Crider et al.
2009/0271109 A1 10/2009 Lee et al.
2009/0271175 A1 10/2009 Bodin et al.
2009/0271176 A1 10/2009 Bodin et al.
2009/0271178 A1 10/2009 Bodin et al.
2009/0271188 A1 10/2009 Agapi et al.
2009/0271189 A1 10/2009 Agapi et al.
2009/0274315 A1 11/2009 Carnes et al.
2009/0281789 A1 11/2009 Waibel et al.
2009/0284482 A1 11/2009 Chin
2009/0286514 A1 11/2009 Lichorowic et al.
2009/0287583 A1 11/2009 Holmes
2009/0290718 A1 11/2009 Kahn et al.
2009/0292987 A1 11/2009 Sorenson
2009/0296552 A1 12/2009 Hicks et al.
2009/0298474 A1 12/2009 George
2009/0298529 A1 12/2009 Mahajan
2009/0299745 A1 12/2009 Kennewick et al.
2009/0299849 A1 12/2009 Cao et al.
2009/0300391 A1 12/2009 Jessup et al.
2009/0300488 A1 12/2009 Salamon et al.
2009/0304198 A1 12/2009 Herre et al.
2009/0306967 A1 12/2009 Nicolov et al.
2009/0306969 A1 12/2009 Goud et al.
2009/0306979 A1 12/2009 Jaiswal et al.
2009/0306980 A1 12/2009 Shin
2009/0306981 A1 12/2009 Cromack et al.
2009/0306985 A1 12/2009 Roberts et al.
2009/0306988 A1 12/2009 Chen et al.
2009/0306989 A1 12/2009 Kaji
2009/0307162 A1 12/2009 Bui et al.
2009/0307201 A1 12/2009 Dunning et al.
2009/0307584 A1 12/2009 Davidson et al.
2009/0313014 A1 12/2009 Shin et al.
2009/0313023 A1 12/2009 Jones
2009/0313026 A1 12/2009 Coffman et al.
2009/0313544 A1 12/2009 Wood et al.
2009/0313564 A1 12/2009 Rottler et al.
2009/0316943 A1 12/2009 Frigola Munoz et al.
2009/0318119 A1 12/2009 Basir et al.
2009/0318198 A1 12/2009 Carroll
2009/0319266 A1 12/2009 Brown et al.
2009/0326923 A1 12/2009 Yan et al.
2009/0326936 A1 12/2009 Nagashima
2009/0326938 A1 12/2009 Marila et al.
2009/0326949 A1 12/2009 Douthitt et al.
2009/0327977 A1 12/2009 Bachfischer et al.
2010/0004918 A1 1/2010 Lee et al.
2010/0004930 A1 1/2010 Strope et al.
2010/0004931 A1 1/2010 Ma et al.
2010/0005081 A1 1/2010 Bennett
2010/0007569 A1 1/2010 Sim et al.
2010/0010803 A1 1/2010 Ishikawa et al.
2010/0010814 A1 1/2010 Patel
2010/0010948 A1 1/2010 Ito et al.
2010/0013760 A1 1/2010 Hirai et al.
2010/0013796 A1 1/2010 Abileah et al.
2010/0017212 A1 1/2010 Attwater et al.
2010/0017382 A1 1/2010 Katragadda et al.
2010/0017741 A1 1/2010 Karp et al.
2010/0019834 A1 1/2010 Zerbe et al.
2010/0020035 A1 1/2010 Ryu et al.
2010/0023318 A1 1/2010 Lemoine
2010/0023320 A1 1/2010 Di Cristo et al.
2010/0023331 A1 1/2010 Duta et al.
2010/0026526 A1 2/2010 Yokota
2010/0030549 A1 2/2010 Lee et al.
2010/0030562 A1 2/2010 Yoshizawa et al.
2010/0030928 A1 2/2010 Conroy et al.
2010/0031143 A1 2/2010 Rao et al.
2010/0031150 A1 2/2010 Andrew
2010/0036653 A1 2/2010 Kim et al.
2010/0036655 A1 2/2010 Cecil et al.
2010/0036660 A1 2/2010 Bennett
2010/0036829 A1 2/2010 Leyba
2010/0036928 A1 2/2010 Granito et al.
2010/0037183 A1 2/2010 Miyashita et al.
2010/0037187 A1 2/2010 Kondziela
2010/0039495 A1 2/2010 Rahman et al.
2010/0042400 A1 2/2010 Block et al.
2010/0042576 A1 2/2010 Roettger et al.
2010/0046842 A1 2/2010 Conwell et al.
2010/0049498 A1 2/2010 Cao et al.
2010/0049514 A1 2/2010 Kennewick et al.
2010/0050064 A1 2/2010 Liu et al.
2010/0050074 A1 2/2010 Nachmani et al.
2010/0054512 A1 3/2010 Solum
2010/0054601 A1 3/2010 Anbalagan et al.
2010/0057435 A1 3/2010 Kent et al.
2010/0057443 A1 3/2010 Di Cristo et al.
2010/0057457 A1 3/2010 Ogata et al.
2010/0057461 A1 3/2010 Neubacher et al.
2010/0057643 A1 3/2010 Yang
2010/0058200 A1 3/2010 Jablokov et al.
2010/0060646 A1 3/2010 Unsal et al.
2010/0063804 A1 3/2010 Sato et al.
2010/0063825 A1 3/2010 Williams et al.
2010/0063961 A1 3/2010 Guiheneuf et al.
2010/0064113 A1 3/2010 Lindahl et al.
2010/0064218 A1 3/2010 Bull et al.
2010/0064226 A1 3/2010 Stefaniak et al.
2010/0066546 A1 3/2010 Aaron
2010/0066684 A1 3/2010 Shahraray et al.
2010/0067723 A1 3/2010 Bergmann et al.
2010/0067867 A1 3/2010 Lin et al.
2010/0070281 A1 3/2010 Conkie et al.
2010/0070517 A1 3/2010 Ghosh et al.
2010/0070521 A1 3/2010 Clinchant et al.
2010/0070899 A1 3/2010 Hunt et al.
2010/0071003 A1 3/2010 Bychkov et al.
2010/0073201 A1 3/2010 Holcomb et al.
2010/0076760 A1 3/2010 Kraenzel et al.
2010/0076968 A1 3/2010 Boyns et al.
2010/0076993 A1 3/2010 Klawitter et al.
2010/0077350 A1 3/2010 Lim et al.
2010/0077469 A1 3/2010 Furman et al.
2010/0079501 A1 4/2010 Ikeda et al.
2010/0079508 A1 4/2010 Hodge et al.
2010/0080398 A1 4/2010 Waldmann
2010/0080470 A1 4/2010 Deluca et al.
2010/0081456 A1 4/2010 Singh et al.
2010/0081487 A1 4/2010 Chen et al.
2010/0082239 A1 4/2010 Hardy et al.
2010/0082286 A1 4/2010 Leung
2010/0082327 A1 4/2010 Rogers et al.
2010/0082328 A1 4/2010 Rogers et al.
2010/0082329 A1 4/2010 Silverman et al.
2010/0082333 A1 4/2010 Al-Shammari
2010/0082343 A1 4/2010 Levit et al.
2010/0082345 A1 4/2010 Wang et al.
2010/0082346 A1 4/2010 Rogers et al.
2010/0082347 A1 4/2010 Rogers et al.
2010/0082348 A1 4/2010 Silverman et al.
2010/0082349 A1 4/2010 Bellegarda et al.
2010/0082376 A1 4/2010 Levitt
2010/0082567 A1 4/2010 Rosenblatt et al.
2010/0082653 A1 4/2010 Nair
2010/0082970 A1 4/2010 Lindahl et al.
2010/0086152 A1 4/2010 Rank et al.

(56) References Cited

U.S. PATENT DOCUMENTS

| | | | |
|---|---|---|---|
| 2010/0086153 | A1 | 4/2010 | Hagen et al. |
| 2010/0086156 | A1 | 4/2010 | Rank et al. |
| 2010/0088020 | A1 | 4/2010 | Sano et al. |
| 2010/0088093 | A1 | 4/2010 | Lee et al. |
| 2010/0088100 | A1 | 4/2010 | Lindahl |
| 2010/0094632 | A1 | 4/2010 | Davis et al. |
| 2010/0098231 | A1 | 4/2010 | Wohlert et al. |
| 2010/0099354 | A1 | 4/2010 | Johnson |
| 2010/0100080 | A1 | 4/2010 | Huculak et al. |
| 2010/0100212 | A1 | 4/2010 | Lindahl et al. |
| 2010/0100371 | A1 | 4/2010 | Yuezhong et al. |
| 2010/0100384 | A1 | 4/2010 | Ju et al. |
| 2010/0100385 | A1 | 4/2010 | Davis et al. |
| 2010/0100515 | A1 | 4/2010 | Bangalore et al. |
| 2010/0100816 | A1 | 4/2010 | Mccloskey et al. |
| 2010/0103776 | A1 | 4/2010 | Chan |
| 2010/0106486 | A1 | 4/2010 | Hua et al. |
| 2010/0106498 | A1 | 4/2010 | Morrison et al. |
| 2010/0106500 | A1 | 4/2010 | McKee et al. |
| 2010/0106503 | A1 | 4/2010 | Farrell et al. |
| 2010/0106975 | A1 | 4/2010 | Vandervort |
| 2010/0114856 | A1 | 5/2010 | Kuboyama |
| 2010/0114887 | A1 | 5/2010 | Conway et al. |
| 2010/0121637 | A1 | 5/2010 | Roy et al. |
| 2010/0122306 | A1 | 5/2010 | Pratt et al. |
| 2010/0125456 | A1 | 5/2010 | Weng et al. |
| 2010/0125458 | A1 | 5/2010 | Franco et al. |
| 2010/0125460 | A1 | 5/2010 | Mellott et al. |
| 2010/0125811 | A1 | 5/2010 | Moore et al. |
| 2010/0127854 | A1 | 5/2010 | Helvick et al. |
| 2010/0128701 | A1 | 5/2010 | Nagaraja |
| 2010/0131265 | A1 | 5/2010 | Liu et al. |
| 2010/0131269 | A1 | 5/2010 | Park et al. |
| 2010/0131273 | A1 | 5/2010 | Aley-Raz et al. |
| 2010/0131498 | A1 | 5/2010 | Linthicum et al. |
| 2010/0131899 | A1 | 5/2010 | Hubert |
| 2010/0138215 | A1 | 6/2010 | Williams |
| 2010/0138224 | A1 | 6/2010 | Bedingfield, Sr. |
| 2010/0138416 | A1 | 6/2010 | Bellotti |
| 2010/0138680 | A1 | 6/2010 | Brisebois et al. |
| 2010/0138759 | A1 | 6/2010 | Roy |
| 2010/0138798 | A1 | 6/2010 | Wilson et al. |
| 2010/0142740 | A1 | 6/2010 | Roerup |
| 2010/0145694 | A1 | 6/2010 | Ju et al. |
| 2010/0145700 | A1 | 6/2010 | Kennewick et al. |
| 2010/0145707 | A1 | 6/2010 | Ljolje et al. |
| 2010/0146442 | A1 | 6/2010 | Nagasaka et al. |
| 2010/0150321 | A1 | 6/2010 | Harris et al. |
| 2010/0153114 | A1 | 6/2010 | Shih et al. |
| 2010/0153115 | A1 | 6/2010 | Klee et al. |
| 2010/0153448 | A1 | 6/2010 | Harpur et al. |
| 2010/0153576 | A1 | 6/2010 | Wohlert et al. |
| 2010/0153968 | A1 | 6/2010 | Engel |
| 2010/0158207 | A1 | 6/2010 | Dhawan et al. |
| 2010/0161311 | A1 | 6/2010 | Massuh |
| 2010/0161313 | A1 | 6/2010 | Karttunen |
| 2010/0161337 | A1 | 6/2010 | Pulz et al. |
| 2010/0161554 | A1 | 6/2010 | Datuashvili et al. |
| 2010/0164897 | A1 | 7/2010 | Morin et al. |
| 2010/0169075 | A1 | 7/2010 | Raffa et al. |
| 2010/0169093 | A1 | 7/2010 | Washio |
| 2010/0169097 | A1 | 7/2010 | Nachman et al. |
| 2010/0169098 | A1 | 7/2010 | Patch |
| 2010/0171713 | A1 | 7/2010 | Kwok et al. |
| 2010/0174544 | A1 | 7/2010 | Heifets |
| 2010/0175066 | A1 | 7/2010 | Paik |
| 2010/0179932 | A1 | 7/2010 | Yoon et al. |
| 2010/0179991 | A1 | 7/2010 | Lorch et al. |
| 2010/0180218 | A1 | 7/2010 | Boston et al. |
| 2010/0185434 | A1 | 7/2010 | Burvall et al. |
| 2010/0185448 | A1 | 7/2010 | Meisel |
| 2010/0185949 | A1 | 7/2010 | Jaeger |
| 2010/0191466 | A1 | 7/2010 | Deluca et al. |
| 2010/0191520 | A1 | 7/2010 | Gruhn et al. |
| 2010/0192221 | A1 | 7/2010 | Waggoner |
| 2010/0195865 | A1 | 8/2010 | Luff |
| 2010/0197359 | A1 | 8/2010 | Harris |
| 2010/0198821 | A1 | 8/2010 | Loritz et al. |
| 2010/0199180 | A1 | 8/2010 | Brichter et al. |
| 2010/0199215 | A1 | 8/2010 | Seymour et al. |
| 2010/0199340 | A1 | 8/2010 | Jonas et al. |
| 2010/0204986 | A1 | 8/2010 | Kennewick et al. |
| 2010/0211199 | A1 | 8/2010 | Naik et al. |
| 2010/0211379 | A1 | 8/2010 | Gorman et al. |
| 2010/0211644 | A1 | 8/2010 | Lavoie et al. |
| 2010/0215195 | A1 | 8/2010 | Harma et al. |
| 2010/0216509 | A1 | 8/2010 | Riemer et al. |
| 2010/0217581 | A1 | 8/2010 | Hong |
| 2010/0217604 | A1 | 8/2010 | Baldwin et al. |
| 2010/0222033 | A1 | 9/2010 | Scott et al. |
| 2010/0222098 | A1 | 9/2010 | Garg |
| 2010/0223055 | A1 | 9/2010 | Mclean |
| 2010/0223056 | A1 | 9/2010 | Kadirkamanathan et al. |
| 2010/0223131 | A1 | 9/2010 | Scott et al. |
| 2010/0225599 | A1 | 9/2010 | Danielsson et al. |
| 2010/0225809 | A1 | 9/2010 | Connors et al. |
| 2010/0227642 | A1 | 9/2010 | Kim et al. |
| 2010/0228540 | A1 | 9/2010 | Bennett |
| 2010/0228549 | A1 | 9/2010 | Herman et al. |
| 2010/0228691 | A1 | 9/2010 | Yang et al. |
| 2010/0229082 | A1 | 9/2010 | Karmarkar et al. |
| 2010/0229100 | A1 | 9/2010 | Miller et al. |
| 2010/0231474 | A1 | 9/2010 | Yamagajo et al. |
| 2010/0235167 | A1 | 9/2010 | Bourdon |
| 2010/0235341 | A1 | 9/2010 | Bennett |
| 2010/0235729 | A1 | 9/2010 | Kocienda et al. |
| 2010/0235732 | A1 | 9/2010 | Bergman |
| 2010/0235770 | A1 | 9/2010 | Ording et al. |
| 2010/0235780 | A1 | 9/2010 | Westerman et al. |
| 2010/0235793 | A1 | 9/2010 | Ording et al. |
| 2010/0241418 | A1 | 9/2010 | Maeda et al. |
| 2010/0246784 | A1 | 9/2010 | Frazier et al. |
| 2010/0250542 | A1 | 9/2010 | Fujimaki |
| 2010/0250599 | A1 | 9/2010 | Schmidt et al. |
| 2010/0255858 | A1 | 10/2010 | Juhasz |
| 2010/0257160 | A1 | 10/2010 | Cao |
| 2010/0257478 | A1 | 10/2010 | Longe et al. |
| 2010/0257490 | A1 | 10/2010 | Lyon et al. |
| 2010/0262599 | A1 | 10/2010 | Nitz |
| 2010/0263015 | A1 | 10/2010 | Pandey et al. |
| 2010/0268537 | A1 | 10/2010 | Al-Telmissani |
| 2010/0268539 | A1 | 10/2010 | Xu et al. |
| 2010/0269040 | A1 | 10/2010 | Lee |
| 2010/0274482 | A1 | 10/2010 | Feng |
| 2010/0274753 | A1 | 10/2010 | Liberty et al. |
| 2010/0277579 | A1 | 11/2010 | Cho et al. |
| 2010/0278320 | A1 | 11/2010 | Arsenault et al. |
| 2010/0278391 | A1 | 11/2010 | Hsu et al. |
| 2010/0278453 | A1 | 11/2010 | King |
| 2010/0280983 | A1 | 11/2010 | Cho et al. |
| 2010/0281034 | A1 | 11/2010 | Petrou et al. |
| 2010/0286984 | A1 | 11/2010 | Wandinger et al. |
| 2010/0286985 | A1 | 11/2010 | Kennewick et al. |
| 2010/0287241 | A1 | 11/2010 | Swanburg et al. |
| 2010/0287514 | A1 | 11/2010 | Cragun et al. |
| 2010/0290632 | A1 | 11/2010 | Lin |
| 2010/0293460 | A1 | 11/2010 | Budelli |
| 2010/0295645 | A1 | 11/2010 | Falldin et al. |
| 2010/0299133 | A1 | 11/2010 | Kopparapu et al. |
| 2010/0299138 | A1 | 11/2010 | Kim |
| 2010/0299142 | A1 | 11/2010 | Freeman et al. |
| 2010/0299444 | A1 | 11/2010 | Nilo et al. |
| 2010/0302056 | A1 | 12/2010 | Dutton et al. |
| 2010/0303254 | A1 | 12/2010 | Yoshizawa et al. |
| 2010/0304342 | A1 | 12/2010 | Zilber |
| 2010/0304705 | A1 | 12/2010 | Hursey et al. |
| 2010/0305807 | A1 | 12/2010 | Basir et al. |
| 2010/0305947 | A1 | 12/2010 | Schwarz et al. |
| 2010/0311395 | A1 | 12/2010 | Zheng et al. |
| 2010/0312547 | A1 | 12/2010 | Van Os et al. |
| 2010/0312566 | A1 | 12/2010 | Odinak et al. |
| 2010/0318293 | A1 | 12/2010 | Brush et al. |
| 2010/0318357 | A1 | 12/2010 | Istvan et al. |
| 2010/0318366 | A1 | 12/2010 | Sullivan et al. |

(56) References Cited

U.S. PATENT DOCUMENTS

2010/0318570 A1 12/2010 Narasinghanallur et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.
2010/0325131 A1 12/2010 Dumais et al.
2010/0325158 A1 12/2010 Oral et al.
2010/0325573 A1 12/2010 Estrada et al.
2010/0325588 A1 12/2010 Reddy et al.
2010/0330908 A1 12/2010 Maddern et al.
2010/0332003 A1 12/2010 Yaguez
2010/0332220 A1 12/2010 Hursey et al.
2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0006876 A1 1/2011 Moberg et al.
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0016421 A1 1/2011 Krupka et al.
2011/0018695 A1 1/2011 Bells et al.
2011/0021211 A1 1/2011 Ohki
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0028083 A1 2/2011 Soitis
2011/0029616 A1 2/2011 Wang et al.
2011/0029637 A1 2/2011 Morse
2011/0030067 A1 2/2011 Wilson
2011/0033064 A1 2/2011 Johnson et al.
2011/0034183 A1 2/2011 Haag et al.
2011/0035144 A1 2/2011 Okamoto et al.
2011/0035434 A1 2/2011 Lockwood
2011/0038489 A1 2/2011 Visser et al.
2011/0039584 A1 2/2011 Merrett
2011/0040707 A1 2/2011 Theisen et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0047246 A1 2/2011 Frissora et al.
2011/0047266 A1 2/2011 Yu et al.
2011/0047605 A1 2/2011 Sontag et al.
2011/0050591 A1 3/2011 Kim et al.
2011/0050592 A1 3/2011 Kim et al.
2011/0054647 A1 3/2011 Chipchase
2011/0054894 A1 3/2011 Phillips et al.
2011/0054901 A1 3/2011 Qin et al.
2011/0055244 A1 3/2011 Donelli
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg et al.
2011/0060807 A1 3/2011 Martin et al.
2011/0060812 A1 3/2011 Middleton
2011/0064378 A1 3/2011 Gharaat et al.
2011/0064387 A1 3/2011 Mendeloff et al.
2011/0065456 A1 3/2011 Brennan et al.
2011/0066366 A1 3/2011 Ellanti et al.
2011/0066436 A1 3/2011 Bezar
2011/0066468 A1 3/2011 Huang et al.
2011/0066602 A1 3/2011 Studer et al.
2011/0066634 A1 3/2011 Phillips et al.
2011/0072033 A1 3/2011 White et al.
2011/0072114 A1 3/2011 Hoffert et al.
2011/0072492 A1 3/2011 Mohler et al.
2011/0075818 A1 3/2011 Vance et al.
2011/0076994 A1 3/2011 Kim et al.
2011/0077943 A1 3/2011 Miki et al.
2011/0080260 A1 4/2011 Wang et al.
2011/0081889 A1 4/2011 Gao et al.
2011/0082688 A1 4/2011 Kim et al.
2011/0083079 A1 4/2011 Farrell et al.
2011/0087491 A1 4/2011 Wittenstein et al.
2011/0087685 A1 4/2011 Lin et al.
2011/0090078 A1 4/2011 Kim et al.
2011/0092187 A1 4/2011 Miller
2011/0093261 A1 4/2011 Angott
2011/0093265 A1 4/2011 Stent et al.
2011/0093271 A1 4/2011 Bernard et al.
2011/0093272 A1 4/2011 Isobe et al.
2011/0099000 A1 4/2011 Rai et al.
2011/0099157 A1 4/2011 LeBeau et al.
2011/0102161 A1 5/2011 Heubel et al.
2011/0103682 A1 5/2011 Chidlovskii et al.
2011/0105097 A1 5/2011 Tadayon et al.
2011/0106534 A1 5/2011 Lebeau et al.
2011/0106536 A1 5/2011 Klappert
2011/0106736 A1 5/2011 Aharonson et al.
2011/0106878 A1 5/2011 Cho et al.
2011/0106892 A1 5/2011 Nelson et al.
2011/0110502 A1 5/2011 Daye et al.
2011/0111724 A1 5/2011 Baptiste
2011/0112825 A1 5/2011 Bellegarda
2011/0112827 A1 5/2011 Kennewick et al.
2011/0112837 A1 5/2011 Kurki-Suonio et al.
2011/0112838 A1 5/2011 Adibi
2011/0112921 A1 5/2011 Kennewick et al.
2011/0116480 A1 5/2011 Li et al.
2011/0116610 A1 5/2011 Shaw et al.
2011/0119049 A1 5/2011 Ylonen
2011/0119051 A1 5/2011 Li et al.
2011/0119623 A1 5/2011 Kim
2011/0119713 A1 5/2011 Chang et al.
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0125701 A1 5/2011 Nair et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0137664 A1 6/2011 Kho et al.
2011/0141141 A1 6/2011 Kankainen
2011/0143718 A1 6/2011 Engelhart, Sr.
2011/0143726 A1 6/2011 de Silva
2011/0143811 A1 6/2011 Rodriguez
2011/0144857 A1 6/2011 Wingrove et al.
2011/0144901 A1 6/2011 Wang
2011/0144973 A1 6/2011 Bocchieri et al.
2011/0144999 A1 6/2011 Jang et al.
2011/0145718 A1 6/2011 Ketola et al.
2011/0151415 A1 6/2011 Darling et al.
2011/0151830 A1 6/2011 Blanda et al.
2011/0153209 A1 6/2011 Geelen
2011/0153322 A1 6/2011 Kwak et al.
2011/0153324 A1 6/2011 Ballinger et al.
2011/0153325 A1 6/2011 Ballinger et al.
2011/0153329 A1 6/2011 Moorer
2011/0153330 A1 6/2011 Yazdani et al.
2011/0153373 A1 6/2011 Dantzig et al.
2011/0154193 A1 6/2011 Creutz et al.
2011/0157029 A1 6/2011 Tseng
2011/0161072 A1 6/2011 Terao et al.
2011/0161076 A1 6/2011 Davis et al.
2011/0161079 A1 6/2011 Gruhn et al.

(56) References Cited

U.S. PATENT DOCUMENTS

| | | | |
|---|---|---|---|
| 2011/0161309 | A1 | 6/2011 | Lung et al. |
| 2011/0161852 | A1 | 6/2011 | Vainio et al. |
| 2011/0166851 | A1 | 7/2011 | LeBeau et al. |
| 2011/0166855 | A1 | 7/2011 | Vermeulen et al. |
| 2011/0166862 | A1 | 7/2011 | Eshed et al. |
| 2011/0167350 | A1 | 7/2011 | Hoellwarth |
| 2011/0173003 | A1 | 7/2011 | Levanon et al. |
| 2011/0173537 | A1 | 7/2011 | Hemphill |
| 2011/0175810 | A1 | 7/2011 | Markovic et al. |
| 2011/0178804 | A1 | 7/2011 | Inoue et al. |
| 2011/0179002 | A1 | 7/2011 | Dumitru et al. |
| 2011/0179372 | A1 | 7/2011 | Moore et al. |
| 2011/0183627 | A1 | 7/2011 | Ueda et al. |
| 2011/0183650 | A1 | 7/2011 | Mckee et al. |
| 2011/0184721 | A1 | 7/2011 | Subramanian et al. |
| 2011/0184730 | A1 | 7/2011 | LeBeau et al. |
| 2011/0184736 | A1 | 7/2011 | Slotznick |
| 2011/0184737 | A1 | 7/2011 | Nakano et al. |
| 2011/0184768 | A1 | 7/2011 | Norton et al. |
| 2011/0184789 | A1 | 7/2011 | Kirsch |
| 2011/0185288 | A1 | 7/2011 | Gupta et al. |
| 2011/0191108 | A1 | 8/2011 | Friedlander |
| 2011/0191271 | A1 | 8/2011 | Baker et al. |
| 2011/0191344 | A1 | 8/2011 | Jin et al. |
| 2011/0195758 | A1 | 8/2011 | Damale et al. |
| 2011/0196670 | A1 | 8/2011 | Dang et al. |
| 2011/0197128 | A1 | 8/2011 | Assadollahi et al. |
| 2011/0199312 | A1 | 8/2011 | Okuta |
| 2011/0201385 | A1 | 8/2011 | Higginbotham et al. |
| 2011/0201387 | A1 | 8/2011 | Paek et al. |
| 2011/0202526 | A1 | 8/2011 | Lee et al. |
| 2011/0202594 | A1 | 8/2011 | Ricci |
| 2011/0202874 | A1 | 8/2011 | Ramer et al. |
| 2011/0205149 | A1 | 8/2011 | Tom et al. |
| 2011/0208511 | A1 | 8/2011 | Sikstrom et al. |
| 2011/0208524 | A1 | 8/2011 | Haughay |
| 2011/0209088 | A1 | 8/2011 | Hinckley et al. |
| 2011/0212717 | A1 | 9/2011 | Rhoads et al. |
| 2011/0216093 | A1 | 9/2011 | Griffin |
| 2011/0218806 | A1 | 9/2011 | Alewine et al. |
| 2011/0218855 | A1 | 9/2011 | Cao et al. |
| 2011/0219018 | A1 | 9/2011 | Bailey et al. |
| 2011/0223893 | A1 | 9/2011 | Lau et al. |
| 2011/0224972 | A1 | 9/2011 | Millett et al. |
| 2011/0228913 | A1 | 9/2011 | Cochinwala et al. |
| 2011/0231182 | A1 | 9/2011 | Weider et al. |
| 2011/0231184 | A1 | 9/2011 | Kerr |
| 2011/0231188 | A1 | 9/2011 | Kennewick et al. |
| 2011/0231218 | A1 | 9/2011 | Tovar |
| 2011/0231432 | A1 | 9/2011 | Sata et al. |
| 2011/0231474 | A1 | 9/2011 | Locker et al. |
| 2011/0238191 | A1 | 9/2011 | Kristjansson et al. |
| 2011/0238407 | A1 | 9/2011 | Kent |
| 2011/0238408 | A1 | 9/2011 | Larcheveque et al. |
| 2011/0238676 | A1 | 9/2011 | Liu et al. |
| 2011/0239111 | A1 | 9/2011 | Grover |
| 2011/0242007 | A1 | 10/2011 | Gray et al. |
| 2011/0244888 | A1 | 10/2011 | Ohki |
| 2011/0246471 | A1 | 10/2011 | Rakib et al. |
| 2011/0249144 | A1 | 10/2011 | Chang |
| 2011/0250570 | A1 | 10/2011 | Mack et al. |
| 2011/0252108 | A1 | 10/2011 | Morris et al. |
| 2011/0257966 | A1 | 10/2011 | Rychlik |
| 2011/0258188 | A1 | 10/2011 | Abdalmageed et al. |
| 2011/0260829 | A1 | 10/2011 | Lee |
| 2011/0260861 | A1 | 10/2011 | Singh et al. |
| 2011/0264530 | A1 | 10/2011 | Santangelo et al. |
| 2011/0264643 | A1 | 10/2011 | Cao |
| 2011/0264999 | A1 | 10/2011 | Bells et al. |
| 2011/0270604 | A1 | 11/2011 | Qi et al. |
| 2011/0274303 | A1 | 11/2011 | Filson et al. |
| 2011/0276595 | A1 | 11/2011 | Kirkland et al. |
| 2011/0276598 | A1 | 11/2011 | Kozempel |
| 2011/0276944 | A1 | 11/2011 | Bergman et al. |
| 2011/0279368 | A1 | 11/2011 | Klein et al. |
| 2011/0280143 | A1 | 11/2011 | Li et al. |
| 2011/0282663 | A1 | 11/2011 | Talwar et al. |
| 2011/0282888 | A1 | 11/2011 | Koperski et al. |
| 2011/0282903 | A1 | 11/2011 | Zhang |
| 2011/0282906 | A1 | 11/2011 | Wong |
| 2011/0283189 | A1 | 11/2011 | McCarty |
| 2011/0283190 | A1 | 11/2011 | Poltorak |
| 2011/0288852 | A1 | 11/2011 | Dymetman et al. |
| 2011/0288855 | A1 | 11/2011 | Roy |
| 2011/0288861 | A1 | 11/2011 | Kurzweil et al. |
| 2011/0288863 | A1 | 11/2011 | Rasmussen |
| 2011/0288866 | A1 | 11/2011 | Rasmussen |
| 2011/0288917 | A1 | 11/2011 | Wanek et al. |
| 2011/0289530 | A1 | 11/2011 | Dureau et al. |
| 2011/0298585 | A1 | 12/2011 | Barry |
| 2011/0301943 | A1 | 12/2011 | Patch |
| 2011/0302162 | A1 | 12/2011 | Xiao et al. |
| 2011/0302645 | A1 | 12/2011 | Headley |
| 2011/0306426 | A1 | 12/2011 | Novak et al. |
| 2011/0307241 | A1 | 12/2011 | Waibel et al. |
| 2011/0307254 | A1 | 12/2011 | Hunt et al. |
| 2011/0307491 | A1 | 12/2011 | Fisk et al. |
| 2011/0307810 | A1 | 12/2011 | Hilerio et al. |
| 2011/0313775 | A1 | 12/2011 | Laligand et al. |
| 2011/0313803 | A1 | 12/2011 | Friend et al. |
| 2011/0314003 | A1 | 12/2011 | Ju et al. |
| 2011/0314032 | A1 | 12/2011 | Bennett et al. |
| 2011/0314404 | A1 | 12/2011 | Kotler et al. |
| 2011/0314539 | A1 | 12/2011 | Horton |
| 2011/0320187 | A1 | 12/2011 | Motik et al. |
| 2012/0002820 | A1 | 1/2012 | Leichter |
| 2012/0005602 | A1 | 1/2012 | Anttila et al. |
| 2012/0008754 | A1 | 1/2012 | Mukherjee et al. |
| 2012/0010886 | A1 | 1/2012 | Razavilar |
| 2012/0011138 | A1 | 1/2012 | Dunning et al. |
| 2012/0013609 | A1 | 1/2012 | Reponen et al. |
| 2012/0015629 | A1 | 1/2012 | Olsen et al. |
| 2012/0016658 | A1 | 1/2012 | Wu et al. |
| 2012/0016678 | A1 | 1/2012 | Gruber et al. |
| 2012/0019400 | A1 | 1/2012 | Patel et al. |
| 2012/0020490 | A1 | 1/2012 | Leichter |
| 2012/0020503 | A1 | 1/2012 | Endo et al. |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022872 | A1 | 1/2012 | Gruber et al. |
| 2012/0022874 | A1 | 1/2012 | Lloyd et al. |
| 2012/0022876 | A1 | 1/2012 | LeBeau et al. |
| 2012/0022967 | A1 | 1/2012 | Bachman et al. |
| 2012/0023088 | A1 | 1/2012 | Cheng et al. |
| 2012/0023095 | A1 | 1/2012 | Wadycki et al. |
| 2012/0023462 | A1 | 1/2012 | Rosing et al. |
| 2012/0026395 | A1 | 2/2012 | Jin et al. |
| 2012/0029661 | A1 | 2/2012 | Jones et al. |
| 2012/0029910 | A1 | 2/2012 | Medlock et al. |
| 2012/0034904 | A1 | 2/2012 | LeBeau et al. |
| 2012/0035907 | A1 | 2/2012 | Lebeau et al. |
| 2012/0035908 | A1 | 2/2012 | Lebeau et al. |
| 2012/0035924 | A1 | 2/2012 | Jitkoff et al. |
| 2012/0035925 | A1 | 2/2012 | Friend et al. |
| 2012/0035926 | A1 | 2/2012 | Ambler |
| 2012/0035931 | A1 | 2/2012 | LeBeau et al. |
| 2012/0035932 | A1 | 2/2012 | Jitkoff et al. |
| 2012/0035935 | A1 | 2/2012 | Park et al. |
| 2012/0036556 | A1 | 2/2012 | LeBeau et al. |
| 2012/0039539 | A1 | 2/2012 | Boiman et al. |
| 2012/0039578 | A1 | 2/2012 | Issa et al. |
| 2012/0041752 | A1 | 2/2012 | Wang et al. |
| 2012/0041756 | A1 | 2/2012 | Hanazawa et al. |
| 2012/0041759 | A1 | 2/2012 | Barker et al. |
| 2012/0042014 | A1 | 2/2012 | Desai et al. |
| 2012/0042343 | A1 | 2/2012 | Laligand et al. |
| 2012/0052945 | A1 | 3/2012 | Miyamoto et al. |
| 2012/0053815 | A1 | 3/2012 | Montanari et al. |
| 2012/0053829 | A1 | 3/2012 | Agarwal et al. |
| 2012/0053945 | A1 | 3/2012 | Gupta et al. |

(56) References Cited

U.S. PATENT DOCUMENTS

| | | | |
|---|---|---|---|
| 2012/0056815 | A1 | 3/2012 | Mehra |
| 2012/0059655 | A1 | 3/2012 | Cartales |
| 2012/0059813 | A1 | 3/2012 | Sejnoha et al. |
| 2012/0060052 | A1 | 3/2012 | White et al. |
| 2012/0062473 | A1 | 3/2012 | Xiao et al. |
| 2012/0064975 | A1 | 3/2012 | Gault et al. |
| 2012/0066212 | A1 | 3/2012 | Jennings |
| 2012/0066581 | A1 | 3/2012 | Spalink |
| 2012/0075054 | A1 | 3/2012 | Ge et al. |
| 2012/0075184 | A1 | 3/2012 | Madhvanath |
| 2012/0077479 | A1 | 3/2012 | Sabotta et al. |
| 2012/0078611 | A1 | 3/2012 | Soltani et al. |
| 2012/0078624 | A1 | 3/2012 | Yook et al. |
| 2012/0078627 | A1 | 3/2012 | Wagner |
| 2012/0078635 | A1 | 3/2012 | Rothkopf et al. |
| 2012/0078747 | A1 | 3/2012 | Chakrabarti et al. |
| 2012/0082317 | A1 | 4/2012 | Pance et al. |
| 2012/0083286 | A1 | 4/2012 | Kim et al. |
| 2012/0084086 | A1 | 4/2012 | Gilbert et al. |
| 2012/0084087 | A1 | 4/2012 | Yang et al. |
| 2012/0084089 | A1 | 4/2012 | Lloyd et al. |
| 2012/0084634 | A1 | 4/2012 | Wong et al. |
| 2012/0088219 | A1 | 4/2012 | Briscoe et al. |
| 2012/0089331 | A1 | 4/2012 | Schmidt et al. |
| 2012/0089659 | A1 | 4/2012 | Halevi et al. |
| 2012/0101823 | A1 | 4/2012 | Weng et al. |
| 2012/0105257 | A1 | 5/2012 | Murillo et al. |
| 2012/0108166 | A1 | 5/2012 | Hymel |
| 2012/0108221 | A1 | 5/2012 | Thomas et al. |
| 2012/0109632 | A1 | 5/2012 | Sugiura et al. |
| 2012/0109753 | A1 | 5/2012 | Kennewick et al. |
| 2012/0109997 | A1 | 5/2012 | Sparks et al. |
| 2012/0110456 | A1 | 5/2012 | Larco et al. |
| 2012/0114108 | A1 | 5/2012 | Katis et al. |
| 2012/0116770 | A1 | 5/2012 | Chen et al. |
| 2012/0117499 | A1 | 5/2012 | Mori et al. |
| 2012/0117590 | A1 | 5/2012 | Agnihotri et al. |
| 2012/0124126 | A1 | 5/2012 | Alcazar et al. |
| 2012/0124177 | A1 | 5/2012 | Sparks |
| 2012/0124178 | A1 | 5/2012 | Sparks |
| 2012/0128322 | A1 | 5/2012 | Shaffer et al. |
| 2012/0130709 | A1 | 5/2012 | Bocchieri et al. |
| 2012/0130995 | A1 | 5/2012 | Risvik et al. |
| 2012/0135714 | A1 | 5/2012 | King, II |
| 2012/0136529 | A1 | 5/2012 | Curtis et al. |
| 2012/0136572 | A1 | 5/2012 | Norton |
| 2012/0136649 | A1 | 5/2012 | Freising et al. |
| 2012/0136855 | A1 | 5/2012 | Ni et al. |
| 2012/0136985 | A1 | 5/2012 | Popescu et al. |
| 2012/0137367 | A1 | 5/2012 | Dupont et al. |
| 2012/0149342 | A1 | 6/2012 | Cohen et al. |
| 2012/0149394 | A1 | 6/2012 | Singh et al. |
| 2012/0150532 | A1 | 6/2012 | Mirowski et al. |
| 2012/0150544 | A1 | 6/2012 | McLoughlin et al. |
| 2012/0150580 | A1 | 6/2012 | Norton |
| 2012/0158293 | A1 | 6/2012 | Burnham |
| 2012/0158399 | A1 | 6/2012 | Tremblay et al. |
| 2012/0158422 | A1 | 6/2012 | Burnham et al. |
| 2012/0159380 | A1 | 6/2012 | Kocienda et al. |
| 2012/0163710 | A1 | 6/2012 | Skaff et al. |
| 2012/0166177 | A1 | 6/2012 | Beld et al. |
| 2012/0166196 | A1 | 6/2012 | Ju et al. |
| 2012/0166429 | A1 | 6/2012 | Moore et al. |
| 2012/0166942 | A1 | 6/2012 | Ramerth et al. |
| 2012/0166959 | A1 | 6/2012 | Hilerio et al. |
| 2012/0166998 | A1 | 6/2012 | Cotterill et al. |
| 2012/0173222 | A1 | 7/2012 | Wang et al. |
| 2012/0173244 | A1 | 7/2012 | Kwak et al. |
| 2012/0173464 | A1 | 7/2012 | Tur et al. |
| 2012/0174121 | A1 | 7/2012 | Treat et al. |
| 2012/0176255 | A1 | 7/2012 | Choi et al. |
| 2012/0179457 | A1 | 7/2012 | Newman et al. |
| 2012/0179467 | A1 | 7/2012 | Williams et al. |
| 2012/0179471 | A1 | 7/2012 | Newman et al. |
| 2012/0185237 | A1 | 7/2012 | Gajic et al. |
| 2012/0185480 | A1 | 7/2012 | Ni et al. |
| 2012/0185781 | A1 | 7/2012 | Guzman et al. |
| 2012/0191461 | A1 | 7/2012 | Lin et al. |
| 2012/0192096 | A1 | 7/2012 | Bowman et al. |
| 2012/0197743 | A1 | 8/2012 | Grigg et al. |
| 2012/0197995 | A1 | 8/2012 | Caruso |
| 2012/0197998 | A1 | 8/2012 | Kessel et al. |
| 2012/0201362 | A1 | 8/2012 | Crossan et al. |
| 2012/0203767 | A1 | 8/2012 | Williams et al. |
| 2012/0209454 | A1 | 8/2012 | Miller et al. |
| 2012/0209654 | A1 | 8/2012 | Romagnino et al. |
| 2012/0209853 | A1 | 8/2012 | Desai et al. |
| 2012/0209874 | A1 | 8/2012 | Wong et al. |
| 2012/0210266 | A1 | 8/2012 | Jiang et al. |
| 2012/0210378 | A1 | 8/2012 | Mccoy et al. |
| 2012/0214141 | A1 | 8/2012 | Raya et al. |
| 2012/0214517 | A1 | 8/2012 | Singh et al. |
| 2012/0215640 | A1 | 8/2012 | Ramer et al. |
| 2012/0215762 | A1 | 8/2012 | Hall et al. |
| 2012/0221339 | A1 | 8/2012 | Wang et al. |
| 2012/0221552 | A1 | 8/2012 | Reponen et al. |
| 2012/0223889 | A1 | 9/2012 | Medlock et al. |
| 2012/0223936 | A1 | 9/2012 | Aughey et al. |
| 2012/0232885 | A1 | 9/2012 | Barbosa et al. |
| 2012/0232886 | A1 | 9/2012 | Capuozzo et al. |
| 2012/0232906 | A1 | 9/2012 | Lindahl et al. |
| 2012/0233207 | A1 | 9/2012 | Mohajer |
| 2012/0233266 | A1 | 9/2012 | Hassan et al. |
| 2012/0233280 | A1 | 9/2012 | Ebara |
| 2012/0239403 | A1 | 9/2012 | Cano et al. |
| 2012/0239661 | A1 | 9/2012 | Giblin |
| 2012/0239761 | A1 | 9/2012 | Linner et al. |
| 2012/0242482 | A1 | 9/2012 | Elumalai et al. |
| 2012/0245719 | A1 | 9/2012 | Story, Jr. et al. |
| 2012/0245939 | A1 | 9/2012 | Braho et al. |
| 2012/0245941 | A1 | 9/2012 | Cheyer |
| 2012/0245944 | A1 | 9/2012 | Gruber et al. |
| 2012/0246064 | A1 | 9/2012 | Balkow |
| 2012/0250858 | A1 | 10/2012 | Iqbal et al. |
| 2012/0252367 | A1 | 10/2012 | Gaglio et al. |
| 2012/0252540 | A1 | 10/2012 | Kirigaya |
| 2012/0253785 | A1 | 10/2012 | Hamid et al. |
| 2012/0253791 | A1 | 10/2012 | Heck et al. |
| 2012/0254143 | A1 | 10/2012 | Varma et al. |
| 2012/0254152 | A1 | 10/2012 | Park et al. |
| 2012/0254290 | A1 | 10/2012 | Naaman |
| 2012/0259615 | A1 | 10/2012 | Morin et al. |
| 2012/0262296 | A1 | 10/2012 | Bezar |
| 2012/0265482 | A1 | 10/2012 | Grokop et al. |
| 2012/0265528 | A1 | 10/2012 | Gruber et al. |
| 2012/0265535 | A1 | 10/2012 | Bryant-Rich et al. |
| 2012/0265787 | A1 | 10/2012 | Hsu et al. |
| 2012/0265806 | A1 | 10/2012 | Blanchflower et al. |
| 2012/0271625 | A1 | 10/2012 | Bernard |
| 2012/0271634 | A1 | 10/2012 | Lenke |
| 2012/0271635 | A1 | 10/2012 | Ljolje |
| 2012/0271640 | A1 | 10/2012 | Basir |
| 2012/0271676 | A1 | 10/2012 | Aravamudan et al. |
| 2012/0275377 | A1 | 11/2012 | Lehane et al. |
| 2012/0278744 | A1 | 11/2012 | Kozitsyn et al. |
| 2012/0278812 | A1 | 11/2012 | Wang |
| 2012/0284015 | A1 | 11/2012 | Drewes |
| 2012/0284027 | A1 | 11/2012 | Mallett et al. |
| 2012/0290291 | A1 | 11/2012 | Shelley et al. |
| 2012/0290300 | A1 | 11/2012 | Lee et al. |
| 2012/0290657 | A1 | 11/2012 | Parks et al. |
| 2012/0295708 | A1 | 11/2012 | Hernandez-Abrego et al. |
| 2012/0296638 | A1 | 11/2012 | Patwa |
| 2012/0296649 | A1 | 11/2012 | Bansal et al. |
| 2012/0296654 | A1 | 11/2012 | Hendrickson et al. |
| 2012/0296891 | A1 | 11/2012 | Rangan |
| 2012/0297341 | A1 | 11/2012 | Glazer et al. |
| 2012/0297348 | A1 | 11/2012 | Santoro |
| 2012/0303369 | A1 | 11/2012 | Brush et al. |
| 2012/0303371 | A1 | 11/2012 | Labsky et al. |
| 2012/0304124 | A1 | 11/2012 | Chen et al. |
| 2012/0304239 | A1 | 11/2012 | Shahraray et al. |
| 2012/0309363 | A1 | 12/2012 | Gruber et al. |
| 2012/0310642 | A1 | 12/2012 | Cao et al. |

(56) References Cited

U.S. PATENT DOCUMENTS

2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316774 A1 12/2012 Yariv et al.
2012/0316862 A1 12/2012 Sultan et al.
2012/0316875 A1 12/2012 Nyquist et al.
2012/0316878 A1 12/2012 Singleton et al.
2012/0316955 A1 12/2012 Panguluri et al.
2012/0317194 A1 12/2012 Tian
2012/0317498 A1 12/2012 Logan et al.
2012/0321112 A1 12/2012 Schubert et al.
2012/0323560 A1 12/2012 Cortes et al.
2012/0324391 A1 12/2012 Tocci et al.
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0018659 A1 1/2013 Chi
2013/0018863 A1 1/2013 Regan et al.
2013/0024277 A1 1/2013 Tuchman et al.
2013/0024576 A1 1/2013 Dishneau et al.
2013/0027875 A1 1/2013 Zhu et al.
2013/0028404 A1 1/2013 Omalley et al.
2013/0030787 A1 1/2013 Cancedda et al.
2013/0030789 A1 1/2013 Dalce
2013/0030804 A1 1/2013 Zavaliagkos et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0047178 A1 2/2013 Moon et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.
2013/0055099 A1 2/2013 Yao et al.
2013/0055147 A1 2/2013 Vasudev et al.
2013/0060571 A1 3/2013 Soemo et al.
2013/0061139 A1 3/2013 Mahkovec et al.
2013/0063611 A1 3/2013 Papakipos et al.
2013/0066832 A1 3/2013 Sheehan et al.
2013/0067307 A1 3/2013 Tian et al.
2013/0067312 A1 3/2013 Rose
2013/0067421 A1 3/2013 Osman et al.
2013/0069769 A1 3/2013 Pennington et al.
2013/0073286 A1 3/2013 Bastea-Forte et al.
2013/0073293 A1 3/2013 Jang et al.
2013/0073346 A1 3/2013 Chun et al.
2013/0073580 A1 3/2013 Mehanna et al.
2013/0078930 A1 3/2013 Chen et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080178 A1 3/2013 Kang et al.
2013/0080251 A1 3/2013 Dempski
2013/0082967 A1 4/2013 Hillis et al.
2013/0085755 A1 4/2013 Bringert et al.
2013/0085761 A1 4/2013 Bringert et al.
2013/0086609 A1 4/2013 Levy et al.
2013/0090921 A1 4/2013 Liu et al.
2013/0091090 A1 4/2013 Spivack et al.
2013/0095805 A1 4/2013 Lebeau et al.
2013/0096909 A1 4/2013 Brun et al.
2013/0096911 A1 4/2013 Beaufort et al.
2013/0096917 A1 4/2013 Edgar et al.
2013/0097566 A1 4/2013 Berglund
2013/0097682 A1 4/2013 Vic et al.
2013/0100017 A1 4/2013 Papakipos et al.
2013/0100268 A1 4/2013 Mihailidis et al.
2013/0103391 A1 4/2013 Millmore et al.
2013/0103405 A1 4/2013 Namba et al.
2013/0106742 A1 5/2013 Lee et al.
2013/0107053 A1 5/2013 Ozaki
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0124672 A1 5/2013 Pan
2013/0125168 A1 5/2013 Agnihotri et al.
2013/0132081 A1 5/2013 Ryu et al.
2013/0132084 A1 5/2013 Stonehocker et al.
2013/0132089 A1 5/2013 Fanty et al.
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore et al.
2013/0151339 A1 6/2013 Kim et al.
2013/0152092 A1 6/2013 Yadgar et al.
2013/0154811 A1 6/2013 Ferren et al.
2013/0155948 A1 6/2013 Pinheiro et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0159861 A1 6/2013 Rottler et al.
2013/0165232 A1 6/2013 Nelson et al.
2013/0166278 A1 6/2013 James et al.
2013/0166303 A1 6/2013 Chang et al.
2013/0166332 A1 6/2013 Hammad
2013/0166442 A1 6/2013 Nakajima et al.
2013/0167242 A1 6/2013 Paliwal
2013/0170738 A1 7/2013 Capuozzo et al.
2013/0172022 A1 7/2013 Seymour et al.
2013/0173258 A1 7/2013 Liu et al.
2013/0173268 A1 7/2013 Weng et al.
2013/0173513 A1 7/2013 Chu et al.
2013/0174034 A1 7/2013 Brown et al.

(56) References Cited

U.S. PATENT DOCUMENTS

2013/0176147 A1 7/2013 Anderson et al.
2013/0176244 A1 7/2013 Yamamoto et al.
2013/0176592 A1 7/2013 Sasaki
2013/0179168 A1 7/2013 Bae et al.
2013/0179172 A1 7/2013 Nakamura et al.
2013/0179440 A1 7/2013 Gordon
2013/0183942 A1 7/2013 Novick et al.
2013/0183944 A1 7/2013 Mozer et al.
2013/0185059 A1 7/2013 Riccardi et al.
2013/0185066 A1 7/2013 Tzirkel-hancock et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0190021 A1 7/2013 Vieri et al.
2013/0191117 A1 7/2013 Atti et al.
2013/0191408 A1 7/2013 Volkert
2013/0197911 A1 8/2013 Wei et al.
2013/0197914 A1 8/2013 Yelvington et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0210410 A1 8/2013 Xu
2013/0210492 A1 8/2013 You et al.
2013/0218553 A1 8/2013 Fujii et al.
2013/0218560 A1 8/2013 Hsiao et al.
2013/0218574 A1 8/2013 Falcon et al.
2013/0218899 A1 8/2013 Raghavan et al.
2013/0219333 A1 8/2013 Palwe et al.
2013/0222249 A1 8/2013 Pasquero et al.
2013/0225128 A1 8/2013 Gomar
2013/0226935 A1 8/2013 Bai et al.
2013/0231917 A1 9/2013 Naik
2013/0234947 A1 9/2013 Kristensson et al.
2013/0235987 A1 9/2013 Arroniz-Escobar et al.
2013/0238326 A1 9/2013 Kim et al.
2013/0238647 A1 9/2013 Thompson
2013/0238729 A1 9/2013 Holzman et al.
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0262168 A1 10/2013 Makanawala et al.
2013/0268263 A1 10/2013 Park et al.
2013/0268956 A1 10/2013 Recco
2013/0275117 A1 10/2013 Winer
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0279724 A1 10/2013 Stafford et al.
2013/0282709 A1 10/2013 Zhu et al.
2013/0283168 A1 10/2013 Brown et al.
2013/0283199 A1 10/2013 Selig et al.
2013/0283283 A1 10/2013 Wang et al.
2013/0285913 A1 10/2013 Griffin et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297198 A1 11/2013 Velde et al.
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0318478 A1 11/2013 Ogura
2013/0321267 A1 12/2013 Bhatti et al.
2013/0322634 A1 12/2013 Bennett et al.
2013/0322665 A1 12/2013 Bennett et al.
2013/0325340 A1 12/2013 Forstall et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325480 A1 12/2013 Lee et al.
2013/0325481 A1 12/2013 Van Os et al.
2013/0325484 A1 12/2013 Chakladar et al.
2013/0325967 A1 12/2013 Parks et al.
2013/0325970 A1 12/2013 Roberts et al.
2013/0325979 A1 12/2013 Mansfield et al.
2013/0328809 A1 12/2013 Smith
2013/0329023 A1* 12/2013 Suplee, III ......... H04N 1/00968 348/61
2013/0331127 A1 12/2013 Sabatelli et al.
2013/0332159 A1 12/2013 Federighi et al.
2013/0332162 A1 12/2013 Keen
2013/0332164 A1 12/2013 Naik
2013/0332168 A1 12/2013 Kim et al.
2013/0332172 A1 12/2013 Prakash et al.
2013/0332400 A1 12/2013 González
2013/0332538 A1 12/2013 Clark et al.
2013/0339256 A1 12/2013 Shroff
2013/0339991 A1 12/2013 Ricci
2013/0342672 A1 12/2013 Gray et al.
2013/0343584 A1 12/2013 Bennett et al.
2013/0343721 A1 12/2013 Abecassis
2013/0346065 A1 12/2013 Davidson et al.
2013/0346068 A1 12/2013 Solem et al.
2013/0346347 A1 12/2013 Patterson et al.
2013/0347018 A1 12/2013 Limp et al.
2013/0347029 A1 12/2013 Tang et al.
2013/0347102 A1 12/2013 Shi
2013/0347117 A1 12/2013 Parks et al.
2014/0001255 A1 1/2014 Anthoine
2014/0006012 A1 1/2014 Zhou et al.
2014/0006025 A1 1/2014 Krishnan et al.
2014/0006027 A1 1/2014 Kim et al.
2014/0006030 A1 1/2014 Fleizach et al.
2014/0006153 A1 1/2014 Thangam et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006955 A1 1/2014 Greenzeiger et al.
2014/0008163 A1 1/2014 Mikonaho et al.
2014/0012574 A1 1/2014 Pasupalak et al.
2014/0012580 A1 1/2014 Ganong et al.
2014/0012586 A1 1/2014 Rubin et al.
2014/0012587 A1 1/2014 Park
2014/0019116 A1 1/2014 Lundberg et al.
2014/0019133 A1 1/2014 Bao et al.
2014/0019460 A1 1/2014 Sambrani et al.
2014/0028029 A1 1/2014 Jochman
2014/0028477 A1 1/2014 Michalske
2014/0028735 A1 1/2014 Williams et al.
2014/0032453 A1 1/2014 Eustice et al.
2014/0033071 A1 1/2014 Gruber et al.
2014/0035823 A1 2/2014 Khoe et al.
2014/0037075 A1 2/2014 Bouzid et al.

(56) References Cited

U.S. PATENT DOCUMENTS

2014/0039888 A1 2/2014 Taubman et al.
2014/0039893 A1 2/2014 Weiner et al.
2014/0039894 A1 2/2014 Shostak
2014/0040274 A1 2/2014 Aravamudan et al.
2014/0040748 A1 2/2014 Lemay et al.
2014/0040754 A1 2/2014 Donelli
2014/0040801 A1 2/2014 Patel et al.
2014/0040918 A1 2/2014 Li et al.
2014/0040961 A1 2/2014 Green et al.
2014/0046934 A1 2/2014 Zhou et al.
2014/0047001 A1 2/2014 Phillips et al.
2014/0052451 A1 2/2014 Cheong et al.
2014/0052680 A1 2/2014 Nitz et al.
2014/0052791 A1 2/2014 Chakra et al.
2014/0053082 A1 2/2014 Park et al.
2014/0053101 A1 2/2014 Buehler et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0067738 A1 3/2014 Kingsbury
2014/0068751 A1 3/2014 Last et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074483 A1 3/2014 Van Os
2014/0074589 A1 3/2014 Nielsen et al.
2014/0074815 A1 3/2014 Plimton
2014/0075453 A1 3/2014 Bellessort et al.
2014/0078065 A1 3/2014 Akkok et al.
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar et al.
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082715 A1 3/2014 Grajek et al.
2014/0086458 A1 3/2014 Rogers et al.
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0095171 A1 4/2014 Lynch et al.
2014/0095172 A1 4/2014 Cabaco et al.
2014/0095173 A1 4/2014 Lynch et al.
2014/0095601 A1 4/2014 Abuelsaad et al.
2014/0095965 A1 4/2014 Li
2014/0096209 A1 4/2014 Saraf et al.
2014/0098247 A1 4/2014 Rao et al.
2014/0100847 A1 4/2014 Ishii et al.
2014/0104175 A1 4/2014 Ouyang et al.
2014/0108017 A1 4/2014 Mason et al.
2014/0108391 A1 4/2014 Volkert
2014/0112556 A1 4/2014 Kalinli-Akbacak
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0129226 A1 5/2014 Lee et al.
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0146200 A1 5/2014 Scott et al.
2014/0149118 A1 5/2014 Lee et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156279 A1 6/2014 Okamoto et al.
2014/0157319 A1 6/2014 Kimura et al.
2014/0157422 A1 6/2014 Livshits et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0164953 A1 6/2014 Lynch et al.
2014/0169795 A1 6/2014 Clough
2014/0171064 A1 6/2014 Das
2014/0172878 A1 6/2014 Clark et al.
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1 6/2014 Kim et al.
2014/0180697 A1 6/2014 Torok et al.
2014/0181865 A1 6/2014 Koganei
2014/0188460 A1 7/2014 Ouyang et al.
2014/0188477 A1 7/2014 Zhang
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik
2014/0207582 A1 7/2014 Flinn et al.
2014/0211944 A1 7/2014 Hayward et al.
2014/0214429 A1 7/2014 Pantel
2014/0214537 A1 7/2014 Yoo et al.
2014/0215513 A1 7/2014 Ramer et al.
2014/0218372 A1 8/2014 Missig et al.
2014/0222435 A1 8/2014 Li et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0226503 A1 8/2014 Cooper et al.

(56) References Cited

U.S. PATENT DOCUMENTS

2014/0229184 A1 8/2014 Shires
2014/0230055 A1 8/2014 Boehl
2014/0232570 A1 8/2014 Skinder et al.
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-Ghazale et al.
2014/0249816 A1 9/2014 Pickering et al.
2014/0249817 A1 9/2014 Hart et al.
2014/0249820 A1 9/2014 Hsu et al.
2014/0249821 A1 9/2014 Kennewick et al.
2014/0250046 A1 9/2014 Winn et al.
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1 9/2014 Kim
2014/0267599 A1 9/2014 Drouin et al.
2014/0267933 A1 9/2014 Young
2014/0272821 A1 9/2014 Pitschel et al.
2014/0273979 A1 9/2014 Van Os et al.
2014/0274005 A1 9/2014 Luna et al.
2014/0274203 A1 9/2014 Ganong et al.
2014/0274211 A1 9/2014 Sejnoha et al.
2014/0278051 A1 9/2014 Mcgavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278426 A1 9/2014 Jost et al.
2014/0278429 A1 9/2014 Ganong, III
2014/0278435 A1 9/2014 Ganong et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0280757 A1* 9/2014 Tran ...................... G06Q 50/10
709/219
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282586 A1 9/2014 Shear et al.
2014/0282743 A1 9/2014 Howard et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0298395 A1 10/2014 Yang et al.
2014/0304086 A1 10/2014 Dasdan et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0317030 A1 10/2014 Shen et al.
2014/0317502 A1 10/2014 Brown et al.
2014/0324429 A1 10/2014 Weilhammer et al.
2014/0324884 A1 10/2014 Lindahl et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0342762 A1 11/2014 Hajdu et al.
2014/0343834 A1 11/2014 Demerchant et al.
2014/0343943 A1 11/2014 Al-telmissani
2014/0343946 A1 11/2014 Torok et al.
2014/0344205 A1 11/2014 Luna et al.
2014/0344627 A1 11/2014 Schaub et al.
2014/0344687 A1 11/2014 Durham et al.
2014/0347181 A1 11/2014 Luna et al.
2014/0350847 A1 11/2014 Ichinokawa
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358521 A1* 12/2014 Mikutel ............... G06Q 10/107
704/9
2014/0358523 A1 12/2014 Sheth et al.
2014/0358549 A1 12/2014 O'connor et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365505 A1 12/2014 Clark et al.
2014/0365880 A1 12/2014 Bellegarda
2014/0365885 A1 12/2014 Carson et al.
2014/0365895 A1 12/2014 Paulson et al.
2014/0365922 A1 12/2014 Yang
2014/0365945 A1 12/2014 Karunamuni et al.
2014/0370817 A1 12/2014 Luna
2014/0370841 A1 12/2014 Roberts et al.

(56) References Cited

U.S. PATENT DOCUMENTS

2014/0372112 A1 12/2014 Xue et al.
2014/0372356 A1 12/2014 Bilal et al.
2014/0372468 A1 12/2014 Collins et al.
2014/0372931 A1 12/2014 Zhai et al.
2014/0379334 A1 12/2014 Fry
2014/0379341 A1 12/2014 Seo et al.
2014/0379798 A1 12/2014 Bunner et al.
2014/0380285 A1 12/2014 Gabel et al.
2015/0003797 A1 1/2015 Schmidt
2015/0004958 A1 1/2015 Wang et al.
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012271 A1 1/2015 Peng et al.
2015/0019219 A1 1/2015 Tzirkel-Hancock et al.
2015/0019221 A1 1/2015 Lee et al.
2015/0019944 A1 1/2015 Kalgi
2015/0019974 A1 1/2015 Doi et al.
2015/0025405 A1 1/2015 Vairavan et al.
2015/0026620 A1 1/2015 Kwon et al.
2015/0027178 A1 1/2015 Scalisi
2015/0031416 A1 1/2015 Labowicz et al.
2015/0032443 A1 1/2015 Karov et al.
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0045003 A1 2/2015 Vora et al.
2015/0045007 A1 2/2015 Cash
2015/0045068 A1 2/2015 Soffer et al.
2015/0046434 A1 2/2015 Lim et al.
2015/0046537 A1 2/2015 Rakib
2015/0046828 A1 2/2015 Desai et al.
2015/0050633 A1 2/2015 Christmas et al.
2015/0050923 A1 2/2015 Tu et al.
2015/0051754 A1 2/2015 Kwon et al.
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1 3/2015 Namgung et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067822 A1 3/2015 Randall
2015/0071121 A1 3/2015 Patil et al.
2015/0073788 A1 3/2015 Sak et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1 4/2015 Conkie et al.
2015/0095268 A1 4/2015 Greenzeiger et al.
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106093 A1 4/2015 Weeks et al.
2015/0106737 A1 4/2015 Montoy-Wilson et al.
2015/0113407 A1 4/2015 Hoffert et al.
2015/0113435 A1 4/2015 Phillips
2015/0120296 A1 4/2015 Stern et al.
2015/0120641 A1 4/2015 Soon-shiong et al.
2015/0120723 A1 4/2015 Deshmukh et al.
2015/0121216 A1 4/2015 Brown et al.
2015/0123898 A1 5/2015 Kim et al.
2015/0127337 A1 5/2015 Heigold et al.
2015/0127348 A1 5/2015 Follis
2015/0127350 A1 5/2015 Agiomyrgiannakis
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134323 A1 * 5/2015 Cuthbert ............ G06K 9/00671
704/3
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0142420 A1 5/2015 Sarikaya et al.
2015/0142438 A1 5/2015 Dai et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149177 A1 5/2015 Kalns et al.
2015/0149182 A1 5/2015 Kalns et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154185 A1 6/2015 Waibel
2015/0154976 A1 6/2015 Mutagi
2015/0160855 A1 6/2015 Bi
2015/0161291 A1 6/2015 Gur et al.
2015/0161370 A1 6/2015 North et al.
2015/0161521 A1 6/2015 Shah et al.
2015/0161989 A1 6/2015 Hsu et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1 6/2015 Doherty et al.
2015/0172262 A1 6/2015 Ortiz, Jr. et al.
2015/0172463 A1 6/2015 Quast et al.
2015/0178388 A1 6/2015 Winnemoeller et al.
2015/0178785 A1 6/2015 Salonen
2015/0179176 A1 6/2015 Ryu et al.
2015/0181285 A1 6/2015 Zhang et al.
2015/0185964 A1 7/2015 Stout
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186538 A1 7/2015 Yan et al.
2015/0186783 A1 7/2015 Byrne et al.
2015/0187355 A1 7/2015 Parkinson et al.

(56) References Cited

U.S. PATENT DOCUMENTS

2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0194165 A1 7/2015 Faaborg et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205858 A1 7/2015 Xie et al.
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221304 A1 8/2015 Stewart
2015/0221307 A1 8/2015 Shah et al.
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228281 A1 8/2015 Raniere
2015/0228283 A1 8/2015 Ehsani et al.
2015/0228292 A1 8/2015 Goldstein et al.
2015/0230095 A1 8/2015 Smith et al.
2015/0234636 A1 8/2015 Barnes, Jr.
2015/0234800 A1 8/2015 Patrick et al.
2015/0237301 A1 8/2015 Shi et al.
2015/0242091 A1 8/2015 Lu et al.
2015/0242385 A1 8/2015 Bao et al.
2015/0243278 A1 8/2015 Kibre et al.
2015/0243279 A1 8/2015 Morse et al.
2015/0243283 A1 8/2015 Halash et al.
2015/0244665 A1 8/2015 Choi et al.
2015/0245154 A1 8/2015 Dadu et al.
2015/0248651 A1 9/2015 Akutagawa et al.
2015/0248886 A1 9/2015 Sarikaya et al.
2015/0253146 A1 9/2015 Annapureddy et al.
2015/0254057 A1 9/2015 Klein et al.
2015/0254058 A1 9/2015 Klein et al.
2015/0254333 A1 9/2015 Fife et al.
2015/0255071 A1 9/2015 Chiba
2015/0256873 A1 9/2015 Klein et al.
2015/0261298 A1 9/2015 Li
2015/0261496 A1 9/2015 Faaborg et al.
2015/0261850 A1 9/2015 Mittal
2015/0269139 A1 9/2015 McAteer et al.
2015/0269617 A1 9/2015 Mikurak
2015/0269677 A1 9/2015 Milne
2015/0269943 A1 9/2015 VanBlon et al.
2015/0277574 A1 10/2015 Jain et al.
2015/0278199 A1* 10/2015 Hazen .................... G06F 40/40
704/9
2015/0278348 A1 10/2015 Paruchuri et al.
2015/0278370 A1* 10/2015 Stratvert ................ G06F 40/40
707/766
2015/0278737 A1 10/2015 Chen Huebscher et al.
2015/0279358 A1 10/2015 Kingsbury et al.
2015/0279360 A1 10/2015 Mengibar et al.
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286716 A1 10/2015 Snibbe et al.
2015/0286937 A1 10/2015 Hildebrand
2015/0287401 A1 10/2015 Lee et al.
2015/0287409 A1 10/2015 Jang
2015/0287411 A1 10/2015 Kojima et al.
2015/0288629 A1 10/2015 Choi et al.
2015/0294086 A1 10/2015 Kare et al.
2015/0294377 A1 10/2015 Chow
2015/0294516 A1 10/2015 Chiang
2015/0295915 A1 10/2015 Xiu
2015/0301796 A1 10/2015 Visser et al.
2015/0302855 A1 10/2015 Kim et al.
2015/0302856 A1 10/2015 Kim et al.
2015/0302857 A1 10/2015 Yamada
2015/0302870 A1 10/2015 Burke et al.
2015/0309997 A1 10/2015 Lee et al.
2015/0310114 A1 10/2015 Ryger et al.
2015/0310858 A1 10/2015 Li et al.
2015/0310862 A1 10/2015 Dauphin et al.
2015/0310879 A1 10/2015 Buchanan et al.
2015/0310888 A1 10/2015 Chen
2015/0312182 A1 10/2015 Langholz
2015/0312409 A1 10/2015 Czarnecki et al.
2015/0314454 A1 11/2015 Breazeal et al.
2015/0317069 A1 11/2015 Clements et al.
2015/0317310 A1 11/2015 Eiche et al.
2015/0319411 A1 11/2015 Kasmir et al.
2015/0324041 A1 11/2015 Varley et al.
2015/0324334 A1 11/2015 Lee et al.
2015/0331664 A1 11/2015 Osawa et al.
2015/0331711 A1 11/2015 Huang et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340040 A1 11/2015 Mun et al.
2015/0340042 A1 11/2015 Sejnoha et al.
2015/0341717 A1 11/2015 Song et al.
2015/0346845 A1 12/2015 Di Censo et al.
2015/0347086 A1 12/2015 Liedholm et al.
2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thörn
2015/0370531 A1 12/2015 Faaborg
2015/0370780 A1 12/2015 Wang et al.
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371665 A1 12/2015 Naik et al.
2015/0373183 A1 12/2015 Woolsey et al.

(56) References Cited

U.S. PATENT DOCUMENTS

2015/0379118 A1 12/2015 Wickenkamp et al.
2015/0379414 A1 12/2015 Yeh et al.
2015/0379993 A1 12/2015 Subhojit et al.
2015/0381923 A1 12/2015 Wickenkamp et al.
2015/0382047 A1 12/2015 Van Os et al.
2015/0382079 A1 12/2015 Lister et al.
2015/0382147 A1 12/2015 Clark et al.
2016/0004690 A1 1/2016 Bangalore et al.
2016/0005320 A1 1/2016 deCharms et al.
2016/0012038 A1 1/2016 Edwards et al.
2016/0014476 A1 1/2016 Caliendo, Jr. et al.
2016/0018872 A1 1/2016 Tu et al.
2016/0018900 A1 1/2016 Tu et al.
2016/0018959 A1 1/2016 Yamashita et al.
2016/0019886 A1 1/2016 Hong
2016/0021414 A1 1/2016 Padi et al.
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034042 A1 2/2016 Joo
2016/0034811 A1 2/2016 Paulik et al.
2016/0036953 A1 2/2016 Lee et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0062605 A1 3/2016 Agarwal et al.
2016/0063094 A1 3/2016 Udupa et al.
2016/0063998 A1 3/2016 Krishnamoorthy et al.
2016/0070581 A1 3/2016 Soon-Shiong
2016/0071516 A1 3/2016 Lee et al.
2016/0071517 A1 3/2016 Beaver et al.
2016/0071521 A1 3/2016 Haughay
2016/0072940 A1 3/2016 Cronin
2016/0077794 A1 3/2016 Kim et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091967 A1 3/2016 Prokofieva et al.
2016/0092434 A1 3/2016 Bellegarda
2016/0092447 A1 3/2016 Venkataraman et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094889 A1 3/2016 Venkataraman et al.
2016/0094979 A1 3/2016 Naik et al.
2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0111091 A1 4/2016 Bakish
2016/0112746 A1 4/2016 Zhang et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0148610 A1 5/2016 Kennewick, Jr. et al.
2016/0150020 A1 5/2016 Farmer et al.
2016/0154624 A1 6/2016 Son et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189717 A1 6/2016 Kannan et al.
2016/0196110 A1 7/2016 Yehoshua et al.
2016/0198319 A1 7/2016 Huang et al.
2016/0203002 A1 7/2016 Kannan et al.
2016/0210551 A1 7/2016 Lee et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0227107 A1 8/2016 Beaumont
2016/0232500 A1 8/2016 Wang et al.
2016/0239645 A1 8/2016 Heo et al.
2016/0240187 A1 8/2016 Fleizach et al.
2016/0240189 A1 8/2016 Lee et al.
2016/0240192 A1 8/2016 Raghuvir
2016/0247061 A1 8/2016 Trask et al.
2016/0249319 A1 8/2016 Dotan-Cohen et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labskýet al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0266871 A1 9/2016 Schmid et al.
2016/0267904 A1 9/2016 Biadsy et al.
2016/0274938 A1 9/2016 Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283185 A1 9/2016 Mclaren et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0293157 A1 10/2016 Chen et al.
2016/0293168 A1 10/2016 Chen
2016/0294755 A1 10/2016 Prabhu
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0307566 A1 10/2016 Bellegarda
2016/0308799 A1 10/2016 Schubert et al.
2016/0313906 A1 10/2016 Kilchenko et al.

(56) References Cited

U.S. PATENT DOCUMENTS

| | | | |
|---|---|---|---|
| 2016/0314788 | A1 | 10/2016 | Jitkoff et al. |
| 2016/0314792 | A1 | 10/2016 | Alvarez et al. |
| 2016/0315996 | A1 | 10/2016 | Ha et al. |
| 2016/0317924 | A1 | 11/2016 | Tanaka et al. |
| 2016/0321239 | A1 | 11/2016 | Iso-Sipilä et al. |
| 2016/0321261 | A1 | 11/2016 | Spasojevic et al. |
| 2016/0321358 | A1 | 11/2016 | Kanani et al. |
| 2016/0322043 | A1 | 11/2016 | Bellegarda |
| 2016/0322044 | A1 | 11/2016 | Jung et al. |
| 2016/0322045 | A1 | 11/2016 | Hatfield et al. |
| 2016/0322048 | A1 | 11/2016 | Amano et al. |
| 2016/0322050 | A1 | 11/2016 | Wang et al. |
| 2016/0328147 | A1 | 11/2016 | Zhang et al. |
| 2016/0328205 | A1 | 11/2016 | Agrawal et al. |
| 2016/0328893 | A1 | 11/2016 | Cordova et al. |
| 2016/0329060 | A1 | 11/2016 | Ito et al. |
| 2016/0334973 | A1 | 11/2016 | Reckhow et al. |
| 2016/0335532 | A1 | 11/2016 | Sanghavi et al. |
| 2016/0336007 | A1 | 11/2016 | Hanazawa et al. |
| 2016/0336010 | A1 | 11/2016 | Lindahl |
| 2016/0336011 | A1 | 11/2016 | Koll et al. |
| 2016/0336024 | A1 | 11/2016 | Choi et al. |
| 2016/0337299 | A1 | 11/2016 | Lane et al. |
| 2016/0337301 | A1 | 11/2016 | Rollins et al. |
| 2016/0342317 | A1 | 11/2016 | Lim et al. |
| 2016/0342685 | A1 | 11/2016 | Basu et al. |
| 2016/0342781 | A1 | 11/2016 | Jeon |
| 2016/0350650 | A1 | 12/2016 | Leeman-Munk et al. |
| 2016/0351190 | A1 | 12/2016 | Piernot et al. |
| 2016/0352567 | A1 | 12/2016 | Robbins et al. |
| 2016/0357304 | A1 | 12/2016 | Hatori et al. |
| 2016/0357728 | A1 | 12/2016 | Bellegarda et al. |
| 2016/0357790 | A1 | 12/2016 | Elkington et al. |
| 2016/0357861 | A1 | 12/2016 | Carlhian et al. |
| 2016/0357870 | A1 | 12/2016 | Hentschel et al. |
| 2016/0358598 | A1 | 12/2016 | Williams et al. |
| 2016/0358600 | A1 | 12/2016 | Nallasamy et al. |
| 2016/0358619 | A1 | 12/2016 | Ramprashad et al. |
| 2016/0359771 | A1 | 12/2016 | Sridhar |
| 2016/0360039 | A1 | 12/2016 | Sanghavi et al. |
| 2016/0360336 | A1 | 12/2016 | Gross et al. |
| 2016/0360382 | A1 | 12/2016 | Gross et al. |
| 2016/0364378 | A1 | 12/2016 | Futrell et al. |
| 2016/0365101 | A1 | 12/2016 | Foy et al. |
| 2016/0371250 | A1 | 12/2016 | Rhodes |
| 2016/0372112 | A1 | 12/2016 | Miller et al. |
| 2016/0372119 | A1 | 12/2016 | Sak et al. |
| 2016/0378747 | A1 | 12/2016 | Orr et al. |
| 2016/0379091 | A1 | 12/2016 | Lin et al. |
| 2016/0379626 | A1 | 12/2016 | Deisher et al. |
| 2016/0379632 | A1 | 12/2016 | Hoffmeister et al. |
| 2016/0379633 | A1 | 12/2016 | Lehman et al. |
| 2016/0379639 | A1 | 12/2016 | Weinstein et al. |
| 2016/0379641 | A1 | 12/2016 | Liu et al. |
| 2017/0003931 | A1 | 1/2017 | Dvortsov et al. |
| 2017/0004824 | A1 | 1/2017 | Yoo et al. |
| 2017/0005818 | A1 | 1/2017 | Gould |
| 2017/0011091 | A1 | 1/2017 | Chehreghani |
| 2017/0011303 | A1 | 1/2017 | Annapureddy et al. |
| 2017/0011742 | A1 | 1/2017 | Jing et al. |
| 2017/0013124 | A1 | 1/2017 | Havelka et al. |
| 2017/0013331 | A1 | 1/2017 | Watanabe et al. |
| 2017/0018271 | A1 | 1/2017 | Khan et al. |
| 2017/0019987 | A1 | 1/2017 | Dragone et al. |
| 2017/0023963 | A1 | 1/2017 | Davis et al. |
| 2017/0025124 | A1 | 1/2017 | Mixter et al. |
| 2017/0026318 | A1* | 1/2017 | Daniel .................. H04L 51/046 |
| 2017/0026509 | A1 | 1/2017 | Rand |
| 2017/0031576 | A1 | 2/2017 | Saoji et al. |
| 2017/0032783 | A1 | 2/2017 | Lord et al. |
| 2017/0032787 | A1 | 2/2017 | Dayal |
| 2017/0032791 | A1 | 2/2017 | Elson et al. |
| 2017/0039283 | A1 | 2/2017 | Bennett et al. |
| 2017/0039475 | A1 | 2/2017 | Cheyer et al. |
| 2017/0040002 | A1 | 2/2017 | Basson et al. |
| 2017/0047063 | A1 | 2/2017 | Ohmura et al. |
| 2017/0053652 | A1 | 2/2017 | Choi et al. |
| 2017/0055895 | A1 | 3/2017 | Jardins et al. |
| 2017/0060853 | A1 | 3/2017 | Lee et al. |
| 2017/0061423 | A1 | 3/2017 | Bryant et al. |
| 2017/0068423 | A1 | 3/2017 | Napolitano et al. |
| 2017/0068513 | A1 | 3/2017 | Stasior et al. |
| 2017/0068550 | A1 | 3/2017 | Zeitlin |
| 2017/0068670 | A1 | 3/2017 | Orr et al. |
| 2017/0069308 | A1 | 3/2017 | Aleksic et al. |
| 2017/0075653 | A1 | 3/2017 | Dawidowsky et al. |
| 2017/0076720 | A1 | 3/2017 | Gopalan et al. |
| 2017/0076721 | A1 | 3/2017 | Bargetzi et al. |
| 2017/0078490 | A1 | 3/2017 | Kaminsky et al. |
| 2017/0083179 | A1 | 3/2017 | Gruber et al. |
| 2017/0083285 | A1 | 3/2017 | Meyers et al. |
| 2017/0083504 | A1 | 3/2017 | Huang |
| 2017/0084277 | A1 | 3/2017 | Sharifi |
| 2017/0085547 | A1 | 3/2017 | De Aguiar et al. |
| 2017/0090569 | A1 | 3/2017 | Levesque |
| 2017/0091168 | A1 | 3/2017 | Bellegarda et al. |
| 2017/0091169 | A1 | 3/2017 | Bellegarda et al. |
| 2017/0091612 | A1 | 3/2017 | Gruber et al. |
| 2017/0092259 | A1 | 3/2017 | Jeon |
| 2017/0092270 | A1 | 3/2017 | Newendorp et al. |
| 2017/0092278 | A1 | 3/2017 | Evermann et al. |
| 2017/0093356 | A1 | 3/2017 | Cudak et al. |
| 2017/0102837 | A1 | 4/2017 | Toumpelis |
| 2017/0102915 | A1 | 4/2017 | Kuscher et al. |
| 2017/0103749 | A1 | 4/2017 | Zhao et al. |
| 2017/0105190 | A1 | 4/2017 | Logan et al. |
| 2017/0110117 | A1 | 4/2017 | Chakladar et al. |
| 2017/0116177 | A1 | 4/2017 | Walia |
| 2017/0116982 | A1 | 4/2017 | Gelfenbeyn et al. |
| 2017/0116989 | A1 | 4/2017 | Yadgar et al. |
| 2017/0124190 | A1 | 5/2017 | Wang et al. |
| 2017/0125016 | A1 | 5/2017 | Wang |
| 2017/0127124 | A9 | 5/2017 | Wilson et al. |
| 2017/0131778 | A1 | 5/2017 | Iyer |
| 2017/0132019 | A1 | 5/2017 | Karashchuk et al. |
| 2017/0132199 | A1 | 5/2017 | Vescovi et al. |
| 2017/0133007 | A1 | 5/2017 | Drewes |
| 2017/0140041 | A1 | 5/2017 | Dotan-Cohen et al. |
| 2017/0140644 | A1 | 5/2017 | Hwang et al. |
| 2017/0140760 | A1 | 5/2017 | Sachdev |
| 2017/0147841 | A1 | 5/2017 | Stagg et al. |
| 2017/0148044 | A1 | 5/2017 | Fukuda et al. |
| 2017/0154033 | A1 | 6/2017 | Lee |
| 2017/0154055 | A1 | 6/2017 | Dimson et al. |
| 2017/0155940 | A1 | 6/2017 | Jin et al. |
| 2017/0161018 | A1 | 6/2017 | Lemay et al. |
| 2017/0161268 | A1 | 6/2017 | Badaskar |
| 2017/0161293 | A1 | 6/2017 | Ionescu et al. |
| 2017/0161393 | A1 | 6/2017 | Oh et al. |
| 2017/0162191 | A1 | 6/2017 | Grost et al. |
| 2017/0162203 | A1 | 6/2017 | Huang et al. |
| 2017/0169818 | A1 | 6/2017 | Vanblon et al. |
| 2017/0169819 | A1 | 6/2017 | Mese et al. |
| 2017/0177547 | A1 | 6/2017 | Ciereszko et al. |
| 2017/0178619 | A1 | 6/2017 | Naik et al. |
| 2017/0178620 | A1 | 6/2017 | Fleizach et al. |
| 2017/0178626 | A1 | 6/2017 | Gruber et al. |
| 2017/0180499 | A1 | 6/2017 | Gelfenbeyn et al. |
| 2017/0185375 | A1 | 6/2017 | Martel et al. |
| 2017/0185581 | A1 | 6/2017 | Bojja et al. |
| 2017/0186429 | A1 | 6/2017 | Giuli et al. |
| 2017/0187711 | A1 | 6/2017 | Joo et al. |
| 2017/0193083 | A1 | 7/2017 | Bhatt et al. |
| 2017/0195493 | A1 | 7/2017 | Sudarsan et al. |
| 2017/0195636 | A1 | 7/2017 | Child et al. |
| 2017/0199870 | A1 | 7/2017 | Zheng et al. |
| 2017/0199874 | A1 | 7/2017 | Patel et al. |
| 2017/0200066 | A1 | 7/2017 | Wang et al. |
| 2017/0201609 | A1 | 7/2017 | Salmenkaita et al. |
| 2017/0201613 | A1 | 7/2017 | Engelke et al. |
| 2017/0206899 | A1 | 7/2017 | Bryant et al. |
| 2017/0215052 | A1 | 7/2017 | Koum et al. |
| 2017/0221486 | A1 | 8/2017 | Kurata et al. |
| 2017/0223189 | A1 | 8/2017 | Meredith et al. |

(56) References Cited

U.S. PATENT DOCUMENTS

2017/0227935 A1 8/2017 Su et al.
2017/0228367 A1 8/2017 Pasupalak et al.
2017/0228382 A1 8/2017 Haviv et al.
2017/0230429 A1 8/2017 Garmark et al.
2017/0230497 A1 8/2017 Kim et al.
2017/0230709 A1 8/2017 Van Os et al.
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0238039 A1 8/2017 Sabattini
2017/0242653 A1 8/2017 Lang et al.
2017/0242657 A1 8/2017 Jarvis et al.
2017/0243468 A1 8/2017 Dotan-Cohen et al.
2017/0243576 A1 8/2017 Millington et al.
2017/0243586 A1 8/2017 Civelli et al.
2017/0256256 A1 9/2017 Wang et al.
2017/0263247 A1 9/2017 Kang et al.
2017/0263248 A1 9/2017 Gruber et al.
2017/0263249 A1 9/2017 Akbacak et al.
2017/0264451 A1 9/2017 Yu et al.
2017/0264711 A1 9/2017 Natarajan et al.
2017/0270912 A1 9/2017 Levit et al.
2017/0278514 A1 9/2017 Mathias et al.
2017/0285915 A1 10/2017 Napolitano et al.
2017/0286397 A1 10/2017 Gonzalez
2017/0287472 A1 10/2017 Ogawa et al.
2017/0289305 A1 10/2017 Liensberger et al.
2017/0295446 A1 10/2017 Shivappa
2017/0308609 A1 10/2017 Berkhin et al.
2017/0311005 A1 10/2017 Lin
2017/0316775 A1 11/2017 Le et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0337035 A1 11/2017 Choudhary et al.
2017/0337478 A1 11/2017 Sarikaya et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0365251 A1 12/2017 Park et al.
2017/0371509 A1 12/2017 Jung et al.
2017/0371885 A1 12/2017 Aggarwal et al.
2017/0374093 A1 12/2017 Dhar et al.
2017/0374176 A1 12/2017 Agrawal et al.
2018/0005112 A1 1/2018 Iso-Sipila et al.
2018/0007060 A1 1/2018 Leblang et al.
2018/0007096 A1 1/2018 Levin et al.
2018/0007538 A1 1/2018 Naik et al.
2018/0012596 A1 1/2018 Piernot et al.
2018/0018248 A1 1/2018 Bhargava et al.
2018/0024985 A1 1/2018 Asano
2018/0033431 A1 2/2018 Newendorp et al.
2018/0033436 A1 2/2018 Zhou
2018/0047201 A1 2/2018 Filev et al.
2018/0047406 A1 2/2018 Park
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0069743 A1 3/2018 Bakken et al.
2018/0075847 A1 3/2018 Lee et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091847 A1 3/2018 Wu et al.
2018/0096683 A1 4/2018 James et al.
2018/0096690 A1 4/2018 Mixter et al.
2018/0102914 A1 4/2018 Kawachi et al.
2018/0107917 A1 4/2018 Hewavitharana et al.
2018/0107945 A1 4/2018 Gao et al.
2018/0108346 A1 4/2018 Paulik et al.
2018/0113673 A1 4/2018 Sheynblat
2018/0121432 A1 5/2018 Parson et al.
2018/0122376 A1 5/2018 Kojima
2018/0122378 A1 5/2018 Mixter et al.
2018/0129967 A1 5/2018 Herreshoff
2018/0130470 A1 5/2018 Lemay et al.
2018/0130471 A1 5/2018 Trufinescu et al.
2018/0137856 A1 5/2018 Gilbert
2018/0137857 A1 5/2018 Zhou et al.
2018/0137865 A1 5/2018 Ling
2018/0143967 A1 5/2018 Anbazhagan et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0157372 A1 6/2018 Kurabayashi
2018/0157992 A1 6/2018 Susskind et al.
2018/0158548 A1 6/2018 Taheri et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0182376 A1 6/2018 Gysel et al.
2018/0188840 A1 7/2018 Tamura et al.
2018/0190273 A1 7/2018 Karimli et al.
2018/0190279 A1 7/2018 Anderson et al.
2018/0191670 A1 7/2018 Suyama
2018/0196683 A1 7/2018 Radebaugh et al.
2018/0210874 A1 7/2018 Fuxman et al.
2018/0213448 A1 7/2018 Segal et al.
2018/0218735 A1 8/2018 Hunt et al.
2018/0225274 A1 8/2018 Tommy et al.
2018/0232203 A1 8/2018 Gelfenbeyn et al.
2018/0233140 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0268106 A1 9/2018 Velaga
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.

(56) References Cited

U.S. PATENT DOCUMENTS

| | | | |
|---|---|---|---|
| 2018/0293984 | A1 | 10/2018 | Lindahl |
| 2018/0293988 | A1 | 10/2018 | Huang et al. |
| 2018/0308477 | A1 | 10/2018 | Nagasaka |
| 2018/0308480 | A1 | 10/2018 | Jang et al. |
| 2018/0308485 | A1 | 10/2018 | Kudurshian et al. |
| 2018/0308486 | A1 | 10/2018 | Saddler et al. |
| 2018/0314552 | A1 | 11/2018 | Kim et al. |
| 2018/0315416 | A1 | 11/2018 | Berthelsen et al. |
| 2018/0322112 | A1 | 11/2018 | Bellegarda et al. |
| 2018/0322881 | A1 | 11/2018 | Min et al. |
| 2018/0329677 | A1 | 11/2018 | Gruber et al. |
| 2018/0329957 | A1 | 11/2018 | Frazzingaro et al. |
| 2018/0329982 | A1 | 11/2018 | Patel et al. |
| 2018/0329998 | A1 | 11/2018 | Thomson et al. |
| 2018/0330714 | A1 | 11/2018 | Paulik et al. |
| 2018/0330721 | A1 | 11/2018 | Thomson et al. |
| 2018/0330722 | A1 | 11/2018 | Newendorp et al. |
| 2018/0330723 | A1 | 11/2018 | Acero et al. |
| 2018/0330729 | A1 | 11/2018 | Golipour et al. |
| 2018/0330730 | A1 | 11/2018 | Garg et al. |
| 2018/0330731 | A1 | 11/2018 | Zeitlin et al. |
| 2018/0330733 | A1 | 11/2018 | Orr et al. |
| 2018/0330737 | A1 | 11/2018 | Paulik et al. |
| 2018/0332118 | A1 | 11/2018 | Phipps et al. |
| 2018/0336184 | A1 | 11/2018 | Bellegarda et al. |
| 2018/0336197 | A1 | 11/2018 | Skilling et al. |
| 2018/0336275 | A1 | 11/2018 | Graham et al. |
| 2018/0336439 | A1 | 11/2018 | Kliger et al. |
| 2018/0336449 | A1 | 11/2018 | Adan et al. |
| 2018/0336892 | A1 | 11/2018 | Kim et al. |
| 2018/0336894 | A1 | 11/2018 | Graham et al. |
| 2018/0336904 | A1 | 11/2018 | Piercy et al. |
| 2018/0336905 | A1 | 11/2018 | Kim et al. |
| 2018/0336920 | A1 | 11/2018 | Bastian et al. |
| 2018/0341643 | A1 | 11/2018 | Alders et al. |
| 2018/0343557 | A1 | 11/2018 | Naik et al. |
| 2018/0349084 | A1 | 12/2018 | Nagasaka et al. |
| 2018/0349346 | A1 | 12/2018 | Hatori et al. |
| 2018/0349349 | A1 | 12/2018 | Bellegarda et al. |
| 2018/0349447 | A1 | 12/2018 | Maccartney et al. |
| 2018/0349472 | A1 | 12/2018 | Kohlschuetter et al. |
| 2018/0350345 | A1 | 12/2018 | Naik |
| 2018/0350353 | A1 | 12/2018 | Gruber et al. |
| 2018/0357073 | A1 | 12/2018 | Johnson et al. |
| 2018/0357308 | A1 | 12/2018 | Cheyer |
| 2018/0358015 | A1 | 12/2018 | Cash et al. |
| 2018/0358019 | A1 | 12/2018 | Mont-Reynaud |
| 2018/0365653 | A1 | 12/2018 | Cleaver et al. |
| 2018/0366105 | A1 | 12/2018 | Kim |
| 2018/0373487 | A1 | 12/2018 | Gruber et al. |
| 2018/0374484 | A1 | 12/2018 | Huang et al. |
| 2019/0012141 | A1 | 1/2019 | Piersol et al. |
| 2019/0012449 | A1 | 1/2019 | Cheyer |
| 2019/0013018 | A1 | 1/2019 | Rekstad |
| 2019/0013025 | A1 | 1/2019 | Alcorn et al. |
| 2019/0014450 | A1 | 1/2019 | Gruber et al. |
| 2019/0019077 | A1 | 1/2019 | Griffin et al. |
| 2019/0027152 | A1 | 1/2019 | Huang et al. |
| 2019/0034040 | A1 | 1/2019 | Shah et al. |
| 2019/0034826 | A1 | 1/2019 | Ahmad et al. |
| 2019/0035405 | A1 | 1/2019 | Haughay |
| 2019/0042059 | A1 | 2/2019 | Baer |
| 2019/0042627 | A1 | 2/2019 | Osotio et al. |
| 2019/0043507 | A1 | 2/2019 | Huang et al. |
| 2019/0045040 | A1 | 2/2019 | Lee et al. |
| 2019/0051309 | A1 | 2/2019 | Kim et al. |
| 2019/0057697 | A1 | 2/2019 | Giuli et al. |
| 2019/0065144 | A1 | 2/2019 | Sumner et al. |
| 2019/0065993 | A1 | 2/2019 | Srinivasan et al. |
| 2019/0066674 | A1 | 2/2019 | Jaygarl et al. |
| 2019/0068810 | A1 | 2/2019 | Okamoto et al. |
| 2019/0073998 | A1 | 3/2019 | Leblang et al. |
| 2019/0074009 | A1 | 3/2019 | Kim et al. |
| 2019/0074015 | A1 | 3/2019 | Orr et al. |
| 2019/0074016 | A1 | 3/2019 | Orr et al. |
| 2019/0079476 | A1 | 3/2019 | Funes |
| 2019/0080685 | A1 | 3/2019 | Johnson, Jr. |
| 2019/0080698 | A1 | 3/2019 | Miller |
| 2019/0087412 | A1 | 3/2019 | Seyed Ibrahim et al. |
| 2019/0087455 | A1 | 3/2019 | He et al. |
| 2019/0095050 | A1 | 3/2019 | Gruber et al. |
| 2019/0095171 | A1 | 3/2019 | Carson et al. |
| 2019/0102378 | A1 | 4/2019 | Piernot et al. |
| 2019/0102381 | A1 | 4/2019 | Futrell et al. |
| 2019/0103103 | A1 | 4/2019 | Ni et al. |
| 2019/0103112 | A1 | 4/2019 | Walker et al. |
| 2019/0116264 | A1 | 4/2019 | Sanghavi et al. |
| 2019/0122666 | A1 | 4/2019 | Raitio et al. |
| 2019/0122692 | A1 | 4/2019 | Binder et al. |
| 2019/0124019 | A1 | 4/2019 | Leon et al. |
| 2019/0129615 | A1 | 5/2019 | Sundar et al. |
| 2019/0132694 | A1 | 5/2019 | Hanes et al. |
| 2019/0139541 | A1 | 5/2019 | Andersen et al. |
| 2019/0141494 | A1 | 5/2019 | Gross et al. |
| 2019/0147880 | A1 | 5/2019 | Booker et al. |
| 2019/0149972 | A1 | 5/2019 | Parks et al. |
| 2019/0156830 | A1 | 5/2019 | Devaraj et al. |
| 2019/0158994 | A1 | 5/2019 | Gross et al. |
| 2019/0164546 | A1 | 5/2019 | Piernot et al. |
| 2019/0172467 | A1 | 6/2019 | Kim et al. |
| 2019/0179607 | A1 | 6/2019 | Thangarathnam et al. |
| 2019/0179890 | A1 | 6/2019 | Evermann |
| 2019/0180770 | A1 | 6/2019 | Kothari et al. |
| 2019/0182176 | A1 | 6/2019 | Niewczas |
| 2019/0187787 | A1 | 6/2019 | White et al. |
| 2019/0188326 | A1 | 6/2019 | Daianu et al. |
| 2019/0188328 | A1 | 6/2019 | Oyenan et al. |
| 2019/0189118 | A1 | 6/2019 | Piernot et al. |
| 2019/0189125 | A1 | 6/2019 | Van Os et al. |
| 2019/0197053 | A1 | 6/2019 | Graham et al. |
| 2019/0213999 | A1 | 7/2019 | Grupen et al. |
| 2019/0214024 | A1 | 7/2019 | Gruber et al. |
| 2019/0220245 | A1 | 7/2019 | Martel et al. |
| 2019/0220246 | A1 | 7/2019 | Orr et al. |
| 2019/0220247 | A1 | 7/2019 | Lemay et al. |
| 2019/0236130 | A1 | 8/2019 | Li et al. |
| 2019/0236459 | A1 | 8/2019 | Cheyer et al. |
| 2019/0244618 | A1 | 8/2019 | Newendorp et al. |
| 2019/0251339 | A1 | 8/2019 | Hawker |
| 2019/0251960 | A1 | 8/2019 | Maker et al. |
| 2019/0259386 | A1 | 8/2019 | Kudurshian et al. |
| 2019/0272825 | A1 | 9/2019 | O'Malley et al. |
| 2019/0272831 | A1 | 9/2019 | Kajarekar |
| 2019/0273963 | A1 | 9/2019 | Jobanputra et al. |
| 2019/0278841 | A1 | 9/2019 | Pusateri et al. |
| 2019/0287522 | A1 | 9/2019 | Lambourne et al. |
| 2019/0295544 | A1 | 9/2019 | Garcia et al. |
| 2019/0303442 | A1 | 10/2019 | Peitz et al. |
| 2019/0310765 | A1 | 10/2019 | Napolitano et al. |
| 2019/0318739 | A1 | 10/2019 | Garg et al. |
| 2019/0339784 | A1 | 11/2019 | Lemay et al. |
| 2019/0341027 | A1 | 11/2019 | Vescovi et al. |
| 2019/0341056 | A1 | 11/2019 | Paulik et al. |
| 2019/0347063 | A1 | 11/2019 | Liu et al. |
| 2019/0348022 | A1 | 11/2019 | Park et al. |
| 2019/0354548 | A1 | 11/2019 | Orr et al. |
| 2019/0355346 | A1 | 11/2019 | Bellegarda |
| 2019/0361729 | A1 | 11/2019 | Gruber et al. |
| 2019/0369748 | A1 | 12/2019 | Hindi et al. |
| 2019/0369842 | A1 | 12/2019 | Dolbakian et al. |
| 2019/0370292 | A1 | 12/2019 | Irani et al. |
| 2019/0370323 | A1 | 12/2019 | Davidson et al. |
| 2019/0371315 | A1 | 12/2019 | Newendorp et al. |
| 2019/0371316 | A1 | 12/2019 | Weinstein et al. |
| 2019/0371317 | A1 | 12/2019 | Irani et al. |
| 2019/0371331 | A1 | 12/2019 | Schramm et al. |
| 2019/0372902 | A1 | 12/2019 | Piersol |
| 2019/0373102 | A1 | 12/2019 | Weinstein et al. |
| 2020/0019609 | A1 | 1/2020 | Yu et al. |
| 2020/0042334 | A1 | 2/2020 | Radebaugh et al. |
| 2020/0043482 | A1 | 2/2020 | Gruber et al. |
| 2020/0043489 | A1 | 2/2020 | Bradley et al. |
| 2020/0044485 | A1 | 2/2020 | Smith et al. |
| 2020/0053218 | A1 | 2/2020 | Gray |

(56) References Cited

U.S. PATENT DOCUMENTS

2020/0058299 A1 2/2020 Lee et al.
2020/0075018 A1 3/2020 Chen
2020/0091958 A1 3/2020 Curtis et al.
2020/0092625 A1 3/2020 Raffle
2020/0098362 A1 3/2020 Piernot et al.
2020/0098368 A1 3/2020 Lemay et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0118568 A1 4/2020 Kudurshian et al.
2020/0125820 A1 4/2020 Kim et al.
2020/0127988 A1 4/2020 Bradley et al.
2020/0135209 A1 4/2020 Delfarah et al.
2020/0137230 A1 4/2020 Spohrer
2020/0143812 A1 5/2020 Walker, II et al.
2020/0159579 A1 5/2020 Shear et al.
2020/0160179 A1 5/2020 Chien et al.
2020/0169637 A1 5/2020 Sanghavi et al.
2020/0175566 A1 6/2020 Bender et al.
2020/0184964 A1 6/2020 Myers et al.
2020/0193997 A1 6/2020 Piernot et al.
2020/0221155 A1 7/2020 Hansen et al.
2020/0227034 A1 7/2020 Summa et al.
2020/0227044 A1 7/2020 Lindahl
2020/0249985 A1 8/2020 Zeitlin
2020/0252508 A1 8/2020 Gray
2020/0267222 A1 8/2020 Phipps et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0302356 A1 9/2020 Gruber et al.
2020/0302919 A1 9/2020 Greborio et al.
2020/0302925 A1 9/2020 Shah et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0312317 A1 10/2020 Kothari et al.
2020/0314191 A1 10/2020 Madhavan et al.
2020/0319850 A1 10/2020 Stasior et al.
2020/0327895 A1 10/2020 Gruber et al.
2020/0356243 A1 11/2020 Meyer et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0365155 A1 11/2020 Milden
2020/0372904 A1 11/2020 Vescovi et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380980 A1 12/2020 Shum et al.
2020/0380985 A1 12/2020 Gada et al.
2020/0382616 A1 12/2020 Vaishampayan et al.
2020/0382635 A1 12/2020 Vora et al.

FOREIGN PATENT DOCUMENTS

AU 2015101171 A4 10/2015
AU 2018100187 A4 3/2018
AU 2017222436 A1 10/2018
CA 2670562 A1 1/2010
CA 2694314 A1 8/2010
CA 2792412 A1 7/2011
CA 2666438 C 6/2013
CH 681573 A5 4/1993
CN 1263385 A 8/2000
CN 1274440 A 11/2000
CN 1321296 A 11/2001
CN 1369858 A 9/2002
CN 1378156 A 11/2002
CN 1383109 A 12/2002
CN 1407795 A 4/2003
CN 1125436 C 10/2003
CN 1471098 A 1/2004
CN 1494695 A 5/2004
CN 1535519 A 10/2004
CN 1640191 A 7/2005
CN 1673939 A 9/2005
CN 1864204 A 11/2006
CN 1898721 A 1/2007
CN 2865153 Y 1/2007
CN 1959628 A 5/2007
CN 1975715 A 6/2007
CN 1995917 A 7/2007
CN 101008942 A 8/2007
CN 101162153 A 4/2008
CN 101179754 A 5/2008
CN 101183525 A 5/2008
CN 101188644 A 5/2008
CN 101228503 A 7/2008
CN 101233741 A 7/2008
CN 101246020 A 8/2008
CN 101271689 A 9/2008
CN 101297541 A 10/2008
CN 101427244 A 5/2009
CN 101535983 A 9/2009
CN 101632316 A 1/2010
CN 101636736 A 1/2010
CN 101667424 A 3/2010
CN 101673544 A 3/2010
CN 101751387 A 6/2010
CN 101833286 A 9/2010
CN 101847405 A 9/2010
CN 101855521 A 10/2010
CN 101894547 A 11/2010
CN 101910960 A 12/2010
CN 101923853 A 12/2010
CN 101930789 A 12/2010
CN 101939740 A 1/2011
CN 101951553 A 1/2011
CN 101958958 A 1/2011
CN 101971250 A 2/2011
CN 101992779 A 3/2011
CN 102056026 A 5/2011
CN 102122506 A 7/2011
CN 102124515 A 7/2011
CN 102137085 A 7/2011
CN 102137193 A 7/2011
CN 102160043 A 8/2011
CN 102201235 A 9/2011
CN 102214187 A 10/2011
CN 102237088 A 11/2011
CN 102246136 A 11/2011
CN 202035047 U 11/2011
CN 102282609 A 12/2011
CN 202092650 U 12/2011
CN 102340590 A 2/2012
CN 102346557 A 2/2012
CN 102368256 A 3/2012
CN 102402985 A 4/2012
CN 102405463 A 4/2012
CN 102498457 A 6/2012
CN 102510426 A 6/2012
CN 102629246 A 8/2012
CN 102651217 A 8/2012
CN 102681896 A 9/2012
CN 102682769 A 9/2012
CN 102682771 A 9/2012
CN 102685295 A 9/2012
CN 102693725 A 9/2012

(56) References Cited

FOREIGN PATENT DOCUMENTS

| | | | |
|---|---|---|---|
| CN | 102694909 | A | 9/2012 |
| CN | 202453859 | U | 9/2012 |
| CN | 102722478 | A | 10/2012 |
| CN | 102737104 | A | 10/2012 |
| CN | 102750087 | A | 10/2012 |
| CN | 102792320 | A | 11/2012 |
| CN | 102801853 | A | 11/2012 |
| CN | 102820033 | A | 12/2012 |
| CN | 102844738 | A | 12/2012 |
| CN | 102866828 | A | 1/2013 |
| CN | 102870065 | A | 1/2013 |
| CN | 102882752 | A | 1/2013 |
| CN | 102917004 | A | 2/2013 |
| CN | 102917271 | A | 2/2013 |
| CN | 102918493 | A | 2/2013 |
| CN | 102955652 | A | 3/2013 |
| CN | 103035240 | A | 4/2013 |
| CN | 103035251 | A | 4/2013 |
| CN | 103038728 | A | 4/2013 |
| CN | 103093334 | A | 5/2013 |
| CN | 103135916 | A | 6/2013 |
| CN | 103198831 | A | 7/2013 |
| CN | 103209369 | A | 7/2013 |
| CN | 103226949 | A | 7/2013 |
| CN | 103236260 | A | 8/2013 |
| CN | 103246638 | A | 8/2013 |
| CN | 103268315 | A | 8/2013 |
| CN | 103280218 | A | 9/2013 |
| CN | 103292437 | A | 9/2013 |
| CN | 103327063 | A | 9/2013 |
| CN | 103365279 | A | 10/2013 |
| CN | 103366741 | A | 10/2013 |
| CN | 103390016 | A | 11/2013 |
| CN | 103412789 | A | 11/2013 |
| CN | 103426428 | A | 12/2013 |
| CN | 103455234 | A | 12/2013 |
| CN | 103456306 | A | 12/2013 |
| CN | 103533143 | A | 1/2014 |
| CN | 103533154 | A | 1/2014 |
| CN | 103543902 | A | 1/2014 |
| CN | 103562863 | A | 2/2014 |
| CN | 103608859 | A | 2/2014 |
| CN | 103620605 | A | 3/2014 |
| CN | 103645876 | A | 3/2014 |
| CN | 103716454 | A | 4/2014 |
| CN | 103727948 | A | 4/2014 |
| CN | 103744761 | A | 4/2014 |
| CN | 103760984 | A | 4/2014 |
| CN | 103765385 | A | 4/2014 |
| CN | 103792985 | A | 5/2014 |
| CN | 103794212 | A | 5/2014 |
| CN | 103795850 | A | 5/2014 |
| CN | 103841268 | A | 6/2014 |
| CN | 103902373 | A | 7/2014 |
| CN | 103930945 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104038621 | A | 9/2014 |
| CN | 104090652 | A | 10/2014 |
| CN | 104113471 | A | 10/2014 |
| CN | 104125322 | A | 10/2014 |
| CN | 104144377 | A | 11/2014 |
| CN | 104169837 | A | 11/2014 |
| CN | 104180815 | A | 12/2014 |
| CN | 104243699 | A | 12/2014 |
| CN | 104281259 | A | 1/2015 |
| CN | 104284257 | A | 1/2015 |
| CN | 104335207 | A | 2/2015 |
| CN | 104335234 | A | 2/2015 |
| CN | 104374399 | A | 2/2015 |
| CN | 104423625 | A | 3/2015 |
| CN | 104427104 | A | 3/2015 |
| CN | 104463552 | A | 3/2015 |
| CN | 104487929 | A | 4/2015 |
| CN | 104516522 | A | 4/2015 |
| CN | 104573472 | A | 4/2015 |
| CN | 104575501 | A | 4/2015 |
| CN | 104584010 | A | 4/2015 |
| CN | 104604274 | A | 5/2015 |
| CN | 104679472 | A | 6/2015 |
| CN | 104769584 | A | 7/2015 |
| CN | 104854583 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105190607 | A | 12/2015 |
| CN | 105247511 | A | 1/2016 |
| CN | 105264524 | A | 1/2016 |
| CN | 105278681 | A | 1/2016 |
| CN | 105320251 | A | 2/2016 |
| CN | 105320726 | A | 2/2016 |
| CN | 105379234 | A | 3/2016 |
| CN | 105430186 | A | 3/2016 |
| CN | 105471705 | A | 4/2016 |
| CN | 105472587 | A | 4/2016 |
| CN | 105556592 | A | 5/2016 |
| CN | 105808200 | A | 7/2016 |
| CN | 105830048 | A | 8/2016 |
| CN | 105869641 | A | 8/2016 |
| CN | 106030699 | A | 10/2016 |
| CN | 106062734 | A | 10/2016 |
| CN | 106415412 | A | 2/2017 |
| CN | 106462383 | A | 2/2017 |
| CN | 106463114 | A | 2/2017 |
| CN | 106465074 | A | 2/2017 |
| CN | 106534469 | A | 3/2017 |
| CN | 106776581 | A | 5/2017 |
| CN | 107450800 | A | 12/2017 |
| CN | 107480161 | A | 12/2017 |
| CN | 107491468 | A | 12/2017 |
| CN | 107545262 | A | 1/2018 |
| CN | 107608998 | A | 1/2018 |
| CN | 107615378 | A | 1/2018 |
| CN | 107919123 | A | 4/2018 |
| CN | 107924313 | A | 4/2018 |
| CN | 107978313 | A | 5/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110531860 | A | 12/2019 |
| CN | 110598671 | A | 12/2019 |
| CN | 110647274 | A | 1/2020 |
| CN | 110825469 | A | 2/2020 |
| DE | 3837590 | A1 | 5/1990 |
| DE | 4126902 | A1 | 2/1992 |
| DE | 4334773 | A1 | 4/1994 |
| DE | 4445023 | A1 | 6/1996 |
| DE | 102004029203 | A1 | 12/2005 |
| DE | 19841541 | B4 | 12/2007 |
| DE | 102008024258 | A1 | 11/2009 |
| DE | 202016008226 | U1 | 5/2017 |
| EP | 30390 | A1 | 6/1981 |
| EP | 57514 | A1 | 8/1982 |
| EP | 59880 | A2 | 9/1982 |
| EP | 138061 | A1 | 4/1985 |
| EP | 140777 | A1 | 5/1985 |
| EP | 218859 | A2 | 4/1987 |
| EP | 262938 | A1 | 4/1988 |
| EP | 138061 | B1 | 6/1988 |
| EP | 283995 | A2 | 9/1988 |
| EP | 293259 | A2 | 11/1988 |
| EP | 299572 | A2 | 1/1989 |
| EP | 313975 | A2 | 5/1989 |
| EP | 314908 | A2 | 5/1989 |
| EP | 327408 | A2 | 8/1989 |

(56) References Cited

FOREIGN PATENT DOCUMENTS

EP 389271 A2 9/1990
EP 411675 A2 2/1991
EP 441089 A2 8/1991
EP 464712 A2 1/1992
EP 476972 A2 3/1992
EP 534410 A2 3/1993
EP 558312 A1 9/1993
EP 559349 A1 9/1993
EP 570660 A1 11/1993
EP 575146 A2 12/1993
EP 578604 A1 1/1994
EP 586996 A2 3/1994
EP 609030 A1 8/1994
EP 651543 A2 5/1995
EP 679005 A1 10/1995
EP 795811 A1 9/1997
EP 476972 B1 5/1998
EP 845894 A2 6/1998
EP 852052 A1 7/1998
EP 863453 A1 9/1998
EP 863469 A2 9/1998
EP 867860 A2 9/1998
EP 869697 A2 10/1998
EP 559349 B1 1/1999
EP 889626 A1 1/1999
EP 917077 A2 5/1999
EP 691023 B1 9/1999
EP 946032 A2 9/1999
EP 981236 A1 2/2000
EP 982732 A1 3/2000
EP 984430 A2 3/2000
EP 1001588 A2 5/2000
EP 1014277 A1 6/2000
EP 1028425 A2 8/2000
EP 1028426 A2 8/2000
EP 1047251 A2 10/2000
EP 1052566 A1 11/2000
EP 1076302 A1 2/2001
EP 1091615 A1 4/2001
EP 1094406 A2 4/2001
EP 1107229 A2 6/2001
EP 1229496 A2 8/2002
EP 1233600 A2 8/2002
EP 1245023 A1 10/2002
EP 1246075 A2 10/2002
EP 1280326 A1 1/2003
EP 1291848 A2 3/2003
EP 1311102 A1 5/2003
EP 1315084 A1 5/2003
EP 1315086 A1 5/2003
EP 1345360 A2 9/2003
EP 1347361 A1 9/2003
EP 1368961 A2 12/2003
EP 1379061 A2 1/2004
EP 1432219 A1 6/2004
EP 1435620 A1 7/2004
EP 1480421 A1 11/2004
EP 1517228 A2 3/2005
EP 1536612 A1 6/2005
EP 1566948 A1 8/2005
EP 1163576 A4 11/2005
EP 1650938 A1 4/2006
EP 1675025 A2 6/2006
EP 1693829 A1 8/2006
EP 1699042 A1 9/2006
EP 1739546 A2 1/2007
EP 1181802 B1 2/2007
EP 1818786 A1 8/2007
EP 1892700 A1 2/2008
EP 1912205 A2 4/2008
EP 1933230 A1 6/2008
EP 1939860 A1 7/2008
EP 651543 B1 9/2008
EP 1909263 B1 1/2009
EP 1335620 B1 3/2009
EP 2069895 A1 6/2009
EP 2094032 A1 8/2009
EP 2107553 A1 10/2009
EP 2109295 A1 10/2009
EP 2144226 A1 1/2010
EP 2168399 A1 3/2010
EP 1720375 B1 7/2010
EP 2205010 A1 7/2010
EP 2250640 A1 11/2010
EP 2309491 A1 4/2011
EP 2329348 A1 6/2011
EP 2339576 A2 6/2011
EP 2355093 A2 8/2011
EP 2393056 A1 12/2011
EP 2400373 A1 12/2011
EP 2431842 A2 3/2012
EP 2523109 A1 11/2012
EP 2523188 A1 11/2012
EP 2551784 A1 1/2013
EP 2555536 A1 2/2013
EP 2575128 A2 4/2013
EP 2632129 A1 8/2013
EP 2639792 A1 9/2013
EP 2669889 A2 12/2013
EP 2672229 A2 12/2013
EP 2672231 A2 12/2013
EP 2675147 A1 12/2013
EP 2680257 A1 1/2014
EP 2683147 A1 1/2014
EP 2683175 A1 1/2014
EP 2717259 A2 4/2014
EP 2725577 A2 4/2014
EP 2733598 A2 5/2014
EP 2733896 A1 5/2014
EP 2743846 A2 6/2014
EP 2760015 A1 7/2014
EP 2781883 A2 9/2014
EP 2801890 A1 11/2014
EP 2801972 A1 11/2014
EP 2801974 A2 11/2014
EP 2824564 A1 1/2015
EP 2849177 A1 3/2015
EP 2879402 A1 6/2015
EP 2881939 A1 6/2015
EP 2891049 A1 7/2015
EP 2930715 A1 10/2015
EP 2938022 A1 10/2015
EP 2940556 A1 11/2015
EP 2947859 A1 11/2015
EP 2950307 A1 12/2015
EP 2957986 A1 12/2015
EP 2985984 A2 2/2016
EP 2891049 A4 3/2016
EP 3032532 A1 6/2016
EP 3035329 A1 6/2016
EP 3038333 A1 6/2016
EP 3115905 A1 1/2017
EP 3125097 A2 2/2017
EP 3224708 A1 10/2017
EP 3246916 A1 11/2017
EP 3300074 A1 3/2018
EP 2983065 B1 8/2018
EP 3392876 A1 10/2018
EP 3401773 A1 11/2018
EP 3506151 A1 7/2019
FR 2911201 A1 7/2008
GB 2293667 A 4/1996
GB 2310559 A 8/1997
GB 2323694 A 9/1998
GB 2342802 A 4/2000
GB 2343285 A 5/2000
GB 2346500 A 8/2000
GB 2352377 A 1/2001
GB 2367399 A 4/2002
GB 2384399 A 7/2003
GB 2402855 A 12/2004
GB 2445436 A 7/2008
GB 2445667 A 7/2008
GB 2470585 A1 12/2010

(56) References Cited

FOREIGN PATENT DOCUMENTS

| | | | |
|---|---|---|---|
| IT | FI20010199 | A1 | 4/2003 |
| JP | 55-80084 | A | 6/1980 |
| JP | 57-41731 | A | 3/1982 |
| JP | 59-57336 | A | 4/1984 |
| JP | 62-153326 | A | 7/1987 |
| JP | 1-500631 | A | 3/1989 |
| JP | 1-254742 | A | 10/1989 |
| JP | 2-86397 | A | 3/1990 |
| JP | 2-153415 | A | 6/1990 |
| JP | 3-113578 | A | 5/1991 |
| JP | 4-236624 | A | 8/1992 |
| JP | 5-79951 | A | 3/1993 |
| JP | 5-165459 | A | 7/1993 |
| JP | 5-293126 | A | 11/1993 |
| JP | 6-19965 | A | 1/1994 |
| JP | 6-69954 | A | 3/1994 |
| JP | 6-274586 | A | 9/1994 |
| JP | 6-332617 | A | 12/1994 |
| JP | 7-199379 | A | 8/1995 |
| JP | 7-219961 | A | 8/1995 |
| JP | 7-320051 | A | 12/1995 |
| JP | 7-320079 | A | 12/1995 |
| JP | 8-63330 | A | 3/1996 |
| JP | 8-185265 | A | 7/1996 |
| JP | 8-223281 | A | 8/1996 |
| JP | 8-227341 | A | 9/1996 |
| JP | 9-18585 | A | 1/1997 |
| JP | 9-27000 | A | 1/1997 |
| JP | 9-55792 | A | 2/1997 |
| JP | 9-259063 | A | 10/1997 |
| JP | 9-265457 | A | 10/1997 |
| JP | 10-31497 | A | 2/1998 |
| JP | 10-69578 | A | 3/1998 |
| JP | 10-78952 | A | 3/1998 |
| JP | 10-105324 | A | 4/1998 |
| JP | 10-274997 | A | 10/1998 |
| JP | 10-320169 | A | 12/1998 |
| JP | 11-06743 | A | 1/1999 |
| JP | 11-45241 | A | 2/1999 |
| JP | 11-136278 | A | 5/1999 |
| JP | 11-231886 | A | 8/1999 |
| JP | 11-265400 | A | 9/1999 |
| JP | 2000-32140 | A | 1/2000 |
| JP | 2000-90119 | A | 3/2000 |
| JP | 2000-99225 | A | 4/2000 |
| JP | 2000-134407 | A | 5/2000 |
| JP | 2000-163031 | A | 6/2000 |
| JP | 2000-207167 | A | 7/2000 |
| JP | 2000-216910 | A | 8/2000 |
| JP | 2000-224663 | A | 8/2000 |
| JP | 2000-272349 | A | 10/2000 |
| JP | 2000-276471 | A | 10/2000 |
| JP | 2000-331004 | A | 11/2000 |
| JP | 2000-339137 | A | 12/2000 |
| JP | 2000-352988 | A | 12/2000 |
| JP | 2000-352989 | A | 12/2000 |
| JP | 2001-13978 | A | 1/2001 |
| JP | 2001-14319 | A | 1/2001 |
| JP | 2001-22498 | A | 1/2001 |
| JP | 2001-34289 | A | 2/2001 |
| JP | 2001-34290 | A | 2/2001 |
| JP | 2001-56233 | A | 2/2001 |
| JP | 2001-109493 | A | 4/2001 |
| JP | 2001-125896 | A | 5/2001 |
| JP | 2001-148899 | A | 5/2001 |
| JP | 2001-273283 | A | 10/2001 |
| JP | 2001-282813 | A | 10/2001 |
| JP | 2001-296880 | A | 10/2001 |
| JP | 2002-14954 | A | 1/2002 |
| JP | 2002-24212 | A | 1/2002 |
| JP | 2002-30676 | A | 1/2002 |
| JP | 2002-41276 | A | 2/2002 |
| JP | 2002-41624 | A | 2/2002 |
| JP | 2002-82748 | A | 3/2002 |
| JP | 2002-82893 | A | 3/2002 |
| JP | 2002-123295 | A | 4/2002 |
| JP | 2002-132804 | A | 5/2002 |
| JP | 2002-169588 | A | 6/2002 |
| JP | 2002-230021 | A | 8/2002 |
| JP | 2002-524806 | A | 8/2002 |
| JP | 2002-281562 | A | 9/2002 |
| JP | 2002-534716 | A | 10/2002 |
| JP | 2002-342033 | A | 11/2002 |
| JP | 2002-342212 | A | 11/2002 |
| JP | 2002-344880 | A | 11/2002 |
| JP | 2002-542501 | A | 12/2002 |
| JP | 2003-15682 | A | 1/2003 |
| JP | 2003-44091 | A | 2/2003 |
| JP | 2003-84877 | A | 3/2003 |
| JP | 2003-517158 | A | 5/2003 |
| JP | 2003-202897 | A | 7/2003 |
| JP | 2003-233568 | A | 8/2003 |
| JP | 2003-244317 | A | 8/2003 |
| JP | 2003-527656 | A | 9/2003 |
| JP | 2003-288356 | A | 10/2003 |
| JP | 2003-308079 | A | 10/2003 |
| JP | 2003-533909 | A | 11/2003 |
| JP | 2004-48804 | A | 2/2004 |
| JP | 2004-54080 | A | 2/2004 |
| JP | 2004-505322 | A | 2/2004 |
| JP | 2004-505525 | A | 2/2004 |
| JP | 2004-86356 | A | 3/2004 |
| JP | 2004-94936 | A | 3/2004 |
| JP | 2004-117905 | A | 4/2004 |
| JP | 2004-152063 | A | 5/2004 |
| JP | 2004-523004 | A | 7/2004 |
| JP | 2004-295837 | A | 10/2004 |
| JP | 2004-534268 | A | 11/2004 |
| JP | 2004-347786 | A | 12/2004 |
| JP | 2005-55782 | A | 3/2005 |
| JP | 2005-63257 | A | 3/2005 |
| JP | 2005-70645 | A | 3/2005 |
| JP | 2005-80094 | A | 3/2005 |
| JP | 2005-86624 | A | 3/2005 |
| JP | 2005-506602 | A | 3/2005 |
| JP | 2005-92441 | A | 4/2005 |
| JP | 2005-149481 | A | 6/2005 |
| JP | 2005-181386 | A | 7/2005 |
| JP | 2005-189454 | A | 7/2005 |
| JP | 2005-221678 | A | 8/2005 |
| JP | 2005-283843 | A | 10/2005 |
| JP | 2005-311864 | A | 11/2005 |
| JP | 2005-332212 | A | 12/2005 |
| JP | 2006-4274 | A | 1/2006 |
| JP | 2006-23860 | A | 1/2006 |
| JP | 2006-30447 | A | 2/2006 |
| JP | 2006-31092 | A | 2/2006 |
| JP | 2006-59094 | A | 3/2006 |
| JP | 2006-80617 | A | 3/2006 |
| JP | 2006-107438 | A | 4/2006 |
| JP | 2006-146008 | A | 6/2006 |
| JP | 2006-146182 | A | 6/2006 |
| JP | 2006-155368 | A | 6/2006 |
| JP | 2006-189394 | A | 7/2006 |
| JP | 2006-195637 | A | 7/2006 |
| JP | 2006-201870 | A | 8/2006 |
| JP | 2006-208696 | A | 8/2006 |
| JP | 2006-244296 | A | 9/2006 |
| JP | 2006-267328 | A1 | 10/2006 |
| JP | 2006-302091 | A | 11/2006 |
| JP | 2006-526185 | A | 11/2006 |
| JP | 2007-4633 | A | 1/2007 |
| JP | 2007-17990 | A | 1/2007 |
| JP | 2007-500903 | A | 1/2007 |
| JP | 2007-53796 | A | 3/2007 |
| JP | 2007-79690 | A | 3/2007 |
| JP | 2007-171534 | A | 7/2007 |
| JP | 2007-193794 | A | 8/2007 |
| JP | 2007-206317 | A | 8/2007 |
| JP | 2007-264471 | A | 10/2007 |
| JP | 2007-264792 | A | 10/2007 |
| JP | 2007-264892 | A | 10/2007 |
| JP | 2007-299352 | A | 11/2007 |
| JP | 2007-325089 | A | 12/2007 |

(56) References Cited

FOREIGN PATENT DOCUMENTS

| | | | |
|---|---|---|---|
| JP | 2008-21002 | A | 1/2008 |
| JP | 2008-26381 | A | 2/2008 |
| JP | 2008-39928 | A | 2/2008 |
| JP | 2008-58813 | A | 3/2008 |
| JP | 2008-90545 | A | 4/2008 |
| JP | 2008-97003 | A | 4/2008 |
| JP | 2008-134949 | A | 6/2008 |
| JP | 2008-526101 | A | 7/2008 |
| JP | 2008-185693 | A | 8/2008 |
| JP | 2008-198022 | A | 8/2008 |
| JP | 2008-217468 | A | 9/2008 |
| JP | 2008-228129 | A | 9/2008 |
| JP | 2008-233678 | A | 10/2008 |
| JP | 2008-236448 | A | 10/2008 |
| JP | 2008-252161 | A | 10/2008 |
| JP | 2008-268684 | A | 11/2008 |
| JP | 2008-271481 | A | 11/2008 |
| JP | 2009-503623 | A | 1/2009 |
| JP | 2009-36999 | A | 2/2009 |
| JP | 2009-47920 | A | 3/2009 |
| JP | 2009-98490 | A | 5/2009 |
| JP | 2009-140444 | A | 6/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-294913 | A | 12/2009 |
| JP | 2009-294946 | A | 12/2009 |
| JP | 2010-66519 | A | 3/2010 |
| JP | 2010-78602 | A | 4/2010 |
| JP | 2010-78979 | A | 4/2010 |
| JP | 2010-108378 | A | 5/2010 |
| JP | 2010-109789 | A | 5/2010 |
| JP | 2010-518475 | A | 5/2010 |
| JP | 2010-518526 | A | 5/2010 |
| JP | 2010-122928 | A | 6/2010 |
| JP | 2010-135976 | A | 6/2010 |
| JP | 2010-146347 | A | 7/2010 |
| JP | 2010-157207 | A | 7/2010 |
| JP | 2010-166478 | A | 7/2010 |
| JP | 2010-205111 | A | 9/2010 |
| JP | 2010-224236 | A | 10/2010 |
| JP | 2010-236858 | A | 10/2010 |
| JP | 4563106 | B2 | 10/2010 |
| JP | 2010-256392 | A | 11/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-237621 | A | 11/2011 |
| JP | 2011-238022 | A | 11/2011 |
| JP | 2011-250027 | A | 12/2011 |
| JP | 2012-14394 | A | 1/2012 |
| JP | 2012-502377 | A | 1/2012 |
| JP | 2012-22478 | A | 2/2012 |
| JP | 2012-33997 | A | 2/2012 |
| JP | 2012-37619 | A | 2/2012 |
| JP | 2012-63536 | A | 3/2012 |
| JP | 2012-508530 | A | 4/2012 |
| JP | 2012-89020 | A | 5/2012 |
| JP | 2012-116442 | A | 6/2012 |
| JP | 2012-142744 | A | 7/2012 |
| JP | 2012-147063 | A | 8/2012 |
| JP | 2012-150804 | A | 8/2012 |
| JP | 2012-518847 | A | 8/2012 |
| JP | 2012-211932 | A | 11/2012 |
| JP | 2013-37688 | A | 2/2013 |
| JP | 2013-46171 | A | 3/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-80476 | A | 5/2013 |
| JP | 2013-517566 | A | 5/2013 |
| JP | 2013-134430 | A | 7/2013 |
| JP | 2013-134729 | A | 7/2013 |
| JP | 2013-140520 | A | 7/2013 |
| JP | 2013-527947 | A | 7/2013 |
| JP | 2013-528012 | A | 7/2013 |
| JP | 2013-148419 | A | 8/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2013-258600 | A | 12/2013 |
| JP | 2014-2586 | A | 1/2014 |
| JP | 2014-10688 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-077969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-191272 | A | 10/2014 |
| JP | 2014-219614 | A | 11/2014 |
| JP | 2014-222514 | A | 11/2014 |
| JP | 2015-4928 | A | 1/2015 |
| JP | 2015-8001 | A | 1/2015 |
| JP | 2015-12301 | A | 1/2015 |
| JP | 2015-18365 | A | 1/2015 |
| JP | 2015-501022 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-94848 | A | 5/2015 |
| JP | 2015-514254 | A | 5/2015 |
| JP | 2015-519675 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2016-504651 | A | 2/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-536648 | A | 11/2016 |
| JP | 2017-19331 | A | 1/2017 |
| JP | 2017-537361 | A | 12/2017 |
| JP | 6291147 | B1 | 2/2018 |
| JP | 2018-525950 | A | 9/2018 |
| KR | 10-1999-0073234 | A | 10/1999 |
| KR | 2001-0093654 | A | 10/2001 |
| KR | 10-2001-0102132 | A | 11/2001 |
| KR | 2002-0013984 | A | 2/2002 |
| KR | 2002-0057262 | A | 7/2002 |
| KR | 2002-0064149 | A | 8/2002 |
| KR | 2002-0069952 | A | 9/2002 |
| KR | 2003-0016993 | A | 3/2003 |
| KR | 10-2004-0014835 | A | 2/2004 |
| KR | 10-2004-0044632 | A | 5/2004 |
| KR | 10-2005-0083561 | A | 8/2005 |
| KR | 10-2005-0090568 | A | 9/2005 |

(56) References Cited

FOREIGN PATENT DOCUMENTS

| | | | |
|---|---|---|---|
| KR | 10-2006-0011603 | A | 2/2006 |
| KR | 10-2006-0012730 | A | 2/2006 |
| KR | 10-2006-0055313 | A | 5/2006 |
| KR | 10-2006-0073574 | A | 6/2006 |
| KR | 10-2006-0091469 | A | 8/2006 |
| KR | 10-2007-0024262 | A | 3/2007 |
| KR | 10-2007-0071675 | A | 7/2007 |
| KR | 10-2007-0094767 | A | 9/2007 |
| KR | 10-0757496 | B1 | 9/2007 |
| KR | 10-2007-0100837 | A | 10/2007 |
| KR | 10-0776800 | B1 | 11/2007 |
| KR | 10-0801227 | B1 | 2/2008 |
| KR | 10-0810500 | B1 | 3/2008 |
| KR | 10-2008-0033070 | A | 4/2008 |
| KR | 10-0819928 | B1 | 4/2008 |
| KR | 10-2008-0049647 | A | 6/2008 |
| KR | 10-2008-0059332 | A | 6/2008 |
| KR | 10-2008-0109322 | A | 12/2008 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0005937 | A | 1/2011 |
| KR | 10-2011-0013625 | A | 2/2011 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-2012-0066523 | A | 6/2012 |
| KR | 10-2012-0082371 | A | 7/2012 |
| KR | 10-2012-0084472 | A | 7/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0024271 | A | 2/2014 |
| KR | 10-2014-0031283 | A | 3/2014 |
| KR | 10-2014-0033574 | A | 3/2014 |
| KR | 10-2014-0055204 | A | 5/2014 |
| KR | 10-2014-0068752 | A | 6/2014 |
| KR | 10-2014-0088449 | A | 7/2014 |
| KR | 10-2014-0106715 | A | 9/2014 |
| KR | 10-2014-0147557 | A | 12/2014 |
| KR | 10-2015-0013631 | A | 2/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-2015-0095624 | A | 8/2015 |
| KR | 10-1555742 | B1 | 9/2015 |

| | | | |
|---|---|---|---|
| KR | 10-2015-0113127 | A | 10/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101198 | A | 8/2016 |
| KR | 10-2016-0140694 | A | 12/2016 |
| KR | 10-2017-0036805 | A | 4/2017 |
| KR | 10-2017-0107058 | A | 9/2017 |
| NL | 1014847 | C | 10/2001 |
| RU | 2273106 | C2 | 3/2006 |
| RU | 2349970 | C2 | 3/2009 |
| RU | 2353068 | C2 | 4/2009 |
| RU | 2364917 | C2 | 8/2009 |
| TW | 468323 | B | 12/2001 |
| TW | 200601264 | A | 1/2006 |
| TW | 200638337 | A | 11/2006 |
| TW | 200643744 | A | 12/2006 |
| TW | 200801988 | A | 1/2008 |
| TW | I301373 | B | 9/2008 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 201142823 | A1 | 12/2011 |
| TW | 201227715 | A1 | 7/2012 |
| TW | 201245989 | A1 | 11/2012 |
| TW | 201312548 | A1 | 3/2013 |
| WO | 1993/020640 | A1 | 10/1993 |
| WO | 1994/016434 | A1 | 7/1994 |
| WO | 1994/029788 | A1 | 12/1994 |
| WO | 1995/002221 | A1 | 1/1995 |
| WO | 1995/016950 | A1 | 6/1995 |
| WO | 1995/017746 | A1 | 6/1995 |
| WO | 1997/010586 | A1 | 3/1997 |
| WO | 1997/026612 | A1 | 7/1997 |
| WO | 1997/029614 | A1 | 8/1997 |
| WO | 1997/038488 | A1 | 10/1997 |
| WO | 1997/049044 | A1 | 12/1997 |
| WO | 1998/009270 | A1 | 3/1998 |
| WO | 1998/033111 | A1 | 7/1998 |
| WO | 1998/041956 | A1 | 9/1998 |
| WO | 1999/001834 | A1 | 1/1999 |
| WO | 1999/008238 | A1 | 2/1999 |
| WO | 1999/016181 | A1 | 4/1999 |
| WO | 1999/056227 | A1 | 11/1999 |
| WO | 2000/014727 | A1 | 3/2000 |
| WO | 2000/014728 | A1 | 3/2000 |
| WO | 2000/019697 | A1 | 4/2000 |
| WO | 2000/022820 | A1 | 4/2000 |
| WO | 2000/029964 | A1 | 5/2000 |
| WO | 2000/030070 | A2 | 5/2000 |
| WO | 2000/038041 | A1 | 6/2000 |
| WO | 2000/041065 | A1 | 7/2000 |
| WO | 2000/044173 | A1 | 7/2000 |
| WO | 2000/060435 | A2 | 10/2000 |
| WO | 2000/063766 | A1 | 10/2000 |
| WO | 2000/068936 | A1 | 11/2000 |
| WO | 2001/006489 | A1 | 1/2001 |
| WO | 2001/030046 | A2 | 4/2001 |
| WO | 2001/030047 | A2 | 4/2001 |
| WO | 2001/033569 | A1 | 5/2001 |
| WO | 2001/035391 | A1 | 5/2001 |
| WO | 2001/044912 | A2 | 6/2001 |
| WO | 2001/046946 | A1 | 6/2001 |
| WO | 2001/065413 | A1 | 9/2001 |
| WO | 2001/067753 | A1 | 9/2001 |
| WO | 2001/071480 | A2 | 9/2001 |
| WO | 2002/010900 | A2 | 2/2002 |
| WO | 2002/025610 | A1 | 3/2002 |
| WO | 2002/031814 | A1 | 4/2002 |
| WO | 2002/037469 | A2 | 5/2002 |
| WO | 2002/049253 | A2 | 6/2002 |
| WO | 2002/071259 | A1 | 9/2002 |
| WO | 2002/073603 | A1 | 9/2002 |

(56) References Cited

FOREIGN PATENT DOCUMENTS

| | | | |
|---|---|---|---|
| WO | 2003/003152 | A2 | 1/2003 |
| WO | 2003/003765 | A1 | 1/2003 |
| WO | 2003/023786 | A2 | 3/2003 |
| WO | 2003/036457 | A2 | 5/2003 |
| WO | 2003/041364 | A2 | 5/2003 |
| WO | 2003/049494 | A1 | 6/2003 |
| WO | 2003/056789 | A1 | 7/2003 |
| WO | 2003/067202 | A2 | 8/2003 |
| WO | 2003/084196 | A1 | 10/2003 |
| WO | 2003/094489 | A1 | 11/2003 |
| WO | 2003/105125 | A1 | 12/2003 |
| WO | 2003/107179 | A1 | 12/2003 |
| WO | 2004/008801 | A1 | 1/2004 |
| WO | 2004/025938 | A1 | 3/2004 |
| WO | 2004/047415 | A1 | 6/2004 |
| WO | 2004/055637 | A2 | 7/2004 |
| WO | 2004/057486 | A1 | 7/2004 |
| WO | 2004/061850 | A1 | 7/2004 |
| WO | 2004/084413 | A2 | 9/2004 |
| WO | 2005/003920 | A2 | 1/2005 |
| WO | 2005/008505 | A1 | 1/2005 |
| WO | 2005/008899 | A1 | 1/2005 |
| WO | 2005/010725 | A2 | 2/2005 |
| WO | 2005/027472 | A2 | 3/2005 |
| WO | 2005/027485 | A1 | 3/2005 |
| WO | 2005/031737 | A1 | 4/2005 |
| WO | 2005/034082 | A1 | 4/2005 |
| WO | 2005/034085 | A1 | 4/2005 |
| WO | 2005/041455 | A1 | 5/2005 |
| WO | 2005/059895 | A1 | 6/2005 |
| WO | 2005/064592 | A1 | 7/2005 |
| WO | 2005/069171 | A1 | 7/2005 |
| WO | 2005/101176 | A2 | 10/2005 |
| WO | 2006/020305 | A2 | 2/2006 |
| WO | 2006/037545 | A2 | 4/2006 |
| WO | 2006/054724 | A1 | 5/2006 |
| WO | 2006/056822 | A1 | 6/2006 |
| WO | 2006/078246 | A1 | 7/2006 |
| WO | 2006/084144 | A2 | 8/2006 |
| WO | 2006/101649 | A2 | 9/2006 |
| WO | 2006/129967 | A1 | 12/2006 |
| WO | 2006/133571 | A1 | 12/2006 |
| WO | 2007/002753 | A2 | 1/2007 |
| WO | 2007/036762 | A1 | 4/2007 |
| WO | 2007/080559 | A2 | 7/2007 |
| WO | 2007/083894 | A1 | 7/2007 |
| WO | 2008/030970 | A2 | 3/2008 |
| WO | 2008/071231 | A1 | 6/2008 |
| WO | 2008/085742 | A2 | 7/2008 |
| WO | 2008/098900 | A2 | 8/2008 |
| WO | 2008/120036 | A1 | 10/2008 |
| WO | 2008/130095 | A1 | 10/2008 |
| WO | 2008/140236 | A1 | 11/2008 |
| WO | 2008/142472 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/013369 | A1 | 2/2010 |
| WO | 2010/054373 | A2 | 5/2010 |
| WO | 2010/075623 | A1 | 7/2010 |
| WO | 2010/100937 | A1 | 9/2010 |
| WO | 2010/141802 | A1 | 12/2010 |
| WO | 2010/144651 | A2 | 12/2010 |
| WO | 2011/028842 | A2 | 3/2011 |
| WO | 2011/057346 | A1 | 5/2011 |
| WO | 2011/060106 | A1 | 5/2011 |
| WO | 2011/082521 | A1 | 7/2011 |
| WO | 2011/088053 | A2 | 7/2011 |
| WO | 2011/093025 | A1 | 8/2011 |
| WO | 2011/100142 | A2 | 8/2011 |
| WO | 2011/116309 | A1 | 9/2011 |
| WO | 2011/123122 | A1 | 10/2011 |
| WO | 2011/133543 | A1 | 10/2011 |
| WO | 2011/133573 | A2 | 10/2011 |
| WO | 2011/097309 | A3 | 12/2011 |
| WO | 2011/150730 | A1 | 12/2011 |
| WO | 2011/163350 | A1 | 12/2011 |
| WO | 2011/088053 | A3 | 1/2012 |
| WO | 2012/008434 | A1 | 1/2012 |
| WO | 2012/019020 | A1 | 2/2012 |
| WO | 2012/019637 | A1 | 2/2012 |
| WO | 2012/063260 | A2 | 5/2012 |
| WO | 2012/092562 | A1 | 7/2012 |
| WO | 2012/112331 | A2 | 8/2012 |
| WO | 2012/129231 | A1 | 9/2012 |
| WO | 2012/063260 | A3 | 10/2012 |
| WO | 2012/135157 | A2 | 10/2012 |
| WO | 2012/154317 | A1 | 11/2012 |
| WO | 2012/154748 | A1 | 11/2012 |
| WO | 2012/155079 | A2 | 11/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/122310 | A1 | 8/2013 |
| WO | 2013/137660 | A1 | 9/2013 |
| WO | 2013/163113 | A1 | 10/2013 |
| WO | 2013/163857 | A1 | 11/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/004544 | A2 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/047047 | A1 | 3/2014 |
| WO | 2014/066352 | A1 | 5/2014 |
| WO | 2014/070872 | A2 | 5/2014 |
| WO | 2014/078965 | A1 | 5/2014 |
| WO | 2014/093339 | A1 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2013/173504 | A8 | 12/2014 |
| WO | 2014/197336 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/204659 | A2 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/041882 | A1 | 3/2015 |
| WO | 2015/041892 | A1 | 3/2015 |

(56) References Cited

FOREIGN PATENT DOCUMENTS

| | | | |
|---|---|---|---|
| WO | 2015/047932 | A1 | 4/2015 |
| WO | 2015/053485 | A1 | 4/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/116151 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/209444 | A1 | 12/2016 |
| WO | 2016/209924 | A1 | 12/2016 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/059388 | A1 | 4/2017 |
| WO | 2017/071420 | A1 | 5/2017 |
| WO | 2017/142116 | A1 | 8/2017 |
| WO | 2017/160487 | A1 | 9/2017 |
| WO | 2017/213682 | A1 | 12/2017 |
| WO | 2018/009397 | A1 | 1/2018 |
| WO | 2018/213401 | A1 | 11/2018 |
| WO | 2018/213415 | A1 | 11/2018 |
| WO | 2019/067930 | A1 | 4/2019 |
| WO | 2019/078576 | A1 | 4/2019 |
| WO | 2019/079017 | A1 | 4/2019 |
| WO | 2019/147429 | A1 | 8/2019 |
| WO | 2019/236217 | A1 | 12/2019 |
| WO | 2020/010530 | A1 | 1/2020 |

OTHER PUBLICATIONS

2004 Chrysler Pacifica: U-Connect Hands-Free Communication System, The Best and Brightest of 2004, Brief Article, Automotive Industries, Sep. 2003, 1 page.

2007 Lexus GS 450h 4dr Sedan (3.5L 6cyl Gas/Electric Hybrid CVT), available at <http://review.cnet.com/4505-10865_16-31833144.html>, retrieved on Aug. 3, 2006, 10 pages.

Abcom Pty. Ltd. "12.1" 925 Candela Mobile PC, LCDHardware.com, available at <http://www.lcdhardware.com/panel/12_1_panel/default.asp.>, retrieved on Dec. 19, 2002, 2 pages.

ABF Software, "Lens—Magnifying Glass 1.5", available at <http://download.com/3000-2437-10262078.html?tag=1st-0-1>, retrieved on Feb. 11, 2004, 1 page.

Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.

Abut et al., "Vector Quantization Of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.

Acero et al., "Environmental Robustness in Automatic Speech Recognition", International Conference on Acoustics, Speech and Signal Processing (ICASSP'90), Apr. 1990, 4 pages.

Acero et al., "Robust Speech Recognition by Normalization of the Acoustic Space", International Conference on Acoustics, Speech and Signal Processing, 1991, 4 pages.

Adium, "AboutAdium—Adium X—Trac", available at <http://web.archive.org/web/20070819113247/http://trac.adiumx.com/wiki/AboutAdium>, retrieved on Nov. 25, 2011, 2 pages.

adobe.com, "Reading PDF Documents with Adobe Reader 6.0—A Guide for People with Disabilities", Available online at "https://www.adobe.com/enterprise/accessibility/pdfs/acro6_cg_ue.pdf", Jan. 2004, 76 pages.

Advisory Action received for U.S. Appl. No. 15/151,191, dated Jun. 21, 2019, 5 pages.

Agnas et al., "Spoken Language Translator: First-Year Report", SICS (ISSN 0283-3638), SRI and Telia Research AB, Jan. 1994, 161 pages.

Ahlberg et al., "The Alphaslider: A Compact and Rapid Selector", CHI '94 Proceedings of the SIGCHI Conference on Human Factors in Computing Systems, Apr. 1994, pp. 365-371.

Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.

Ahlbom et al., Modeling Spectral Speech Transitions Using Temporal Decomposition Techniques, IEEE International Conference of Acoustics, Speech and Signal Processing (ICASSP'87), vol. 12, Apr. 1987, 4 pages.

Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.

Ahmed et al., "Intelligent Natural Language Query Processor", TENCON '89, Fourth IEEE Region 10 International Conference, Nov. 22-24, 1989, pp. 47-49.

Ahuja et al., "A Comparison Of Application Sharing Mechanisms In Real-Time Desktop Conferencing Systems", At&T Bell Laboratories, 1990, pp. 238-248.

Aikawa et al., "Generation for Multilingual MT", available at <http://mtarchive.info/MTS-2001-Aikawa.pdf>, retrieved on Sep. 18, 2001, 6 pages.

Aikawa et al., "Speech Recognition Using Time-Warping Neural Networks", Proceedings of the 1991, IEEE Workshop on Neural Networks for Signal Processing, 1991, 10 pages.

Aikawa, K. "Time-Warping Neural Network for Phoneme Recognition", IEEE International Joint Conference on Neural Networks, vol. 3, Nov. 18-21, 1991, pp. 2122-2127.

Alfred App, "Alfred", available at <http://www.alfredapp.com/>, retrieved on Feb. 8, 2012, 5 pages.

All Music Website, available at <http://www.allmusic.com/>, retrieved on Mar. 19, 2007, 2 pages.

Allen et al., "Automated Natural Spoken Dialog", Computer, vol. 35, No. 4, Apr. 2002, pp. 51-56.

Allen, J., "Natural Language Understanding", 2nd Edition, The Benjamin/Cummings Publishing Company, Inc., 1995, 671 pages.

Alleva et al., "Applying SPHINX-II to DARPA Wall Street Journal CSR Task", Proceedings of Speech and Natural Language Workshop, Feb. 1992, pp. 393-398.

Alshawi et al., "CLARE: A Contextual Reasoning and Co-operative Response Framework for the Core Language Engine", SRI International, Cambridge Computer Science Research Centre, Cambridge, Dec. 1992, 273 pages.

Alshawi et al., "Declarative Derivation of Database Queries from Meaning Representations", Proceedings of the BANKAI Workshop on Intelligent Information Access, Oct. 1991, 12 pages.

Alshawi et al., "Logical Forms in the Core Language Engine", Proceedings of the 27th Annual Meeting of the Association for Computational Linguistics, 1989, pp. 25-32.

(56) References Cited

OTHER PUBLICATIONS

Alshawi et al., "Overview of the Core Language Engine", Proceedings of Future Generation Computing Systems, Tokyo, Sep. 1988, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Amano et al., "A User-friendly Multimedia Book Authoring System", The Institute of Electronics, Information and Communication Engineers Technical Report, vol. 103, No. 416, Nov. 2003, pp. 33-40.
Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, Databases and Applications of Semantics (ODBASE), 2005, 18 pages.
Amrel Corporation, "Rocky Matrix BackLit Keyboard", available at <http://www.amrel.com/asi_matrixkeyboard.html>, retrieved on Dec. 19, 2002, 1 page.
Anastasakos et al., "Duration Modeling in Large Vocabulary Speech Recognition", International Conference on Acoustics, Speech and Signal Processing (ICASSP'95), May 1995, pp. 628-631.
Anderson et al., "Syntax-Directed Recognition of Hand-Printed Two-Dimensional Mathematics", Proceedings of Symposium on Interactive Systems for Experimental Applied Mathematics: Proceedings of the Association for Computing Machinery Inc. Symposium, 1967, 12 pages.
Anhui USTC IFL Ytek Co. Ltd., "Flytek Research Center Information Datasheet", available at <http://www.iflttek.com/english/Research.htm>, retrieved on Oct. 15, 2004, 3 pages.
Ansari et al., "Pitch Modification of Speech using a Low-Sensitivity Inverse Filter Approach", IEEE Signal Processing Letters, vol. 5, No. 3, Mar. 1998, pp. 60-62.
Anthony et al., "Supervised Adaption for Signature Verification System", IBM Technical Disclosure, Jun. 1, 1978, 3 pages.
Api.Ai, "Android App Review—Speaktoit Assistant", Available at <https://www.youtube.com/watch?v=myE498nyfGw>, Mar. 30, 2011, 3 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Apple Computer, "Guide Maker User's Guide", Apple Computer, Inc., Apr. 27, 1994, 8 pages.
Apple Computer, "Introduction to Apple Guide", Apple Computer, Inc., Apr. 28, 1994, 20 pages.
Apple Computer, "Knowledge Navigator", published by Apple Computer no later than 2008, as depicted in Exemplary Screenshots from video entitled 'Knowledge Navigator', 2008, 7 pages.
Apple Computer, Inc., "Apple—iPod—Technical Specifications, iPod 20GB and 60GB Mac + PC", available at <http://www.apple.com/ipod/color/specs.html>, 2005, 3 pages.
Apple Computer, Inc., "Apple Announces iTunes 2", Press Release, Oct. 23, 2001, 2 pages.
Apple Computer, Inc., "Apple Introduces iTunes—World's Best and Easiest to Use Jukebox Software", Macworld Expo, Jan. 9, 2001, 2 pages.
Apple Computer, Inc., "Apple's iPod Available in Stores Tomorrow", Press Release, Nov. 9, 2001, 1 page.
Apple Computer, Inc., "Inside Macintosh", vol. VI, 1985.
Apple Computer, Inc., "iTunes 2, Playlist Related Help Screens", iTunes v2.0, 2000-2001, 8 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Apple, "VoiceOver", available at <http://www.apple.com/accessibility/voiceover/>, Feb. 2009, 5 pages.
AppleEvent Manager, which is described in the publication Inside Macintosh vol. VI, available from Addison-Wesley Publishing Company, 1985.
Applicant Initiated Interview Summary received for U.S. Appl. No. 15/151,191, dated Dec. 26, 2019, 5 pages.
Arango et al., "Touring Machine: A Software Platform for Distributed Multimedia Applications", 1992 IFIP International Conference on Upper Layer Protocols, Architectures, and Applications, May 1992, pp. 1-11.
Archbold et al., "A Team User's Guide", SRI International, Dec. 21, 1981, 70 pages.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Asanovic et al., "Experimental Determination of Precision Requirements for Back-Propagation Training of Artificial Neural Networks", Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech and Signal Processing (ICASSP'83), Apr. 1983, 4 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. 7, Jul. 1989, 8 pages.
Bahl et al., "Acoustic Markov Models Used in the Tangora Speech Recognition System", Proceeding of International Conference on Acoustics, Speech and Signal Processing (ICASSP'88), vol. 1, Apr. 1988, 4 pages.
Bahl et al., "Large Vocabulary Natural Language Continuous Speech Recognition", Proceedings of 1989 International Conference on Acoustics, Speech and Signal Processing, vol. 1, May 1989, 6 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Recognition of a Continuously Read Natural Corpus", IEEE International Conference on Acoustics, Speech, and Signal Processing, vol. 3, Apr. 1978, pp. 422-424.

(56) References Cited

OTHER PUBLICATIONS

Bahl et al., "Speech Recognition with Continuous-Parameter Hidden Markov Models", Proceeding of International Conference on Acoustics, Speech and Signal Processing (ICASSP'88), vol. 1, Apr. 1988, 8 pages.
Bajarin, Tim, "With Low End Launched, Apple Turns to Portable Future", PC Week, vol. 7, Oct. 1990, p. 153(1).
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Barrett et al., "How to Personalize the Web", 1997 In proceddings of the ACM SIGCHI Conference on Human Factors in Computer Systems, Mar. 22-27, 1997, pp. 75-82.
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Bear et al., "A System for Labeling Self-Repairs in Speech", SRI International, Feb. 22, 1993, 9 pages.
Bear et al., "Detection and Correction of Repairs in Human-Computer Dialog", SRI International, May 1992, 11 pages.
Bear et al., "Integrating Multiple Knowledge Sources for Detection and Correction of Repairs in Human-Computer Dialog", Proceedings of the 30th Annual Meeting on Association for Computational Linguistics (ACL), 1992, 8 pages.
Bear et al., "Using Information Extraction to Improve Document Retrieval", SRI International, Menlo Park, California, 1998, 11 pages.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology (EUROSPEECH'97), Sep. 1997, 4 pages.
Bellegarda et al., "A Multispan Language Modeling Framework for Large Vocabulary Speech Recognition", IEEE Transactions on Speech and Audio Processing, vol. 6, No. 5, Sep. 1998, 12 pages.
Bellegarda et al., "A Novel Word Clustering Algorithm Based on Latent Semantic Analysis", Proceedings of the IEEE International Conference on Acoustics, Speech and Signal Processing (ICASSP'96), vol. 1, 1996, 4 pages.
Bellegarda et al., "Experiments Using Data Augmentation for Speaker Adaptation", International Conference on Acoustics, Speech and Signal Processing (ICASSP'95), May 1995, 4 pages.
Bellegarda et al., "On-Line Handwriting Recognition using Statistical Mixtures", Advances in Handwriting and Drawings: A Multidisciplinary Approach, Europia, 6th International IGS Conference on Handwriting and Drawing, Paris, France, Jul. 1993, 11 pages.
Bellegarda et al., "Performance of the IBM Large Vocabulary Continuous Speech Recognition System on the ARPA Wall Street Journal Task", Signal Processing VII: Theories and Applications, European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R. "Latent Semantic Mapping", IEEE Signal Processing Magazine, vol. 22, No. 5, Sep. 2005, pp. 70-80.
Bellegarda, Jerome R., "Exploiting both Local and Global Constraints for Multi-Span Statistical Language Modeling", Proceeding of the 1998 IEEE International Conference on Acoustics, Speech and Signal Processing (1CASSP'98), vol. 2, May 1998, 5 pages.
Bellegarda, Jerome R., "Exploiting Latent Semantic Information in Statistical Language Modeling", Proceedings of the IEEE, vol. 88, No. 8, Aug. 2000, 18 pages.
Bellegarda, Jerome R., "Interaction-Driven Speech Input-A Data-Driven Approach to the Capture of both Local and Global Language Constraints", available at <http://old.sig.chi.ora/bulletin/1998.2/bellegarda.html>, 1992, 7 pages.
Bellegarda, Jerome R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", Proceedings of the First International Conference on Human Language Technology Research, Paper, 2001, 5 pages.
Benel et al., "Optimal Size and Spacing of Touchscreen Input Areas", Human-Computer Interaction—INTERACT, 1987, pp. 581-585.
Bergmann et al., "An adaptable man-machine interface using connected-word recognition", 2nd European Conference on Speech Communication and Technology (Eurospeech 91), vol. 2, XP002176387, Sep. 24-26, 1991, pp. 467-470.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Symantec", New version of MORE.TM, Apr. 10, 1990, 1 page.
Berry et al., "Task Management under Change and Uncertainty Constraint Solving Experience with the CALO Project", Proceedings of CP'05 Workshop on Constraint Solving under Change, 2005, 5 pages.
Bertulucci, Jeff, "Google Adds Voice Search to Chrome Browser", PC World, Jun. 14, 2011, 5 pages.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.
Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.

(56) References Cited

OTHER PUBLICATIONS

Black et al., "Automatically Clustering Similar Units for Unit Selection in Speech Synthesis", Proceedings of Eurospeech, vol. 2, 1997, 4 pages.
Black et al., "Multilingual Text-to-Speech Synthesis", Acoustics, Speech and Signal Processing (ICASSP'04), Proceedings of the IEEE International Conference, vol. 3, May 17-21, 2004, pp. 761-764.
Blair et al., "An Evaluation of Retrieval Effectiveness for a Full-Text Document-Retrieval System", Communications of the ACM, vol. 28, No. 3, Mar. 1985, 11 pages.
Bleher et al., "A Graphic Interactive Application Monitor", IBM Systems Journal, vol. 19, No. 3, Sep. 1980, pp. 382-402.
BluePhoneElite: About, available at <http://www.reelintelligence.com/BluePhoneElite>, retrieved on Sep. 25, 2006, 2 pages.
BluePhoneElite: Features, available at <http://www.reelintelligence.com/BluePhoneElite/features.shtml,>, retrieved on Sep. 25, 2006, 2 pages.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bobrow et al., "Knowledge Representation for Syntactic/Semantic Processing", From: AAA-80 Proceedings, Copyright 1980, AAAI, 1980, 8 pages.
Bocchieri et al., "Use of Geographical Meta-Data in ASR Language and Acoustic Models", IEEE International Conference on Acoustics Speech and Signal Processing, 2010, pp. 5118-5121.
Bociurkiw, Michael, "Product Guide: Vanessa Matz", available at <http://www.forbes.com/asap/2000/1127/vmartz_print.html>, retrieved on Jan. 23, 2003, 2 pages.
Borden IV, G.R., "An Aural User Interface for Ubiquitous Computing", Proceedings of the 6th International Symposium on Wearable Computers, IEEE, 2002, 2 pages.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Bouchou et al., "Using Transducers in Natural Language Database Query", Proceedings of 4th International Conference on Applications of Natural Language to Information Systems, Austria, Jun. 1999, 17 pages.
Boy, Guy A., "Intelligent Assistant Systems", Harcourt Brace Jovanovicy, 1991, 1 page.
Boyer et al., "A Fast String Searching Algorithm", Communications of the ACM, vol. 20, 1977, pp. 762-772.
Brain, Marshall, "How MP3 Files Work", available at <http://www.howstuffworks.com>, retrieved on Mar. 19, 2007, 4 pages.
Bratt et al., "The SRI Telephone-Based ATIS System", Proceedings of ARPA Workshop on Spoken Language Technology, 1995, 3 pages.
Briner, L. L., "Identifying Keywords in Text Data Processing", In Zelkowitz, Marvin V., Ed, Directions and Challenges, 15th Annual Technical Symposium, Gaithersbury, Maryland, Jun. 17, 1976, 7 pages.
Brown et al., "Browing Graphs Using a Fisheye View", Apple Inc., Video Clip, Systems Research Center, CHI '92 Continued Proceedings on a CD, 1992.
Brown et al., "Browsing Graphs Using a Fisheye View", CHI '93 Proceedings of the INTERACT '93 and CHI '93 Conference on Human Factors in Computing Systems, 1993, p. 516.
Bulyko et al., "Error-Correction Detection and Response Generation in a Spoken Dialogue System", Speech Communication, vol. 45, 2005, pp. 271-288.
Bulyko et al., "Joint Prosody Prediction and Unit Selection for Concatenative Speech Synthesis", Electrical Engineering Department, University of Washington, Seattle, 2001, 4 pages.
Burger, D., "Improved Access to Computers for the Visually Handicapped: New Prospects and Principles", IEEE Transactions on Rehabilitation Engineering, vol. 2, No. 3, Sep. 1994, pp. 111-118.
Burke et al., "Question Answering from Frequently Asked Question Files", AI Magazine, vol. 18, No. 2, 1997, 10 pages.
Burns et al., "Development of a Web-Based Intelligent Agent for the Fashion Selection and Purchasing Process via Electronic Commerce", Proceedings of the Americas Conference on Information System (AMCIS), Dec. 31, 1998, 4 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Bussey, et al., "Service Architecture, Prototype Description and Network Implications of a Personalized Information Grazing Service", INFOCOM'90, Ninth Annual Joint Conference of the IEEE Computer and Communication Societies, Available at <http://slrohall.com/oublications/>, Jun. 1990, 8 pages.
Bussler et al., "Web Service Execution Environment (WSMX)", retrieved from Internet on Sep. 17, 2012, available at <http://www.w3.org/Submission/WSMX>, Jun. 3, 2005, 29 pages.
Butcher, Mike, "EVI Arrives in Town to go Toe-to-Toe with Siri", TechCrunch, Jan. 23, 2012, 2 pages.
Butler, Travis, "Archos Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
Buzo et al., "Speech Coding Based Upon Vector Quantization", IEEE Transactions on Acoustics, Speech and Signal Processing, vol. Assp-28, No. 5, Oct. 1980, 13 pages.
Call Centre, "Word Prediction", The CALL Centre & Scottish Executive Education Dept., 1999, pp. 63-73.
Caminero-Gil et al., "Data-Driven Discourse Modeling for Semantic Interpretation", Proceedings of the IEEE International Conference on Acoustics, Speech and Signal Processing, May 1996, 6 pages.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Cao et al., "Adapting Ranking SVM to Document Retrieval", SIGIR '06, Seattle, WA, Aug. 6-11, 2006, 8 pages.
Car Working Group, "Hands-Free Profile 1.5 HFP1.5_SPEC", Bluetooth Doc, available at <www.bluetooth.org>, Nov. 25, 2005, 93 pages.
Caraballo et al., "Language Identification Based on a Discriminative Text Categorization Technique", Iberspeech 2012—Vii Jornadas En Tecnologia Del Habla And Iii Iberiansl Tech Workshop, Nov. 21, 2012, pp. 1-10.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Carter et al., "The Speech-Language Interface in the Spoken Language Translator", SRI International, Nov. 23, 1994, 9 pages.
Carter, D., "Lexical Acquisition in the Core Language Engine", Proceedings of the Fourth Conference of the European Chapter of the Association for Computational Linguistics, 1989, 8 pages.
Casner et al., "N-Way Conferencing with Packet Video", The Third International Workshop on Packet Video, Mar. 22-23, 1990, pp. 1-6.

(56) References Cited

OTHER PUBLICATIONS

Castleos, "Whole House Voice Control Demonstration", available online at : https://www.youtube.com/watch?v=9SRCoxrZ_W4, Jun. 2, 2012, 26 pages.
Cawley, Gavin C. "The Application of Neural Networks to Phonetic Modelling", PhD. Thesis, University of Essex, Mar. 1996, 13 pages.
Chai et al., "Comparative Evaluation of a Natural Language Dialog Based System and a Menu Driven System for Information Access: A Case Study", Proceedings of the International Conference on Multimedia Information Retrieval (RIAO), Paris, Apr. 2000, 11 pages.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chang et al., "A Segment-Based Speech Recognition System for Isolated Mandarin Syllables", Proceedings TEN CON '93, IEEE Region 10 Conference on Computer, Communication, Control and Power Engineering, vol. 3, Oct. 1993, 6 pages.
Chang et al., "Discriminative Training of Dynamic Programming based Speech Recognizers", IEEE Transactions on Speech and Audio Processing, vol. 1, No. 2, Apr. 1993, pp. 135-143.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Chelba et al., "Structured Language Modeling for Speech Recognition", Available online at : http://arxiv.org/pdf/cs/0001023.pdf, Jan. 25, 2000, 7 pages.
Chen et al., "An Improved Method For Image Retrieval Using Speech Annotation", The 9th International Conference on Multi-Media Modeling, Jan. 2003, pp. 1-17.
Chen, Yi, "Multimedia Siri Finds and Plays Whatever You Ask For", PSFK Report, Feb. 9, 2012, 9 pages.
Cheyer et al., "Demonstration Video of Multimodal Maps Using an Agent Architecture", published by SRI International no later than 1996, as depicted in Exemplary Screenshots from video entitled Demonstration Video of Multimodal Maps Using an Agent Architecture, 1996, 6 pages.
Cheyer et al., "Demonstration Video of Multimodal Maps Using an Open-Agent Architecture", published by SRI International no later than 1996, as depicted in Exemplary Screenshots from video entitled Demonstration Video of Multimodal Maps Using an Open-Agent Architecture, 6 pages.
Cheyer et al., "Multimodal Maps: An Agent-Based Approach", International Conference on Co-operative Multimodal Communication, 1995, 15 pages.
Cheyer et al., "Spoken Language and Multimodal Applications for Electronic Realties", Virtual Reality, vol. 3, 1999, pp. 1-15.
Cheyer et al., "The Open Agent Architecture", Autonomous Agents and Multi-Agent Systems, vol. 4, Mar. 1, 2001, 6 pages.
Cheyer et al., "The Open Agent Architecture: Building Communities of Distributed Software Agents", Artificial Intelligence Center, SRI International, Power Point Presentation, Available online at <http://www.ai.sri.com/-oaa/>, retrieved on Feb. 21, 1998, 25 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Chomsky et al., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Church, Kenneth W., "Phonological Parsing in Speech Recognition", Kluwer Academic Publishers, 1987.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Codd, E. F., "Databases: Improving Usability and Responsiveness—How About Recently", Copyright 1978, Academic Press, Inc., 1978, 28 pages.
Cohen et al., "An Open Agent Architecture", available at <http://citeseerx.ist.psu.edu/viewdoc/summary?doi=1 0.1.1.30.480>, 1994, 8 pages.
Cohen et al., "Voice User Interface Design,", Excerpts from Chapter 1 and Chapter 10, 2004, 36 pages.
Coleman, David W., "Meridian Mail Voice Mail System Integrates Voice Processing and Personal Computing", Speech Technology, vol. 4, No. 2, Mar./Apr. 1988, pp. 84-87.
Coles et al., "Chemistry Question-Answering", SRI International, Jun. 1969, 15 pages.
Coles et al., "Techniques for Information Retrieval Using an Inferential Question-Answering System with Natural-Language Input", SRI International, Nov. 1972, 198 Pages.
Coles et al., "The Application of Theorem Proving to Information Retrieval", SRI International, Jan. 1971, 21 pages.
Colt, Sam, "Here's One Way Apple's Smartwatch Could Be Better Than Anything Else", Business Insider, Aug. 21, 2014, pp. 1-4.
Combined Search Report and Examination Report under Sections 17 and 18(3) received for GB Patent Application No. 1009318.5, dated Oct. 8, 2010, 5 pages.
Combined Search Report and Examination Report under Sections 17 and 18(3) received for GB Patent Application No. 1217449.6, dated Jan. 17, 2013, 6 pages.
Compaq Inspiration Technology, "Personal Jukebox (PJB)—Systems Research Center and PAAD", Oct. 13, 2000, 25 pages.
Compaq, "Personal Jukebox", available at <http://research.compaq.com/SRC/pjb/>, 2001, 3 pages.
Conkie et al., "Preselection of Candidate Units in a Unit Selection-Based Text-to-Speech Synthesis System", ISCA, 2000, 4 pages.
Conklin, Jeff, "Hypertext: An Introduction and Survey", Computer Magazine, Sep. 1987, 25 pages.
Conklin, Jeffrey, "A Survey of Hypertext", MCC Software Technology Program, Dec. 1987, 40 pages.
Connolly et al., "Fast Algorithms for Complex Matrix Multiplication Using Surrogates", IEEE Transactions on Acoustics, Speech and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corporate Ladder, BLOC Publishing Corporation, 1991, 1 page.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Cox et al., "Speech and Language Processing for Next-Millennium Communications Services", Proceedings of the IEEE, vol. 88, No. 8, Aug. 2000, 24 pages.
Craig et al., "Deacon: Direct English Access and Control", AFIPS Conference Proceedings, vol. 19, San Francisco, Nov. 1966, 18 pages.

(56) References Cited

OTHER PUBLICATIONS

Creative Technology Ltd., "Creative Nomad® II: Getting Started—User Guide (On Line Version)", available at <http://ec1.images-amazon.com/media/i3d/01/A/man-migrate/MANUAL000026434.pdf>, Apr. 2000, 46 pages.
Creative Technology Ltd., "Creative Nomad®: Digital Audio Player: User Guide (On-Line Version)", available at <http://ec1.images-amazon.com/media/i3d/01/A/man-migrate/MANUAL000010757.pdf>, Jun. 1999, 40 pages.
Creative Technology Ltd., "Nomad Jukebox", User Guide, Version 1.0, Aug. 2000, 52 pages.
Creative, "Creative Nomad MuVo TX", available at <http://web.archive.org/web/20041024175952/www.creative.com/products/pfriendly.asp?product=9672>, retrieved on Jun. 6, 2006, 1 page.
Creative, "Creative Nomad MuVo", available at <http://web.archive.org/web/20041024075901/www.creative.com/products/product.asp?category=213&subcategory=216&product=4983>, retrieved on Jun. 7, 2006, 1 page.
Creative, "Digital MP3 Player", available at <http://web.archive.org/web/20041024074823/www.creative.com/products/product.asp?category=213&subcategory=216&product=4983, 2004, 1 page.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW90 Proceedings, Oct. 1990, pp. 329-342.
Cucerzan et al., "Bootstrapping a Multilingual Part-of-Speech Tagger in One Person-Day", In Proceedings of the 6th Conference on Natural Language Learning, vol. 20, 2002, pp. 1-7.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Cutkosky et al., "PACT: An Experiment in Integrating Concurrent Engineering Systems", Journal & Magazines, Computer, vol. 26, No. 1, Jan. 1993, 14 pages.
Dar et al., "DTL's DataSpot: Database Exploration Using Plain Language", Proceedings of the 24th VLDB Conference, New York, 1998, 5 pages.
Database WPI Section Ch, Week 8733, Derwent Publications Ltd., London, GB; Class A17, AN 87-230826 & JP, A, 62 153 326 (Sanwa Kako KK (Sans) Sanwa Kako Co), Jul. 8, 1987, 6 pages.
Database WPI Section Ch, Week 8947, Derwent Publications Ltd., London, GB; Class A17, AN 89-343299 & JP, A, 1 254 742 (Sekisui Plastics KK), Oct. 11, 1989, 7 pages.
Davis et al., "A Personal Handheld Multi-Modal Shopping Assistant", International Conference on Networking and Services, IEEE, 2006, 9 pages.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Decker et al., "Designing Behaviors for Information Agents", The Robotics Institute, Carnegie-Mellon University, Paper, Jul. 1996, 15 pages.
Decker et al., "Matchmaking and Brokering", The Robotics Institute, Carnegie-Mellon University, Paper, May 1996, 19 pages.
Deerwester et al., "Indexing by Latent Semantic Analysis", Journal of the American Society for Information Science, vol. 41, No. 6, Sep. 1990, 19 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.
Deller, Jr. et al., "Discrete-Time Processing of Speech Signals", Prentice Hall, ISBN: 0-02-328301-7, 1987, 14 pages.
Diagrammaker, Action Software, 1989.
Diagram-Master, Ashton-Tate, 1989.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Audio in the New Era, Electronic Design and Application, No. 6, Jun. 30, 2003, 3 pages.
Digital Equipment Corporation, "Open VMS Software Overview", Software Manual, Dec. 1995, 159 pages.
Digital Equipment Corporation, "OpenVMS RTL DECtalk (DTK$) Manual", May 1993, 56 pages.
Dittenbach et al., "A Natural Language Query Interface for Tourism Information", In: Information and Communication Technologies in Tourism 2003, XP055114393, Feb. 14, 2003, pp. 152-162.
Dobrisek et al., "Evolution of the Information-Retrieval System for Blind and Visually-Impaired People", International Journal of Speech Technology, Kluwer Academic Publishers, Bo, vol. 6, No. 3, pp. 301-309.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: A Graphical Database Tool", ACM Transactions on Office Information Systems, vol. 4, No. 1, Jan. 1986, pp. 24-41.
Donovan, R. E., "A New Distance Measure for Costing Spectral Discontinuities in Concatenative Speech Synthesisers", available at <http://citeseerx.ist.osu.edu/viewdoc/summarv?doi=1 0.1.1.21.6398>, 2001, 4 pages.
Dourish et al., "Portholes: Supporting Awareness in a Distributed Work Group", CHI 1992;, May 1992, pp. 541-547.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in An Efficient Bottom-Up Parser", Proceedings of the 32nd Annual Meeting of the Association for Computational Linguistics, 1994, 7 pages.
Dragon Naturally Speaking Version 11 Users Guide, Nuance Communications, Inc., Copyright @2002-2010, 132 pages.
Dual Rate Speech Coder for Multimedia Communications Transmitting at 5.3 and 6.3 kbit/s, International Telecommunication Union Recommendation G.723, 7 pages.
Dusan et al., "Multimodal Interaction on PDA's Integrating Speech and Pen Inputs", Eurospeech Geneva, 2003, 4 pages.
dyslexic.com, "AlphaSmart 3000 with CoWriter SmartApplet: Don Johnston Special Needs", available at <http://www.dyslexic.com/procuts.php7catid-2&pid=465&PHPSESSID=2511b800000f7da>, retrieved on Dec. 6, 2005, 13 pages.
Eagle et al., "Social Serendipity: Proximity Sensing and Cueing", MIT Media Laboratory Technical Note 580, May 2004, 18 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elio et al., "On Abstract Task Models and Conversation Policies", Proc. Workshop on Specifying and Implementing Conversation Policies, Autonomous Agents'99 Conference, 1999, pp. 1-10.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin'", available at <http://db.tidbits.com/getbits.acgi?tbart=05988>, Jun. 19, 2000, 3 pages.

(56) References Cited

OTHER PUBLICATIONS

Epstein et al., "Natural Language Access to a Melanoma Data Base", SRI International, Sep. 1978, 7 pages.
Ericsson et al., "Software Illustrating a Unified Approach to Multimodality and Multilinguality in the In-Home Domain", Talk and Look: Tools for Ambient Linguistic Knowledge, Dec. 2006, 127 pages.
Ericsson Inc., "Cellular Phone with Integrated MP3 Player", Research Disclosure Journal No. 41815, Feb. 1999, 2 pages.
Erol et al., "Multimedia Clip Generation From Documents for Browsing on Mobile Devices", IEEE Transactions on Multimedia, vol. 10, No. 5, Aug. 2008, 13 pages.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
European Search Report received for European Patent Application No. 01201774.5, dated Sep. 14, 2001, 3 pages.
European Search Report received for European Patent Application No. 99107544.1, dated Jul. 8, 1999, 4 pages.
European Search Report received for European Patent Application No. 99107545.8, dated Jul. 1, 1999, 3 pages.
Evermann et al., "Posterior Probability Decoding, Confidence Estimation and System Combination", Proceedings Speech Transcription Workshop, 2000, 4 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Extended European Search Report (includes European Search Report and European Search Opinion) received for European Patent Application No. 06256215.2, dated Feb. 20, 2007, 6 pages.
Extended European Search Report (includes European Search Report and European Search Opinion) received for European Patent Application No. 12186113.2, dated Apr. 28, 2014, 14 pages.
Extended European Search Report (includes Partial European Search Report and European Search Opinion) received for European Patent Application No. 13169672.6, dated Aug. 14, 2013, 11 pages.
Extended European Search Report (includes Partial European Search Report and European Search Opinion) received for European Patent Application No. 15169349.6, dated Jul. 28, 2015, 8 pages.
Extended European Search Report (includes Partial European Search Report and European Search Opinion) received for European Patent Application No. 15196748.6, dated Apr. 4, 2016.
Extended European Search Report (includes Partial European Search Report and European Search Opinion) received for European Patent Application No. 16150079.8, dated Feb. 18, 2016, 7 pages.
Extended European Search Report (includes Supplementary European Search Report and Search Opinion) received for European Patent Application No. 07863218.9, dated Dec. 9, 2010, 7 pages.
Extended European Search Report (includes Supplementary European Search Report and Search Opinion) received for European Patent Application No. 12727027.0, dated Sep. 26, 2014, 7 pages.
Extended European Search Report (inclusive of the Partial European Search Report and European Search Opinion) received for European Patent Application No. 12729332.2, dated Oct. 31, 2014, 6 pages.
Extended European Search Report and Search Opinion received for European Patent Application No. 12185276.8, dated Dec. 18, 2012, 4 pages.
Extended European Search Report received for European Patent Application No. 11159884.3, dated May 20, 2011, 8 pages.
Extended European Search Report received for European Patent Application No. 12186663.6, dated Jul. 16, 2013, 6 pages.
Extended European Search Report received for European Patent Application No. 13726938.7, dated Dec. 14, 2015, 8 pages.
Extended European Search Report received for European Patent Application No. 13770552.1, dated Jan. 7, 2016, 5 pages.
Extended European Search Report received for European Patent Application No. 14719914.5, dated Oct. 10, 2016, 7 pages.
Extended European Search Report received for European Patent Application No. 14737370.8, dated May 19, 2016, 12 pages.
Extended European Search Report received for European Patent Application No. 16862616.6, dated Sep. 25, 2018, 11 pages.
Fanty et al., "A Comparison of DFT, PLP and Cochleagram for Alphabet Recognition", IEEE, Nov. 1991, pp. 326-329.
Feigenbaum et al., "Computer-Assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-Based Knowledge Representation and its Natural Deduction System", SRI International, Jul. 1977, 43 pages.
Final Office Action received for U.S. Appl. No. 15/151,191, dated Jan. 25, 2019, 29 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Fiscus, J. G., "A Post-Processing System To Yield Reduced Word Error Rates: Recognizer Output Voting Error Reduction (ROVER)", IEEE Proceedings, Automatic Speech Recognition and Understanding, Dec. 14-17, 1997, pp. 347-354.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Frisse, M. E., "Searching for Information in a Hypertext Medical Handbook", Communications of the ACM, vol. 31, No. 7, Jul. 1988, 8 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991, pp. 1-9.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gautier et al., "Generating Explanations of Device Behavior Using Compositional Modeling and Causal Ordering", CiteSeerx, 1993, pp. 89-97.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Gervasio et al., "Active Preference Learning for Personalized Calendar Scheduling Assistance", CiteSeerx, Proceedings of IUI'05, Jan. 2005, pp. 90-97.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.

(56) References Cited

OTHER PUBLICATIONS

Gilloire et al., "Innovative Speech Processing for Mobile Terminals: An Annotated Bibliography", Signal Processing, vol. 80, No. 7, Jul. 2000, pp. 1149-1166.
Glass et al., "Multilingual Language Generation Across Multiple Domains", International Conference on Spoken Language Processing, Japan, Sep. 1994, 5 pages.
Glass et al., "Multilingual Spoken-Language Understanding in the Mit Voyager System", Available online at <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Glinert-Stevens, Susan, "Microsoft Publisher: Desktop Wizardry", PC Sources, vol. 3, No. 2, Feb. 1992, 1 page.
Glossary of Adaptive Technologies: Word Prediction, available at <http://www.utoronto.ca/atrc/reference/techwordpred.html>, retrieved on Dec. 6, 2005, 5 pages.
Gmail, "About Group Chat", available at <http://mail.google.com/support/bin/answer.py?answer=81090>, Nov. 26, 2007, 2 pages.
Goddeau et al., "A Form-Based Dialogue Manager for Spoken Language Applications", Available online at <http://phasedance.com/pdf!icslp96.pdf>, Oct. 1996, 4 pages.
Goddeau et al., "Galaxy: A Human-Language Interface to On-Line Travel Information", International Conference on Spoken Language Processing, Yokohama, 1994, pp. 707-710.
Goldberg et al., "Using Collaborative Filtering to Weave an Information Tapestry", Communications of the ACM, vol. 35, No. 12, Dec. 1992, 10 pages.
Goldberg, Cheryl, "IBM Drawing Assistant: Graphics for the EGA", PC Magazine, vol. 4, No. 26, Dec. 24, 1985, 1 page.
Gong et al., "Guidelines for Handheld Mobile Device Interface Design", Proceedings of DSI 2004 Annual Meeting, 2004, pp. 3751-3756.
Gonnet et al., "Handbook of Algorithms and Data Structures: in Pascal and C. (2nd ed.)", Addison-Wesley Longman Publishing Co., 1991, 17 pages.
Good et al., "Building a User-Derived Interface", Communications of the ACM; (Oct. 1984) vol. 27, No. 10, Oct. 1984, pp. 1032-1043.
Gorin et al., "On Adaptive Acquisition of Language", International Conference on Acoustics, Speech and Signal Processing (ICASSP'90), vol. 1, Apr. 1990, 5 pages.
Gotoh et al., "Document Space Models Using Latent Semantic Analysis", In Proceedings of Eurospeech, 1997, 4 pages.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Greenberg, Saul, "A Fisheye Text Editor for Relaxed-WYSIWIS Groupware", CHI '96 Companion, Vancouver, Canada, Apr. 13-18, 1996, 2 pages.
Gregg et al., "DSS Access on the WWW: An Intelligent Agent Prototype", Proceedings of the Americas Conference on Information Systems, Association for Information Systems, 1998, 3 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Grishman et al., "Computational Linguistics: An Introduction", Cambridge University Press, 1986, 172 pages.
Grosz et al., "Dialogic: A Core Natural-Language Processing System", SRI International, Nov. 1982, 17 pages.
Grosz et al., "Research on Natural-Language Processing at SRI", SRI International, Nov. 1981, 21 pages.
Grosz et al., "TEAM: An Experiment in the Design of Transportable Natural-Language Interfaces", Artificial Intelligence, vol. 32, 1987, 71 pages.
Grosz, B., "Team: A Transportable Natural-Language Interface System", Proceedings of the First Conference on Applied Natural Language Processing, 1983, 7 pages.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", Proceedings of International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.
Gruber et al., "Toward a Knowledge Medium for Collaborative Product Development", Proceedings of the Second International Conference on Artificial Intelligence in Design, Jun. 1992, pp. 1-19.
Gruber, Thomas R., "A Translation Approach to Portable Ontology Specifications", Knowledge Acquisition, vol. 5, No. 2, Jun. 1993, pp. 199-220.
Gruber, Thomas R., "Automated Knowledge Acquisition for Strategic Knowledge", Machine Learning, vol. 4, 1989, pp. 293-336.
Gruber, Thomas R., "Interactive Acquisition of Justifications: Learning "Why" by Being Told "What"", Knowledge Systems Laboratory, Technical Report KSL 91-17, Original Oct. 1990, Revised Feb. 1991, 24 pages.
Gruber, Thomas R., "Toward Principles for the Design of Ontologies used for Knowledge Sharing", International Journal of Human-Computer Studies, vol. 43, No. 5-6, Nov. 1995, pp. 907-928.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., U.S Unpublished/U.S. Appl. No. 61/657,744, filed Jun. 9, 2012 titled "Automatically Adapting User Interfaces For Hands-Free Interaction", 40 pages.
Gruber, Thomas R., et al., U.S. Appl. No. 07/976,970, filed Nov. 16, 1992 titled "Status Bar for Application Windows".
Gruber, Tom, "(Avoiding) The Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.

(56) References Cited

OTHER PUBLICATIONS

Gruber, Tom, "Helping Organizations Collaborate, Communicate, and Learn", Presentation to NASA Ames Research, Available online at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "It Is What It Does: The Pragmatics of Ontology for Knowledge Sharing", Proceedings of the International CIDOC CRM Symposium, Available online at <http://tomgruber.org/writing/cidoc-ontology.htm>, Mar. 26, 2003, 21 pages.
Gruber, Tom, "Ontologies, Web 2.0 and Beyond", Ontology Summit, Available online at <http://tomgruber.org/writing/ontolog-social-web-keynote.htm>, Apr. 2007, 17 pages.
Gruber, Tom, "Ontology of Folksonomy: A Mash-Up of Apples and Oranges", Int'l Journal on Semantic Web & Information Systems, vol. 3, No. 2, 2007, 7 pages.
Gruber, Tom, "Siri, A Virtual Personal Assistant-Bringing Intelligence to the Interface", Semantic Technologies Conference, Jun. 16, 2009, 21 pages.
Gruber, Tom, "TagOntology", Presentation to Tag Camp, Oct. 29, 2005, 20 pages.
Gruber, Tom, "Where the Social Web Meets the Semantic Web", Presentation at the 5th International Semantic Web Conference, Nov. 2006, 38 pages.
Gruhn et al., "A Research Perspective on Computer-Assisted Office Work", IBM Systems Journal, vol. 18, No. 3, 1979, pp. 432-456.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guida et al., "NLI: A Robust Interface for Natural Language Person-Machine Communication", International Journal of Man-Machine Studies, vol. 17, 1982, 17 pages.
Guim, Mark, "How to Set a Person-Based Reminder with Cortana", available at <http://www.wpcentral.com/how-to-person-based-reminder-cortana>, Apr. 26, 2014, 15 pages.
Gurevych et al., "Semantic Coherence Scoring Using an Ontology", North American Chapter of the Association for Computational Linguistics Archive, Proceedings of the 2003 Conference of the North American Chapter of the Association for Computational Linguistics on Human Language Technology, May 27, 2003, 8 pages.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: Tools and Applications, 2007, pp. 191-198.
Guzzoni et al., "Active, A platform for Building Intelligent Software", Computational Intelligence, available at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, Aug. 2007, 6 pages.
Guzzoni et al., "Many Robots Make Short Work", AAAI Robot Contest, SRI International, 1996, 9 pages.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A Unified Platform for Building Intelligent Assistant Applications", Oct. 25, 2007, 262 pages.
Haas et al., "An Approach to Acquiring and Applying Knowledge", SRI international, Nov. 1980, 22 pages.
Hadidi et al., "Student's Acceptance of Web-Based Course Offerings: An Empirical Assessment", Proceedings of the Americas Conference on Information Systems(AMCIS), 1998, 4 pages.
Haga et al., "A Usability Survey of a Contents-Based Video Retrieval System by Combining Digital Video and an Electronic Bulletin Board", The Internet and Higher Education, vol. 8, No. 3, 2005, pp. 251-262.
Hain et al., "The Papageno TTS System", Siemens AG, Corporate Technology, Munich, Germany TC-STAR Workshop, 2006, 6 pages.
Haitsma et al., "A Highly Robust Audio Fingerprinting System", In Proceedings of the International Symposium on Music Information Retrieval (ISMIR), 2002, 9 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hartson et al., "Advances in Human-Computer Interaction", Chapters 1, 5, and 6, vol. 3, 1992, 121 pages.
Hashimoto, Yoshiyuki , "Simple Guide for iPhone Siri, Which Can Be Operated with Your Voice", Shuwa System Co., Ltd., vol. 1, Jul. 5, 2012, pp. 8, 130, 131.
Hawkins et al., "Hierarchical Temporal Memory: Concepts, Theory and Terminology", Numenta, Inc., Mar. 27, 2007, 20 pages.
He et al., "Personal Security Agent: KQML-Based PKI", The Robotics Institute, Carnegie-Mellon University, Paper, 1997, 14 pages.
Headset Button Controller v7.3 APK Full APP Download for Android, Blackberry, iPhone, 11 pages.
Hear voice from Google translate, Available on URL:https://www.youtube.com/watch?v=18AvMhFqD28, Jan. 28, 2011, 1 page.
Heger et al., "KNOWBOT: An Adaptive Data Base Interface", Nuclear Science and Engineering, V. 107, No. 2, Feb. 1991, pp. 142-157.
Helm et al., "Building Visual Language Parsers", Proceedings of CHI'91, Proceedings of the SIGCHI Conference on Human Factors in Computing Systems, 1991, 8 pages.
Hendrickson, Bruce, "Latent Semantic Analysis and Fiedler Retrieval", Linear Algebra and its Applications, vol. 421, 2007, pp. 345-355.
Hendrix et al., "Developing a Natural Language Interface to Complex Data", ACM Transactions on Database Systems, vol. 3, No. 2, Jun. 1978, pp. 105-147.
Hendrix et al., "The Intelligent Assistant: Technical Considerations Involved in Designing Q&A's Natural-Language Interface", Byte Magazine, Issue 14, Dec. 1987, 1 page.
Hendrix et al., "Transportable Natural-Language Interfaces to Databases", SRI International, Technical Note 228, Apr. 30, 1981, 18 pages.
Hendrix, Gary G., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.

(56) References Cited

OTHER PUBLICATIONS

Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.
Hermansky, H., "Perceptual Linear Predictive (PLP) Analysis of Speech", Journal of the Acoustical Society of America, vol. 87, No. 4, Apr. 1990, 15 pages.
Hermansky, H., "Recognition of Speech in Additive and Convolutional Noise Based on Rasta Spectral Processing", Proceedings of IEEE International Conference on Acoustics, Speech and Signal Processing (ICASSP'93), Apr. 1993, 4 pages.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Hirschman et al., "Multi-Site Data Collection and Evaluation in Spoken Language Understanding", Proceedings of the Workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for use with an Agent-Oriented Natural Language Interface", Proceedings of HCI International, vol. 4, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, "Speech System and Research", 1955, pp. 129-135, 152-153.
Holmes, J. N., "Speech Synthesis and Recognition-Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech and Signal Processing (ICASSP-91), Apr. 1991, 4 pages.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
Howard, John H., "(Abstract) An Overview of the Andrew File System", Information Technology Center, Carnegie Mellon University; (CMU-ITC-88-062) To Appear in a future issue of the ACM Transactions on Computer Systems, 1988, pp. 1-6.
Huang et al., "A Novel Approach to Robust Speech Endpoint Detection in Car Environments", Acoustics, Speech, And Signal Processing 2000, ICASSP '00, Proceeding S. 2000 IEEE International Conference on Jun. 5-9, 2000, vol. 3, Jun. 5, 2000, pp. 1751-1754.
Huang et al., "Real-Time Software-Based Video Coder for Multimedia Communication Systems", Department of Computer Science and Information Engineering, 1993, 10 pages.
Huang et al., "The SPHINX-II Speech Recognition System: An Overview", Computer, Speech and Language, vol. 7, No. 2, 1993, 14 pages.
Hukin, R. W., "Testing an Auditory Model by Resynthesis", European Conference on Speech Communication and Technology, Sep. 26-29, 1989, pp. 243-246.
Hunt, "Unit Selection In A Concatenative Speech Synthesis System Using A Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
IAP Sports Lingo 0×09 Protocol V1.00, May 1, 2006, 17 pages.
IBM Corporation, "Simon Says Here's How", Users Manual, 1994, 3 pages.
IBM, "Integrated Audio-Graphics User Interface", IBM Technical Disclosure Bulletin, vol. 33, No. 11, Apr. 1991, 4 pages.
IBM, "Speech Editor", IBM Technical Disclosure Bulletin, vol. 29, No. 10, Mar. 10, 1987, 3 pages.
IBM, "Speech Recognition with Hidden Markov Models of Speech Waveforms", IBM Technical Disclosure Bulletin, vol. 34, No. 1, Jun. 1991, 10 pages.
IBM, "Why Buy: ThinkPad", available at <http://www.pc.ibm.com/us/thinkpad/easeofuse.html>, retrieved on Dec. 19, 2002, 2 pages.
IChat AV, "Video Conferencing for the Rest of Us", Apple—Mac Os X—iChat AV, available at <http://www.apple.com/macosx/features/ichat/>, retrieved on Apr. 13, 2006, 3 pages.
id3.org, "id3v2.4.0-Frames", available at <http://id3.org/id3v2.4.0-frames?action=print>, retrieved on Jan. 22, 2015, 41 pages.
IEEE 1394 (Redirected from Firewire, Wikipedia, The Free Encyclopedia, available at <http://www.wikipedia.org/wiki/Firewire>, retrieved on Jun. 8, 2003, 2 pages.
Interactive Voice, available at <http://www.helloivee.com/company/>, retrieved on Feb. 10, 2014, 2 pages.
International Preliminary Report on Patentability received for PCT Patent Application No. PCT/GB2009/051684, dated Jun. 23, 2011, 10 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Preliminary Report on Patentability received for PCT Patent Application No. PCT/US1994/011011, dated Feb. 28, 1996, 4 pages.
International Preliminary Report on Patentability received for PCT Patent Application No. PCT/US1995/008369, dated Oct. 9, 1996, 4 pages.
International Preliminary Report on Patentability received for PCT Patent Application No. PCT/US2004/002873, dated Feb. 1, 2006, 5 pages.
International Preliminary report on Patentability received for PCT Patent Application No. PCT/US2004/016519, dated Jan. 23, 2006, 12 pages.
International Preliminary Report on Patentability received for PCT Patent Application No. PCT/US2005/030234, dated Mar. 20, 2007, 9 pages.
International Preliminary Report on Patentability received for PCT Patent Application No. PCT/US2008/000042, dated Jul. 7, 2009, 6 pages.
International Preliminary Report on Patentability received for PCT Patent Application No. PCT/US2008/000043, dated Jul. 7, 2009, 8 pages.
International Preliminary Report on Patentability received for PCT Patent Application No. PCT/US2008/000047, dated Jul. 7, 2009, 8 pages.

(56) References Cited

OTHER PUBLICATIONS

International Preliminary Report on Patentability received for PCT Patent Application No. PCT/US2009/051954, dated Mar. 24, 2011, 8 pages.
International Preliminary Report on Patentability received for PCT Patent Application No. PCT/US2009/055577, completed on Aug. 6, 2010, 12 pages.
International Preliminary Report on Patentability received for PCT Patent Application No. PCT/US2010/037378, dated Dec. 6, 2011, 9 pages.
International Preliminary Report on Patentability received for PCT Patent Application No. PCT/US2011/020350, dated Jul. 17, 2012, 12 pages.
International Preliminary Report on Patentability received for PCT Patent Application No. PCT/US2011/020825, dated Jan. 13, 2012, 17 pages.
International Preliminary Report on Patentability received for PCT Patent Application No. PCT/US2011/020861, dated Aug. 2, 2012, 11 pages.
International Preliminary Report on Patentability received for PCT Patent Application No. PCT/US2011/037014, dated Dec. 13, 2012, 10 pages.
International Preliminary Report on Patentability received for PCT Patent Application No. PCT/US2012/029810, dated Oct. 3, 2013, 9 pages.
International Preliminary Report on Patentability received for PCT Patent Application No. PCT/US2012/034028, dated Oct. 31, 2013, 7 pages.
International Preliminary Report on Patentability received for PCT Patent Application No. PCT/US2012/040571, dated Dec. 19, 2013, 10 pages.
International Preliminary Report on Patentability received for PCT Patent Application No. PCT/US2012/040801, dated Dec. 19, 2013, 16 pages.
International Preliminary Report on Patentability received for PCT Patent Application No. PCT/US2012/040931, dated Dec. 18, 2014, 9 pages.
International Preliminary Report on Patentability received for PCT Patent Application No. PCT/US2012/043098, dated Jan. 9, 2014, 8 pages.
International Preliminary Report on Patentability received for PCT Patent Application No. PCT/US2012/043100, dated Jan. 9, 2014, 7 pages.
International Preliminary Report on Patentability received for PCT Patent Application No. PCT/US2012/056382, dated Apr. 10, 2014, 9 pages.
International Preliminary Report on Patentability received for PCT Patent Application No. PCT/US2013/028412, dated Sep. 12, 2014, 12 pages.
International Preliminary Report on Patentability received for PCT Patent Application No. PCT/US2013/028920, dated Sep. 18, 2014, 11 pages.
International Preliminary Report on Patentability received for PCT Patent Application No. PCT/US2013/029156, dated Sep. 9, 2014, 7 pages.
International Preliminary Report on Patentability received for PCT Patent Application No. PCT/US2013/041225, dated Nov. 27, 2014, 9 pages.
International Preliminary Report on Patentability received for PCT Patent Application No. PCT/US2013/041233, dated Nov. 18, 2014, 8 pages.
International Preliminary Report on Patentability received for PCT Patent Application No. PCT/US2013/044574, dated Dec. 9, 2014, 8 pages.
International Preliminary Report on Patentability received for PCT Patent Application No. PCT/US2013/044834, dated Dec. 9, 2014, 9 pages.
International Preliminary Report on Patentability received for PCT Patent Application No. PCT/US2013/047659, dated Dec. 31, 2014, 15 pages.
International Preliminary Report on Patentability received for PCT Patent Application No. PCT/US2013/047668, dated Jan. 8, 2015, 13 pages.
International Preliminary Report on Patentability received for PCT Patent Application No. PCT/US2013/052558, dated Feb. 12, 2015, 12 pages.
International Preliminary Report on Patentability received for PCT Patent Application No. PCT/US2013/058916, dated Mar. 19, 2015, 8 pages.
International Preliminary Report on Patentability received for PCT Patent Application No. PCT/US2013/060121, dated Apr. 2, 2015, 6 pages.
International Preliminary Report on Patentability received for PCT Patent Application No. PCT/US2014/015418, dated Aug. 20, 2015, 12 pages.
International Preliminary Report on Patentability received for PCT Patent Application No. PCT/US2014/016988, dated Sep. 3, 2015, 8 pages.
International Preliminary Report on Patentability received for PCT Patent Application No. PCT/US2014/023822, dated Sep. 24, 2015, 12 pages.
International Preliminary Report on Patentability received for PCT Patent Application No. PCT/US2014/023826, dated Sep. 24, 2015, 9 pages.
International Preliminary Report on Patentability received for PCT Patent Application No. PCT/US2014/026871, dated Sep. 24, 2015, 7 pages.
International Preliminary Report on Patentability received for PCT Patent Application No. PCT/US2014/026873, dated Sep. 24, 2015, 9 pages.
International Preliminary Report on Patentability received for PCT Patent Application No. PCT/US2014/028785, dated Sep. 24, 2015, 15 pages.
International Preliminary Report on Patentability received for PCT Patent Application No. PCT/US2014/028950, dated Sep. 24, 2015, 8 pages.
International Preliminary Report on Patentability received for PCT Patent Application No. PCT/US2014/029050, dated Sep. 24, 2015, 7 pages.
International Preliminary Report on Patentability received for PCT Patent Application No. PCT/US2014/029562, dated Sep. 24, 2015, 16 pages.
International Preliminary Report on Patentability received for PCT Patent Application No. PCT/US2014/040393, dated Dec. 8, 2015, 15 pages.
International Preliminary Report on Patentability received for PCT Patent Application No. PCT/US2014/040394, dated Dec. 23, 2015, 7 pages.
International Preliminary Report on Patentability received for PCT Patent Application No. PCT/US2014/040397, dated Dec. 17, 2015, 8 pages.
International Preliminary Report on Patentability received for PCT Patent Application No. PCT/US2014/040401, dated Dec. 8, 2015, 6 pages.
International Preliminary Report on Patentability received for PCT Patent Application No. PCT/US2014/040403 dated Dec. 23, 2015, 7 pages.
International Preliminary Report on Patentability received for PCT Patent Application No. PCT/US2014/040961, dated Dec. 17, 2015, 20 pages.
International Preliminary Report on Patentability received for PCT Patent Application No. PCT/US2014/041159, dated Dec. 17, 2015, 8 pages.
International Preliminary Report on Patentability received for PCT Patent Application No. PCT/US2014/041173, dated Dec. 17, 2015, 9 pages.
International Preliminary Report on Patentability received for PCT Patent Application No. PCT/US2014/049568, dated Feb. 18, 2016, 10 pages.
International Preliminary Report on Patentability received for PCT Patent Application No. PCT/US2016/035107, dated May 17, 2018, 24 pages.

(56) References Cited

OTHER PUBLICATIONS

International Search Report & Written Opinion received for PCT Patent Application No. PCT/US2016/021410, dated Jul. 26, 2016, 19 pages.
International Search Report and Written Opinion received for PCT Patent Application No. PCT/US16/23312, dated Jun. 27, 2016, 7 pages.
International Search Report and Written Opinion received for PCT Patent Application No. PCT/US1994/011011, dated Feb. 8, 1995, 3 pages (International Search Report only).
International Search Report and Written Opinion received for PCT Patent Application No. PCT/US2004/002873, dated Oct. 13, 2005, 7 pages.
International Search Report and Written Opinion received for PCT Patent Application No. PCT/US2004/016519, dated Nov. 3, 2005, 6 pages.
International Search Report and Written Opinion received for PCT Patent Application No. PCT/US2005/030234, dated Mar. 17, 2006, 11 pages.
International Search Report and Written Opinion received for PCT Patent Application No. PCT/US2005/038819, dated Apr. 5, 2006, 12 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2009/051954, dated Oct. 30, 2009, 10 pages.
International Search Report and Written Opinion received for PCT Patent Application No. PCT/US2009/055577, dated Jan. 26, 2010, 9 pages.
International Search Report and Written Opinion received for PCT Patent Application No. PCT/US2010/037378, dated Aug. 25, 2010, 14 pages.
International Search Report and Written Opinion received for PCT Patent Application No. PCT/US2011/020350, dated Jun. 30, 2011, 17 pages.
International Search Report and Written Opinion received for PCT Patent Application No. PCT/US2011/020825, dated Mar. 18, 2011, 9 pages.
International Search Report and Written Opinion received for PCT Patent Application No. PCT/US2011/020861, dated Nov. 29, 2011, 12 pages.
International Search Report and Written Opinion received for PCT Patent Application No. PCT/US2012/029810, dated Aug. 17, 2012, 11 pages.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040571, dated Nov. 16, 2012, 14 pages.
International Search Report and Written Opinion received for PCT Patent Application No. PCT/US2012/040801, dated Oct. 22, 2012, 20 pages.
International Search Report and Written Opinion received for PCT Patent Application No. PCT/US2012/040931, dated Feb. 1, 2013, 4 pages (International Search Report only).
International Search Report and Written Opinion received for PCT Patent Application No. PCT/US2012/043098, dated Nov. 14, 2012, 9 pages.
International Search Report and Written Opinion received for PCT Patent Application No. PCT/US2012/043100, dated Nov. 15, 2012, 8 pages.
International Search Report and Written Opinion received for PCT Patent Application No. PCT/US2012/056382, dated Dec. 20, 2012, 11 pages.
International Search Report and Written Opinion received for PCT Patent Application No. PCT/US2013/028412, dated Sep. 26, 2013, 17 pages.
International Search Report and Written Opinion received for PCT Patent Application No. PCT/US2013/028920, dated Jun. 27, 2013, 14 pages.
International Search Report and Written Opinion received for PCT Patent Application No. PCT/US2013/029156, dated Jul. 15, 2013, 9 pages.
International Search Report and Written Opinion received for PCT Patent Application No. PCT/US2013/040971, dated Nov. 12, 2013, 11 pages.
International Search Report and Written Opinion received for PCT Patent Application No. PCT/US2013/041225, dated Aug. 23, 2013, 3 pages (International Search Report only).
International Search Report and Written Opinion received for PCT Patent Application No. PCT/US2013/044574, dated Sep. 27, 2013, 12 pages.
International Search Report and Written Opinion received for PCT Patent Application No. PCT/US2013/044834, dated Dec. 20, 2013, 13 pages.
International Search Report and Written Opinion received for PCT Patent Application No. PCT/US2013/047659, dated Jul. 7, 2014, 25 pages.
International Search Report and Written Opinion received for PCT Patent Application No. PCT/US2013/047668, dated Feb. 13, 2014, 17 pages.
International Search Report and Written Opinion received for PCT Patent Application No. PCT/US2013/052558, dated Jan. 30, 2014, 15 pages.
International Search Report and Written Opinion received for PCT Patent Application No. PCT/US2013/058916, dated Sep. 8, 2014, 10 pages.
International Search Report and Written Opinion received for PCT Patent Application No. PCT/US2013/060121, dated Dec. 6, 2013, 8 pages.
International Search Report and Written Opinion received for PCT Patent Application No. PCT/US2014/015418, dated Aug. 26, 2014, 17 pages.

(56) References Cited

OTHER PUBLICATIONS

International Search Report and Written Opinion received for PCT Patent Application No. PCT/US2014/016988, dated Apr. 29, 2014, 10 pages.
International Search Report and Written Opinion received for PCT Patent Application No. PCT/US2014/023822, dated Sep. 25, 2014, 14 pages.
International Search Report and Written Opinion received for PCT Patent Application No. PCT/US2014/023826, dated Oct. 9, 2014, 13 pages.
International Search Report and Written Opinion received for PCT Patent Application No. PCT/US2014/026871, dated Jul. 23, 2014, 9 pages.
International Search Report and Written Opinion received for PCT Patent Application No. PCT/US2014/026873, dated Jan. 5, 2015, 11 pages.
International Search Report and Written Opinion received for PCT Patent Application No. PCT/US2014/028785, dated Oct. 17, 2014, 23 pages.
International Search Report and Written Opinion received for PCT Patent Application No. PCT/US2014/028950, dated Nov. 25, 2014, 10 pages.
International Search Report and Written Opinion received for PCT Patent Application No. PCT/US2014/029050, dated Jul. 31, 2014, 9 pages.
International Search Report and Written Opinion received for PCT Patent Application No. PCT/US2014/029562, dated Sep. 18, 2014, 21 pages.
International Search Report and Written Opinion received for PCT Patent Application No. PCT/US2014/040393, dated Dec. 8, 2014, 23 pages.
International Search Report and Written Opinion received for PCT Patent Application No. PCT/US2014/040394, dated Aug. 8, 2014, 11 pages.
International Search Report and Written Opinion received for PCT Patent Application No. PCT/US2014/040397, dated Aug. 27, 2014, 12 pages.
International Search Report and Written Opinion received for PCT Patent Application No. PCT/US2014/040401, dated Sep. 4, 2014, 10 pages.
International Search Report and Written Opinion received for PCT Patent Application No. PCT/US2014/040403, dated Sep. 23, 2014, 9 pages.
International Search Report and Written Opinion received for PCT Patent Application No. PCT/US2014/040961, dated Mar. 10, 2015, 5 pages.
International Search Report and Written Opinion received for PCT Patent Application No. PCT/US2014/041159, dated Sep. 26, 2014, 10 pages.
International Search Report and Written Opinion received for PCT Patent Application No. PCT/US2014/041173, dated Sep. 10, 2014, 11 pages.
International Search Report and Written Opinion received for PCT Patent Application No. PCT/US2014/049568, dated Nov. 14, 2014, 12 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/023089, dated Aug. 20, 2015, 16 pages.
International Search Report and Written Opinion received for PCT Patent Application No. PCT/US2015/023097, dated Jul. 7, 2015, 15 pages.
International Search Report and Written Opinion received for PCT Patent Application No. PCT/US2015/023593, dated Aug. 14, 2015, 16 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/029554, dated Jul. 16, 2015, 11 pages.
International Search Report and Written Opinion received for PCT Patent Application No. PCT/US2015/032470, dated Oct. 1, 2015, 13 pages.
International Search Report and Written Opinion received for PCT Patent Application No. PCT/US2015/032724, dated Jul. 27, 2015, 11 pages.
International Search Report and Written Opinion received for PCT Patent Application No. PCT/US2015/033051, dated Aug. 5, 2015, 14 pages.
International Search Report and Written Opinion received for PCT Patent Application No. PCT/US2015/047062, dated Jan. 13, 2016, 25 pages.
International Search Report and Written Opinion received for PCT Patent Application No. PCT/US2015/047064, dated Nov. 13, 2015, 13 pages.
International Search Report and Written Opinion received for PCT Patent Application No. PCT/US2015/047281, dated Dec. 17, 2015, 19 pages.
International Search Report and Written Opinion received for PCT Patent Application No. PCT/US2015/047553, dated Jan. 5, 2016, 10 pages.
International Search Report and Written opinion received for PCT Patent Application No. PCT/US2015/047583, dated Feb. 3, 2016, 11 pages.
International Search Report and Written Opinion received for PCT Patent Application No. PCT/US2015/047584, dated Nov. 9, 2015, 10 pages.
International Search Report and Written Opinion received for PCT Patent Application No. PCT/US2015/053365, dated Mar. 10, 2016, 20 pages.
International Search Report and Written Opinion received for PCT Patent Application No. PCT/US2015/053366, dated Apr. 26, 2016, 16 pages.
International Search Report and Written Opinion received for PCT Patent Application No. PCT/US2016/021103, dated Jun. 8, 2016, 15 pages.
International Search Report and Written Opinion received for PCT Patent Application No. PCT/US2016/021104, dated Jun. 8, 2016, 15 pages.
International Search Report and Written opinion received for PCT Patent Application No. PCT/US2016/021409, dated May 26, 2016, 22 pages.
International Search report and Written Opinion received for PCT Patent Application No. PCT/US2016/024666, dated Jun. 10, 2016, 13 pages.
International Search Report and Written Opinion received for PCT Patent Application No. PCT/US2016/025404, dated Jun. 24, 2016, 21 pages.
International Search Report and Written Opinion received for PCT Patent Application No. PCT/US2016/025407, dated Jun. 23, 2016, 18 pages.
International Search Report and Written Opinion received for PCT Patent Application No. PCT/US2016/025408, dated Aug. 11, 2016, 19 pages.

(56) References Cited

OTHER PUBLICATIONS

International Search Report and Written Opinion received for PCT Patent Application No. PCT/US2016/031059, dated Aug. 8, 2016, 11 pages.
International Search Report and Written Opinion received for PCT Patent Application No. PCT/US2016/031549, dated Aug. 5, 2016, 35 pages.
International Search Report and Written Opinion received for PCT Patent Application No. PCT/US2016/031550, dated Aug. 4, 2016, 13 pages.
International Search Report and Written Opinion received for PCT Patent Application No. PCT/US2016/035105, dated Aug. 29, 2016, 25 pages.
International Search Report and Written Opinion received for PCT Patent Application No. PCT/US2016/035107, dated Aug. 31, 2016, 26 pages.
International Search Report and Written Opinion received for PCT Patent Application No. PCT/US2016/035112, dated Aug. 22, 2016, 21 pages.
International Search Report and Written Opinion received for PCT Patent Application No. PCT/US2016/043005, dated Oct. 7, 2016, 17 pages.
International Search Report received for PCT Patent Application No. PCT/GB2009/051684, dated Mar. 12, 2010, 4 pages.
International Search Report received for PCT Patent Application No. PCT/US1993/012666, dated Nov. 9, 1994, 8 pages.
International Search Report received for PCT Patent Application No. PCT/US1994/000687, dated Jun. 3, 1994, 1 page.
International Search Report received for PCT Patent Application No. PCT/US 1994/00077, dated May 25, 1994, 2 pages.
International Search Report received for PCT Patent Application No. PCT/US1995/008369, dated Nov. 8, 1995, 6 pages.
International Search Report received for PCT Patent Application No. PCT/US1995/013076, dated Feb. 2, 1996, 1 page.
International Search Report received for PCT Patent Application No. PCT/US1996/01002, dated Oct. 30, 1996, 4 pages.
International Search Report received for PCT Patent Application No. PCT/US2002/024669, dated Nov. 5, 2002, 3 pages.
International Search Report received for PCT Patent Application No. PCT/US2002/024670, dated Sep. 26, 2002, 3 pages.
International Search Report received for PCT Patent Application No. PCT/US2002/033330, dated Feb. 4, 2003, 6 pages.
International Search Report received for PCT Patent Application No. PCT/US2005/046797, dated Nov. 24, 2006, 6 pages.
International Search Report received for PCT Patent Application No. PCT/US2011/037014, dated Oct. 4, 2011, 6 pages.
International Search Report received for PCT Patent Application No. PCT/US2013/041233, dated Nov. 22, 2013, 3 pages.
Intraspect SoftWare, "The Intraspect Knowledge Management Solution: Technical Overview", available at <http://tomgruber.org/writing/intraspect-whitepaper-1998.pdf>, 1998, 18 pages.
Invitation to Pay Additional Fees and Partial International Search Report received for PCT Patent Application No. PCT/US2004/016519, dated Aug. 4, 2005, 6 pages.
Invitation to Pay Additional Fees and Partial International Search Report received for PCT Patent Application No. PCT/US2005/046797, dated Jul. 3, 2006, 6 pages.
Invitation to Pay Additional Fees and Partial International Search Report received for PCT Patent Application No. PCT/US2006/048738, dated Jul. 10, 2007, 4 pages.
Invitation to Pay Additional Fees and Partial International Search Report received for PCT Patent Application No. PCT/US2011/020350, dated Apr. 14, 2011, 5 pages.
Invitation to Pay Additional Fees and Partial International Search Report received for PCT Patent Application No. PCT/US2015/023089, dated Jun. 17, 2015, 7 pages.
Invitation to Pay Additional Fees received for PCT Application No. PCT/US2016/021410, dated Apr. 28, 2016, 2 pages.
Invitation to Pay Additional Fees received for PCT Patent Application No. PCT/US2008/000043, dated Jun. 27, 2008, 4 pages.
Invitation to Pay Additional Fees received for PCT Patent Application No. PCT/US2008/000047, dated Jul. 4, 2008, 4 pages.
Invitation to Pay Additional Fees received for PCT Patent Application No. PCT/US2011/037014, dated Aug. 2, 2011, 6 pages.
Invitation to Pay Additional Fees received for PCT Patent Application No. PCT/US2012/040801, dated Aug. 8, 2012, 2 pages.
Invitation to Pay Additional Fees received for PCT Patent Application No. PCT/US2013/047659, dated Feb. 27, 2014, 7 pages.
Invitation to Pay Additional Fees received for PCT Patent Application No. PCT/US2013/052558, dated Nov. 7, 2013, 6 pages.
Invitation to pay additional fees received for PCT Patent Application No. PCT/US2014/029562, dated Jul. 4, 2014, 7 pages.
Invitation to Pay Additional Fees received for PCT Patent Application No. PCT/US2014/040961, dated Jan. 14, 2015, 3 pages.
Invitation to Pay Additional Fees received for PCT Patent Application No. PCT/US2015/047281, dated Oct. 8, 2015, 6 pages.
Invitation to Pay Additional Fees received for PCT Patent Application No. PCT/US2015/053366, dated Feb. 19, 2016, 8 pages.
Invitation to Pay Additional Fees received for PCT Patent Application No. PCT/US2016/025408, dated May 13, 2016, 2 pages.
Invitation to Pay Additional Fees received for PCT Patent Application No. PCT/US2014/028785, dated Jul. 4, 2014, 7 pages.
Invitation to pay additional fees received for the PCT Patent Application No. PCT/US2014/015418, dated May 26, 2014, 5 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Iphone Hacks, "Native iPhone MMS Application Released", available at <http://www.iphonehacks.com/2007/12/iphone-mms-app.html>, retrieved on Dec. 25, 2007, 5 pages.
IPhoneChat, "iChat for iPhone in JavaScript", available at <http://www.publictivity.com/iPhoneChat/>, retrieved on Dec. 25, 2007, 2 pages.
Iso-Sipila et al., "Multi-Lingual Speaker-Independent Voice User Interface for Mobile Devices", ICASSP 2006 Proceedings, IEEE International Conference on Acoustics, Speech and Signal Processing May 14, 2006, pp. 1-1081.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 1996, 4 pages.
Jabra Corporation, "FreeSpeak: BT200 User Manual", 2002, 42 pages.
Jabra, "Bluetooth Headset: User Manual", 2005, 17 pages.
Jabra, "Bluetooth Introduction", 2004, 15 pages.
Jacobs et al., "Scisor: Extracting Information from On-Line News", Communications of the ACM, vol. 33, No. 11, Nov. 1990, 10 pages.
Janas, Jurgen M., "The Semantics-Based Natural Language Interface to Relational Databases", Chapter 6, Cooperative Interfaces to Information Systems, 1986, pp. 143-188.
Jawaid et al., "Machine Translation with Significant Word Reordering and Rich Target-Side Morphology", WDS'11 Proceedings of Contributed Papers, Part I, 2011, pp. 161-166.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice,, May 1980, pp. 381-397.
Jelinek, F., "Self-Organized Language Modeling for Speech Recognition", Readings in Speech Recognition, Edited by Alex Waibel and Kai-Fu Lee, Morgan Kaufmann Publishers, Inc., ISBN: 1-55860-124-4, 1990, 63 pages.
Jennings et al., "A Personal News Service Based on a User Model Neural Network", IEICE Transactions on Information and Systems, vol. E75-D, No. 2, Mar. 1992, 12 pages.

(56) References Cited

OTHER PUBLICATIONS

Ji et al., "A Method for Chinese Syllables Recognition Based upon Sub-syllable Hidden Markov Model", 1994 International Symposium on Speech, Image Processing and Neural Networks, Hong Kong, Apr. 1994, 4 pages.
Jiang et al., "A Syllable-based Name Transliteration System", Proc, of the 2009 Named Entities Workshop, Aug. 7, 2009, pp. 96-99.
Johnson, Jeff A., "A Comparison of User Interfaces for Panning on a Touch-Controlled Display", CHI '95 Proceedings, 1995, 8 pages.
Johnson, Julia Ann., "A Data Management Strategy for Transportable Natural Language Interfaces", Doctoral Thesis Submitted to the Department of Computer Science, University of British Columbia, Canada, Jun. 1989, 285 pages.
Jones, J., "Speech Recognition for Cyclone", Apple Computer, Inc., E.R.S. Revision 2.9, Sep. 10, 1992, 93 pages.
Jouvet et al., "Evaluating Grapheme-to-phoneme Converters in Automatic Speech Recognition Context", IEEE,, 2012,, pp. 4821-4824.
Julia et al., "http://www.speech.sri.com/demos/atis.html", Proceedings of AAAI, Spring Symposium, 1997, 5 pages.
Julia et al., "Un Editeur Interactif De Tableaux Dessines a Main Levee (An Interactive Editor for Hand-Sketched Tables)", Traitement du Signal, vol. 12, No. 6, 1995, pp. 619-626.
Kaeppner et al., "Architecture of HeiPhone: A Testbed for Audio/Video Teleconferencing", IBM European Networking Center, 1993.
Kahn et al., "CoABS Grid Scalability Experiments", Autonomous Agents and Multi-Agent Systems, vol. 7, 2003, pp. 171-178.
Kamba et al., "Using Small Screen Space More Efficiently", CHI '96 Proceedings of the SIGCHI Conference on Human Factors in Computing Systems, Apr. 13-18, 1996, pp. 383-390.
Kamel et al., "A Graph Based Knowledge Retrieval System", IEEE International Conference on Systems, Man and Cybernetics, 1990, pp. 269-275.
Kanda et al., "Robust Domain Selection Using Dialogue History in Multi-domain Spoken Dialogue Systems", Journal of Information Processing Society, vol. 48, No. 5, May 15, 2007, pp. 1980-1989. (English Abstract Submitted).
Kanda et al., "Spoken Language Understanding Using Dialogue Context in Database Search Task", Journal of Information Processing Society of Japan, vol. 47, No. 6, Jun. 15, 2016, pp. 1802-1811. (English Abstract Submitted).
Kane et al., "Slide Rule: Making Mobile Touch Screens Accessible to Blind People Using Multi-Touch Interaction Techniques", ASSETS, Oct. 13-15, 2008, pp. 73-80.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Karp, P. D., "A Generic Knowledge-Base Access Protocol", Available online at <http://lecture.cs.buu.ac.th/-f50353/Document/gfp.pdf>, May 12, 1994, 66 pages.
Katz et al., "Exploiting Lexical Regularities in Designing Natural Language Systems", Proceedings of the 12th International Conference on Computational Linguistics, 1988, pp. 1-22.
Katz et al., "REXTOR: A System for Generating Relations from Natural Language", Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, S. M., "Estimation of Probabilities from Sparse Data for the Language Model Component of a Speech Recognizer", IEEE Transactions on Acoustics, Speech and Signal Processing, vol. ASSP-35, No. 3, Mar. 1987, 3 pages.
Katzenmaier et al., "Identifying the Addressee in Human-Human-Robot Interactions based on Head Pose and Speech", Proc. ICMI" 04, ACM, 2004, pp. 144-151.
Kazemzadeh et al., "Acoustic Correlates of User Response to Error in Human-Computer Dialogues", Automatic Speech Recognition and Understanding, 2003, pp. 215-220.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Kikui, Gen-Itiro, "Identifying the Coding System and Language of On-Line Documents on the Internet", International Conference on Computational, Aug. 1996, pp. 652-657.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET'93, 1993, pp. 1-12.
Kitano, H., "PhiDM-Dialog, An Experimental Speech-to-Speech Dialog Translation System", Computer, vol. 24, No. 6, Jun. 1991, 13 pages.
Kitaoka et al., "Detection and Recognition of Correction Utterances on Misrecognition of Spoken Dialog System", Systems and Computers in Japan, vol. 36, No. Oct. 11, 2005, pp. 24-33.
Kjelldahl et al., "Multimedia—Principles, Systems, and Applications", Proceedings of the 1991 Eurographics Workshop on Multimedia Systems, Applications, and Interaction, Apr. 1991.
Klabbers et al., "Reducing Audible Spectral Discontinuities", IEEE Transactions on Speech and Audio Processing, vol. 9, No. 1, Jan. 2001, 13 pages.
Klatt et al., "Linguistic Uses of Segmental Duration in English: Acoustic and Perpetual Evidence", Journal of the Acoustical Society of America, vol. 59, No. 5, May 1976, 16 pages.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Knownav, "Knowledge Navigator", YouTube Video available at <http://www.youtube.com/watch?v=QRH8eimU_20>, Apr. 29, 2008, 1 page.
Kohler, Joachim, "Multilingual Phone Models for Vocabulary-Independent Speech Recognition Tasks", Speech Communication, vol. 35, No. 1-2, Aug. 2001, pp. 21-30.
Kominek et al., "Impact of Durational Outlier Removal from Unit Selection Catalogs", 5th ISCA Speech Synthesis Workshop, Jun. 14-16, 2004, 6 pages.

(56) References Cited

OTHER PUBLICATIONS

Konolige, Kurt, "A Framework for a Portable Natural-Language Interface to Large Data Bases", SRI International, Technical Note 197, Oct. 12, 1979, 54 pages.
Kroon et al., "Pitch Predictors with High Temporal Resolution", IEEE, vol. 2, 1990, pp. 661-664.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kubala et al., "Speaker Adaptation from a Speaker-Independent Training Corpus", International Conference on Acoustics, Speech and Signal Processing (ICASSP'90), Apr. 1990, 4 pages.
Kubala et al., "The Hub and Spoke Paradigm for CSR Evaluation", Proceedings of the Spoken Language Technology Workshop, Mar. 1994, 9 pages.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
Ladefoged, Peter, "A Course in Phonetics", New York, Harcourt, Brace, Jovanovich, Second Edition, 1982.
Laface et al., "A Fast Segmental Viterbi Algorithm For Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Laird et al., "SOAR: An Architecture for General Intelligence", Artificial Intelligence, vol. 33, 1987, pp. 1-64.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Langley et al., "A Design for the ICARUS Architechture", SIGART Bulletin, vol. 2, No. 4, 1991, pp. 104-109.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Larks, "Intelligent Software Agents", available at <http://www.cs.cmu.edu/~softagents/larks.html> retrieved on Mar. 15, 2013, 2 pages.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Lee et al., "A Real-Time Mandarin Dictation Machine for Chinese Language with Unlimited Texts and Very Large Vocabulary", International Conference on Acoustics, Speech and Signal Processing, vol. 1, Apr. 1990, 5 pages.
Lee et al., "Golden Mandarin (II)—An Improved Single-Chip Real-Time Mandarin Dictation Machine for Chinese Language with Very Large Vocabulary", IEEE International Conference of Acoustics, Speech and Signal Processing, vol. 2, 1993, 4 pages.
Lee et al., "Golden Mandarin (II)—An Intelligent Mandarin Dictation Machine for Chinese Character Input with Adaptation/Learning Functions", International Symposium on Speech, Image Processing and Neural Networks, Hong Kong, Apr. 1994, 5 pages.
Lee et al., "On URL Normalization", Proceedings of the International Conference on Computational Science and its Applications, ICCSA2005, pp. 1076-1085.
Lee et al., "System Description of Golden Mandarin (I) Voice Input for Unlimited Chinese Characters", International Conference on Computer Processing of Chinese & Oriental Languages, vol. 5, No. 3 & 4, Nov. 1991, 16 pages.
Lee, K. F., "Large-Vocabulary Speaker-Independent Continuous Speech Recognition: The SPHINX System", Partial Fulfillment of the Requirements for the Degree of Doctorof Philosophy, Computer Science Department, Carnegie Mellon University, Apr. 1988, 195 pages.
Lee, Kai-Fu, "Automatic Speech Recognition", 1989, 14 pages (Table of Contents).
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent User Interfaces, Jan. 2005, pp. 231-238.
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Leveseque et al., "A Fundamental Tradeoff in Knowledge Representation and Reasoning", Readings in Knowledge Representation, 1985, 30 pages.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Cameron, "Task Ave for iPhone Review", Mac Life, Available at <http://www.maclife.com/article/reviews/task_ave_iphone_review>, Mar. 3, 2011, 5 pages.
Lewis, Peter, "Two New Ways to Buy Your Bits", CNN Money, available at <http://money.cnn.com/2003/12/30/commentary/ontechnology/download/>,, Dec. 31, 2003, 4 pages.
Li et al., "A Phonotactic Language model for Spoken Language Identification", Proceedings of the 43rd Annual Meeting of the ACL, Jun. 25, 2005, pp. 515-522.
Lieberman et al., "Out of Context: Computer Systems that Adapt to, and Learn from, Context", IBM Systems Journal, vol. 39, No. 3 & 4, 2000, pp. 617-632.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.

(56) References Cited

OTHER PUBLICATIONS

Lin et al., "A Distributed Architecture for Cooperative Spoken Dialogue Agents with Coherent Dialogue State and History", Available on line at <http://citeseerx.ist.psu.edu/viewdoc/summary?doi=10.1.1.42.272>, 1999, 4 pages.
Lin et al., "A New Framework for Recognition of Mandarin Syllables with Tones Using Sub-syllabic Unites", IEEE International Conference on Acoustics, Speech and Signal Processing (ICASSP-93), Apr. 1993, 4 pages.
Linde et al., "An Algorithm for Vector Quantizer Design", IEEE Transactions on Communications, vol. 28, No. 1, Jan. 1980, 12 pages.
Liu et al., "Efficient Joint Compensation of Speech for the Effects of Additive Noise and Linear Filtering", IEEE International Conference of Acoustics, Speech and Signal Processing, ICASSP-92, Mar. 1992, 4 pages.
Logan et al., "Mel Frequency Cepstral Co-efficients for Music Modeling", International Symposium on Music Information Retrieval, 2000, 2 pages.
Lowerre, B. T., "The-Harpy Speech Recognition System", Doctoral Dissertation, Department of Computer Science, Carnegie Mellon University, Apr. 1976, 20 pages.
Lyon, R., "A Computational Model of Binaural Localization and Separation", Proceedings of IEEE International Conference on Acoustics, Speech and Signal Processing, Apr. 1983, pp. 1148-1151.
Lyons et al., "Augmenting Conversations Using Dual-Purpose Speech", Proceedings of the 17th Annual ACM Symposium on User interface Software and Technology, 2004, 10 pages.
Lyons, Richard F., "CCD Correlators for Auditory Models", Proceedings of the Twenty-Fifth Asilomar Conference on Signals, Systems and Computers, Nov. 4-6, 1991, pp. 785-789.
Macchi, Marian, "Issues in Text-to-Speech Synthesis" Proceedings of IEEE International Joint Symposia on Intelligence and Systems, May 21, 1998, pp. 318-325.
MacKenzie et al., "Alphanumeric Entry on Pen-Based Computers", International Journal of Human-Computer Studies, vol. 41, 1994, pp. 775-792.
MacKinlay et al., "The Perspective Wall: Detail and Context Smoothly Integrated", ACM, 1991, pp. 173-179.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
Mactech, "Keystrokes 3.5 for Mac OS X Boosts Word Prediction", available at <http://www.mactech.com/news/?p=1007129>, retrieved on Jan. 7, 2008, 3 pages.
Maghbouleh, Arman, "An Empirical Comparison of Automatic Decision Tree and Linear Regression Models for Vowel Durations", Revised Version of a Paper Presented at the Computational Phonology in Speech Technology Workshop, 1996 Annual Meeting of the Association for Computational Linguistics in Santa Cruz, California, 7 pages.
Mahedero et al., "Natural Language Processing of Lyrics", In Proceedings of the 13th Annual ACM International Conference on Multimedia, ACM, Nov. 6-11, 2005, 4 pages.
Mangu et al., "Finding Consensus in Speech Recognition: Word Error Minimization and Other Applications of Confusion Networks", Computer Speech and Language, vol. 14, No. 4, 2000, pp. 291-294.
Manning etal, "Foundations of Statistical Natural Language Processing", The MIT Press, Cambridge Massachusetts, 1999, pp. 10-11.
Marcus et al., "Building a Large Annotated Corpus of English: The Penn Treebank", Computational Linguistics, vol. 19, No. 2, 1993, pp. 313-330.
Markel et al., "Linear Prediction of Speech", Springer-Verlag, Berlin, Heidelberg, New York, 1976, 12 pages.
Markel et al., "Linear Production of Speech", Reviews, 1976, pp. xii, 288.
Martin et al., "Building and Using Practical Agent Applications", SRI International, PAAM Tutorial, 1998, 78 pages.
Martin et al., "Building Distributed Software Systems with the Open Agent Architecture", Proceedings of the Third International Conference on the Practical Application of Intelligent Agents and Multi-Agent Technology, Mar. 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the Second International Conference on the Practical Application of Intelligent Agents and Multi-Agent Technology, Apr. 1997, pp. 1-20.
Martin et al., "The Open Agent Architecture: A Framework for Building Distributed Software Systems", Applied Artificial Intelligence: An International Journal, vol. 13, No. 1-2, available at <http://adam.cheyer.com/papers/oaa.pdf> >, retrieved from internet on Jan.-Mar. 1999.
Martin et al., "Transportability and Generality in a Natural-Language Interface System", Proceedings of the Eighth International Joint Conference on Artificial Intelligence, Technical Note 293, Aug. 1983, 21 pages.
Martins et al., "Extracting and Exploring the Geo-Temporal Semantics of Textual Resources", Semantic Computing, IEEE International Conference, 2008, pp. 1-9.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matiasek et al., "Tamic-P: A System for NL Access to Social Insurance Database", 4th International Conference on Applications of Natural Language to Information Systems, Jun. 1999, 7 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, pp. 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
McGuire et al., "SHADE: Technology for Knowledge-Based Collaborative Engineering", Journal of Concurrent Engineering Applications and Research (CERA), 1993, 18 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mellinger, David K., "Feature-Map Methods for Extracting Sound Frequency Modulation", IEEE Computer Society Press, 1991, pp. 795-799.
Meng et al., "Generating Phonetic Cognates to Handle Named Entities in English-Chinese Cross-Language Spoken Document Retrieval", Automatic Speech Recognition and Understanding, Dec. 2001, pp. 311-314.
Meng et al., "Wheels: A Conversational System in the Automobile Classified Domain", Proceedings of Fourth International Conference on Spoken Language, ICSLP 96, vol. 1, Oct. 1996, 4 pages.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.
Merlin et al., "Non Directly Acoustic Process For Costless Speaker Recognition and Indexation", International Workshop on Intelligent Communication Technologies and Applications, Jan. 1, 1999, 5 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.

(56) References Cited

OTHER PUBLICATIONS

Miastkowski, Stan, "paperworks Makes Paper Intelligent", Byte Magazine, Jun. 1992.
Michos et al., "Towards an Adaptive Natural Language Interface to Command Languages", Natural Language Engineering, vol. 2, No. 3, 1996, pp. 191-209.
Microsoft Corporation, "Microsoft MS-DOS Operating System User's Guide", Microsoft Corporation, 1982, pp. 4-1 to 4-16, 5-1 to 5-19.
Microsoft Corporation, Microsoft Office Word 2003 (SP2), Microsoft Corporation, SP3 as of 2005, pages MSWord 2003 Figures 1-5, 1983-2003.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pages MSWord Figures 1-5, 1999.
Microsoft, "Turn On and Use Magnifier", available at <http://www.microsoft.com/windowsxp/using/accessibility/magnifierturnon.mspx>, retrieved on Jun. 6, 2009.
Microsoft/Ford, "Basic Sync Commands", www.SyncMyRide.com, Sep. 14, 2007, 1 page.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Milstead et al., "Metadata: Cataloging by Any Other Name", available at <http://www.iicm.tugraz.at/thesis/cguetl_diss/literatur/Kapitel06/References/Milstead_et_al._1999/metadata.html>, Jan. 1999, 18 pages.
Milward et al., "D2.2: Dynamic Multimodal Interface Reconfiguration, Talk and Look: Tools for Ambient Linguistic Knowledge", available at <http://www.ihmc.us/users/nblaylock!Pubs/Files/talk d2.2.pdf>, Aug. 8, 2006, 69 pages.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Advances in Database Technology, Lecture Notes in Computer Science, vol. 1777, 2000, pp. 1-15.
Moberg et al., "Cross-Lingual Phoneme Mapping for Multilingual Synthesis Systems", Proceedings of the 8th International Conference on Spoken Language Processing, Jeju Island, Korea, INTERSPEECH 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Mobile Tech News, "T9 Text Input Software Updated", available at <http://www.mobiletechnews.com/info/2004/11/23/122155.html>, Nov. 23, 2004, 4 pages.
Modi et al., "CMRadar: A Personal Assistant Agent for Calendar Management", AAAI, Intelligent Systems Demonstrations, 2004, pp. 1020-1021.
Mok et al., "Media Searching on Mobile Devices", IEEE EIT 2007 Proceedings, 2007, pp. 126-129.
Moore et al., "Combining Linguistic and Statistical Knowledge Sources in Natural-Language Processing for ATIS", SRI International, Artificial Intelligence Center, 1995, 4 pages.
Moore et al., "SRI's Experience with the ATIS Evaluation", Proceedings of the Workshop on Speech and Natural Language, Jun. 1990, pp. 147-148.
Moore et al., "The Information Warfare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-Based User Interfaces", Proceedings of International Workshop on Human Interface Technology, Oct. 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Morland, D. V., "Human Factors Guidelines for Terminal Interface Design", Communications of the ACM vol. 26, No. 7, Jul. 1983, pp. 484-494.
Morris et al., "Andrew: A Distributed Personal Computing Environment", Communications of the ACM, (Mar. 1986); vol. 29 No. 3,, Mar. 1986, pp. 184-201.
Morton, Philip, "Checking If An Element Is Hidden", StackOverflow, Available at <http://stackoverflow.com/questions/178325/checking-if-an-element-is-hidden>, Oct. 7, 2008, 12 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Apple Computer, Inc., Addison-Wesley Publishing Company, Inc., 1990, 17 pages.
Mozer, Michael C., "An Intelligent Environment must be Adaptive", IEEE Intelligent Systems, 1999, pp. 11-13.
Muller et al., "CSCW92 Demonstrations", 1992, pp. 11-14.
Murty et al., "Combining Evidence from Residual Phase and MFCC Features for Speaker Recognition", IEEE Signal Processing Letters, vol. 13, No. 1, Jan. 2006, 4 pages.
Murveit et al., "Integrating Natural Language Constraints into HMM-Based Speech Recognition", International Conference on Acoustics, Speech and Signal Processing, Apr. 1990, 5 pages.
Murveit et al., "Speech Recognition in SRI's Resource Management and ATIS Systems", Proceedings of the Workshop on Speech and Natural Language, 1991, pp. 94-100.
Musicmatch, "Musicmatch and Xing Technology Introduce Musicmatch Jukebox", Press Releases, available at <http://www.musicmatch.com/info/company/press/releases/?year= 1998&release=2>, May 18, 1998, 2 pages.
Muthusamy et al., "Speaker-Independent Vowel Recognition: Spectograms versus Cochleagrams", IEEE, Apr. 1990, pp. 533-536.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
N200 Hands-Free Bluetooth Car Kit, available at <www.wirelessground.com>, retrieved on Mar. 19, 2007, 3 pages.

(56) References Cited

OTHER PUBLICATIONS

Nadoli et al., "Intelligent Agents in the Simulation of Manufacturing Systems", Proceedings of the SCS Multiconference on AI and Simulation, 1989, 1 page.
Nakagawa et al., "Speaker Recognition by Combining MFCC and Phase Information", IEEE International Conference on Acoustics, Speech and Signal Processing (ICASSP), Mar. 2010, 4 pages.
Nakagawa et al., "Unknown Word Guessing and Part-of-Speech Tagging Using Support Vector Machines", Proceedings of the 6th NLPRS, 2001, pp. 325-331.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 70 pages.
NCIP Staff, "Magnification Technology", available at <http://www2.edc.org/ncip/library/vi/magnifi.htm>, 1994, 6 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Neches et al., "Enabling Technology for Knowledge Sharing", Fall, 1991, pp. 37-56.
Newton, Harry, "Newton's Telecom Dictionary", Mar. 1998, pp. 62, 155, 610-611, 771.
Ng, Simon, "Google's Task List Now Comes to Iphone", SimonBlog, Available at <http://www.simonblog.com/2009/02/04/googles-task-list-now-comes-to-iphone/>, Feb. 4, 2009, 33 pages.
Nguyen et al., "Generic Manager for Spoken Dialogue Systems", In DiaBruck: 7th Workshop on the Semantics and Pragmatics of Dialogue, Proceedings, 2003, 2 pages.
Niesler et al., "A Variable-Length Category-Based N-Gram Language Model", IEEE International Conference on Acoustics, Speech and Signal Processing (ICASSP'96), vol. 1, May 1996, 6 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Non-Final Office Action received for U.S. Appl. No. 15/151,191, dated Jun. 15, 2018, 25 pages.
Non-Final Office Action received for U.S. Appl. No. 15/151,191, dated Oct. 16, 2019, 31 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
Noth et al., "Verbmobil: The Use of Prosody in the Linguistic Components of a Speech Understanding System", IEEE Transactions On Speech and Audio Processing, vol. 8, No. 5, Sep. 2000, pp. 519-532.
Notice of Allowance received for U.S. Appl. No. 15/151,191, dated Feb. 18, 2020, 5 pages.
O'Connor, Rory J., "Apple Banking on Newton's Brain", San Jose Mercury News, Apr. 22, 1991.
Odubiyi et al., "SAIRE—A Scalable Agent-Based Information Retrieval Engine", Proceedings of the First International Conference on Autonomous Agents, 1997, 12 pages.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Osxdaily, "Get a List of Siri Commands Directly from Siri", Available at <http://osxdaily.com/2013/02/05/list-siri-commands/>, Feb. 5, 2013, 15 pages.
Owei et al., "Natural Language Query Filtration in the Conceptual Query Language", IEEE, 1997, pp. 539-549.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide: Your Palm® Treo.TM. 755p Smartphone", 2005-2007, 304 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010.
Panasonic, "Toughbook 28: Powerful, Rugged and Wireless", Panasonic Toughbook Models, available at <http://www.panasonic.com/computer/notebook/html/01a_s8.htm>, retrieved on Dec. 19, 2002, 3 pages.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", Available online at <http://citeseerx.ist.psu.edu/messaqes/downloadsexceeded.html>, Nov. 14, 1997, 21 pages.
Parks et al., "Classification of Whale and Ice Sounds with a cochlear Model", IEEE, Mar. 1992.
Parson, T. W., "Voice and Speech Processing", Pitch and Formant Estimation, McGraw-Hill, Inc., ISBN: 0-07-0485541-0, 1987, 15 pages.
Parsons, T. W., "Voice and Speech Processing", Linguistics and Technical Fundamentals, Articulatory Phonetics and Phonemics, McGraw-Hill, Inc., ISBN: 0-07-0485541-0, 1987, 5 pages.
Patent Abstracts of Japan, vol. 014, No. 273 (E-0940)Jun. 13, 1990 (Jun. 13, 1990)-& JP 02 086057 A (Japan Storage Battery Co Ltd), Mar. 27, 1990 (Mar. 27, 1990), 3 pages.
Pathak et al., "Privacy-preserving Speech Processing: Cryptographic and Stringmatching Frameworks Show Promise", In: IEEE signal processing magazine, retrieved from <http://www.merl.com/publications/docs/TR2013-063.pdf>, Feb. 13, 2013, 16 pages.
Patterson et al., "Rendezvous: An Architecture for Synchronous Multi-User Applications", CSCW'90 Proceedings, 1990, pp. 317-328.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
PhatNoise, Voice Index on Tap, Kenwood Music Keg, available at <http://www.phatnoise.com/kenwood/kenwoodssamail.html>, retrieved on Jul. 13, 2006, 1 page.

(56) References Cited

OTHER PUBLICATIONS

Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Phoenix Solutions, Inc., "Declaration of Christopher Schmandt Regarding the MIT Galaxy System", West Interactive Corp., A Delaware Corporation, Document 40, Jul. 2, 2010, 162 pages.
Pickering, J. A., "Touch-Sensitive Screens: The Technologies and Their Application", International Journal of Man—Machine Studies, vol. 25, No. 3, Sep. 1986, pp. 249-269.
Picone, J., "Continuous Speech Recognition using Hidden Markov Models", IEEE ASSP Magazine, vol. 7, No. 3, Jul. 1990, 16 pages.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Pollock, Stephen, "A Rule-Based Message Filtering System", Published in Journal, ACM Transactions on Information Systems (TOIS), vol. 6, Issue 3, Jul. 1988, pp. 232-254.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Powell, Josh, "Now You See Me . . . Show/Hide Performance", available at http://www.learningjquery.com/2010/05/now-you-see-me-showhide-performance, May 4, 2010, 3 pages.
Public Safety Technologies, "Tracer 2000 Computer", available at <http://www.pst911.com/tracer.html>, retrieved on Dec. 19, 2002, 3 pages.
Pulman et al., "Clare: A Combined Language and Reasoning Engine", Proceedings of JFIT Conference, available at <http://www.cam.sri.com/tr/crc042/paper.ps.Z>, 1993, 8 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Quick Search Algorithm, Communications of the ACM, 33(8), 1990, pp. 132-142.
Rabiner et al., "Digital Processing of Speech Signals", Prentice Hall, 1978, pp. 274-277.
Rabiner et al., "Fundamental of Speech Recognition", AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K.,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Ratcliffe, M., "ClearAccess 2.0 Allows SQL Searches Off-Line (Structured Query Language) (ClearAccess Corp. Preparing New Version of Data-Access Application with Simplified User Interface, New Features) (Product Announcement)", MacWeek, vol. 6, No. 41, Nov. 16, 1992, 2 pages.
Ravishankar, Mosur K., "Efficient Algorithms for Speech Recognition", Doctoral Thesis Submitted to School of Computer Science, Computer Science Division, Carnegie Mellon University, Pittsburgh, May 15, 1996, 146 pages.
Rayner et al., "Adapting the Core Language Engine to French and Spanish", Cornell University Library, available at <http:l/arxiv.org/abs/cmp-lg/9605015>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation with Mid-90's Technology: A Case Study", Eurospeech, ISCA, Available online at <http://citeseerx.ist.psu.edu/viewdoc/summary?doi=10.1.1.54.8608>, 1993, 4 pages.
Rayner, M., "Abductive Equivalential Translation and its Application to Natural Language Database Interfacing", Dissertation Paper, SRI International, Sep. 1993, 162 pages.
Rayner, Manny, "Linguistic Domain Theories: Natural-Language Database Interfacing from First Principles", SRI International, Cambridge, 1993, 11 pages.
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Remde et al., "SuperBook: An Automatic Tool for Information Exploration-Hypertext?", In Proceedings of Hypertext, 87 Papers, Nov. 1987, 14 pages.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction INTERACT, 1997, pp. 85-92.
Reynolds, C. F., "On-Line Reviews: A New Application of the HICOM Conferencing System", IEEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rigoll, G., "Speaker Adaptation for Large Vocabulary Speech Recognition Systems Using Speaker Markov Models", International Conference on Acoustics, Speech and Signal Processing (ICASSP'89), May 1989, 4 pages.

(56) References Cited

OTHER PUBLICATIONS

Riley, M D., "Tree-Based Modelling of Segmental Durations", Talking Machines Theories, Models and Designs, Elsevier Science Publishers B.V., North-Holland, ISBN: 08-444-89115.3, 1992, 15 pages.
Rioport, "Rio 500: Getting Started Guide", available at <http://ec1.images-amazon.com/media/i3d/01/A/man-migrate/MANUAL000023453.pdf>, 1999, 2 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech and Signal Processing (ICASSP'79), Apr. 1979, 5 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Roddy et al., "Communication and Collaboration in a Landscape of B2B eMarketplaces", VerticalNet Solutions, White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root, Robert, "Design of a Multi-Media Vehicle for Social Browsing", Bell Communications Research, 1988, pp. 25-38.
Rose et al., "Inside Macintosh", vols. I, II and III, Addison-Wesley Publishing Company, Inc., Jul. 1988, 1284 pages.
Roseberry, Catherine, "How To Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosenfeld, R., "A Maximum Entropy Approach to Adaptive Statistical Language Modelling", Computer Speech and Language, vol. 10, No. 3, Jul. 1996, 25 pages.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roszkiewicz, A., "Extending your Apple", Back Talk-Lip Service, A+ Magazine, The Independent Guide for Apple Computing, vol. 2, No. 2, Feb. 1984, 5 pages.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Rubine, Dean Harris, "Combining Gestures and Direct Manipulation", CHI '92, May 3-7, 1992, pp. 659-660.
Rubine, Dean Harris, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Ruch et al., "Using Lexical Disambiguation and Named-Entity Recognition to Improve Spelling Correction in the Electronic Patient Record", Artificial Intelligence in Medicine, Sep. 2003, pp. 169-184.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approach", Prentice Hall, Inc., 1995, 121 pages.
Russo et al., "Urgency is a Non-Monotonic Function of Pulse Rate", Journal of the Acoustical Society of America, vol. 122, No. 5, 2007, 6 pages.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech and Signal Processing, vol. ASSP-26, No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with Security Attributes and Privilege Delegation Access control beyond the ACL", Computer Communications, vol. 20, 1997, 9 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
San-Segundo et al., "Confidence Measures for Dialogue Management in the CU Communicator System", Proceedings of Acoustics, Speech and Signal Processing (ICASSP'00), Jun. 2000, 4 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Graphical Fisheye Views of Graphs", Systems Research Center, Digital Equipment Corporation,, Mar. 17, 1992, 31 pages.
Sarkar et al., "Graphical Fisheye Views", Communications of the ACM, vol. 37, No. 12, Dec. 1994, pp. 73-83.
Sarkar et al., "Stretching the Rubber Sheet: A Metaphor for Viewing Large Layouts on Small Screens", UIST'93, ACM, Nov. 3-5, 1993, pp. 81-91.
Sarvas et al., "Metadata Creation System for Mobile Images", Conference Proceedings, The Second International Conference On Mobile Systems, Applications And Services, Jun. 6, 2004, pp. 36-48.
Sastry, Ravindra W., "A Need for Speed: A New Speedometer for Runners", submitted to the Department of Electrical Engineering and Computer Science at the Massachusetts Institute of Technology, 1999, pp. 1-42.
Sato, H., "A Data Model, Knowledge Base and Natural Language Processing for Sharing a Large Statistical Database", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, 15 pages.
Scagliola, C., "Language Models and Search Algorithms for Real-Time Speech Recognition", International Journal of Man-Machine Studies, vol. 22, No. 5, 1985, 25 pages.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.

(56) References Cited

OTHER PUBLICATIONS

Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Augmenting a Window System with Speech Input", IEEE Computer Society, Computer, vol. 23, No. 8, Aug. 1990, 8 pages.
Schmandt et al., "Phone Slave: A Graphical Telecommunications Interface", Proceedings of the SID, vol. 26, No. 1, 1985, pp. 79-82.
Schmandt et al., "Phone Slave: A Graphical Telecommunications Interface", Society for Information Display, International Symposium Digest of Technical Papers, Jun. 1984, 4 pages.
Schmid, H., "Part-of-speech tagging with neural networks", COLING '94 Proceedings of the 15th conference on Computational linguistics—vol. 1, 1994, pp. 172-176.
Schnelle, Dirk, "Context Aware Voice User Interfaces for Workflow Support", Dissertation paper, Aug. 27, 2007, 254 pages.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Schooler et al., "A Packet-switched Multimedia Conferencing System", by Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schooler, Eve, "A Distributed Architecture for Multimedia Conference Control", ISI Research Report, Nov. 1991, pp. 1-18.
Schultz, Tanja, "Speaker Characteristics", In: Speaker Classification I, retrieved from <http://ccc.inaoep.mx/~villasen/bib/Speaker%20Characteristics.pdf>, 2007, pp. 47-74.
Schütze, H., "Dimensions of Meaning", Proceedings of Supercomputing'92 Conference, Nov. 1992, 10 pages.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient And Exact Procedure For Finding The N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behaviors Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.
Seide et al., "Improving Speech Understanding by Incorporating Database Constraints and Dialogue History", Proceedings of Fourth International Conference on Philadelphia,, 1996, pp. 1017-1020.
Sen et al., "Indian Accent Text-to-Speech System for Web Browsing", Sadhana, vol. 27, No. 1, Feb. 2002, pp. 113-126.
Seneff et al., "A New Restaurant Guide Conversational System: Issues in Rapid Prototyping for Specialized Domains", Proceedings of Fourth International Conference on Spoken Language, vol. 2, 1996, 4 pages.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Sharoff et al., "Register-Domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", Proceedings of the Ninth Conference on Artificial Intelligence for Applications, Mar. 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation through Vector Quantization", IEEE International Conference on Acoustics, Speech and Signal Processing (ICASSP'86), vol. 11, Apr. 1986, 4 pages.
Shimazu et al., "CAPIT: Natural Language Interface Design Tool with Keyword Analyzer and Case-Based Parser", NEG Research & Development, vol. 33, No. 4, Oct. 1992, 11 pages.
Shinkle, L., "Team User's Guide", SRI International, Artificial Intelligence Center, Nov. 1984, 78 pages.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shklar et al., "InfoHarness: Use of Automatically Generated Metadata for Search and Retrieval of Heterogeneous Information", Proceedings of CAiSE'95, Finland, 1995, 14 pages.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References).
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.

(56) References Cited

OTHER PUBLICATIONS

Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.
Sigurdsson et al., "Mel Frequency Cepstral Co-efficients: An Evaluation of Robustness of MP3 Encoded Music", Proceedings of the 7th International Conference on Music Information Retrieval, 2006, 4 pages.
Silverman et al., "Using a Sigmoid Transformation for Improved Modeling of Phoneme Duration", Proceedings of the IEEE International Conference on Acoustics, Speech and Signal Processing, Mar. 1999, 5 pages.
Simkovitz, Daniel, "LP-DOS Magnifies the PC Screen", IEEE, 1992, pp. 203-204.
Simonite, Tom, "One Easy Way to Make Siri Smarter", Technology Review, Oct. 18, 2011, 2 pages.
Singh et al., "Automatic Generation of Phone Sets and Lexical Transcriptions", Acoustics, Speech and Signal Processing (ICASSP'00), 2000, 1 page.
Singh, N., "Unifying Heterogeneous Information Models", Communications of the ACM, 1998, 13 pages.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al., "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_ 1&z . . . >, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Speaker Recognition, Wikipedia, The Free Enclyclopedia, Nov. 2, 2010, 4 pages.
Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.
SRI International, "The Open Agent Architecture TM 1.0 Distribution", Open Agent Architecture (OAA), 1999, 2 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Srihari, R. K.., "Use of Multimedia Input In Automated Image Annotation And Content-based Retrieval", Proceedings Of Spie, International Society For Optical Engineering, vol. 2420, Feb. 9, 1995., pp. 249-260.
Srinivas et al., "Monet: A Multi-Media System for Conferencing and Application Sharing in Distributed Systems", CERC Technical Report Series Research Note, Feb. 1992.
Starr et al., "Knowledge-Intensive Query Processing", Proceedings of the 5th KRDB Workshop, Seattle, May 31, 1998, 6 pages.
Stealth Computer Corporation, "Peripherals for Industrial Keyboards & Pointing Devices", available at <http://www.stealthcomputer.com/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.htrnl>, Dec. 12, 2000, 2 pages.
Stent et al., "Geo-Centric Language Models for Local Business Voice Search", AT&T Labs—Research, 2009, pp. 389-396.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, Mark E., "A Nonclausal Connection-Graph Resolution Theorem-Proving Program", Proceedings of AAAI'82, 1982, 5 pages.
Stifleman, L., "Not Just Another Voice Mail System", Proceedings of 1991 Conference, American Voice, Atlanta GA, Sep. 24-26, 1991, pp. 21-26.
Stone et al., "The Movable Filter as a User Interface Tool", CHI '94 Human Factors in Computing Systems, 1994, pp. 306-312.
Strom et al., "Intelligent Barge-In in Conversational Systems", MIT laboratory for Computer Science, 2000, 4 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
Sugumaran, V., "A Distributed Intelligent Agent-Based Spatial Decision Support System", Proceedings of the Americas Conference on Information systems (AMCIS), Dec. 31, 1998, 4 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
Sundaram et al., "Latent Perceptual Mapping with Data-Driven Variable-Length Acoustic Units for Template-Based Speech Recognition", ICASSP 2012, Mar. 2012, pp. 4125-4128.
Sycara et al., "Coordination of Multiple Intelligent Software Agents", International Journal of Cooperative Information Systems (IJCIS), vol. 5, No. 2 & 3, 1996, 31 pages.
Sycara et al., "Distributed Intelligent Agents", IEEE Expert, vol. 11, No. 6, Dec. 1996, 32 pages.
Sycara et al., "Dynamic Service Matchmaking among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
T3 Magazine, "Creative MuVo TX 256MB", available at <http://www.t3.co.uk/reviews/entertainment/mp3_player/creative_muvo_tx_256mb>, Aug. 17, 2004, 1 page.
Taos, "Taos, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Taylor et al., "Speech Synthesis by Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988, pp. 25-64.
Tenenbaum et al., "Data Structure Using Pascal", Prentice-Hall, Inc., 1981, 34 pages.
Textndrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
TG3 Electronics, Inc., "BL82 Series Backlit Keyboards", available at <http://www.tg3electronics.com/products/backlit/backlit.htm>, retrieved on Dec. 19, 2002, 2 pages.

(56) References Cited

OTHER PUBLICATIONS

The HP 150, "Hardware: Compact, Powerful, and Innovative", vol. 8, No. 10, Oct. 1983, pp. 36-50.
Tidwell, Jenifer, "Animated Transition", Designing Interfaces, Patterns for effective Interaction Design, Nov. 2005, First Edition, 4 pages.
Timothy et al., "Speech-Based Annotation and Retrieval of Digital Photographs", Interspeech. 8th Annual Conference Of The International Speech Communication Association, Aug. 27, 2007, pp. 2165-2168.
Tofel, Kevin C., "SpeakTolt: A Personal Assistant for Older iPhones, iPads", Apple News, Tips and Reviews, Feb. 9, 2012, 7 pages.
Tombros et al., "Users' Perception of Relevance of Spoken Documents", Journal of the American Society for Information Science, New York, Aug. 2000, pp. 929-939.
Top 10 Best Practices for Voice User Interface Design available at <http://www.developer.com/voice/article.php/1567051/Top-10-Best-Practices-for-Voice-UserInterface-Design.htm>, Nov. 1, 2002, 4 pages.
Touch, Joseph, "Zoned Analog Personal Teleconferencing", USC / Information Sciences Institute, 1993, pp. 1-19.
Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Tsai et al., "Attributed Grammar—A Tool for Combining Syntactic and Statistical Approaches to Pattern Recognition", IEEE Transactions on Systems, Man and Cybernetics, vol. SMC-10, No. 12, Dec. 1980, 13 pages.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Turletti, Thierry, "The INRIA Videoconferencing System (IVS)", Oct. 1994, pp. 1-7.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1994, 9 pages.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Van Santen, J. P.H., "Contextual Effects on Vowel Duration", Journal Speech Communication, vol. 11, No. 6, Dec. 1992, pp. 513-546.
Veiga, Alex, "AT&T Wireless Launching Music Service", available at <http://bizyahoo.com/ap/041005/at_t_mobile_music_5.html?printer=1 >, Oct. 5, 2004, 2 pages.
Vepa et al., "New Objective Distance Measures for Spectral Discontinuities in Concatenative Speech Synthesis", Proceedings of the IEEE 2002 Workshop on Speech Synthesis, 2002, 4 pages.
Verschelde, Jan, "MATLAB Lecture 8. Special Matrices in MATLAB", UIC, Dept. of Math, Stat. & CS, MCS 320, Introduction to Symbolic Computation, 2007, 4 pages.
Viegas et al., "Chat Circles", SIGCHI Conference on Human Factors in Computing Systems, May 15-20, 1999, pp. 9-16.
Viikki et al., "Speaker- and Language-Independent Speech Recognition in Mobile Communication Systems", IEEE, vol. 1, 2001, pp. 5-8.
Vingron, Martin, "Near-Optimal Sequence Alignment", Current Opinion in Structural Biology, vol. 6, No. 3, 1996, pp. 346-352.
Vlingo Incar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Vogel et al., "Shift: A Technique for Operating Pen-Based Interfaces Using Touch", CHI '07 Proceedings, Mobile Interaction Techniques I, Apr. 28-May 3, 2007, pp. 657-666.
VoiceAssist, "Send Text, Listen to and Send E-Mail by Voice", YouTube Video, Available online at <http://www.youtube.com/watch?v=0tEU61nHHA4>, Jul. 30, 2009, 1 page.
VoiceontheGo, "Voice on the Go (BlackBerry)", YouTube Video, available online at <http://www.youtube.com/watch?v=pJqpWgQS98w>, Jul. 27, 2009, 1 page.
W3C Working Draft, "Speech Synthesis Markup Language Specification for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Wahlster et al., "Smartkom: Multimodal Communication with a Life-Like Character", Eurospeech-Scandinavia, 7th European Conference on Speech Communication and Technology, 2001, 5 pages.
Waibel, Alex, "Interactive Translation of Conversational Speech", Computer, vol. 29, No. 7, Jul. 1996, pp. 41-48.
Waldinger et al., "Deductive Question Answering from Multiple Resources", New Directions in Question Answering, Published by AAAI, Menlo Park, 2003, 22 pages.
Walker et al., "Natural Language Access to Medical Text", SRI International, Artificial Intelligence Center, Mar. 1981, 23 pages.
Walker et al., "The LOCUS Distributed Operating System 1", University of California Los Angeles, 1983, pp. 49-70.
Waltz, D., "An English Language Question Answering System for a Large Relational Database", ACM, vol. 21, No. 7, 1978, 14 pages.
Wang et al., "An Industrial-Strength Audio Search Algorithm", In Proceedings of the International Conference on Music Information Retrieval (ISMIR), 2003, 7 pages.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ward et al., "A Class Based Language Model for Speech Recognition", IEEE, 1996, 3 pages.
Ward et al., "Recent Improvements in the CMU Spoken Language Understanding System", ARPA Human Language Technology Workshop, 1994, 4 pages.
Ward, Wayne, "The CMU Air Travel Information Service: Understanding Spontaneous Speech", Proceedings of the Workshop on Speech and Natural Language, HLT '90, 1990, pp. 127-129.
Ware et al., "The DragMag Image Magnifier Prototype I", Apple Inc., Video Clip, Marlon, on a CD, Applicant is not Certain about the Date for the Video Clip., 1995.
Warren et al., "An Efficient Easily Adaptable System for Interpreting Natural Language Queries", American Journal of Computational Linguistics, vol. 8, No. 3-4, 1982, 11 pages.

(56) References Cited

OTHER PUBLICATIONS

Watabe et al., "Distributed Multiparty Desktop Conferencing System: MERMAID", CSCW90 Proceedings, Oct. 1990, pp. 27-38.
Weizenbaum, J., "ELIZA—A Computer Program for the Study of Natural Language Communication Between Man and Machine", Communications of the ACM, vol. 9, No. 1, Jan. 1966, 10 pages.
Werner et al., "Prosodic Aspects of Speech, Universite de Lausanne", Fundamentals of Speech Synthesis and Speech Recognition: Basic Concepts, State of the Art and Future Challenges, 1994, 18 pages.
Westerman, Wayne, "Hand Tracking, Finger Identification and Chordic Manipulation on A Multi-Touch Surface", Doctoral Dissertation, 1999, 363 Pages.
What is Fuzzy Logic?, available at <http://www.cs.cmu.edu>, retrieved on Apr. 15, 1993, 5 pages.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Windows XP: A Big Surprise!—Experiencing Amazement from Windows XP, New Computer, No. 2, Feb. 28, 2002, 8 pages.
Winiwarter et al., "Adaptive Natural Language Interfaces to FAQ Knowledge Bases", Proceedings of 4th International Conference on Applications of Natural Language to Information Systems, Austria, Jun. 1999, 22 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wolff, M., "Post Structuralism and the ARTFUL Database: Some Theoretical Considerations", Information Technology and Libraries, vol. 13, No. 1, Mar. 1994, 10 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Worldwide Character Encoding, Version 2.0, vols. 1,2 by Unicode, Inc., 12 pages.
Written Opinion received for PCT Patent Application No. PCT/US2005/046797, dated Nov. 24, 2006, 9 pages.
Wu et al., "Automatic Generation of Synthesis Units and Prosodic Information for Chinese Concatenative Synthesis", Speech Communication, vol. 35, No. 3-4, Oct. 2001, pp. 219-237.
Wu et al., "KDA: A Knowledge-Based Database Assistant", Proceeding of the Fifth International Conference on Engineering (IEEE Cat.No. 89CH2695-5), 1989, 8 pages.
Wu, M., "Digital Speech Processing and Coding", Multimedia Signal Processing, Lecture-2 Course Presentation, University of Maryland, College Park, 2003, 8 pages.
Wu, M., "Speech Recognition, Synthesis, and H.C.I.", Multimedia Signal Processing, Lecture-3 Course Presentation, University of Maryland, College Park, 2003, 11 pages.
Wyle, M. F., "A Wide Area Network Information Filter", Proceedings of First International Conference on Artificial Intelligence on Wall Street, Oct. 1991, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", Computer Magazine, IEEE, Jan. 1988, 16 pages.
Yarowsky, David, "Homograph Disambiguation in Text-to-Speech Synthesis", Chapter 12, Progress in Speech Synthesis, 1997, pp. 157-172.
Yiourgalis et al., "Text-to-Speech system for Greek", ICASSP 91, vol. 1, May 14-17, 1991, pp. 525-528.
Yoon et al., "Letter-to-Sound Rules for Korean", Department of Linguistics, The Ohio State University, 2002, 4 pages.
Young et al., "The HTK Book", Version 3.4, Dec. 2006, 368 pages.
Yunker, John, "Beyond Borders: Web Globalization Strategies", New Riders, Aug. 22, 2002, 11 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zeng et al., "Cooperative Intelligent Software Agents", The Robotics Institute, Carnegie-Mellon University, Mar. 1995, 13 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhao et al., "Intelligent Agents for Flexible Workflow Systems", Proceedings of the Americas Conference on Information Systems (AMCIS), Oct. 1998, 4 pages.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zhong et al., "JustSpeak: Enabling Universal Voice Control on Android", W4A'14, Proceedings of the 11th Web for All Conference, No. 36, Apr. 7-9, 2014, 8 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
Zovato et al., "Towards Emotional Speech Synthesis: A Rule based Approach", Proceedings of 5th ISCA Speech Synthesis Workshop-Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, 13 pages.
Zue et al., "Pegasus: A Spoken Dialogue Interface for On-Line Air Travel Planning", Speech Communication, vol. 15, 1994, 10 pages.
Zue et al., "The Voyager Speech Understanding System: Preliminary Development and Evaluation", Proceedings of IEEE, International Conference on Acoustics, Speech and Signal Processing, 1990, 4 pages.
Zue, Victor W., "Toward Systems that Understand Spoken Language", ARPA Strategic Computing Institute, Feb. 1994, 9 pages.
Zue, Victor, "Conversational Interfaces: Advances and Challenges", Spoken Language System Group, Sep. 1997, 10 pages.

(56) References Cited

OTHER PUBLICATIONS

AAAAPlay, "Sony Media Remote for iOS and Android", Online available at: <https://www.youtube.com/watch?v=W8QoeQhlGok>, Feb. 4, 2012, 3 pages.
"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Anania Peter, "Amazon Echo with Home Automation (Smartthings)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v= rDpdS_YWzFc>, May 1, 2013, 1 page.
Asakura et al., "What LG thinks; How the TV should be in the Living Room", HiVi, vol. 31, No. 7, Stereo Sound Publishing, Inc., Jun. 17, 2013, pp. 68-71 (Official Copy Only). {See communication under 37 CFR § 1.98(a) (3)}.
"Ask Alexa—Things That Are Smart Wiki", Online available at:—<http://thingsthataresmart.wiki/index.php?title=Ask Alexa&oldid=4283>, Jun. 8, 2016, pp. 1-31.
Ashbrook, Daniel L., "Enabling Mobile Microinteractions", May 2010, 186 pages.
AshingtonDCTech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway—Programming Example", Online Available at: <https://www.youtube.com/watch?v=TXDaJFm5UH4>, Mar. 4, 2015, 3 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen, Yi, "Multimedia Siri Finds and Plays Whatever You Ask For", PSFK Report, Feb. 9, 2012, pp. 1-9.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Coulouris et al., "Distributed Systems: Concepts and Design (Fifth Edition)", Addison-Wesley, 2012, 391 pages.
Czech Lucas, "A System for Recognizing Natural Spelling of English Words", Diploma Thesis, Karlsruhe Institute of Technology, May 7, 2014, 107 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks For Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Detroitborg, "Apple Remote App (iPhone & iPod Touch): Tutorial and Demo", Online Available at:—<https://www.youtube.com/watch?v=M_jzeEevKql>, Oct. 13, 2010, 4 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
"DirecTV™ Voice", Now Part of the DirectTV Mobile App for Phones, Sep. 18, 2013, 5 pages.
Earthling1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Filipowicz, Luke, "How to use the QuickType keyboard in iOS 8", Online available at:—<https://www.imore.com/comment/568232>, Oct. 11, 2014, pp. 1-17.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Gasic et al., "Effective Handling of Dialogue State in the Hidden Information State POMDP-based Dialogue Manager", ACM Transactions on Speech and Language Processing, May 2011, pp. 1-25.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Google Developers,"Voice search in your app", Online available at:—<https://www.youtube.com/watch?v=PS1FbB5qWEI>, Nov. 12, 2014, 1 page.
Gupta et al., "I-vector-based Speaker Adaptation Of Deep Neural Networks For French Broadcast Audio Transcription", ICASSP, 2014, 2014, pp. 6334-6338.
Gupta, Naresh, "Inside Bluetooth Low Energy", Artech House, 2013, 274 pages.
Hershey et al., "Deep Clustering: Discriminative Embeddings For Segmentation And Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How To Enable Google Assistant on Galaxy S7 and Other Android Phones (No Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One For Dummies", 3rd Edition, 2013, 98 pages.
Ikeda, Masaru, "beGlobal Seoul 2015 Startup Battle: Talkey", YouTube Publisher, Online Available at:—<https://www.youtube.com/watch?v=4Wkp7sAAIdg>, May 14, 2015, 1 page.
INews and Tech,"How To Use The QuickType Keyboard In IOS 8", Online available at:—<http://www.inewsandtech.com/how-to-use-the-quicktype-keyboard-in-ios-8/>, Sep. 17, 2014, 6 pages.
Internet Services and Social Net, "How to Search for Similar Websites", Online availabe at:—<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.

(56) References Cited

OTHER PUBLICATIONS

Isik et al., "Single-Channel Multi-Speaker Separation using Deep Clustering", Interspeech 2016, Sep. 8-12, 2016, pp. 545-549.

Jonsson et al., "Proximity-based Reminders Using Bluetooth", 2014 IEEE International Conference on Pervasive Computing and Communications Demonstrations, 2014, pp. 151-153.

Karn, Ujjwal, "An Intuitive Explanation of Convolutional Neural Networks", The Data Science Blog, Aug. 11, 2016, 23 pages.

Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.

King et al., "Robust Speech Recognition Via Anchor Word Representations", Interspeech 2017, Aug. 20-24, 2017, pp. 2471-2475.

Lee, Sungjin, "Structured Discriminative Model For Dialog State Tracking", Proceedings of the SIGDIAL 2013 Conference, Aug. 22-24, 2013, pp. 442-451.

"Link Your Voice to Your Devices with Voice Match, Google Assistant Help", Online available at:—<https://support.google.com/assistant/answer/9071681?co=GENIE.Platform%3DAndroid&hl=en>, Retrieved on Jul. 1, 2020, 2 pages.

Liou et al., "Autoencoder for Words", Neurocomputing, vol. 139, Sep. 2014, pp. 84-96.

Liu et al., "Accurate Endpointing with Expected Pause Duration", Sep. 6-10, 2015, pp. 2912-2916.

Loukides et al., "What Is the Internet of Things?", O'Reilly Media, Inc., Online Available at: <https://www.oreilly.com/library/view/what-is-the/9781491975633/>, 2015, 31 pages.

Luo et al., "Speaker-Independent Speech Separation With Deep Attractor Network", IEEE/ACM Transactions On Audio, Speech, And Language Processing, vol. 26, No. 4, Apr. 2018, pp. 787-796.

Majerus Wesley, "Cell Phone Accessibility for Your Blind Child", Online available at:—<https://web.archive.org/web/20100210001100/https://nfb.org/images/nfb/publications/fr/fr28/3/fr280314.htm>, 2010, pp. 1-5.

Malcangi Mario, "Text-driven Avatars Based on Artificial Neural Networks and Fuzzy Logic", International Journal of Computers, vol. 4, No. 2, Dec. 31, 2010, pp. 61-69.

Marketing Land,"Amazon Echo: Play music", Online Available at:—<https://www.youtube.com/watch?v=A7V5NPbsXi4>, Apr. 27, 2015, 3 pages.

Mhatre et al., "Donna Interactive Chat-bot acting as a Personal Assistant", International Journal of Computer Applications (0975-8887), vol. 140, No. 10, Apr. 2016, 6 pages.

Mikolov et al., "Linguistic Regularities in Continuous Space Word Representations", Proceedings of NAACL-HLT, Jun. 9-14, 2013, pp. 746-751.

Modern Techies,"Braina-Artificial Personal Assistant for PC(like Cortana,Siri)!!!!", Online available at: <https://www.youtube.com/watch?v=_Coo2P8ilqQ>, Feb. 24, 2017, 3 pages.

Morrison Jonathan, "iPhone 5 Siri Demo", Online Available at:—<https://www.youtube.com/watch?v=_wHWwG5lhWc>, Sep. 21, 2012, 3 pages.

Nakamura et al., "Realization of a Browser to Filter Spoilers Dynamically", vol. No. 67, 2010, 8 pages (Official Copy Only). {See communication under 37 CFR § 1.98(a) (3)}.

Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.

Nakamura et al., "Study of Methods to Diminish Spoilers of Sports Match: Potential of a Novel Concept "Information Clouding"", vol. 54, No. 4, ISSN: 1882-7764. Online available at: https://ipsj.ixsq.nii.ac.jp/ej/index.php?active_action=repository_view_main_item_detail&page_id=13&block_id=8&item_id=91589&item_no=1, Apr. 2013, pp. 1402-1412 (Official Copy Only). {See communication under 37 CFR § 1.98(a) (3)}.

Nakamura Satoshi, "Antispoiler: An Web Browser to Filter Spoiler", vol. 2010-HCL-139 No.17, Online available at:—<https://ipsj.ixsq.nii.ac.jp/ej/index.php?active_action=repository_view_main_item_detail&page_id=13&block_id=8&item_id=70067&item_no=1>, Jul. 31, 2010, 8 pages (Official Copy Only). {See communication under 37 CFR § 1.98(a) (3)}.

Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Feb. 28, 2011, 11 pages (Official Copy Only). {See communication under 37 CFR § 1.98(a) (3)}.

Nozawa et al., "iPhone 4S Perfect Manual", vol. 1, First Edition, Nov. 11, 2011, 4 pages (Official Copy Only). {See communication under 37 CFR § 1.98(a) (3)}.

Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.

Patra et al., "A Kernel-Based Approach for Biomedical Named Entity Recognition", Scientific World Journal, vol. 2013, 2013, pp. 1-7.

PC Mag,"How to Voice Train Your Google Home Smart Speaker", Online available at: <https://in.pcmag.com/google-home/126520/how-to-voice-train-your-google-home-smart-speaker>, Oct. 25, 2018, 12 pages.

Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.

Perlow, Jason, "Alexa Loop Mode with Playlist for Sleep Noise", Online Available at: <https://www.youtube.com/watch?v=nSkSuXziJSg>, Apr. 11, 2016, 3 pages.

"*Phoenix Solutions, Inc*. v. *West Interactive Corp*.", Document 40, Declaration of Christopher Schmandt Regarding the MIT Galaxy System, Jul. 2, 2010, 162 pages.

pocketables.com,"AutoRemote example profile", Online available at: https://www.youtube.com/watch?v=kC_zhUnNZj8, Jun. 25, 2013, 1 page.

Qian et al., "Single-channel Multi-talker Speech Recognition With Permutation Invariant Training", Speech Communication, Issue 104, 2018, pp. 1-11.

"Quick Type Keyboard on iOS 8 Makes Typing Easier", Online available at:—<https://www.youtube.com/watch?v=0CIdLR4fhVU>, Jun. 3, 2014, 3 pages.

Rasch, Katharina, "Smart Assistants for Smart Homes", Doctoral Thesis in Electronic and Computer Systems, 2013, 150 pages.

Rios Mafe, "New Bar Search for Facebook", YouTube, available at:—<https://www.youtube.com/watch?v=vwgN1WbvCas>, Jul. 19, 2013, 2 pages.

Ritchie, Rene, "QuickType keyboard in iOS 8: Explained", Online Available at:—<https://www.imore.com/quicktype-keyboards-ios-8-explained>, Jun. 21, 2014, pp. 1-19.

Routines, "SmartThings Support", Online available at:—<https://web.archive.org/web/20151207165701/https://support.smartthings.com/hc/en-us/articles/205380034-Routines>, 2015, 3 pages.

Rowland et al., "Designing Connected Products: UX for the Consumer Internet of Things", O'Reilly, May 2015, 452 pages.

Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.

Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.

Seehafer Brent, "Activate Google Assistant on Galaxy S7 with Screen off", Online available at: <https://productforums.google.com/forum/#!topic/websearch/lp3qlGBHLVI>, Mar. 8, 2017, 4 pages.

Selfridge et al., "Interact: Tightly-coupling Multimodal Dialog with an Interactive Virtual Assistant", International Conference on Multimodal Interaction, ACM, Nov. 9, 2015, pp. 381-382.

Senior et al., "Improving DNN Speaker Independence With I-Vector Inputs", ICASSP, 2014, pp. 225-229.

Seroter et al., "SOA Patterns with BizTalk Server 2013 and Microsoft Azure", Packt Publishing, Jun. 2015, 454 pages.

(56) References Cited

OTHER PUBLICATIONS

Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Siou, Serge, "How To Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Spivack, Nova, "Sneak Preview of Siri—Part Two—Technical Foundations—Interview with Tom Gruber, CTO of Siri I Twine", Online Available at:—<https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", Interspeech 2012, Sep. 9-13, 2012, pp. 194-197.
Tan et al., "Knowledge Transfer In Permutation Invariant Training For Single-channel Multi-talker Speech Recognition", ICASSP 2018, 2018, pp. 5714-5718.
Tanaka Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy Only) {See communication under 37 CFR § 1.98(a) (3)}.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Vodafone Deutschland, "Samsung Galaxy S3 Tastatur Spracheingabe", Online available at—<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions On Audio, Speech, And Language Processing, vol. 23, No. 10, Oct. 2015, pp. 1670-1679.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
X.Ai, "How it Works", Online available at:—<https://web.archive.org/web/20160531201426/https://x.ai/how-it-works/>, May 31, 2016, 6 pages.
Xu et al., "Policy Optimization of Dialogue Management in Spoken Dialogue System For Out-of-Domain Utterances", 2016 International Conference On Asian Language Processing (IALP), IEEE, Nov. 21, 2016, pp. 10-13.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone APP RKRemoteControl", Online Available at: <https://www.youtube.com/watch?v=zpmUeOX_xro>, Mar. 31, 2015, 4 pages.
Yates MichaelC., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Ye et al., "iPhone 4S native secret", Jun. 30, 2012, 1 page (Official Copy Only). {See communication under 37 CFR § 1.98(a) (3)}.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "The Hidden Information State Model: A Practical Framework for POMDP-Based Spoken Dialogue Management", Computer Speech & Language, vol. 24, Issue 2, Apr. 2010, pp. 150-174.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training Of Deep Models For Speaker-Independent Multi-talker Speech Separation", Proc. ICASSP, 2017, 5 pages.
Yu et al., "Recognizing Multi-Talker Speech with Permutation Invariant Training", Interspeech 2017, Aug. 20-24, 2017, pp. 2456-2460.
Zangerle et al., "Recommending #-Tags in Twitter", proceedings of the Workshop on Semantic Adaptive Socail Web, 2011, pp. 1-12.
Zhan et al., "Play with Android phones", Feb. 29, 2012, 1 page (Official Copy Only). {See communication under 37 CFR § 1.98(a) (3)}.
Zmolikova et al., "Speaker-Aware Neural Network Based Beamformer For Speaker Extraction In Speech Mixtures", Interspeech 2017, Aug. 20-24, 2017, pp. 2655-2659.
Office Action received for Chinese Patent Application No. 201680064269.3, dated May 26, 2021, 14 pages (6 pages of English Translation and 8 pages of Official Copy).
Office Action received for European Patent Application No. 16862616.6, dated Jul. 13, 2021, 5 pages.
Notice of Allowance received for Chinese Patent Application No. 201680064269.3, dated Dec. 17, 2021, 2 pages (1 page of English Translation and 1 page of Official Copy).
Intention to Grant received for European Patent Application No. 16862616.6, dated Oct. 21, 2021, 8 pages.
Result of Consultation received for European Patent Application No. 16862616.6, dated Sep. 29, 2021, 3 pages.
Decision to Grant received for European Patent Application No. 16862616.6, dated Feb. 17, 2022, 2 pages.
Extended European Search Report received for European Patent Application No. 22156627.6, dated May 12, 2022, 17 pages.
Brief Communication Regarding Oral Proceedings received for European Patent Application No. 22156627.6, dated Jul. 29, 2022, 1 page.
European Search Report received for European Patent Application No. 22156627.6, dated Jul. 13, 2022, 20 pages.

* cited by examiner

1000

INTELLIGENT AUTOMATED ASSISTANT IN A MESSAGING ENVIRONMENT

CROSS-REFERENCE TO RELATED APPLICATION

This application is a continuation of U.S. Ser. No. 15/151,191, filed on May 10, 2016, entitled "INTELLIGENT AUTOMATED ASSISTANT IN A MESSAGING ENVIRONMENT," which claims priority from U.S. Provisional Ser. No. 62/252,311, filed on Nov. 6, 2015, entitled "INTELLIGENT AUTOMATED ASSISTANT IN A MESSAGING ENVIRONMENT." The content of both applications are hereby incorporated by reference in their entirety for all purposes.

FIELD

This relates generally to intelligent automated assistants and, more specifically, to intelligent automated assistants in a messaging environment.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

Typically, electronic devices implement a dedicated user interface for interacting with the digital assistant. For example, an electronic device can implement a dedicated voice interface for interacting with the digital assistant. Such dedicated user interfaces can limit the opportunities for interaction, which can limit the widespread adoption and application of digital assistants to benefit people's lives.

SUMMARY

Systems and processes for operating an intelligent automated assistant in a messaging environment are provided. In one example process, a graphical user interface (GUI) having a plurality of previous messages between a user of the electronic device and the digital assistant can be displayed on a display. The plurality of previous messages can be presented in a conversational view. User input can be received and in response to receiving the user input, the user input can be displayed as a first message in the GUI. A contextual state of the electronic device corresponding to the displayed user input can be stored. The process can cause an action to be performed in accordance with a user intent derived from the user input. A response based on the action can be displayed as a second message in the GUI.

In another example process, a GUI having a plurality of previous messages between a user and the digital assistant can be displayed on a display of an electronic device. The plurality of previous messages can be presented in a conversational view. A first user input including a media object can be received. In response to receiving the first user input, the media object can be displayed as a first message in the GUI. A second user input including text can be received. In response to receiving the second user input, the text can be displayed as a second message in the GUI. The process can cause a user intent corresponding to the first user input and the second user input to be determined. A determination of whether the user intent requires extracting text from the media object can be obtained. In response to obtaining a determination that the user intent requires extracting text from the media object: text from the media object can be extracted, a task in accordance with the user intent can be perform using the extracted text, and a response indicative of the user intent being satisfied can be displayed as a third message in the GUI.

In yet another example process, a GUI having a plurality of previous messages between a user of the electronic device and a user of a remote device can be displayed on the display of an electronic device. The plurality of previous messages can be presented in a conversational view. A first user input addressed to the digital assistant can be received from the user of the electronic device. In response to receiving the first user input, the first user input can be displayed as a first message in the GUI. The process can cause an action to be performed in accordance with a user intent derived from the first user input. A response based on the action can be displayed as a second message in the GUI.

DETAILED DESCRIPTION

Figure 1:
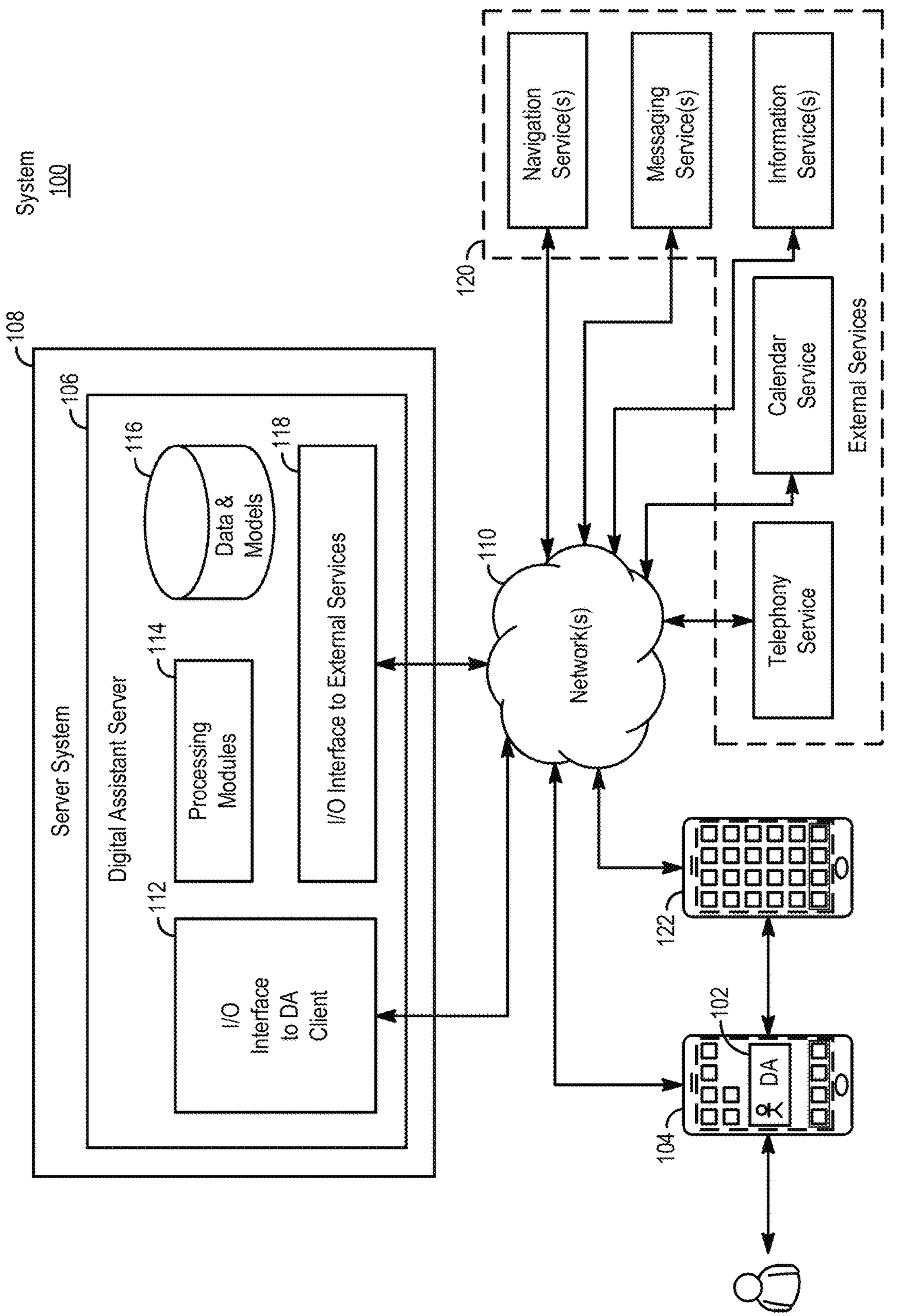
FIG. 1 is a block diagram illustrating a system and environment for implementing a digital assistant according to various examples.

In the following description of examples, reference is made to the accompanying drawings in which it is shown by way of illustration specific examples that can be practiced. It is to be understood that other examples can be used and structural changes can be made without departing from the scope of the various examples.

It can be desirable to implement a digital assistant in a messaging environment. The messaging platform can enable multiple modes of input (e.g., text, audio, images, video, etc.) to be sent and received. A user request can thus define a request to the digital assistant using a combination of inputs (e.g., image and text). As described herein, this can increase the functionality and capabilities of the digital assistant, thereby providing a richer interactive experience between a user and a digital assistant. In addition, the messaging platform is a visual interface which permits interactions in a broader range of environments than voice/audio based platforms. A digital assistant in a message environment can thus enable greater accessibility to the digital assistant. In particular, the digital assistant can be accessible in noisy environments or in environments where audio output is not desired (e.g., the library). Further, the messaging platform can be a conversational interface where short concise communications are exchanged between two or more parties and presented in a chronological format. A digital assistant in a message environment can thus enable the digital assistant to be a participant in a multi-party conversation where the benefits associated with the digital assistant can be shared among the multiple participants. Moreover, the chronological format enables a user to conveniently review previous interactions with the digital assistant and utilize the contextual history associated with the previous interactions to define a wider range of tasks.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input can both be inputs and, in some cases, can be separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
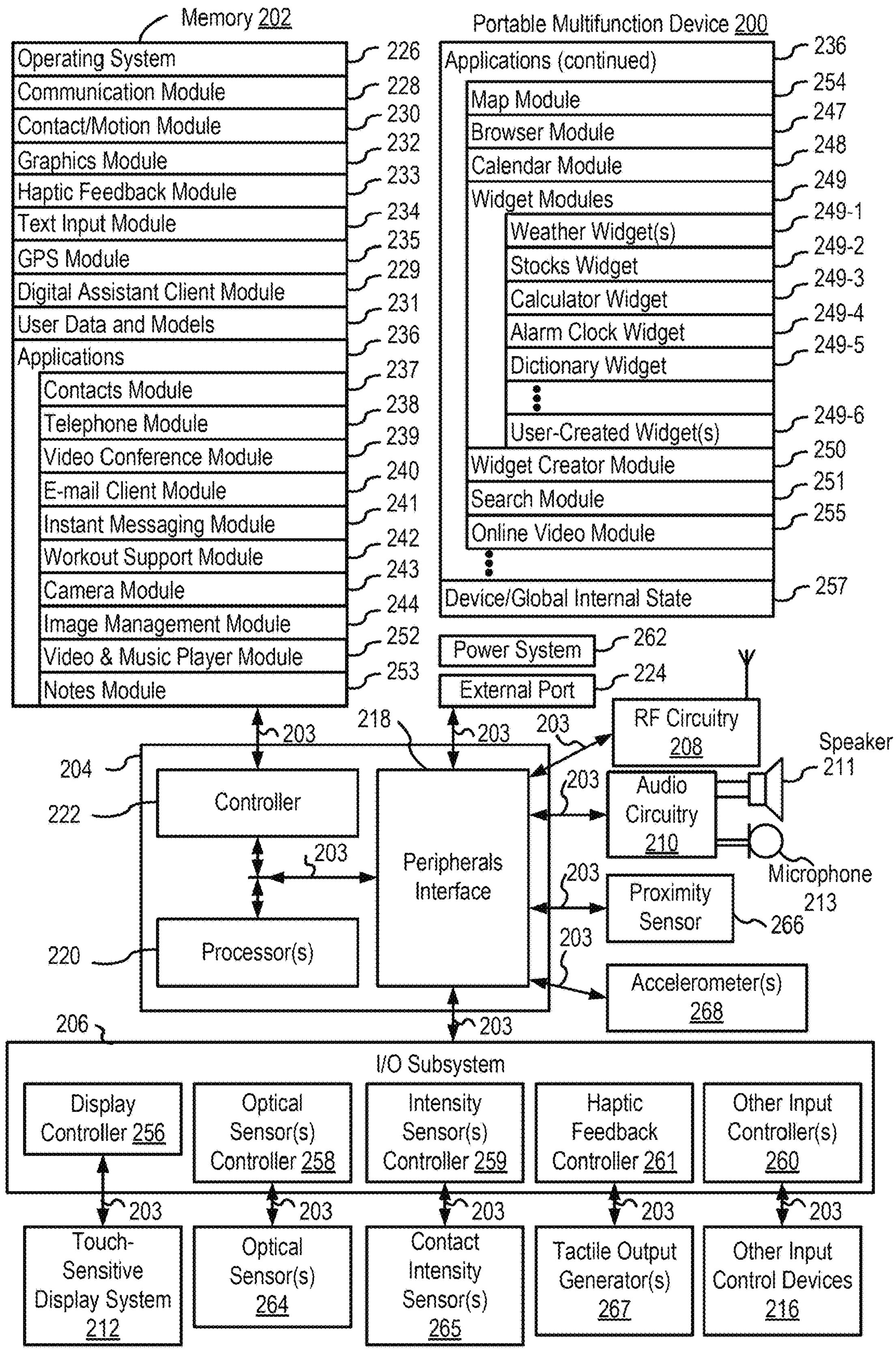
FIG. 2A is a block diagram illustrating a portable multifunction device implementing the client-side portion of a digital assistant according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
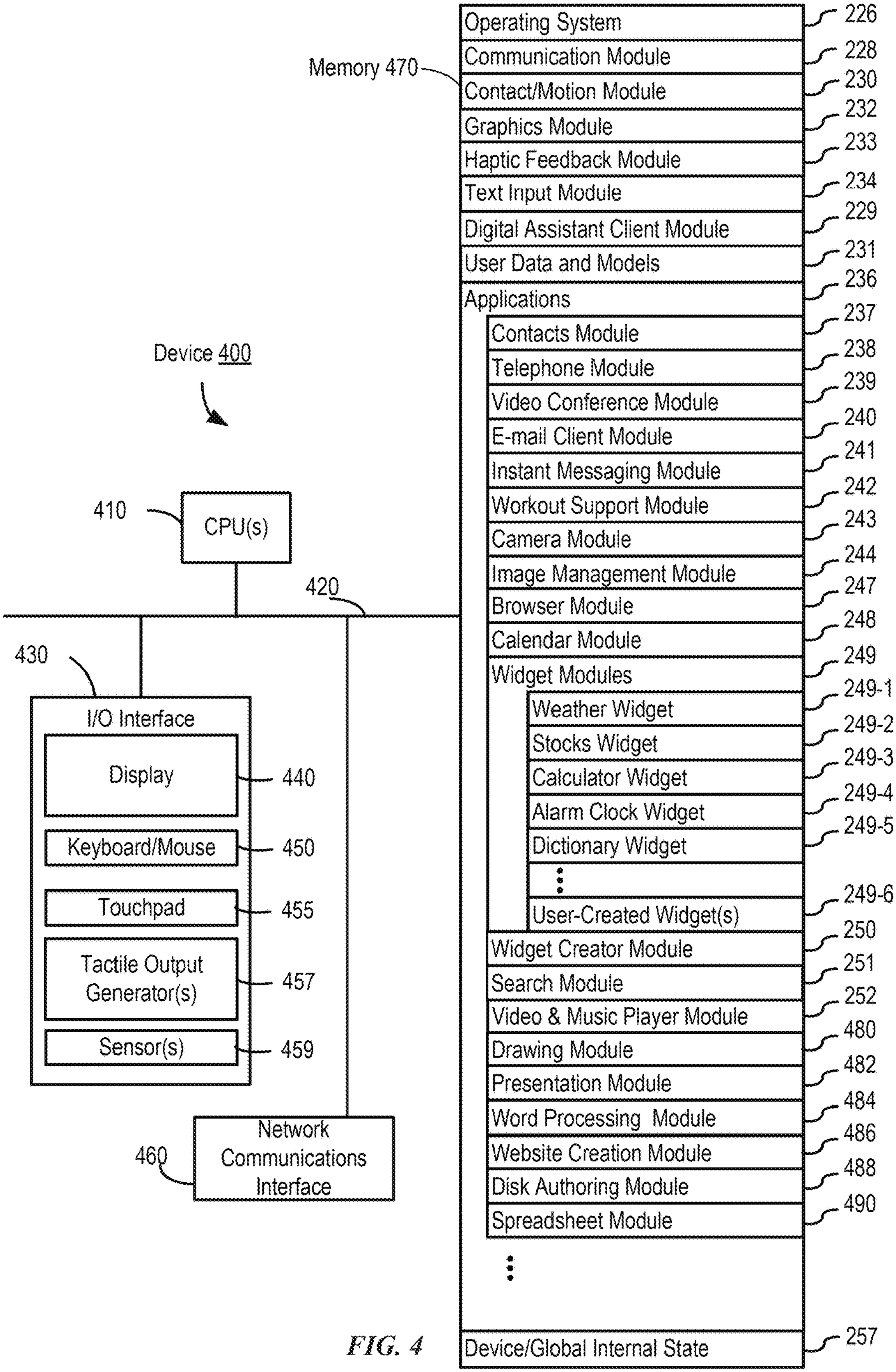
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
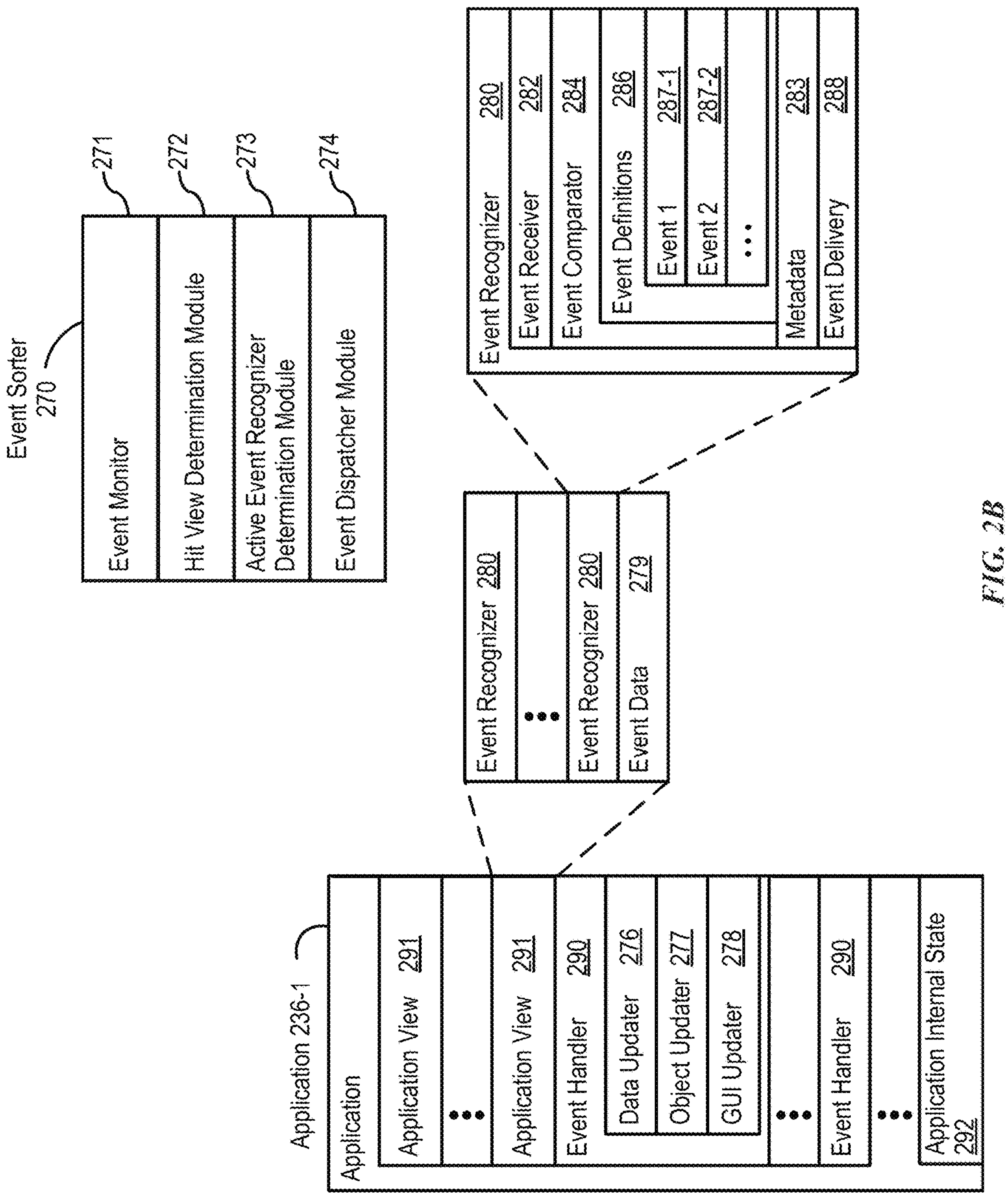
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
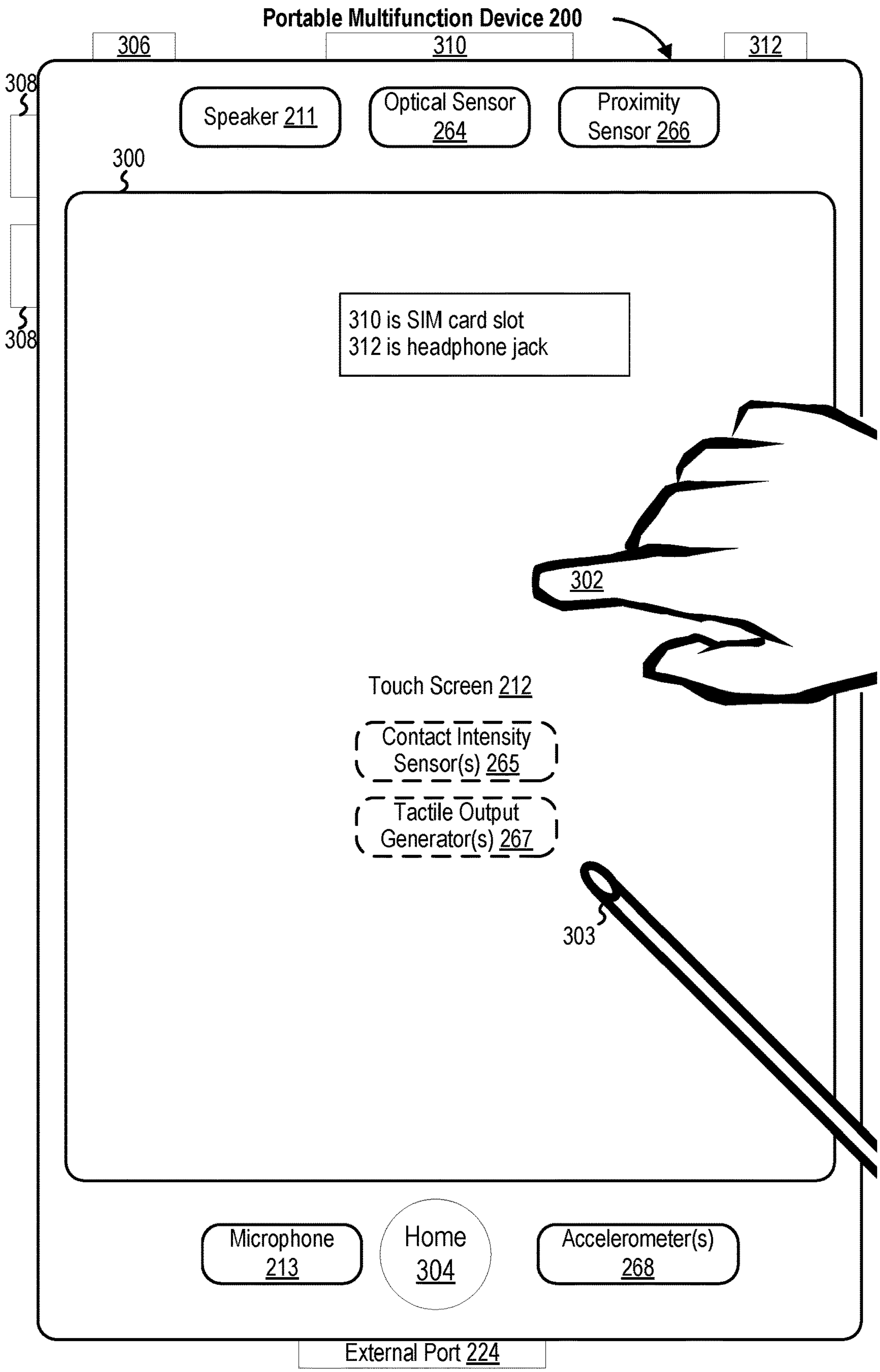
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
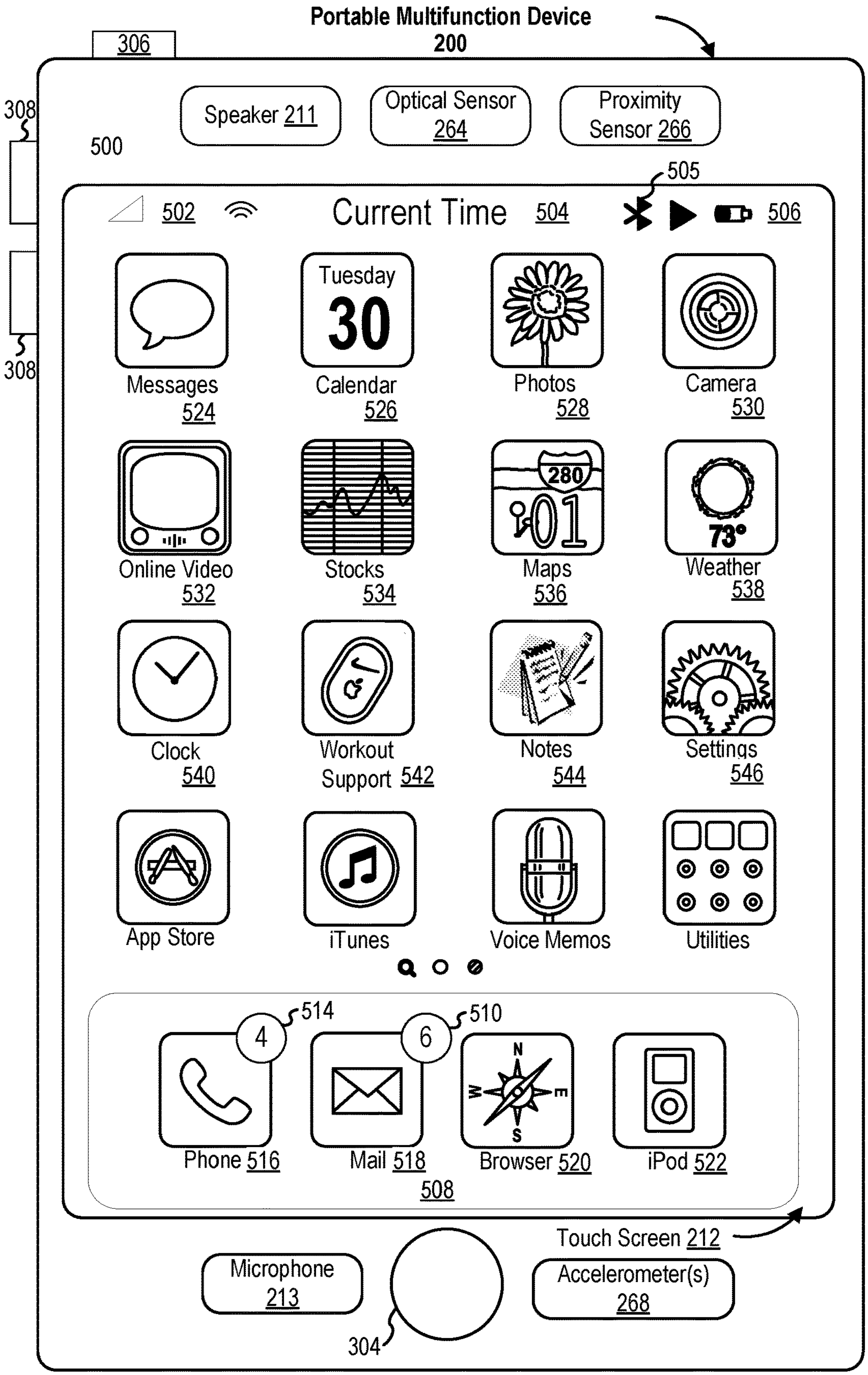
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
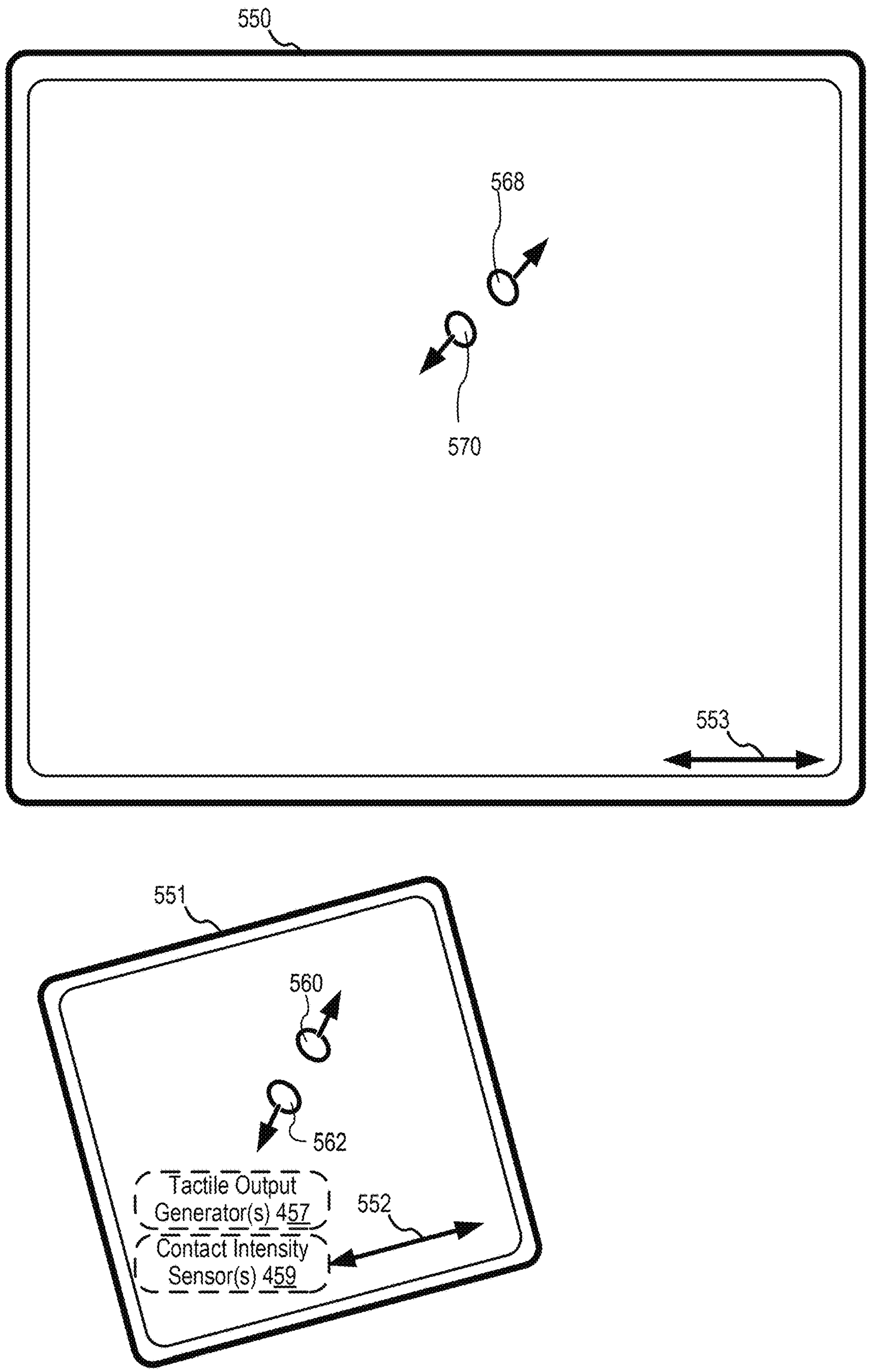
FIG. 5B illustrates an exemplary user interface for a multifunction device with a touch-sensitive surface that is separate from the display according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
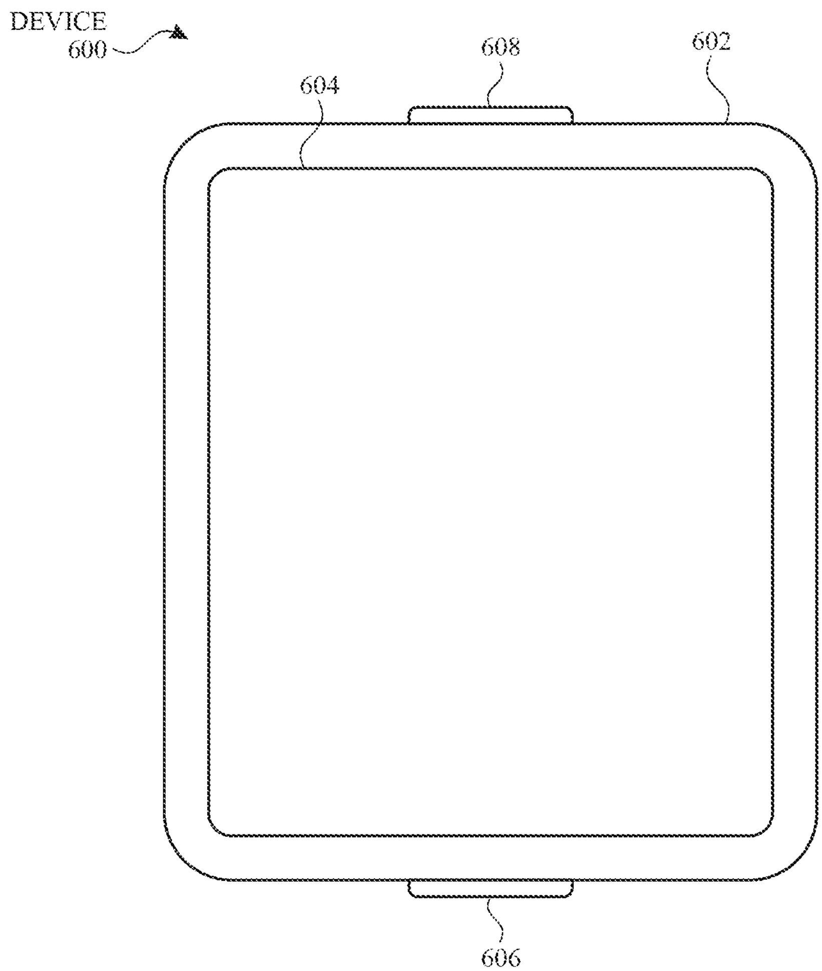
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
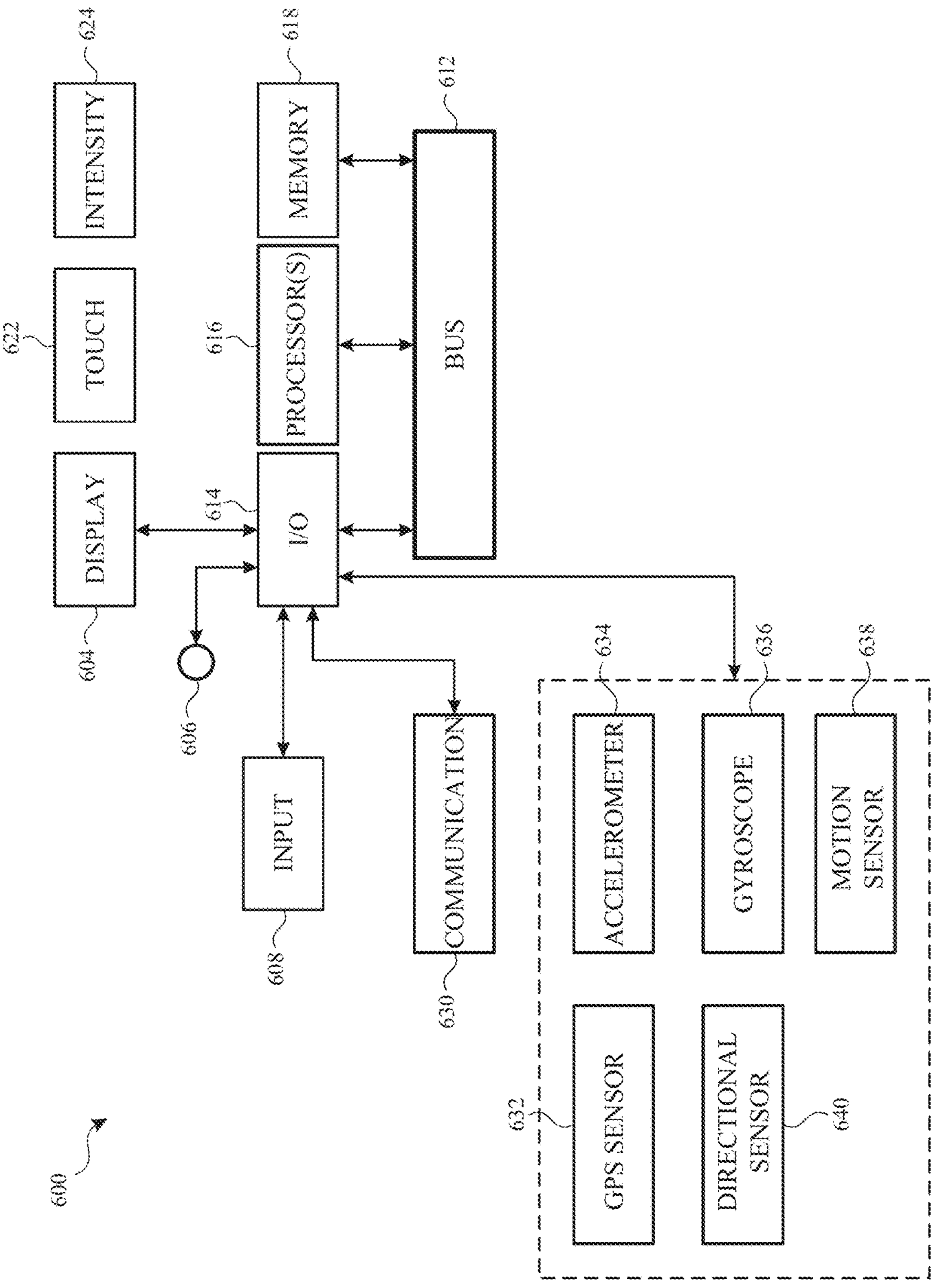
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques and processes described below. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
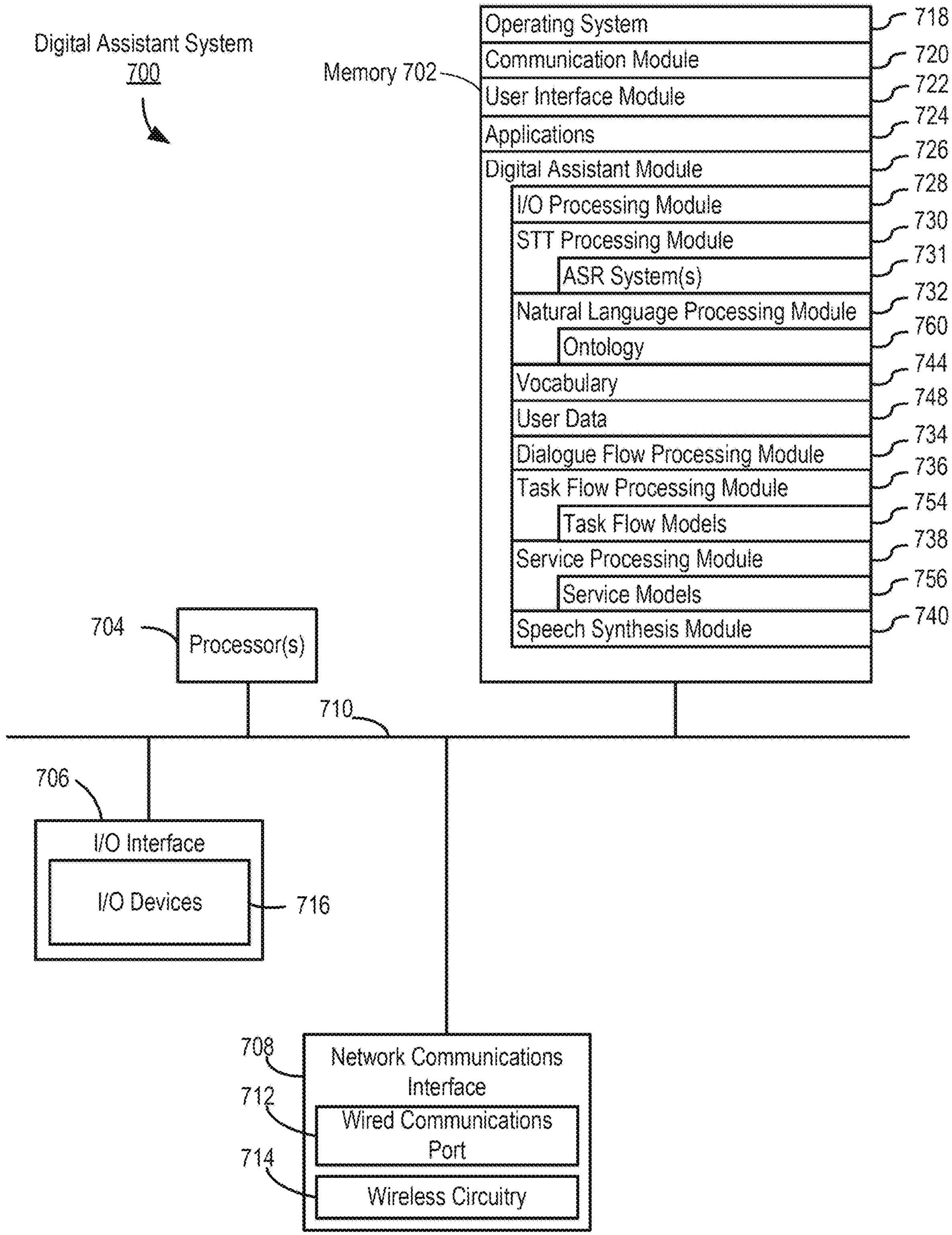
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing the processes described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
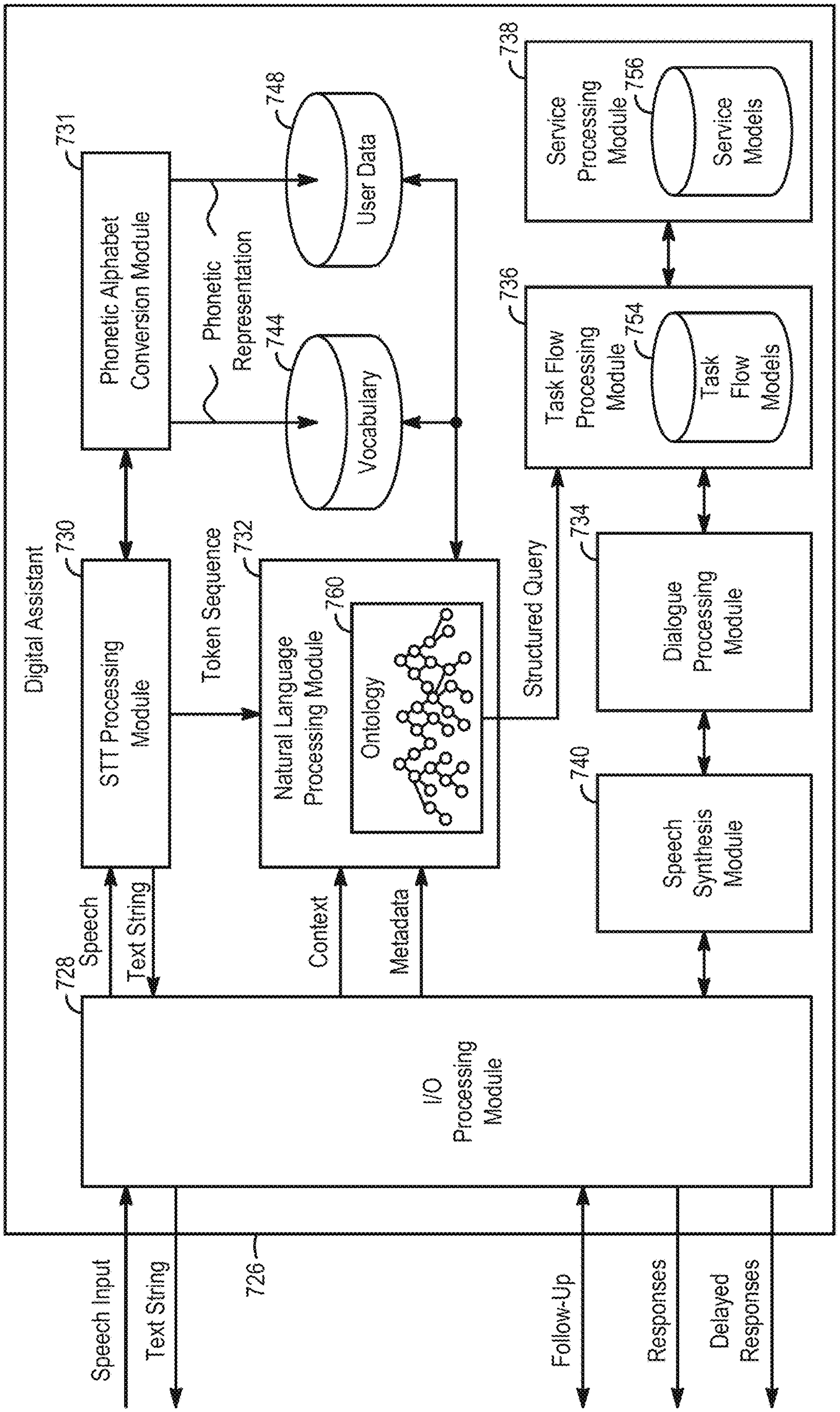
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪroʊ/ and /tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /tə'meɪroʊ/corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /tə'mɑtoʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
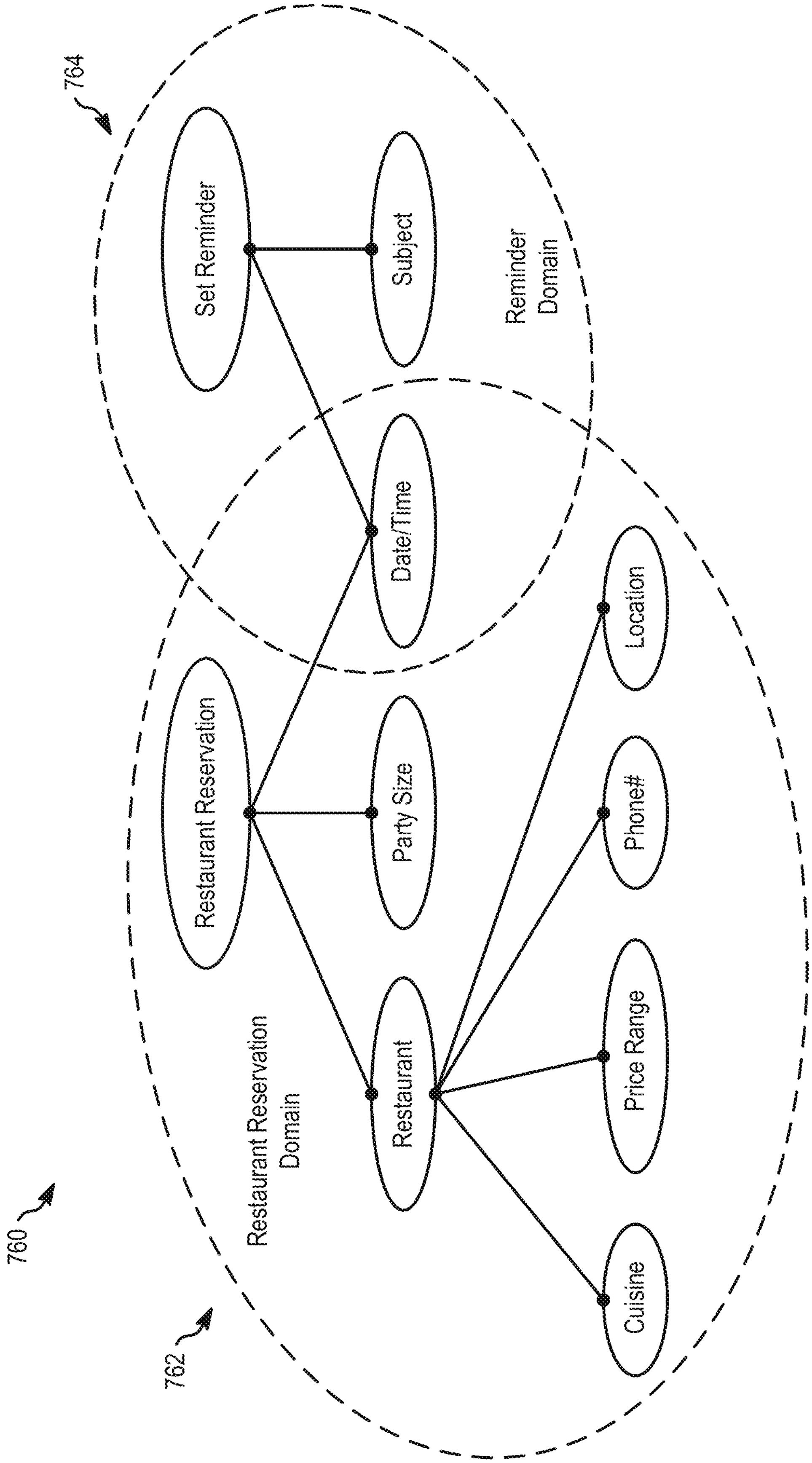
FIG. 7C illustrates a portion of an ontology according to various examples.
Figure 8:
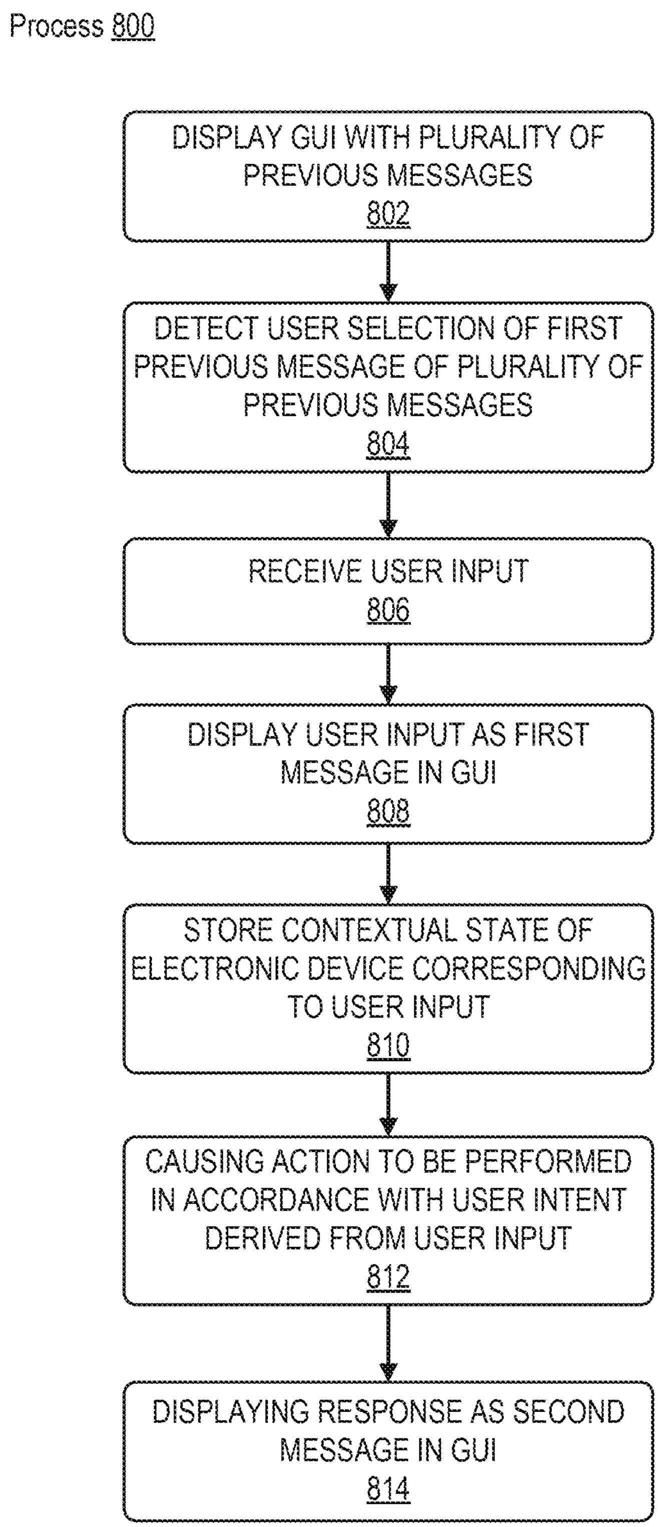
FIG. 8 illustrates a process for operating a digital assistant in a messaging environment according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi" } and {Time="7 pm" }. However, in this example, the user's utterance contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me,"

natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Processes for Operating a Digital Assistant in a Messaging Environment

FIGS. 8, 11A-D, and 13A-C illustrate processes 800, 1100, and 1300 for operating a digital assistant in a messaging environment according to various examples. FIGS. 9A-L, 12A-H, and 14A-I illustrate exemplary user interfaces of an electronic device for operating a digital assistant in a messaging environment according to various examples. Processes 800, 1100, and 1300 can be performed using one or more electronic devices implementing a digital assistant. In some examples, the processes can be performed at a client-server system (e.g., system 100) implementing a digital assistant. In some examples, the processes can be performed at an electronic device (e.g., device 104, 200, 400, or 600). In processes 800, 1100, and 1300, some blocks are, optionally, combined, the order of some blocks are, optionally, changed, and some blocks are, optionally, omitted. Further, one of ordinary skill would appreciate that the blocks of one exemplary process can be implemented in another exemplary process. For example, the blocks of processes 1100 or 1300 can be implemented in process 800.

Figure 9B:
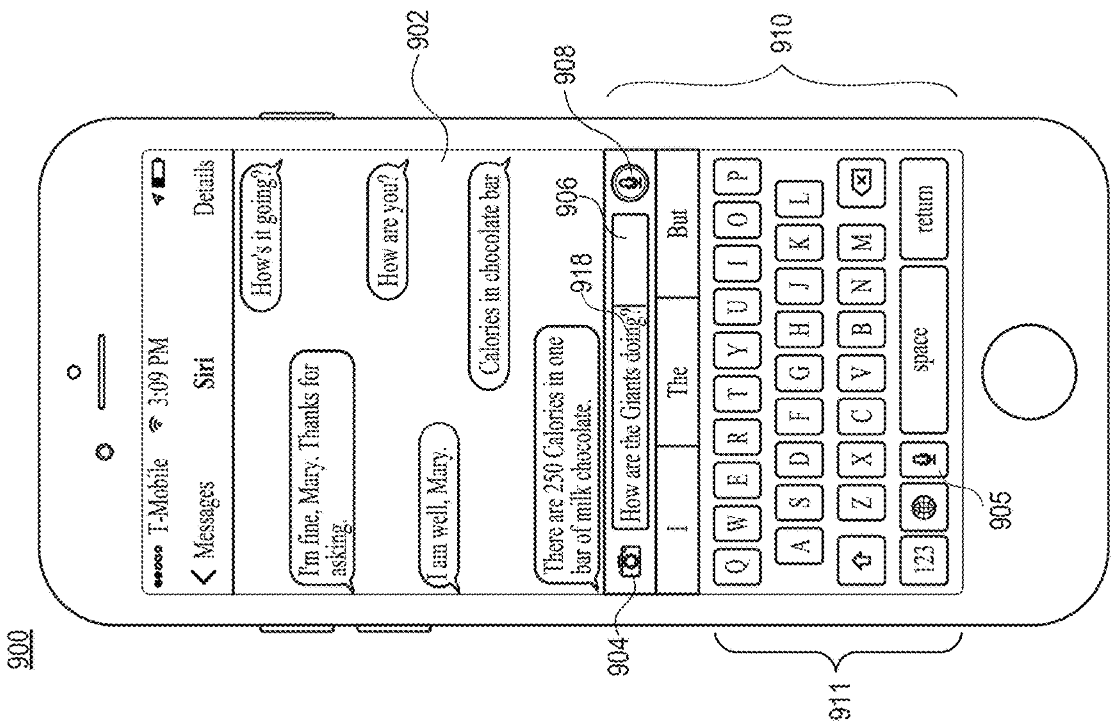
FIGS. 9A-L illustrate exemplary user interfaces of an electronic device for operating a digital assistant in a messaging environment according to various examples.
Figure 9A:
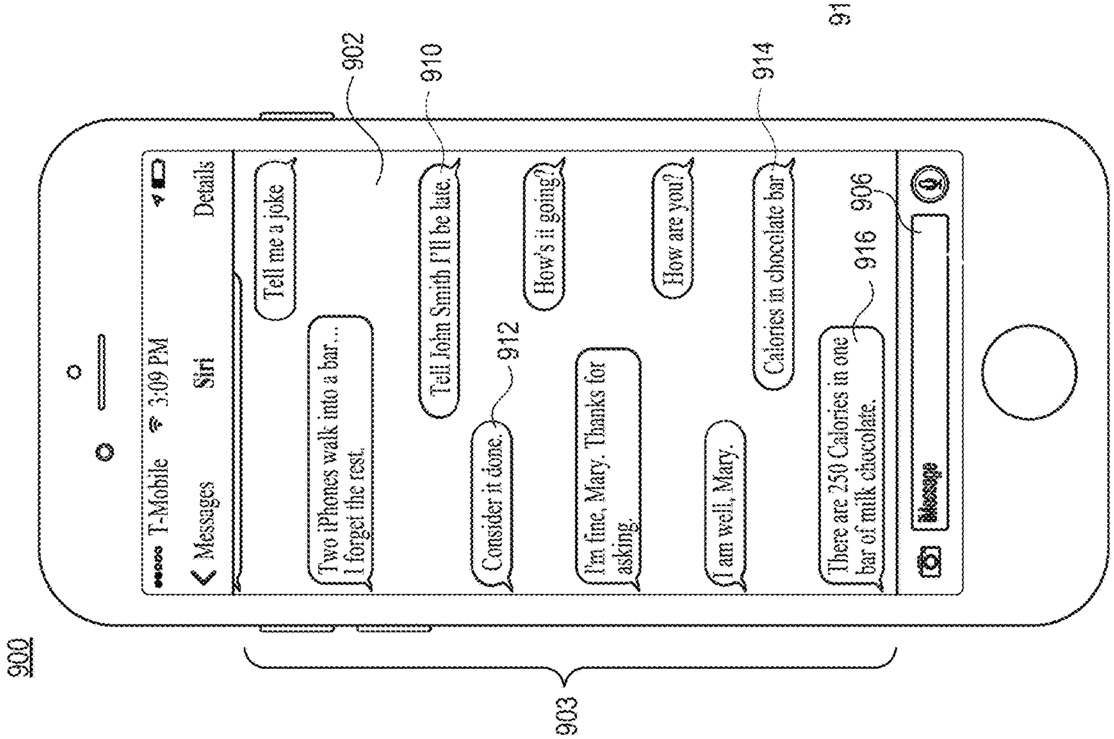

Process 800 is described below with simultaneous reference to FIGS. 8 and 9A-L. At block 802, a graphical user interface (GUI) can be displayed on the display (e.g., touch screen 212 or display 440) of an electronic device. For example, as shown in FIG. 9A, GUI 902 of electronic device 900 can be displayed. Electronic device 900 can be similar to one or more of devices 104, 200, 400, or 600, described above, and can implement a digital assistant. GUI 902 can be a GUI of a messaging application (e.g., messaging application implemented by instant messaging module 241) of the electronic device. The messaging application can be configured to send messages to and receive messages from one or more recipients. As shown, GUI 902 can include plurality of previous messages 903 that were previously exchanged between a user of electronic device 900 and the digital assistant. In particular, plurality of previous messages 903 can include previous messages from the user addressed to the digital assistant and previous messages generated by the digital assistant in response to the user's previous messages. For example, previous message 910 of plurality of previous messages 903 can be generated from user input and addressed to the digital assistant. Previous message 912 of plurality of previous messages 903 can be generated by the digital assistant in response to previous message 910 from the user.

As shown, plurality of previous messages 903 in GUI 902 can be presented in a conversational view. In particular, plurality of previous messages 903 can be displayed in chronological order. In the present example, plurality of previous messages 903 are displayed in chronological order from top to bottom where the oldest previous message is displayed at the top of GUI 902 and the most recent previous message is displayed at the bottom of GUI 902. Further, messages from the user can be displayed on a side of GUI 902 opposite from that of messages from the digital assistant. In particular, previous messages from the user (e.g., previous message 910) can be justified on the right side of GUI 902 whereas previous messages from the digital assistant (e.g., previous message 912) can be justified on the left side of GUI 902.

The plurality of previous messages can include one or more interactive sessions between the user and the digital assistant. Each interactive session can include two or more previous messages. In particular, an interactive session can be initiated by an initial request from a user and the messages in the interactive session can each be relevant to the initial request. For example, previous messages 910 and 912 can be part of the same interactive session.

The plurality of previous messages can represent a text history of all previous interactive sessions between the user and the digital assistant (e.g., since the last time the message history was cleared). The previous interactive sessions can include text-based interactions via the messaging application or voice-based interactions via a digital assistant interface separate from the messaging application. For example, as shown in FIG. 9A, previous messages 914 and 916 can be text transcriptions of a previous voice-based interaction between the user and the digital assistant that occurred outside of the messaging application. The previous voice-based interaction may have occurred prior to receiving the user input at block 806 of process 800 and may have been initiated when a user input was previously detected at the electronic device to invoke the digital assistant. Detecting the user input can include, for example, detecting the push of a button on the electronic device or detecting the selection of an affordance on the electronic device. In response to detecting the user input, the electronic device can sampled audio containing a user utterance. In this example, the user utterance can include the request "Calories in chocolate bar." The electronic device can cause the user utterance to be transcribed to text and the text representation of the user utterance can be included in GUI 902 as previous message 914. The electronic device can further cause an action to be performed in accordance with a user intent derived from the user utterance. In particular, the sampled audio data can be transmitted to a digital assistant server (e.g., DA server 106) to determine an actionable intent based on the user utterance and generate a task flow corresponding to the actionable intent. Alternatively, the electronic device can process the sampled audio data locally to determine the actionable intent and generate the corresponding task flow. The task flow can be executed by the digital assistant server and/or the electronic device to perform the action. In this example, the performed action can be a search for the number of calories in a chocolate bar. A response based on the results obtained from the search can be outputted by the electronic device action. For example, the response can provide the number of calories in a milk chocolate bar. As shown in FIG. 9A, a text representation of the response can be included in GUI 902 as previous message 916.

Each of the plurality of previous messages can be associated with a previous contextual state of the electronic device. The previous contextual state can be similar to the contextual state stored at block 810, described below. In particular, the previous contextual state can include information related to the state of the electronic device at the time user input associated with the previous message was received. For example, the previous contextual state can include temporal information (e.g., the time) defining when the user input was received or location information defining the location of the electronic device at the time the user input was received. Further, a pair of previous messages comprising the user input and the corresponding response to the user input from the digital assistant can be associated with the same previous contextual state. For example, previous messages 910 and 912 can be associated with the same previous contextual state. In particular, the previous contextual state of previous message 910 and 912 can be the state of the electronic device at the time user input associated with previous message 910 was received. Further, the previous contextual state associated with previous messages 910 and 912 can be different from the previous contextual state associated with previous messages 914 and 916.

In some examples, the previous contextual state of the electronic device associated with a previous message can optionally be utilized during a current interactive session between the user and the digital assistant. For example, the user may wish to find a restaurant at the location associated with a specific previous message. In these examples, block 804 can be performed.

At block 804, a user selection of a first previous message of the plurality of previous messages can be detected. The user selection can be any suitable user input associated with the first previous message. In particular, the user selection can be detected via GUI 902. The first previous message can be associated with a first previous contextual state of the electronic device. In response to detecting the user selection of the first previous message, the first previous contextual state of the electronic device can be retrieved. The retrieved first previous contextual state can then be utilized to process a user input (e.g., user input of block 806) representing a user request. In some examples, block 804 can be performed prior to block 806. In other examples, block 804 can be performed after block 806 and before block 808.

At block 806, user input can be received. The user input can be received via a user input interface of the electronic device. As shown in FIG. 9B, GUI 902 can include user input interface 910. The user input can include text and/or a media object. Text input can be received via keyboard 911 of user input interface 910. Alternatively, text input can be received using dictation button 905, which enables a user utterance received via the microphone (e.g., microphone 213) of the electronic device to be transcribed into text. The media object can be an image, an audio clip, a video clip, or the like. A media object can be received using image/video button 904 and audio button 908. In particular, selection of image/video button 904 can enable the user to retrieve an image/video stored on the electronic device or to capture a new image/video using the camera (e.g., optical sensor 264) of electronic device. Selection of audio button 908 can enable the user to record an audio clip via the microphone (e.g., microphone 213) of the electronic device. User input received via user input interface 910 can be displayed in text input field 906 before being submitted. The user input can represent a user request to perform a task or retrieve information. The user input can be in natural language form. In the present example shown in FIG. 9B, the user input can be text input 918 "How are the Giants doing?"

In some examples, the user can leverage previous messages to enable quicker entry of user input. In particular, a previous message of the plurality of previous messages can be selected to auto-populate the text input field of the user input interface. For example, with reference to FIG. 9A, a user input associated with previous message 910 can be detected. The user input can be a user selection of previous message 910 via GUI 902. In response to detecting the user input associated with previous message 910, text of previous message 910 (e.g., "Tell John Smith I'll be late.") can be displayed in text input field 906 of GUI 902. This can be desirable to allow a user to input a request with few actions and in less time. For example, if the user wishes to input the text "Tell John White I'll be late," the user can auto-populate the text of previous message 910 in text input field 906 and change "Smith" to "White."

At block 808, the user input of block 806 can be displayed as a first message in the GUI. For example, with reference to FIG. 9C, text input 918 can be displayed as message 922 in GUI 902. In particular, message 922 can be addressed to the digital assistant. Block 808 can be performed in response to receiving the user input at block 806.

At block 810, the electronic device can store a contextual state of the electronic device corresponding to the displayed user input. In particular, the contextual state can be stored in association with the first message. The contextual state being stored can include the state of the electronic device at the time the user input was received at block 806. In some examples, the contextual state of the electronic device can include temporal information of when the user input at block 806 was received. In some examples, the contextual state of the electronic device can include information derived from a physical sensor of the electronic device at the time the user input at block 806 was received (e.g., location information defining the location of the electronic device at the time the user input was received). In some examples, the contextual state of the electronic device can include information stored on the electronic device at the time the user input at block 806 was received. The information can be related to a predetermined application of the electronic device. For example, the information can include contact information, email messages, media files, calendar appointments, search histories, fitness data, or the like. In some examples, the information can include which applications are installed and/or actively running on the electronic device at the time the user input of block 806 was received. It should be appreciated that the contextual state of the electronic device can include various other types of contextual information associated with the electronic device at the time the user input of block 806 was received. In the present example shown in FIG. 9C, the contextual state of the electronic device can include at least the time and date at which the user input of block 806 was received at the electronic device and the location of the electronic device at the time the user input of block 806 was received. The time, date, and location information can be stored on the electronic device in association with first message 922. Block 810 can be performed in response to receiving the user input at block 806.

At block 812, the electronic device can cause an action to be performed in accordance with a user intent derived from the user input. Block 812 can be performed automatically without additional human intervention in response to receiving the user input at block 806 (or in response to displaying the first message at block 808). In particular, the electronic device can cause the user intent (e.g., actionable intent) to be determined (e.g., using natural language processing module 732) based on the user input of block 806 and cause a task flow corresponding to the user intent to be generated (e.g., using task flow processing module 736). The electronic device can further cause the task flow to be executed to perform the action. In the present example shown in FIG. 9D, the user intent can be determined to be searching for recent sports scores related to the "Giants" and thus the action can be performing a search for recent sports scores related to the "Giants." Results that at least partially satisfy the derived user intent can be obtained by performing the action. The displayed response at block 814 can thus be based on the results obtained by performing the action.

In some examples, receiving the user input at block 806 (or displaying the first message at block 808) can cause the electronic device to determine the user intent, generate the task flow, and perform the action. Alternatively, the electronic device can transmit a representation of the user input to a digital assistant server (e.g., DA server 106) and cause the digital assistant server to determine the user intent, generate the task flow, and perform the action.

In some examples, the stored contextual state of the electronic device of block 810 can be utilized to determine the user intent and thus the response displayed at block 814 can be based on the stored contextual state. For example, location information stored in association with first message 922 can indicate that the electronic device was located in San Francisco at the time text input 918 was received. Based on this location information, it can be determined that the user is more likely referring to the San Francisco Giants (baseball team) rather than the New York Giants (football team), and the action can include searching for the most recent scores related to the San Francisco Giants to obtain results. In particular, search results indicating that the San Francisco Giants won 7 to 1 over the San Diego Padres in its most recent game can be obtained. It should be appreciated that in other examples, the previous contextual states of any number of previous messages in GUI 902 can additionally or alternatively be used to determine the user intent.

Figure 9D:
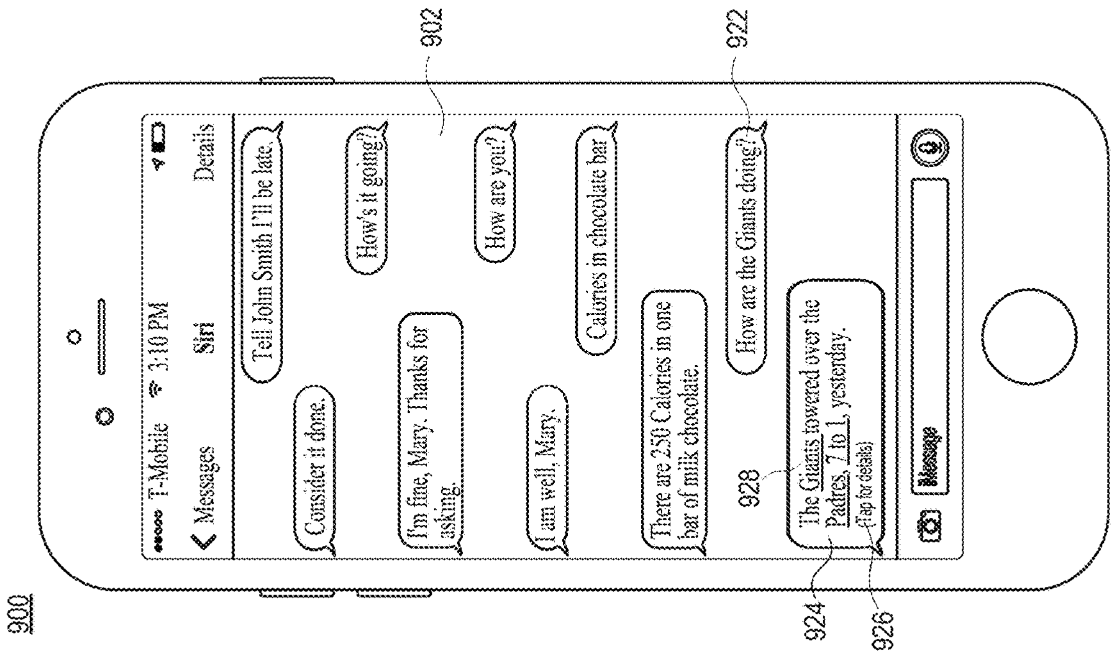
Figure 9C:
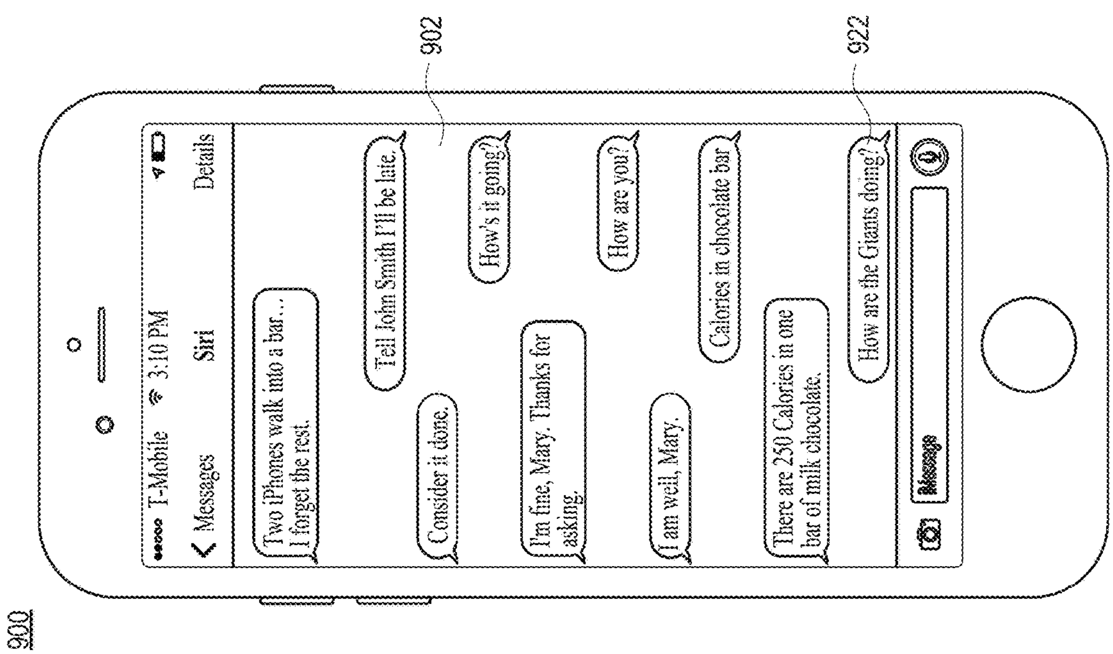
Figure 9F:
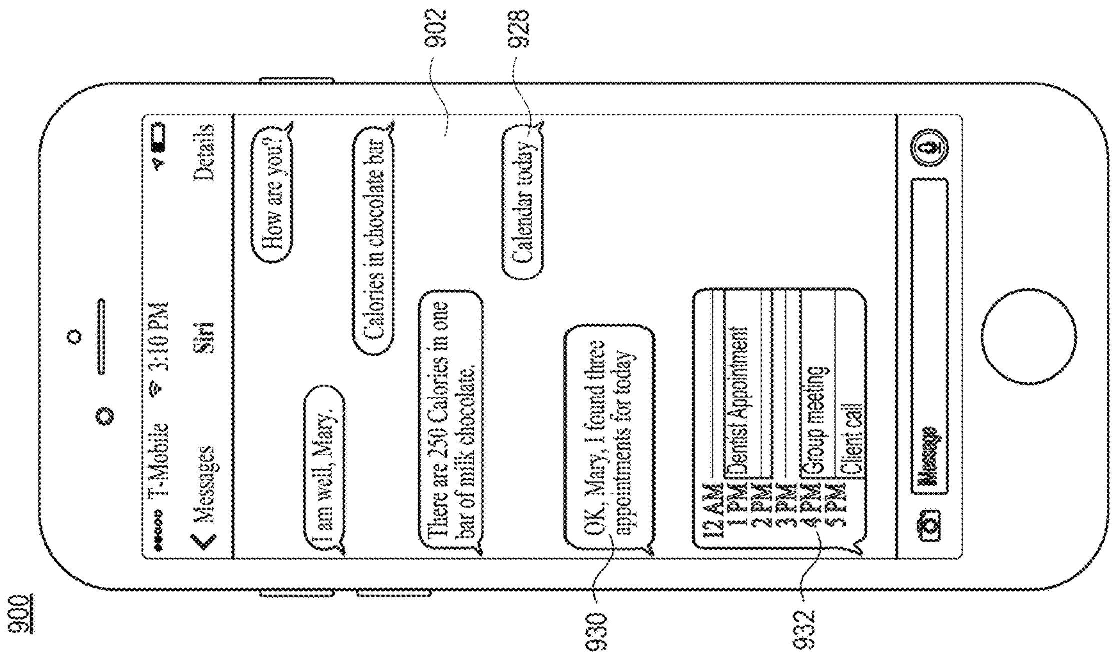
Figure 9E:
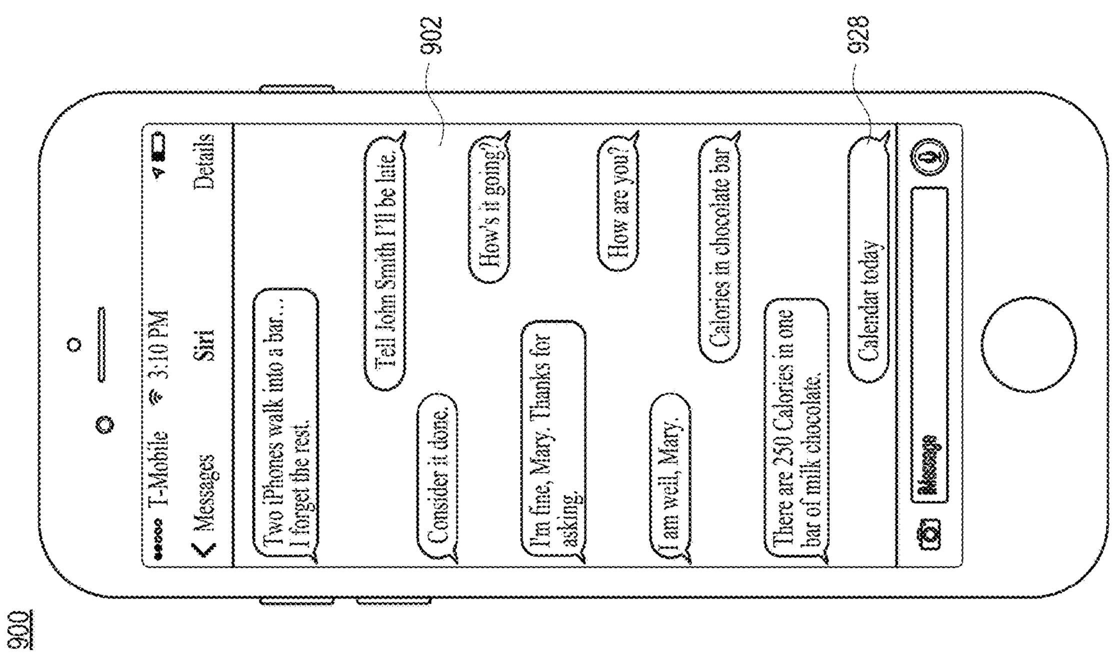

At block 814, a response based on the action of block 812 can be displayed as a second message in the GUI. For example, as shown in FIG. 9D, second message 924 can be displayed in GUI 902. Second message 924 can include a response based on the search results obtained at block 812. In particular, second message 924 can include the search results indicating that the San Francisco Giants won 7 to 1 over the San Diego Padres in its most recent game. The response can at least partially satisfy the user request represented by the user input of block 806. Further, the response can be in natural language form.

In some examples, the second message can be displayed without providing any audio output. For example, second message 924 can be displayed in GUI 902 without outputting any spoken audio corresponding to the text response in second message 924. This can be desirable to preserve the text based interactive environment associated with the messaging platform. In particular, a user may prefer to interact with the digital assistant using the messaging platform rather than a voice/audio interface when voice/audio based interactions are not possible, such as in a noisy environment, in a public setting with little privacy, or in a quiet setting (e.g., library).

Second message 924 can include only text. In particular, as shown in FIG. 9D, second message 924 can be concise with only a limited number of text sentence (e.g., at most one, two, or three sentences) and without any media object. Such concise responses facilitate the quick exchange of information, which is desired and expected by users in the messaging environment. In some examples, in order to provide the user with the option of obtaining a more detailed response, second message 924 can be configured to provide a more detailed response in accordance with a user selection of second message 924. This can enable the desirable concise format to be preserved while providing convenient access to additional details responsive to the user request. For example, as shown in FIG. 9D, block 814 can include displaying indication 926 (e.g., "Tap for details") in second message 924 that a more detailed response is available by selecting second message 926. In the present example, indication 926 can inform the user that second message 926 is configured to provide additional details related to the Giants in response to a user selection of second message 926.

In some examples, a user selection of second message 924 can be received via GUI 902 of electronic device 900. In the present example, the user selection of second message 926 can include a touch input via GUI 902 of electronic device 900. It should be recognized that in other examples, the user selection can include any suitable user input associated with the second message. In response to receiving the user selection of second message 924, detailed results based on the user intent can be obtained. In particular, receiving the user selection can cause an application of the electronic device to obtain additional results that satisfy the user intent. The application can be different from the messaging application. For example, the user selection of second message 924 can cause the Internet browser application (e.g., the Internet browser application of browser module 247) of the electronic device to perform a search based on the user intent and to obtain detailed results related to how the Giants are doing. The detailed results can include, for example, the total number of games won or lost by the Giants in the current season, news articles reporting the recent win against the Padres, future game schedules for the Giants, or the like. The obtained detailed result can be displayed in a GUI of the Internet browser application.

Whether or not the second message displayed at block 814 is selectable to provide a more detailed response can be based on the user intent derived from the user input at block 812. For example, in determining the actionable intent corresponding to the user input at block 812, a determination can be made as to whether the actionable intent is associated with one of a plurality of predetermined domains in the ontology. In some examples, the plurality of predetermined domains can include domains where a detailed response is most likely desired by the user. In particular, the plurality of predetermined domains can include domains such as "contacts," "restaurants," "movies," "sports," or "search." In response to a determination that the actionable intent is associated with one of a plurality of predetermined domains, the displayed second message at block 814 can be configured to provide a more detailed response in accordance with a user selection of the second message.

In some examples, hyperlinks can be provided in the response of the second message to provide the user with access to additional information relevant to the user request. For example, one or more words (or one or more character strings) in the second message can be highlighted to indicate that additional information related to the highlighted words is available upon user selection. In particular, process 800 can identify one or more words (or one or more character strings) in the displayed response corresponding to an entity. The entity can be a person, team, business, location, event, building, object, media item, or the like. In some examples, the one or more words corresponding to an entity can be identified based on the derived user intent at block 812. In the present example, the user intent can be determined to be associated with the domain "sports" and thus one or more words corresponding to a sports entity can be identified. In particular, as shown in FIG. 9D, the words "Giants," "Padres," and "7 to 1" can be identified. Process 800 can further include determining an action associated with the entity. In some examples, the action can include obtaining information related to the entity. The action can be performed using an application of the electronic device other than the messaging application. The electronic device can enable the selection of the one or more identified words in the displayed response (e.g., hyperlinking). In particular, detecting a user selection of the one or more identified words can cause the action associated with the entity to be performed. For example, in response to detecting the user selection of the word "Giants" in message 924, information related to the Giants can be retrieved using the Internet browser application. For example, the Internet browser application can be instructed to load the homepage of the Giants or perform an Internet search of the Giants. Although in FIG. 9D, the one or more words are highlighted by underlining, it should be recognized that other means of highlighting can be implemented, such as, using different fonts, colors, bolding, or the like.

In some examples, the one or more words corresponding to an entity can be identified based on the contextual state of the electronic device. For example, the user intent can be related to contacts (e.g., sending a message to "John White") and the one or more words can be identified based on a name or location stored in the contacts of the electronic device at the time the user input was received (e.g., "John White"). In response to detecting the user selection of the one or more identified words, the contact corresponding to the one or more identified words can be retrieved and displayed via, for example, a GUI of the contacts application. In another example, the user intent can be related to airline flights (e.g., searching for a flights landing in San Francisco from Chicago) and the response in the second message can include a flight numbers. Based on this user intent, the character string corresponding to the airline flight can be identified in the second message and can be highlighted and hyperlinked in the second message. In response to detecting the user selection of the flight number in the second message, the flight schedule and/or flight status associated with the flight number can be obtained and displayed (e.g., via a GUI of the Internet browser application).

In some examples, block 814 can further include displaying a media object in the GUI of the electronic device. The media object can be based on the user intent. In particular, the media object can at least partially satisfy the user request represented by the user input at block 806. In some examples, the media object can be displayed in the second message. In other examples, the media object can be displayed in a separate message (e.g., a third message). The media object can be an image, an audio clip, a video, or the like. In some examples, the media object can be a snippet of a GUI of an application of the electronic device (e.g., an application other than the messaging application). In an illustrative example shown in FIGS. 9E-F, the user input "Calendar today" can be received (e.g., at block 806). The user input can represent a user request to retrieve appointments from the calendar application schedule for today. In response to receiving the user input, the user input can be displayed in GUI 902 as message 928 (e.g., at block 808). Based on the user intent derived from the user input, the appointments scheduled for today can be retrieved from the calendar application of the electronic device (e.g., at block 812). Further, a snippet of the GUI of the calendar application depicting the appointments scheduled for today can be obtained (e.g., at block 812). A text response addressing the user request can be displayed as message 930 in GUI 902 (e.g., at block 814). Further the snippet of the GUI of the calendar application can be displayed as message 932 in GUI 902. The snippet can be a graphical presentation of information requested by the user in the user input.

Displaying a media object in response to a user request in the user input can be desirable for presenting information that may otherwise be difficult to clearly and concisely present using text alone. In some examples, whether or not a media object is displayed in response to the user request can be based on the user intent derived from the user input. For example, in determining the actionable intent corresponding to the user input at block 812, a determination can be made as to whether the actionable intent is associated with one of a second plurality of predetermined domains in the ontology. In some examples, the second plurality of predetermined domains can include domains where information can be more clearly and concisely displayed in graphical or multimedia form. In particular, the second plurality of predetermined domains can include domains such as "calendar," "weather," "stocks," "maps," "health," or the like. In response to a determination that the actionable intent is associated with one of a second plurality of predetermined domains, a media object based on the user intent can be displayed at block 814.

The displayed media object can be selectable to provide the user with expanded results associated with the media object. In particular, in response to detecting the user selection of the media object, expanded results can be obtained and displayed. The expanded results can be obtained and displayed by an application of the electronic device other than the messaging application. For example, the user selection of media object 932 in FIG. 9F can cause the calendar application to display a GUI of the calendar application with the user's appointments scheduled for today. The expanded results can be larger and contain more information than the media object displayed at block 814.

Figure 9H:
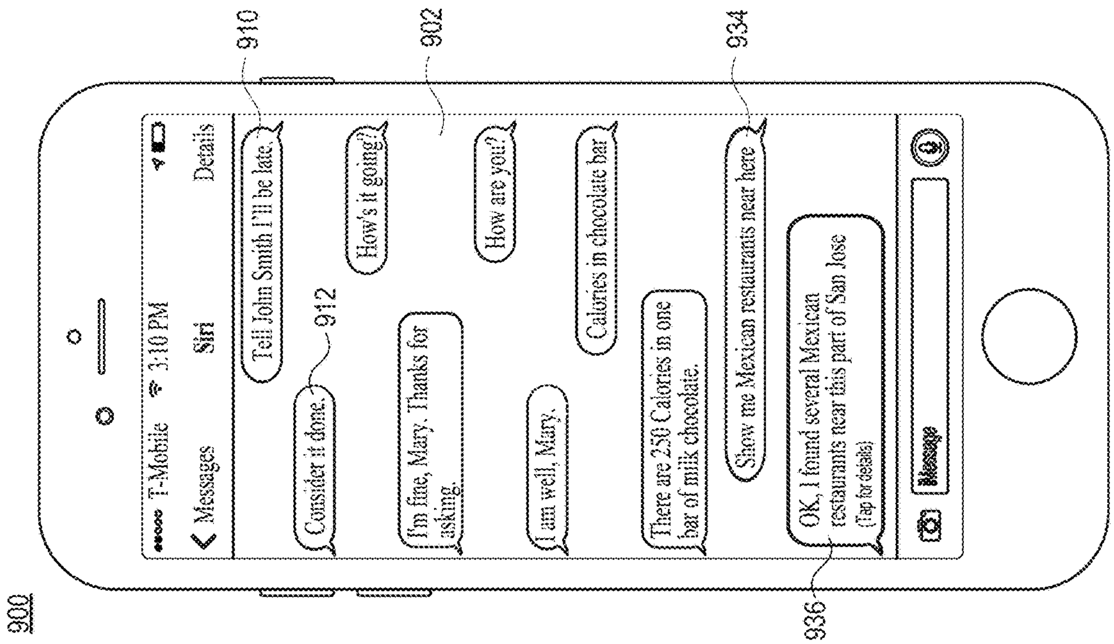
Figure 9G:
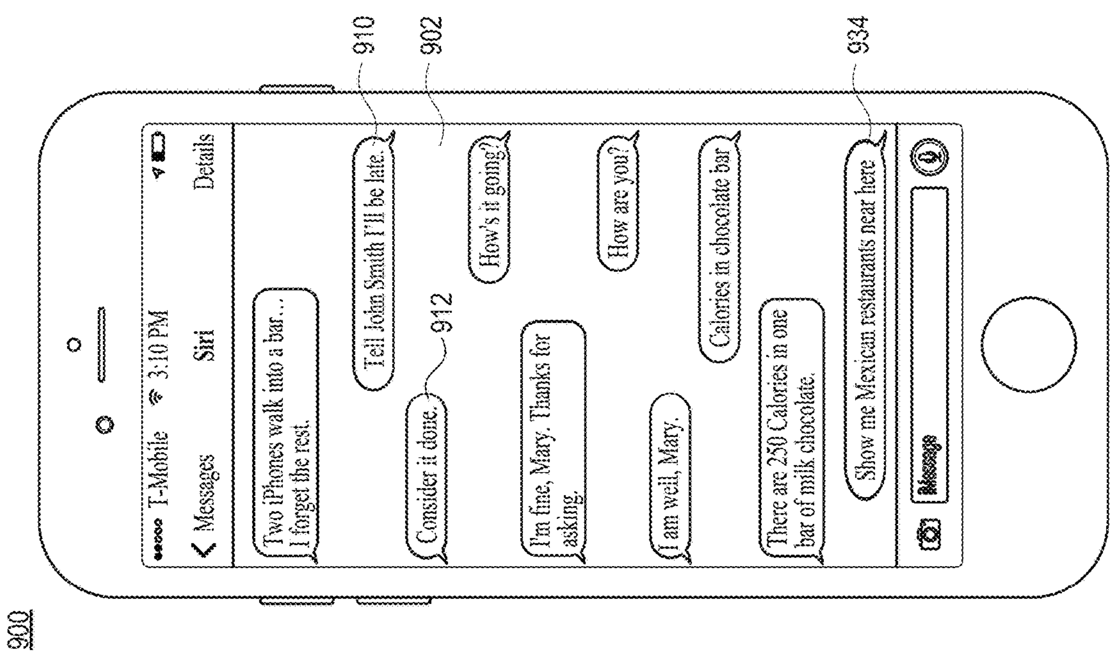

As discussed above, the previous contextual state of the electronic device associated with a previous message in GUI 902 can be utilized to facilitate a current interactive session between the user and the digital assistant. FIGS. 9G-H illustrate an example where the previous contextual state of the electronic device can be utilized to satisfy a user request represented by the user input of block 806. In this example, the user may have been traveling in an unfamiliar part of San Jose at the time previous message 910 was sent to the digital assistant. Further, the user may have noticed an interesting Mexican restaurant in that unfamiliar part of San Jose while sending previous message 910. The user may utilize the previous contextual state of the electronic device associated with previous message 910 in order to look up that Mexican restaurant at a later time. In the present example, the user input "Show me Mexican restaurants near here" can be received (e.g., at block 806) and in response to the user input, the user input can be displayed as message 934 (e.g., at block 808) in GUI 902. In response to detecting a user selection of previous message 910 (e.g., at block 804), the previous contextual state of the electronic device associated with previous message 910 can be retrieved. In particular, the previous contextual state of the electronic device associated with previous message 910 can include location information corresponding to the unfamiliar location in San Jose. The electronic device can cause an action to be performed in accordance with a user intent derived from the user input (e.g., at block 812). In response to detecting the user selection of previous message 910, the user intent can be derived based on the retrieved previous contextual state of the electronic device associated with previous message 910. In particular, it can be determined based on the user selection of previous message 910 that "near here" refers to the location of the electronic device at the time previous message 910 was sent (e.g., the unfamiliar part of San Jose).

In this example, the action performed can be a search for Mexican restaurants near the location of the electronic device at the time previous message 910 was sent. The results obtained from the search are thus based on the previous contextual state of the electronic device associated with previous message 910. As shown in FIG. 9H, a response based on the obtained search results can be displayed as message 936. In particular, a list of Mexican restaurants near the unfamiliar part of San Jose can be displayed (e.g., in a separate application of the electronic device) in response to the user selection of message 936.

Figure 9J:
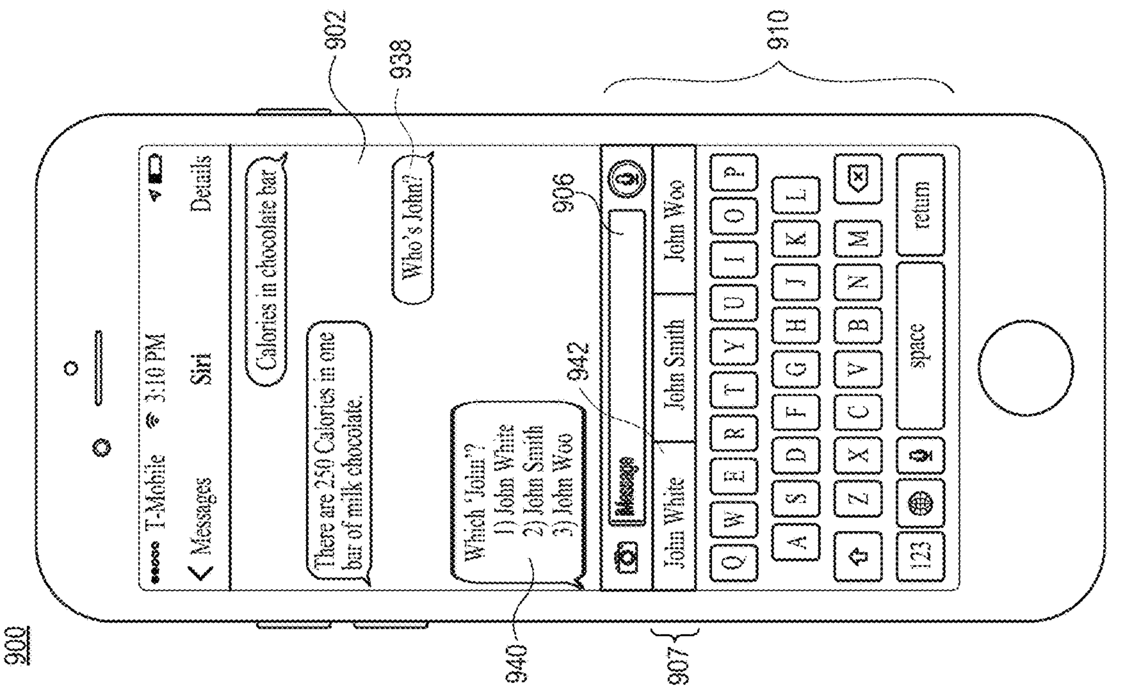
Figure 9I:
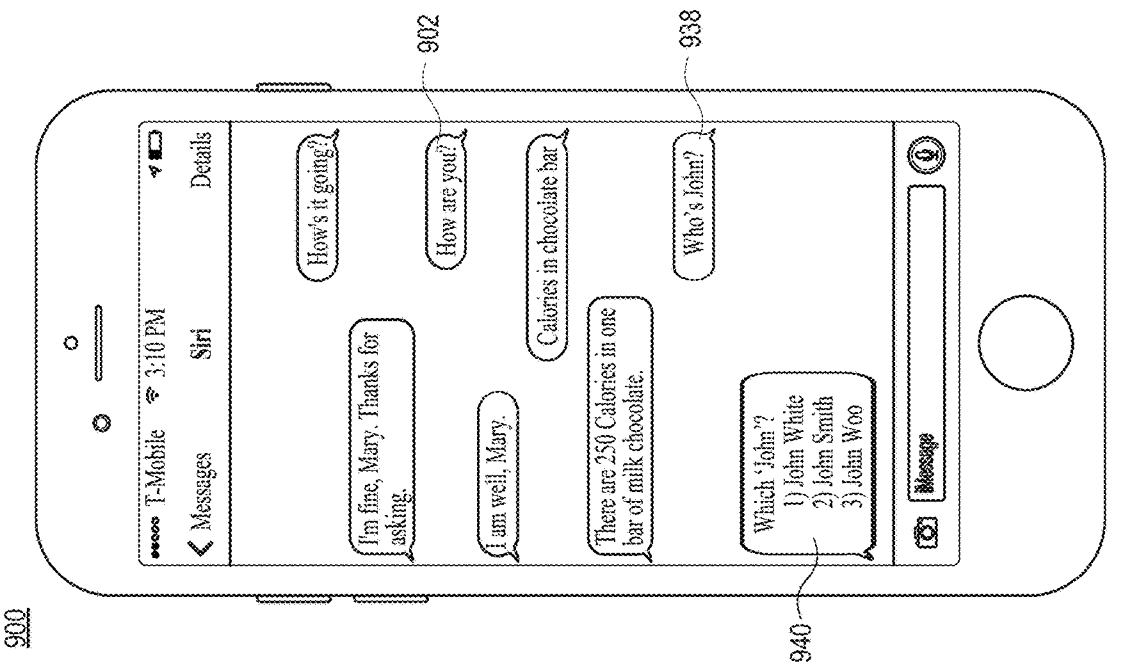

In some examples, the user input received at block 806 can include an ambiguous term. For example, in the user input of message 938 shown in FIG. 9I, the user input "Who's John?" can include the ambiguous term "John," which can have two or more interpretations. In particular, based on the contextual state of the electronic device at the time the user input of message 938 was received, it can be determined that there are three contacts (e.g., John White, John Smith, and John Woo) stored on the electronic device corresponding to the name "John." In these examples, the displayed response of message 940 (e.g., at block 814) can include a request for additional information related to the ambiguous term. For example, as shown in FIG. 9I, the request for additional information can include a list of possible interpretations (e.g., "John White," "John Smith," and "John Woo") for the ambiguous term "John.

User input interface 910 can be utilized to facilitate user response to the request for additional information related to the ambiguous term. In particular, user input interface 910 can include auto-complete interface 907. Auto-complete interface 907 can be configured to display suggested words or character strings that are a prediction of future user input. The suggested words or character strings can be based on one or more characters that the user has already inputted and is displayed in text field 906. Additionally or alternatively, the suggested words or character strings can be based on the displayed response from the digital assistant. As shown in FIG. 9J, two or more suggested character strings (e.g., "John White," "John Smith," and "John Woo") can be displayed in auto-complete interface 907. Each of the two or more suggested character strings can be responsive to the request for additional information. In particular, the two or more suggested character strings can include the list of possible interpretations of the ambiguous term (e.g., "John White," "John Smith," and "John Woo").

A user input indicating a selection of one of the list of possible interpretations can be received. In some examples, the user input can be a user selection of a suggested character string of the two or more suggested character strings. For example, a user selection of the suggested character string "John White" 942 in auto-complete interface 907 can be detected and in response, the suggested character string "John White" can be displayed as message 944 in GUI 902. It should be appreciated that, as an alternative to auto-complete interface 907, a response to the request for additional information related to the ambiguous term can be provided via text input. For example, text input "John White" can be received via the keyboard of user input interface 910 to select the intended interpretation of the ambiguous term "John." Further, as shown in FIGS. 9I and 9J, the list of possible interpretations of the ambiguous term can be numbered and thus in some examples, the text input corresponding number of the intended interpretation can be received. In particular, the text input "3" can be received to indicate selection of "John White" as the intended interpretation of the ambiguous term "John."

Figure 9L:
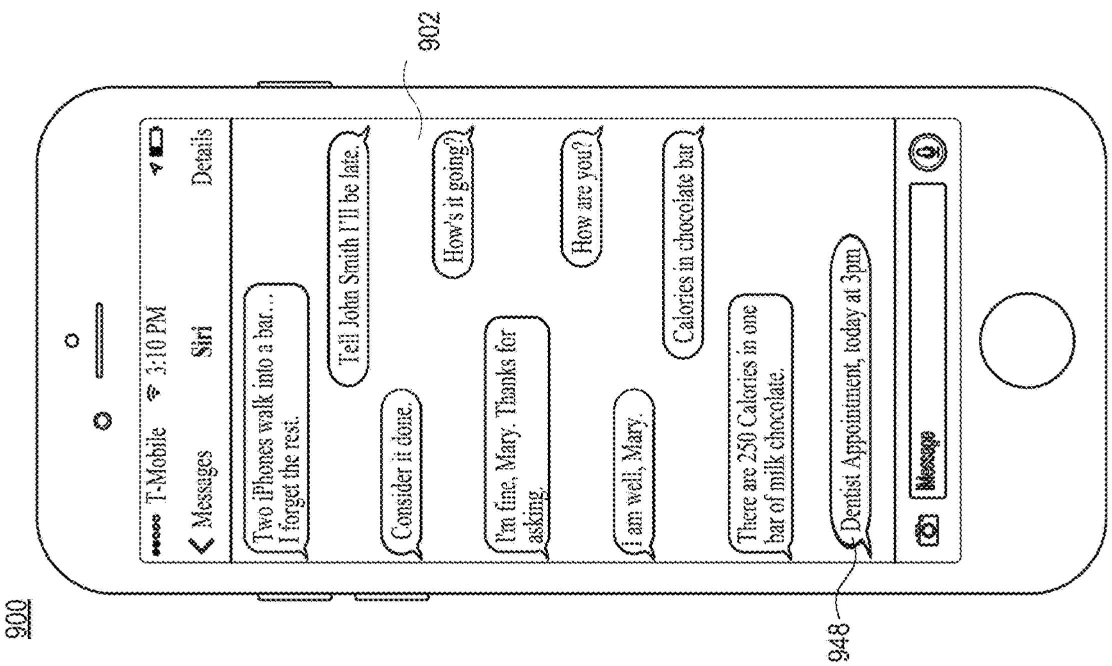
Figure 9K:
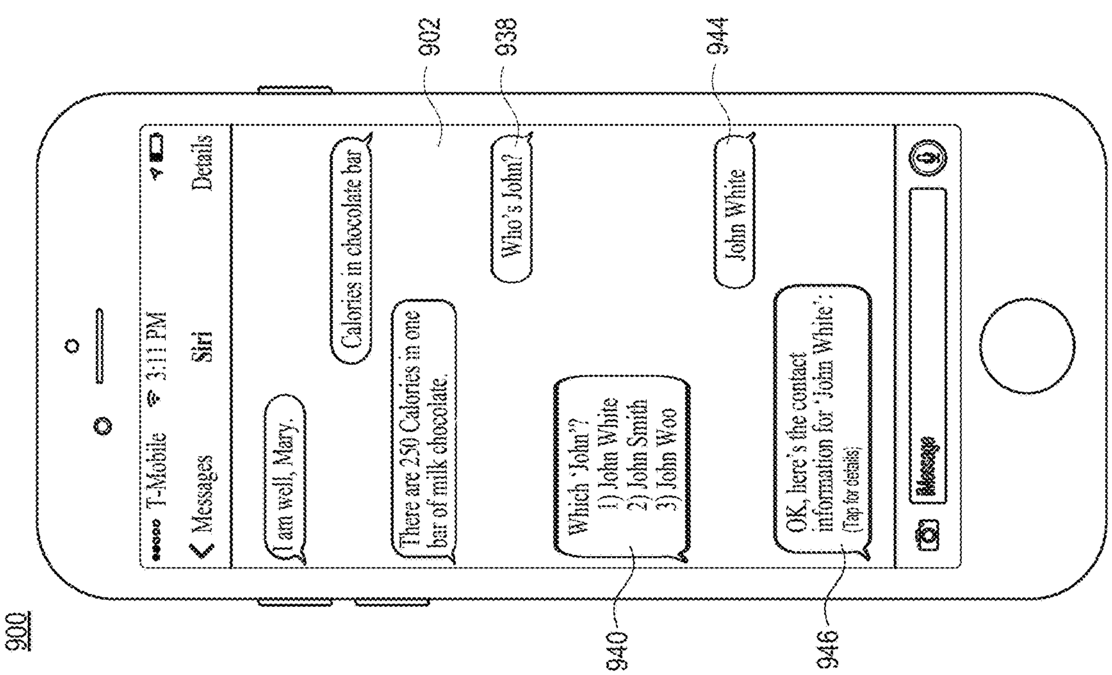

The electronic device can cause an action to be performed based on the user intent derived from the user input "Who's John?" and the user selection of "John White" as the intended interpretation of the ambiguous term "John." As shown in FIG. 9K, a response based on the performed action can be displayed as message 946. In particular, the response can be based on the selected interpretation "John White." In the present example, the contact information of "John White" can be displayed (e.g., using the contacts application of electronic device 1400) in response to the user selection of message 946.

Although in the above examples, auto-complete interface 907 is utilized for responding to disambiguation requests of the digital assistant, it should be recognized that auto-complete interface 907 can further be utilized to response to digital assistant requests other than disambiguation requests. For example, in response to a user request for show times for a movie at a cinema, the digital assistant can provide show time options and then ask the user whether he or she would like to purchase tickets. In this example, the displayed response at block 814 can be "Here are some available show times today: 730 pm, 1045 pm, 1200 am. Would you like to purchase tickets?" To facilitate user response to the digital assistant's question, the electronic device can display the suggested character strings "Yes" and "No" in auto-complete interface 907 for user selection. In response to the user selection of the suggested character string "Yes," the suggested character string "Yes" can be displayed as a message in the GUI. Further, a response based on the suggested character string "Yes" can be displayed. For example, the response can be a follow-up request asking the user which show time he or she would like to reserve. Alternatively, the response can be a message which when selected, causes a movie reservation website to be displayed on a GUI of the Internet browser application of the electronic device.

In some examples, notifications from various applications of the electronic device can be presented via the digital assistant on the messaging platform. The notifications can be received from applications of the electronic device other than the messaging application. In the present example shown in FIG. 9L, the notification can be a calendar alert from the calendar application for a dentist appointment. The calendar alert can be based on user input received prior to receiving the notification. For example, the user input can be input for creating a calendar entry for the dentist appointment in the calendar application. In response to receiving the notification, the notification can be displayed as a message in the GUI. For example, as shown in FIG. 9L, the notification for the dentist appointment can be displayed as message 948 in GUI 902. Convey notifications from other applications via the digital assistant on the message application can allow users to rely on a single application as the central platform for all communication. This can be desirable to streamline user interactions and improve user experience. In particular, receiving notifications through the messaging platform can allow all notifications to be stored and organized in a single location for easy referencing. Further, the digital assistant can be readily available to perform any tasks related to the notification. For example, upon receiving message 948 notifying the user of the dentist appointment, the user can conveniently request the digital assistant to send a message to the dentist indicating that the user will be 5 minutes late. Because the notification is associated with context information such as the contact information of the dentist, a message can readily be sent to the dentist without the user having to take additional time looking up the contact information of the dentist using one application and the switch to a separate application to compose the desired message. Other examples of notifications can include reminder notifications from the task reminder application for a task, stock price alerts from the stock application, fitness notifications from the fitness application related to reaching a fitness goal, or the like.

As described above, each message in GUI 902 can be associated with a contextual state of the electronic device. The message history can thus serve as a contextual history of the electronic device. In some examples, it may be desirable for the user to bookmark certain messages that are associated with important contextual states. For example, previous message 910 can be associated with a location that the user may be interested in referring to in the future. In these examples, a user input associated with previous message 910 can be received. The user input can be a predefined user input received via GUI 902 to bookmark previous message 910. In response to receiving the user input, a bookmark of previous message 910 can be stored in association with an affordance. The affordance can be displayed, for example, on a scroll bar (not shown) of GUI 902. The position of the affordance on the scroll bar can correspond to the position of previous message 910 among the plurality of previous messages. Selecting the affordance by the user can causes a focus of GUI 902 to change to previous message 910.

Figure 10A:
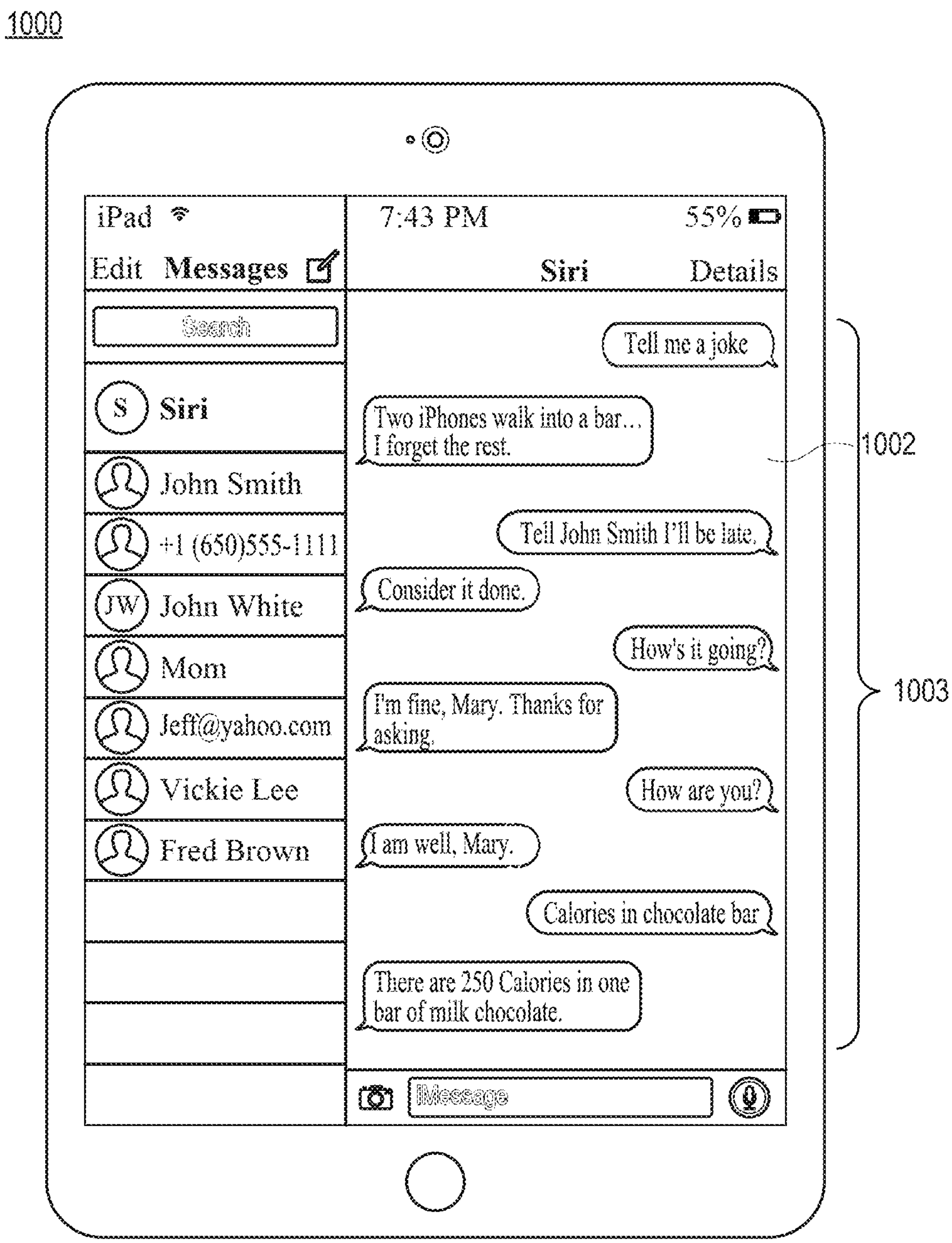
FIGS. 10A-C illustrate user interfaces of an electronic device for operating a digital assistant in a messaging environment according to various examples.
Figure 10B:
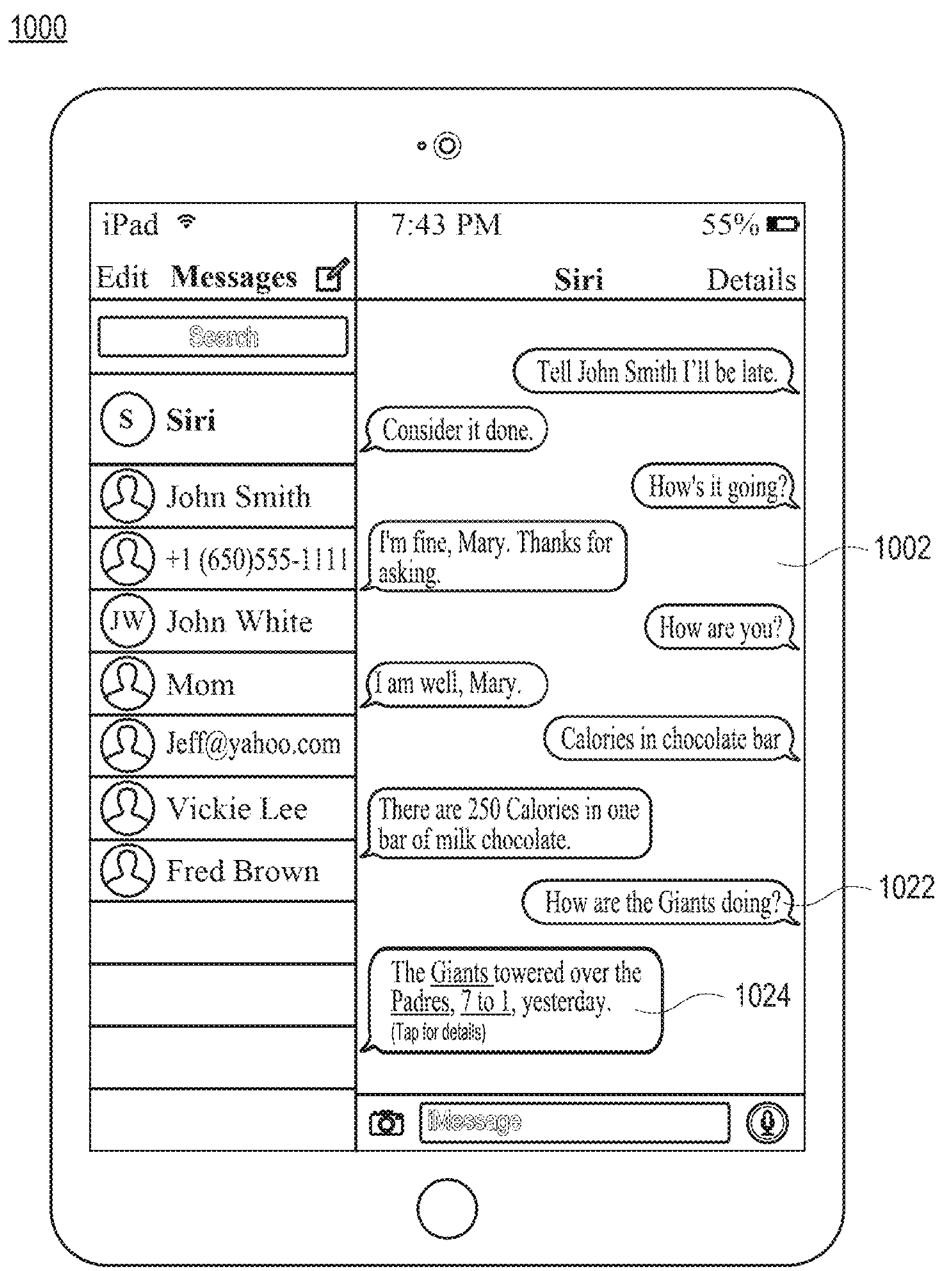
Figure 10C:
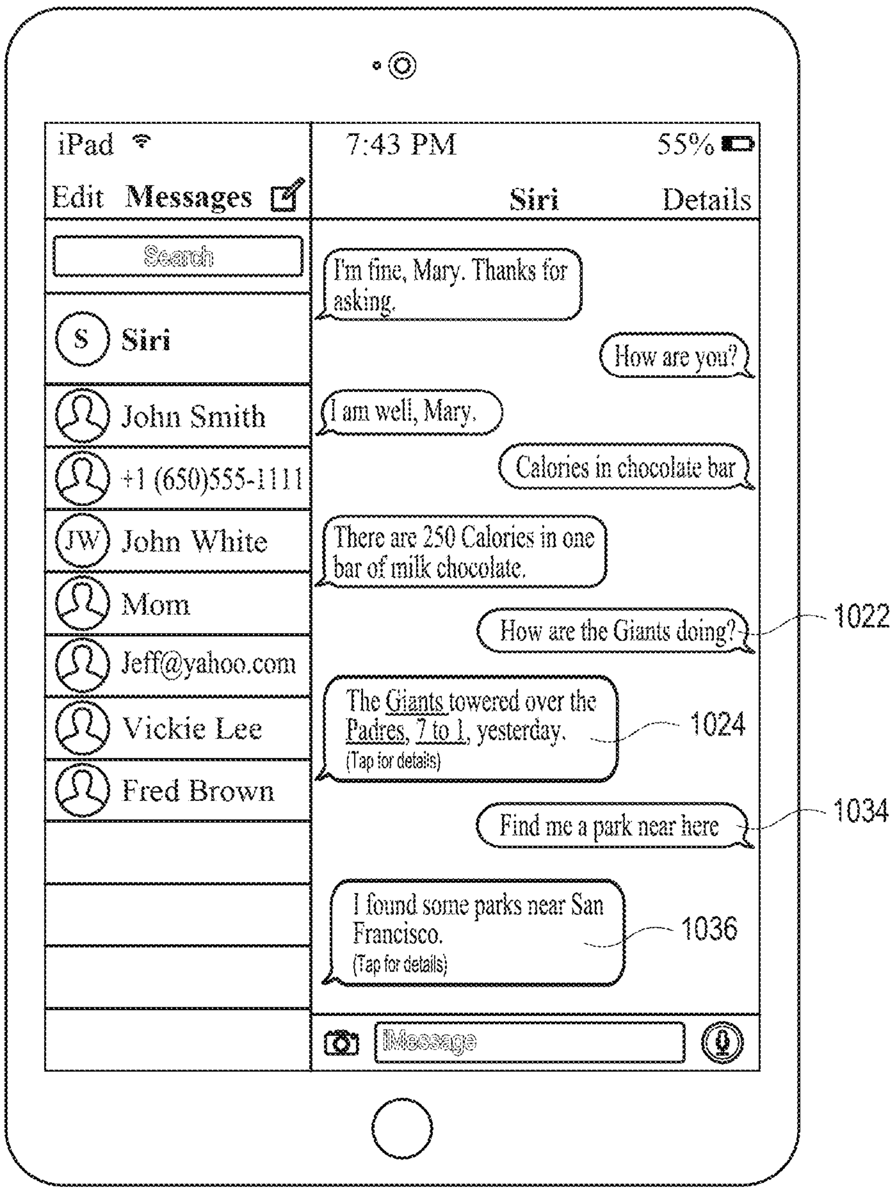

In some examples, the conversation history in GUI 902 can be synchronized with a corresponding GUI of the messaging application of a second electronic device. For example, FIGS. 10A-C illustrates electronic device 1000 displaying GUI 1002. GUI 1002 can be the GUI of the messaging application of second electronic device 1000. Second electronic device 1002 can be separate and different from electronic device 900. Second electronic device 1000 can implement a digital assistant and the user can interact with the digital assistant of second electronic device 1000 via GUI 1002. As shown in FIG. 10A, GUI 1002 can include plurality of previous messages 1003 that are identical to plurality of previous messages 903. In particular, plurality of previous messages 1003 include messages exchanges at electronic device 900 between the user and the digital assistant implemented on electronic device 900. Electronic device 900 can cause plurality of previous messages 1003 to be displayed in GUI 1002 based on plurality of previous messages 903. Further, as shown in FIG. 10B, in response to displaying at block 808 the user input as first message 922 in GUI 902 of electronic device 900, electronic device 900 can cause the same first message to be displayed as message 1022 in GUI 1002 of second electronic device 1000. Similarly, in response to displaying at block 814 the response as second message 924 in GUI 902 of electronic device 900, electronic device 800 can cause the same second message to be displayed as message 1024 in GUI 1002 of second electronic device 1000. Thus, the message history at electronic device 900 between the user and the digital assistant can be accessible to the user when the user switches over to electronic device 1000.

Each of plurality of previous messages 1003 can be associated with a previous contextual state of electronic device 900 corresponding to a respective one of plurality of previous messages 903. Similarly, message 1022 can be associated with the same contextual state of electronic device 900 as message 922. These contextual states (and previous contextual states) can be stored on electronic device 1000. In some examples, the contextual state associated with a message generated at the electronic device can be utilized to process user requests addressed to the digital assistant of the second electronic device. For example, a user selection of message 1022 in GUI 1002 can be detected. In response to detecting the user selection of message 1022, the contextual state of electronic device 900 associated with message 1022 can be retrieved. In the present example, the contextual state associated with message 1022 can include location information of electronic device 900 at the time message 922 was generated. In particular, the location information can indicate that electronic device 900 was in San Francisco at the time message 922 was generated. With reference to FIG. 10C, a user input can be received at second electronic device 1000. The user input can be similar to the user input received at block 806. In particular, the user input can be received via a user input interface (not shown) of GUI 1002 that is similar to user input interface 910. In this example, the user input can be the text "Find me a park near here." In response to receiving the user input, the user input can be displayed as message 1034 in GUI 1002 of second electronic device 1000. Second electronic device 1000 can cause an action to be performed in accordance with a user intent. Causing the action to be performed can be similar to block 812 described above. The user intent can be derived from the user input "Find me a park near here" and from the contextual state of electronic device 900 at the time message 922 was generated. As described above, the contextual state can include location information associated with the city of San Francisco. Based on this contextual state of electronic device 900, it can be determined that the user intent is to search for parks in San Francisco and the performed action can thus be a search for parks in San Francisco. A response as message 1036 can be displayed in GUI 1002 of second electronic device 1000. Displaying the response can be similar to block 814 described above. The response can be based on the performed action. Specifically, in the present example, the response in message 1036 can provide access to results obtained from performing a search for parks in San Francisco.

Process 1100 is described below with simultaneous reference to FIGS. 11A-D and 12A-H. At block 1102, a graphical user interface (GUI) having a plurality of previous messages between a user and the digital assistant can be displayed on the display of an electronic device. For example, as shown in FIG. 12A, GUI 1202 of electronic device 1200 can be displayed. GUI 1202 can be a GUI of a messaging application of electronic device 1200. GUI 1202 includes plurality of previous message 1203 between the user of electronic device 1200 and the digital assistant implemented on electronic device 1200. Plurality of previous messages 1203 are presented in a conversational view. Electronic device 1200 can be similar to one or more of devices 104, 200, 400, 600, or 900. Block 1102 can be similar or identical to block 802 of process 800.

At block 1104, a first user input including a media object can be received. The media object can be an image, video clip, audio clip, or the like. In some examples, the media object can be received via a user input interface of GUI 1202. The user input interface can be similar to user input interface 910. For example, the media object can be received using buttons similar to image/video button 904 and audio button 908, described above. The media object can be retrieved from the memory of electronic device 1200. Alternatively, the media object can be generated based on input received via the microphone or the camera of electronic device 1200. In the present example shown in FIG. 12B, media object of user input can be an image of a business card.

Figure 12B:
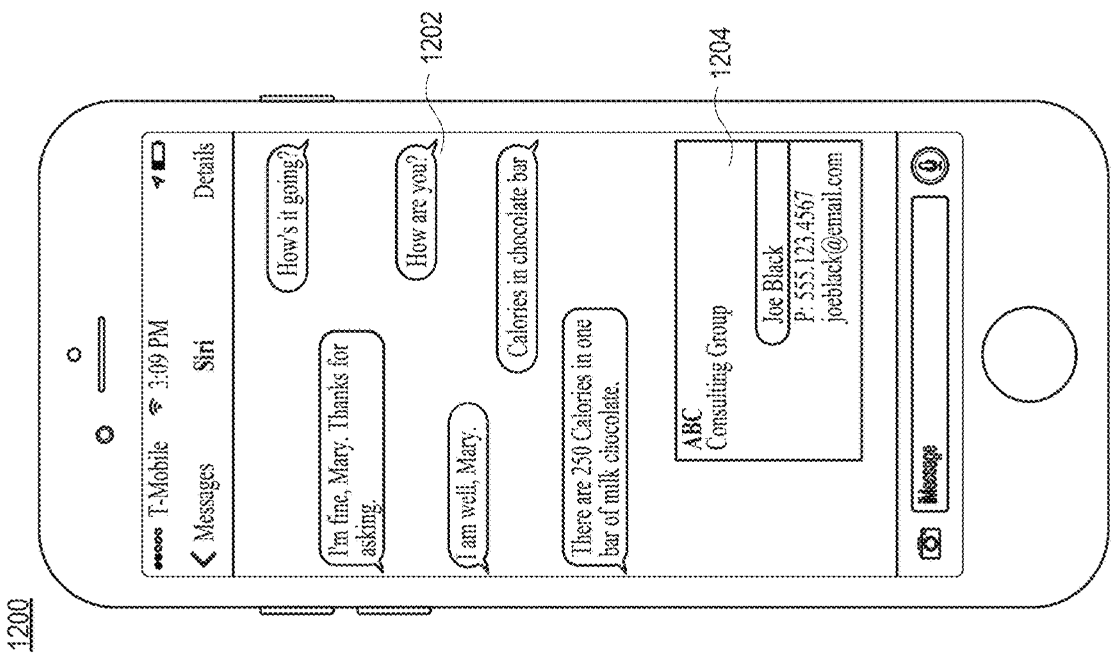
FIGS. 12A-H illustrate user interfaces of an electronic device for operating a digital assistant in a messaging environment according to various examples.

At block 1106, the media object can be displayed as a first message in the GUI. For example, as shown in FIG. 12B, media object can be displayed as first message 1204 in GUI 1202. In the present example, the image of the business card in first message 1204 can depict contact information of an individual (e.g., "Joe Black"). It should be recognized that in other examples, the image can depict contact information of any entity (e.g., a person, an organization, a business, etc.) The image can be captured by the user via the camera of electronic device 1200. Block 1106 can be performed in response to receiving the first user input at block 1104.

Figure 12A:
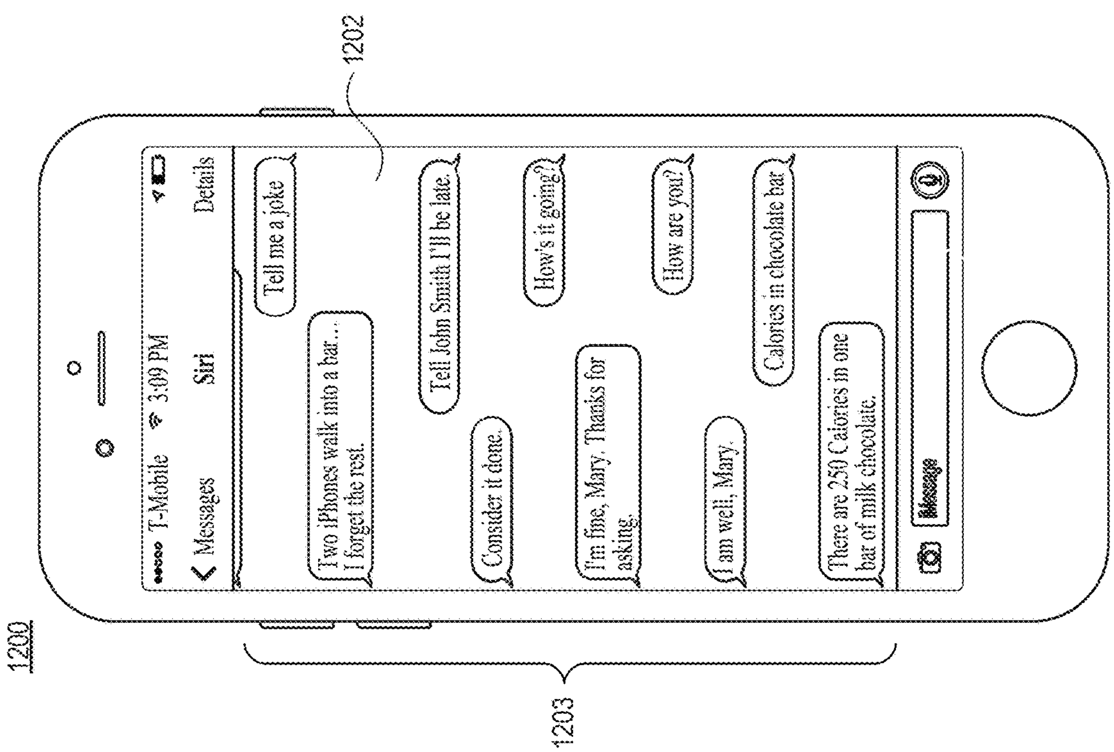
Figure 12C:
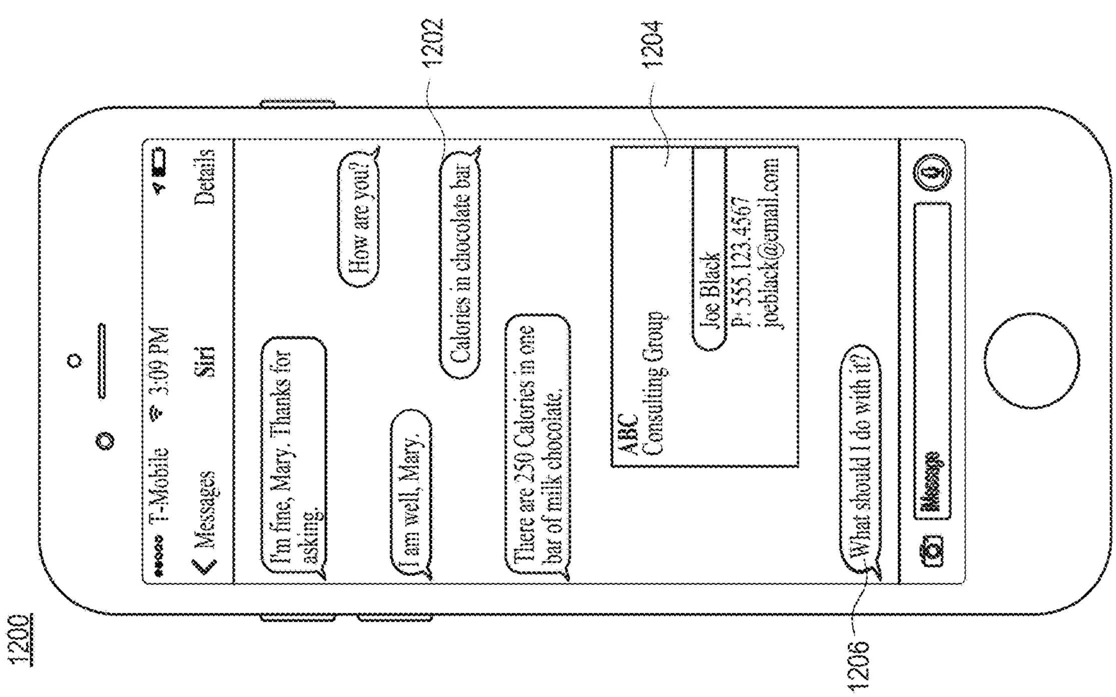

At block 1108, a request for additional information related to the media object can be displayed as a second message. For example as shown in FIG. 12C, second message 1206 can be displayed in GUI 1202. In this example, second message 1206 includes the request "What should I do with it?" It should be recognized that in other examples, the second message can include a different request related to the media object. In particular, the second message can include a request for clarification of the user's intent with respect to the media object. The request can thus prompt the user to more fully define the user's intent for providing the media object. Second message can be generated and displayed by the digital assistant in response to the media object of block 1104. Block 1108 can be performed after displaying the media object as the first message at block 1106 and before receiving the second user input at block 1110. In some examples, block 1108 can be optional.

At block 1110, a second user input including text can be received. In some examples, the text of the second user input can be received via a keyboard of GUI 1202 (e.g., keyboard 911.) In some examples, the text can be responsive to the request of block 1108 in the second message. In some examples, the text can represent a request to perform a task using the media object. In other examples, the text can represent a request to obtain information related to the media object. In the present example shown in FIG. 12D, the text can be "Add to contacts."

Figure 12D:
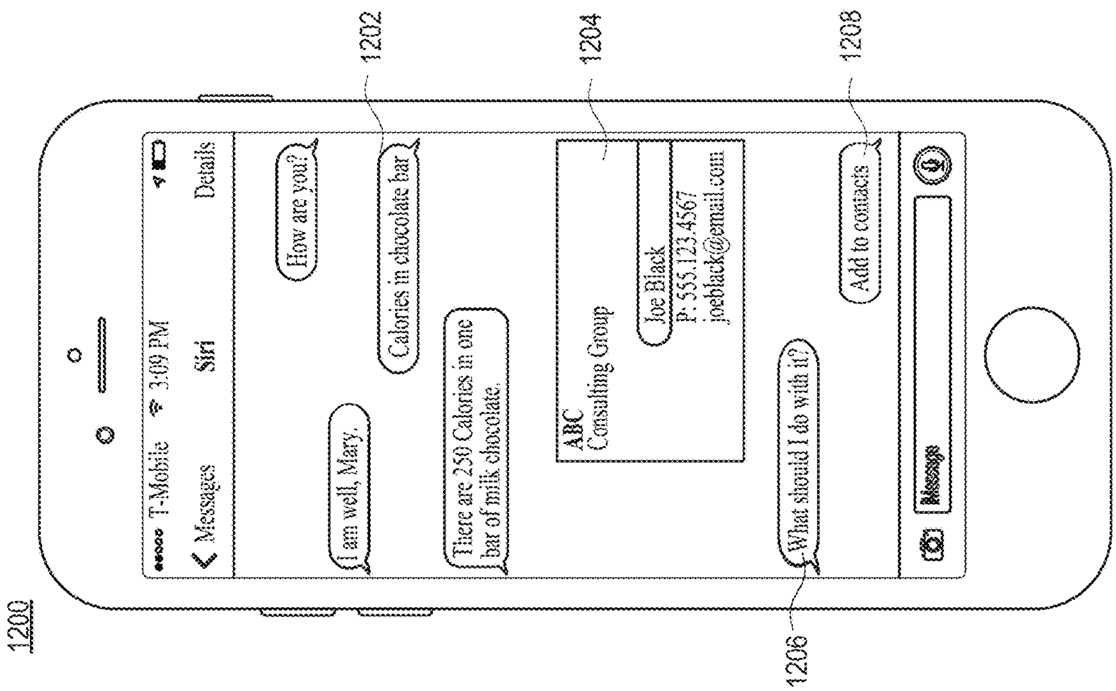

At block 1112, the text of block 1110 can be displayed as a third message in the GUI. For example, as shown in FIG. 12D, the text "Add to contacts" can be displayed as third message 1208 in GUI 1202. Block 1112 can be performed in response to receiving the second user input at block 1110. As evident in the present example, neither the media object of block 1104 nor the text of block 1110 are individually sufficient to represent a user request. Specifically, neither contains sufficient information to deduce a user intent. However, the combination of the media object of block 1104 and the text of block 1110 can represent a user request to the digital assistant.

At block 1114, the electronic device can cause a user intent (e.g., an actionable intent) corresponding to the first user input of block 1104 and the second user input of block 1110 to be determined. Block 1114 can include causing a domain among a plurality of domains in an ontology (e.g., ontology 760) to be determined based on the first user input and the second user input. The user intent can be determined using natural language processes (e.g., with natural language processing module 732) based on the first user input and the second user input. In some examples, the user intent can be determined at the electronic device. Alternatively, the electronic device can transmit the media object of block 1104 and the text of block 1110 to a remote server (e.g., DA server 106) where the user intent is determined based on the media object of block 1104 and the text of block 1110. In the present example, it can be determined that the "contacts" domain corresponds to the first user input and the second user input. Further, it can be determined that the user intent includes creating and storing a new contact entry in the contacts application of the electronic device based on the media object.

At block 1116, a determination of whether the user intent requires extracting text from the media object can be obtained. In some examples, the determination can be based on the user intent determined at block 1114. In particular, certain domains can be predetermined to require extracting text from the media object. For example, domains including contacts, calendar, reminders, and translation can be predetermined to require extracting text from the media object. In response to obtaining a determination that the user intent requires extracting text from the media object, block 1118 can be performed.

At block 1118, text from the media object can be extracted. Various techniques can be implemented to extract text from the media object. In examples where the media object is an image, optical character recognition can be performed on the image to extract text from the image. In examples where the media object is an audio clip or a video clip, speech to text recognition can be performed (e.g., using STT processing module 730) on the media object to extract text. Further, in examples where metadata is embedded in the media object, the media object can be processed to extract text from the metadata. In the present example, optical character recognition can be performed on the media object of message 1204 to extract the text depicted in the image of a business card. The extracted text can thus include contact information.

At block 1120, a task in accordance with the user intent can be performed using the extracted text. In particular, a task flow corresponding to the user intent of block 1114 can be determined. Block 1120 can thus include performing the tasks of the task flow to at least partially fulfill the user intent of block 1114. In the present example, a performed task can include determining contacts fields corresponding to one or more character strings of the extracted text. For example, the character strings "Joe," "Black," "joeblack@email.com," and "555.123.4567" of the extracted text can be determined to correspond to the first name contacts field, the last name contacts field, the email contacts field, and the phone number contacts field, respectively. Further, block 1120 can include populating, in accordance with the user intent, the extracted text into a text field of an application of the electronic device. Specifically, in the present example, a new contact entry can be created in the contacts application. The contact entry can be associated with the individual "Joe Black." Further, the character strings "Joe," "Black," "joeblack@email.com," and "555.123.4567" of the extracted text can be populated into the first name field, the last name field, the email field, and the phone number field of the new contact entry, respectively. In other examples, it can be determined that an existing contact in the contact application is associated with the extracted text (e.g., same name, email, phone number, or the like). In these examples, the existing contact can be edited and additional information based on the extract text can be populated into one or more text fields of the existing contact. Block 1120 can be performed automatically without additional user intervention in response to receiving the first user input of block 1104 and the second user input at block 1110.

At block 1122, a response indicative of the user intent being satisfied can be displayed as a fourth message in the GUI. For example, as shown in FIG. 12E, the response "Joe Black has been added to your contacts" is displayed as fourth message 1209. The response can confirm that the user request represented by the first user input and the second user input has been performed. Further, in this example, the name "Joe Black" can be highlighted (e.g., underlined) to indicate to the user that the words "Joe Black" in message 1209 are selectable. In particular, message 1209 can be configured such that the user selection of the words "Joe Back" can cause the newly created/edited contact entry of Joe Black to be displayed in the contacts application of the electronic device.

In some examples, the response of block 1122 can include information requested by the user. For example, the task of block 1120 can include retrieving information in accordance with the user intent, and the retrieved information can be displayed in the response of the fourth message. In some examples, the response can include a request from the digital assistant for additional information. For example, the response can include a request for information to clarify the user's intent. In particular, the request can be a request to disambiguate an ambiguous term in the text of the second user input. In some examples, the response can request confirmation from the user prior to performing the task of block 1120.

Although blocks 1102-1122 of process 1100 are explained above with respect to using an image depicting contact information to create a new contact entry in the contacts application of the electronic device, it should be recognized that blocks 1102-1122 can include various other implementations. For example, a calendar entry in the calendar application of the electronic device can be created based on the first user input of block 1104 and the second user input of block 1110. In these examples, the media object of the first user input (e.g., block 1104) can include information about an event (e.g., an opera, concert, festival, examination, etc.). For example, the media object can be a picture of a pamphlet advertising the event. The picture can be captured using the electronic device and can depicting event information in text form. The event information can include, for example, a date, time, venue, and title for the event. The text of the second user input (e.g., block 1110) can include a request to create a calendar event using the media object. For example, the text of the second user input can be "Add to calendar." Based on the text and media object, the user intent can be determined at block 1114 to include creating a calendar entry in a calendar application of the electronic device using the media object. In examples where the media object is an image, text depicted in the image can be extracted using optical character recognition. The extracted text can be processed to identify one or more character strings associated with a text calendar field (e.g., start time, end time, title, location, event description, etc.) The task performed at block 1120 in accordance with the user intent can include creating a new calendar entry and populating one or more text fields of the calendar entry with the extracted text.

In some examples, a reminder event in the reminder application of the electronic device can be created based on the first user input of block 1104 and the second user input of block 1110. In these examples, the media object of the first user input can include information regarding a reminder task. For example, the media object can be a picture of a grocery store advertisement indicating that watermelon is on sale for 29 cents a pound. The picture can be taken using the electronic device. The text of the second user input can include a request to create a task reminder using the media object. For example, the text of the second user input can be "Create a reminder" or "Add to grocery list." Based on the media object and the text, the user intent can be determined at block 1114 to include creating a reminder entry in a reminder application of the electronic device using the media object. In examples where the media object is an image, text depicted in the image can be extracted using optical character recognition. The extracted text can be processed to identify one or more character strings associated with a respective text reminder field (e.g., task title, task description, task category, reminder trigger criterion, etc.). For example, the extracted text from the grocery store advertisement can include the character strings "whole seedless watermelon for 29 cents/lb," which is determined to be associated with the text reminder fields "task title" or "task description." Further, it can be determined based on the word "watermelon" that the task is associated with the predefined task category of "Grocery List," which can be associated with the reminder trigger criterion of being located within a predetermined distance of a grocery store. The task performed at block 1120 in accordance with the user intent can include creating a new task reminder and populating one or more text fields of the reminder entry with the extracted text. For example, the new task reminder can be for buying watermelon at the grocery store where a reminder is provided when the electronic device is within a predetermine distance of a grocery store.

In some examples, text extracted from a media object can be translated based on the first user input of block 1104 and the second user input of block 1110. In these examples, the media object can contain a first language in text or spoken form. For example, the media object can be a picture of a traffic sign depicting the French text "arret." The text of the second user input can include a request to translate the media object into a second language. For example, the text of the second user input can be "Translate into English." Based on the media object and the text, the user intent can be determined at block 1114 to include translating a first language in the media object to a second language. In examples where the media object is an image, text depicted in the image can be extracted using optical character recognition. During text extraction, the language of the text can be determined. For example, it can be determined in the present example that the extracted text is French. The task performed at block 1120 in accordance with the user intent can include obtaining the text of the second language corresponding to the text of the first language. For example, the extract French text "arrêt" can be translated into the corresponding English text "stop." The translation can be performed on the electronic device or the French text can be transmitted to a separate device to perform the translation. The displayed response of block 1122 can include the text of the second language. For example, the displayed response can be "It says 'stop.'"

Although in the examples described above, the media object is an image, it should be recognized that in other examples, the media object can be an audio/video clip. In particular, the audio/video file can include an utterance. In these examples, extracting text from the media object at block 1118 can include performing speech to text recognition on the media object to extract a text representation of the utterance. Further, it should be recognized that the examples described above of creating a contact entry, a calendar entry, a reminder entry, or performing a translation can be similarly performed using an audio/video clip instead of an image.

Figure 11A:
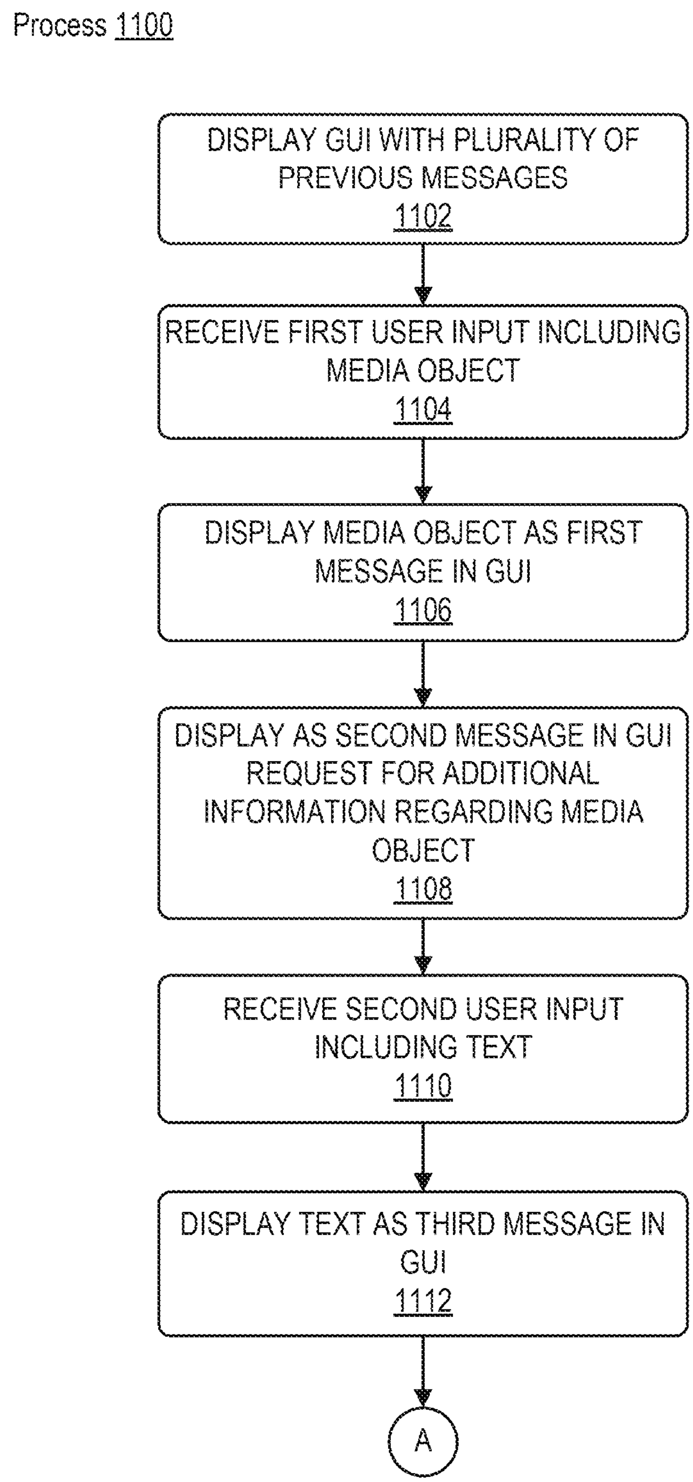
FIGS. 11A-D illustrate a process for operating a digital assistant in a messaging environment according to various examples.
Figure 11B:
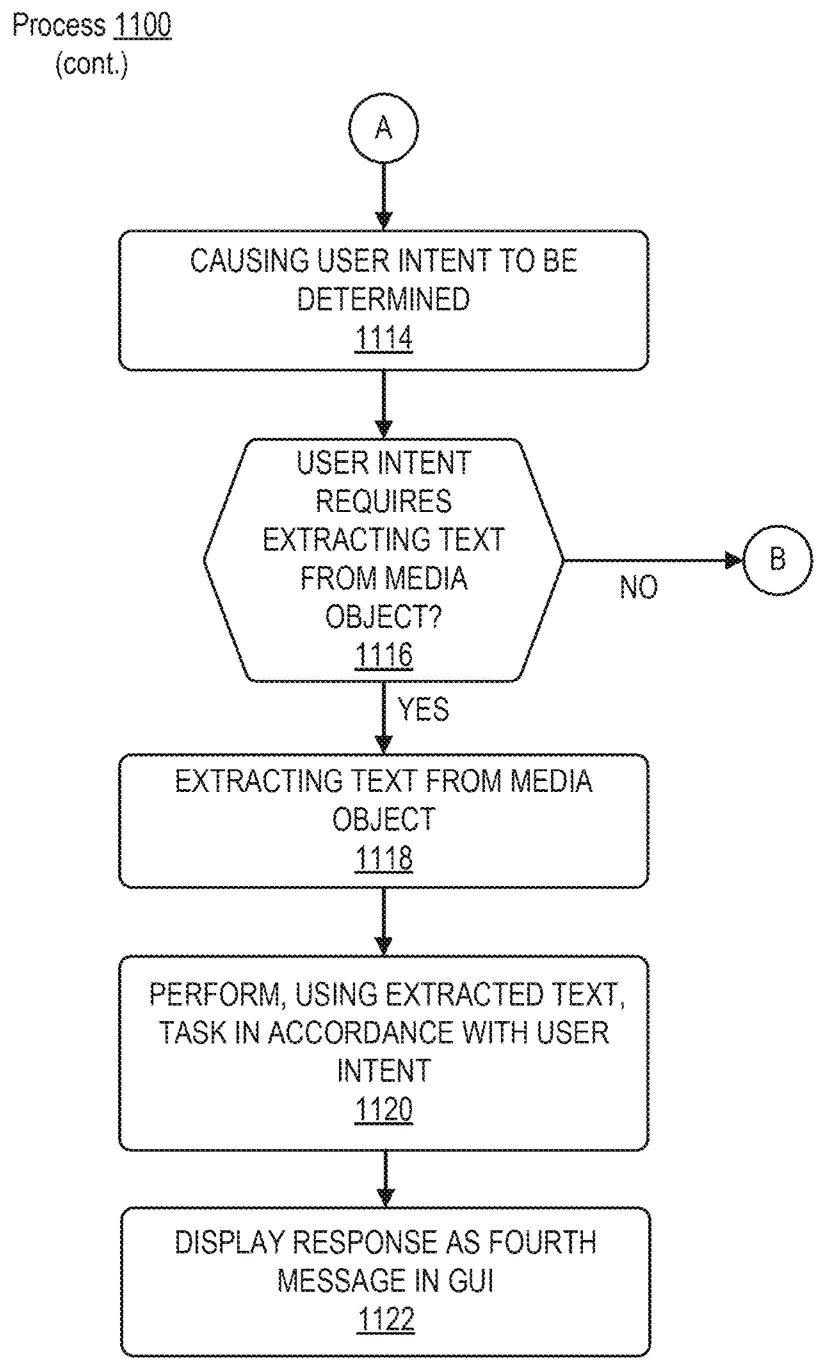
Figure 11C:
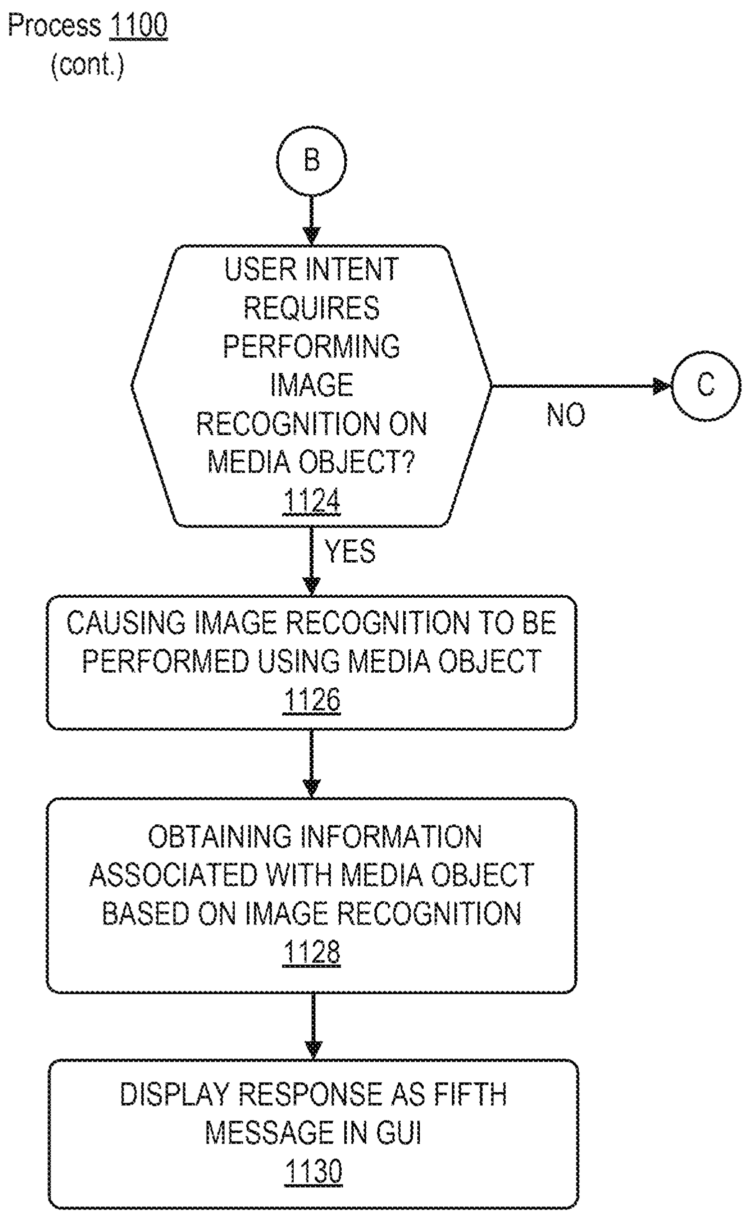

With reference back to block 1116, in response to obtaining a determination that the user intent does not require extracting text from the media object, block 1124 shown in FIG. 11C can be performed. At block 1124, a determination can be obtained as to whether the user intent requires performing image recognition on the media object. In some examples, the determination can be based on the user intent determined at block 1114 and the type of media object received at block 1104. For example, if the domain is determined to be the "search" domain and the media object is determined to be an image, then it can be determined that the user intent requires performing image recognition on the media object.

Figure 12F:
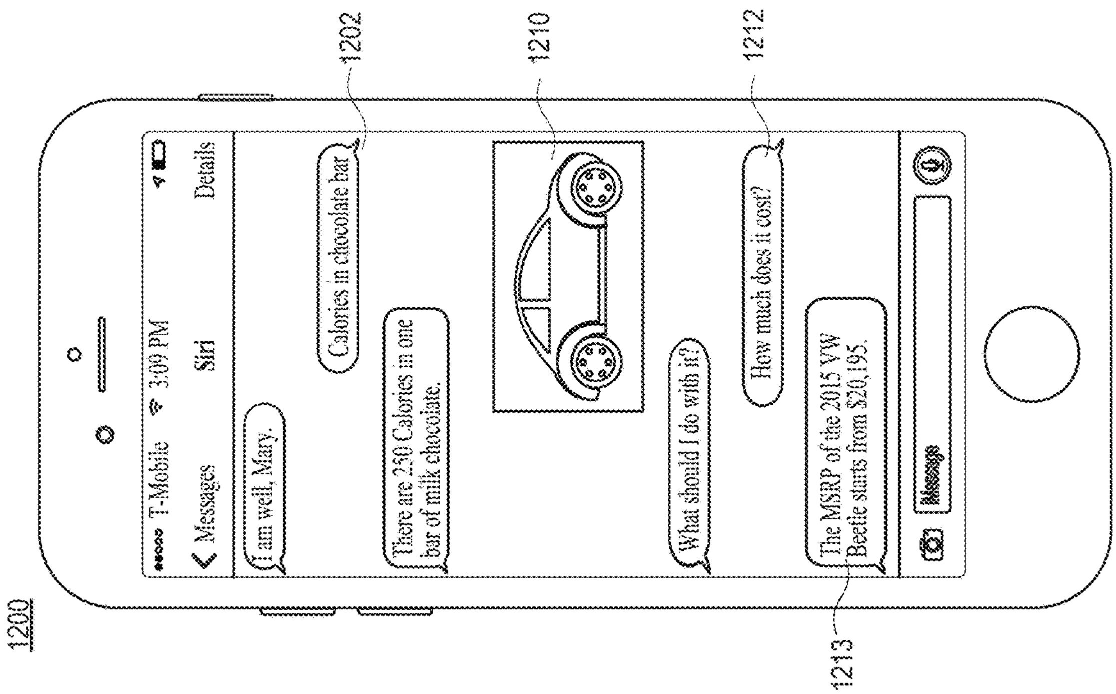
Figure 12E:
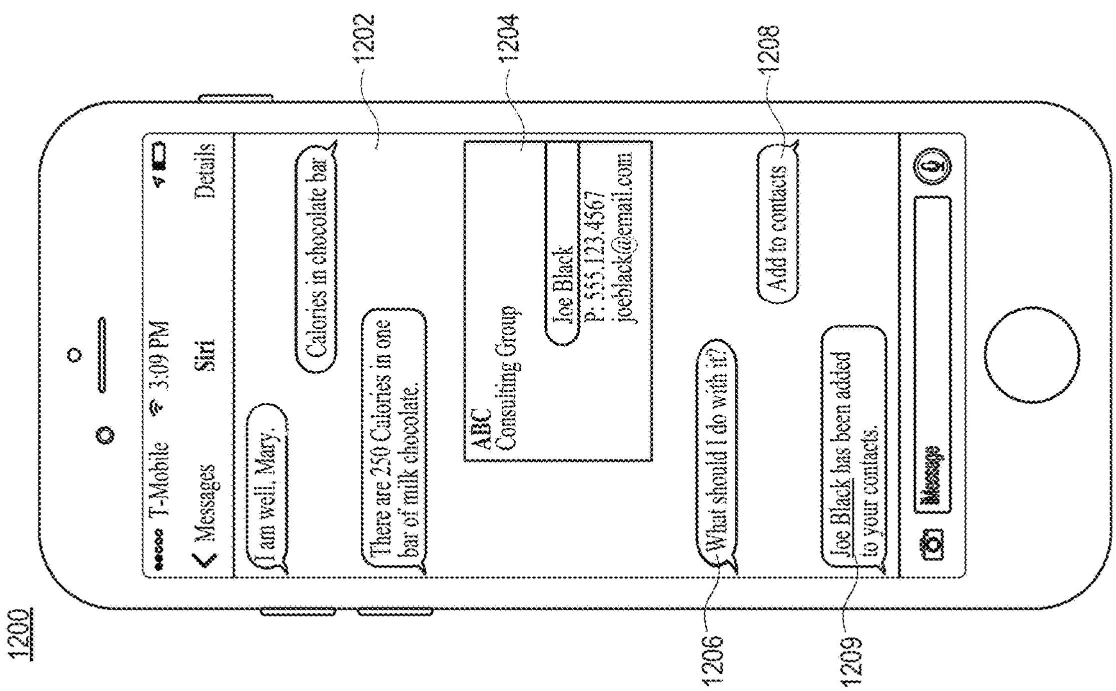

In an example illustrated in FIG. 12F, the media object displayed in message 1210 (e.g., at block 1106) can be an image of a retail object. In the present example, the retail object is a specific car (e.g., the 2015 Volkswagen Beetle). The text of the second user input displayed in message 1212 (e.g., at block 1112) can be a request to search for the price of the car depicted in the media object (e.g., "How much does this cost?"). Based on the image and the text, it can be determined at block 1114 that the user intent includes performing image recognition on the image to identify the retail object and then performing a price search of the identified retail object. In this example, a determination can be obtained at block 1124 that the user intent requires performing image recognition on the media object. In response to obtaining a determination that the user intent requires performing image recognition on the media object, block 1126 can be performed.

At block 1126, the electronic device can cause image recognition to be performed on the media object. In some examples, the media object can be transmitted to a separate server to perform the image recognition. In other examples, at least a portion of the image recognition can be performed on the electronic device. Image recognition can include extracting a set of representative image characteristics from the media object and then comparing the set of representative image characteristics to a plurality of sets of reference characteristics stored in a database to determine a best match. Each set of reference characteristics can be associated with reference information. The reference information can include information identifying the reference image corresponding to the respective set of reference characteristics. The image recognition results can be based on the reference information of the best matched set of reference characteristics. For example, the set of representative image characteristics of the media object in message 1210 can be found to best match a set of reference characteristics corresponding to a reference image of the 2015 Volkswagen Beetle. In particular, the image recognition results can include the character strings "2015," "Volkswagen," and "Beetle" based on the reference information associated with the best matched set of reference characteristics.

At block 1128, information associated with the media object can be obtained based on the image recognition. In particular, the information can be obtained in accordance with the user intent of block 1114 and using the image recognition results of block 1126. In the present example, based on the user intent of searching for the price of the retail object depicted in the media object, a price search using the image recognition results "2015 Volkswagen Beetle" can be performed. The obtained information can include price information of the retail object. For example, the obtained information can include the manufacturer's suggested retail price (MSRP) of the 2015 Volkswagen Beetle. In other examples, the obtained information can include the image recognition results.

At block 1130, a response indicative of the user intent being satisfied can be displaying as a fifth message in the GUI. The response can be based on the information associated with the media object. Block 1130 can be similar to block 1122. In the present example shown in FIG. 12F, the response can be displayed as message 1213 and can include MSRP information of the 2015 Volkswagen Beetle to satisfy the user intent.

Although blocks 1124-1130 of process 1100 are explained above with respect to searching for price information of a retail object depicted in the media object, it should be recognized that blocks 1124-1130 can include various other implementations. For example, location or entity information associated with the media object can be obtained with blocks 1124-1130. For example, the media object of block 1104 can be an image depicting the characteristics of a location (e.g., a map, a landmark, a flag, etc.). Alternatively, the media object can be an image depicting characteristics of an entity (e.g., a person, organism, thing, building, business, etc.). In these examples, the text at block 1110 can represent a request for information identifying the location or entity. For example, the text can be "Where is this place?" "What insect is this?" or "Which company uses this logo?" Based on the media object and the text, the user intent can be determined at block 1114 to include performing image recognition on the media object to obtain a recognition result and obtaining the identity of the location or entity represented in the media object. Based on the image recognition performed at block 1126, information associated with the media object can be obtained at block 1128. In these examples, the obtained information can include the identity of the location or entity represented in the media object. Further, the fifth message displayed at block 1130 can include the identity of the location or entity represented in the media object (e.g., "This is the country Algeria," "This is the Golden Gate Bridge," "This is an earwig," etc.).

Figure 11D:
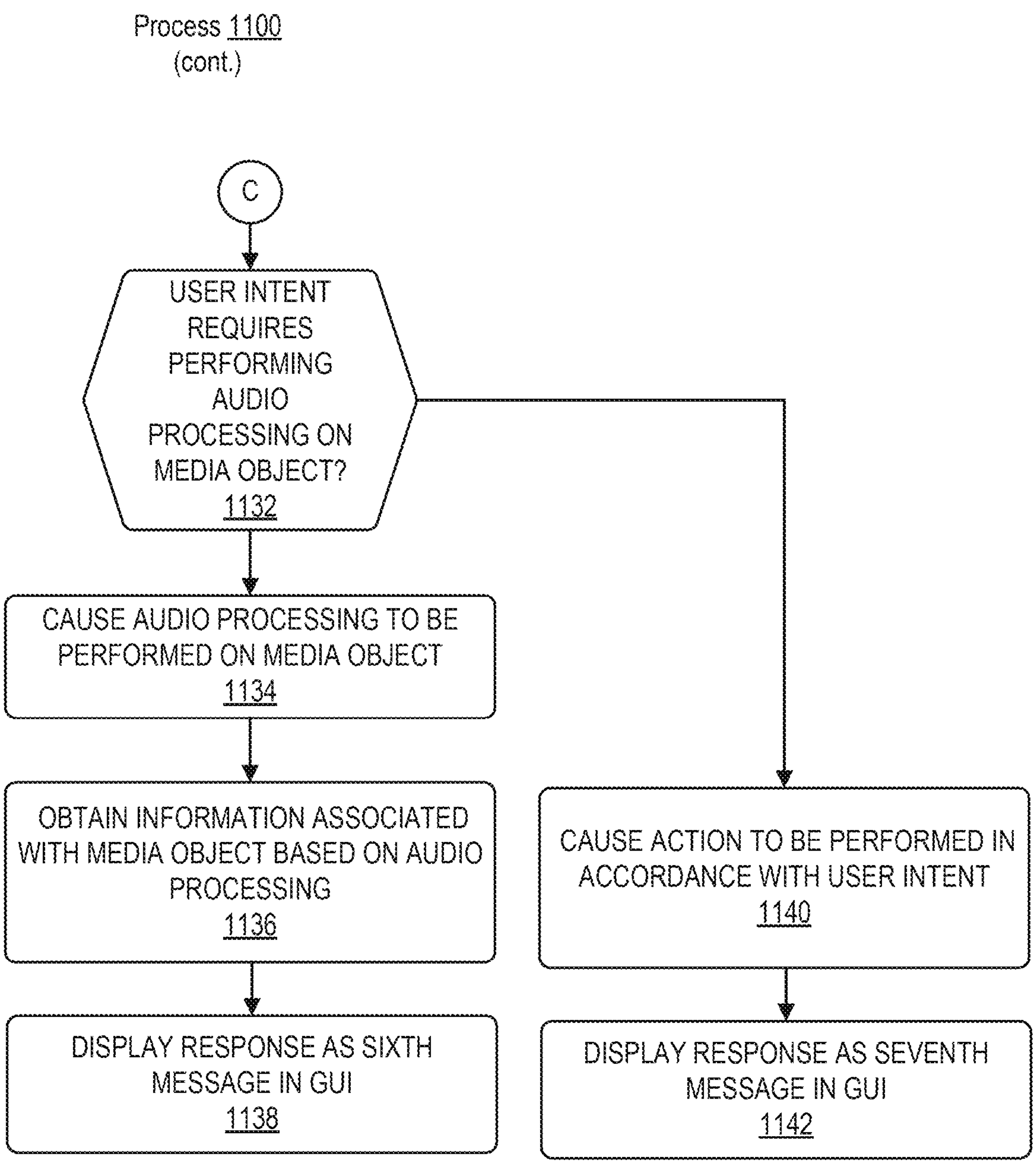

With reference back to block 1124, in response to obtaining a determination that the user intent does not require performing image recognition on the media object, block 1132 of FIG. 11D can be performed. At block 1132, a determination can be obtained as to whether the user intent requires performing audio processing on the media object. In some examples, the determination can be based on the user intent determined at block 1114 and the type of media object received at block 1104. For example, if the domain is determined to be the "search" domain or the "music" domain and the media object is determined to be an audio file, then it can be determined that the user intent requires performing image recognition on the media object. In response to obtaining a determination that the user intent requires performing audio processing on the media object, block 1134 can be performed.

Figure 12H:
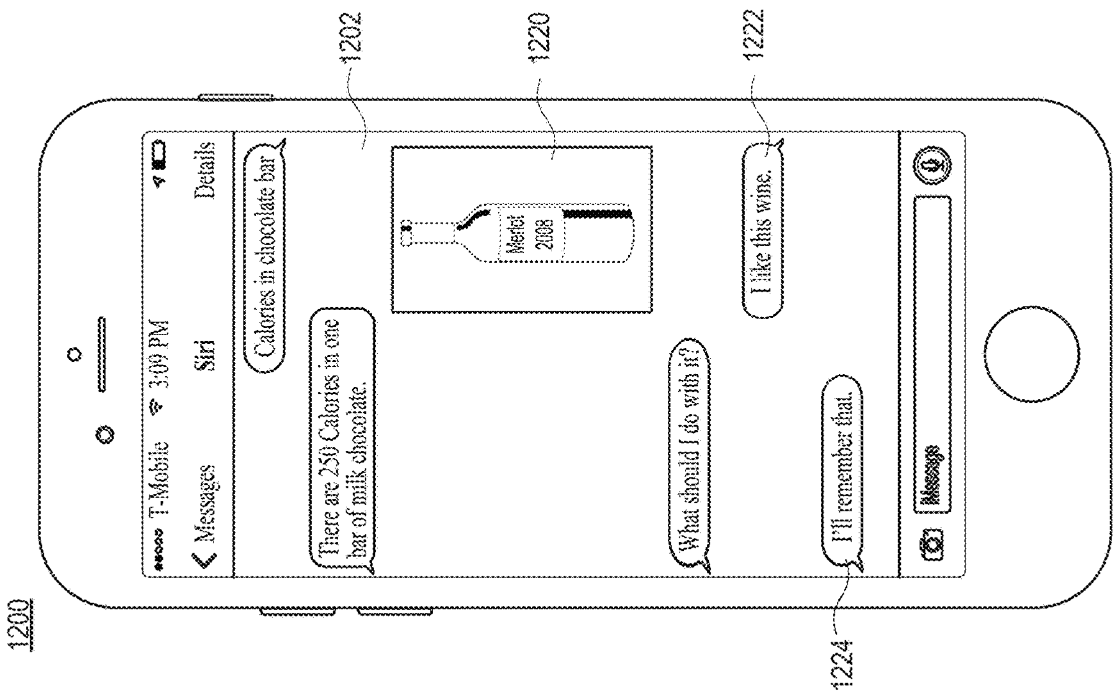
Figure 12G:
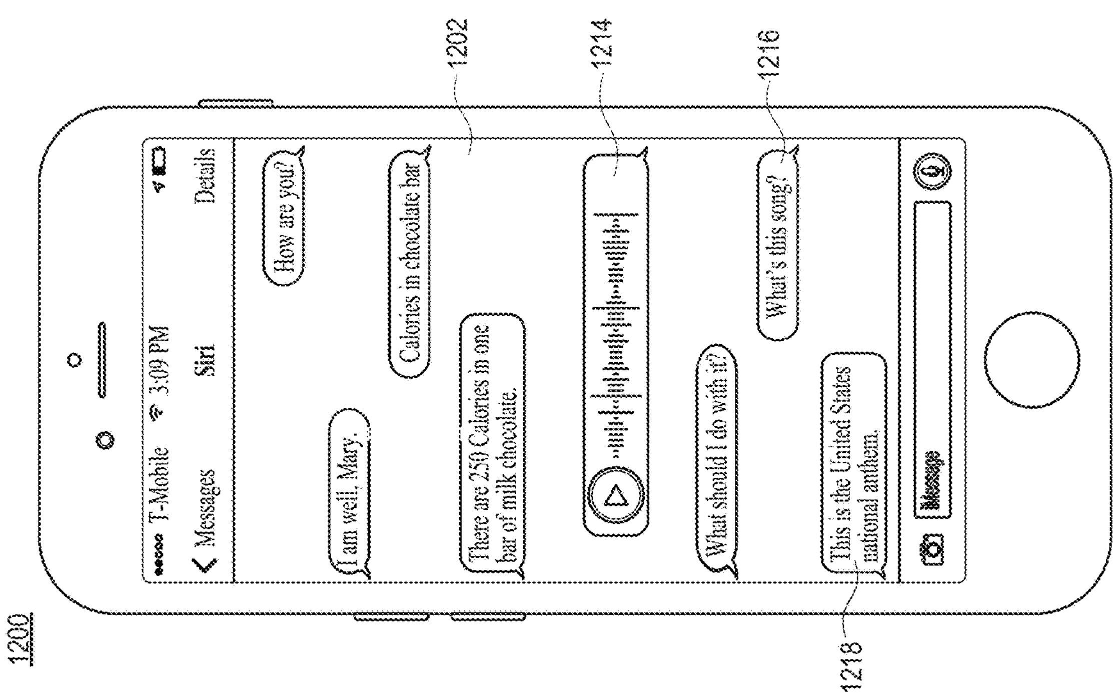
Figure 13A:
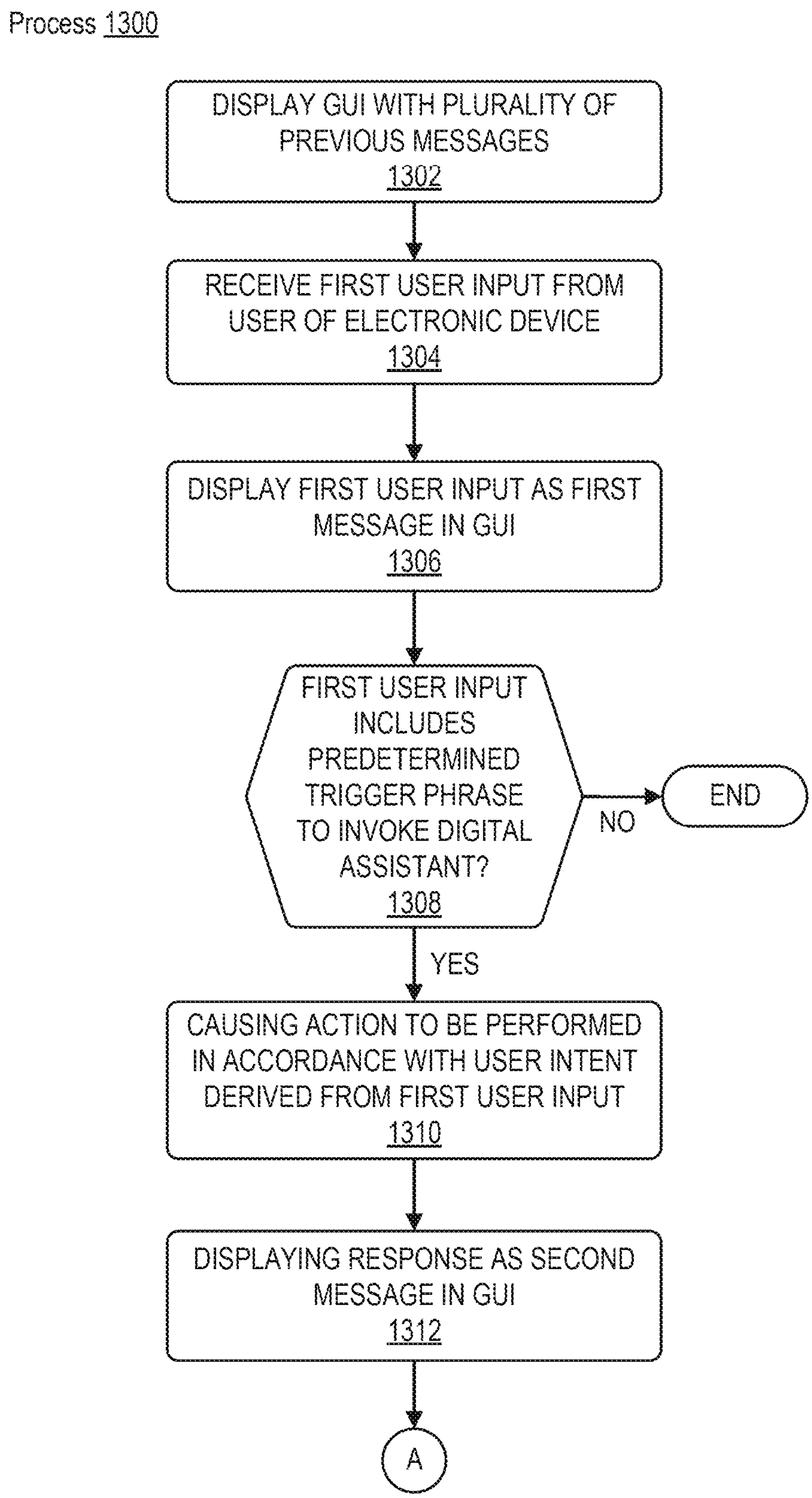
FIGS. 13A-C illustrate a process for operating a digital assistant in a messaging environment according to various examples.
Figure 13B:
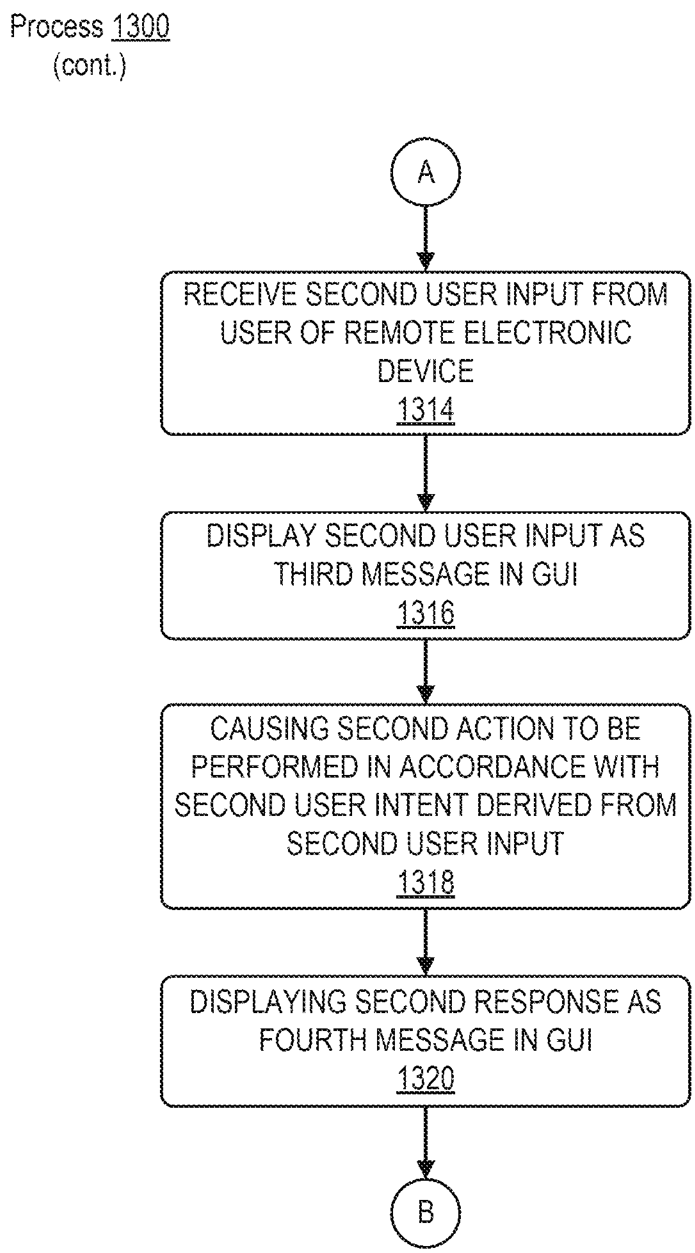
Figure 13C:
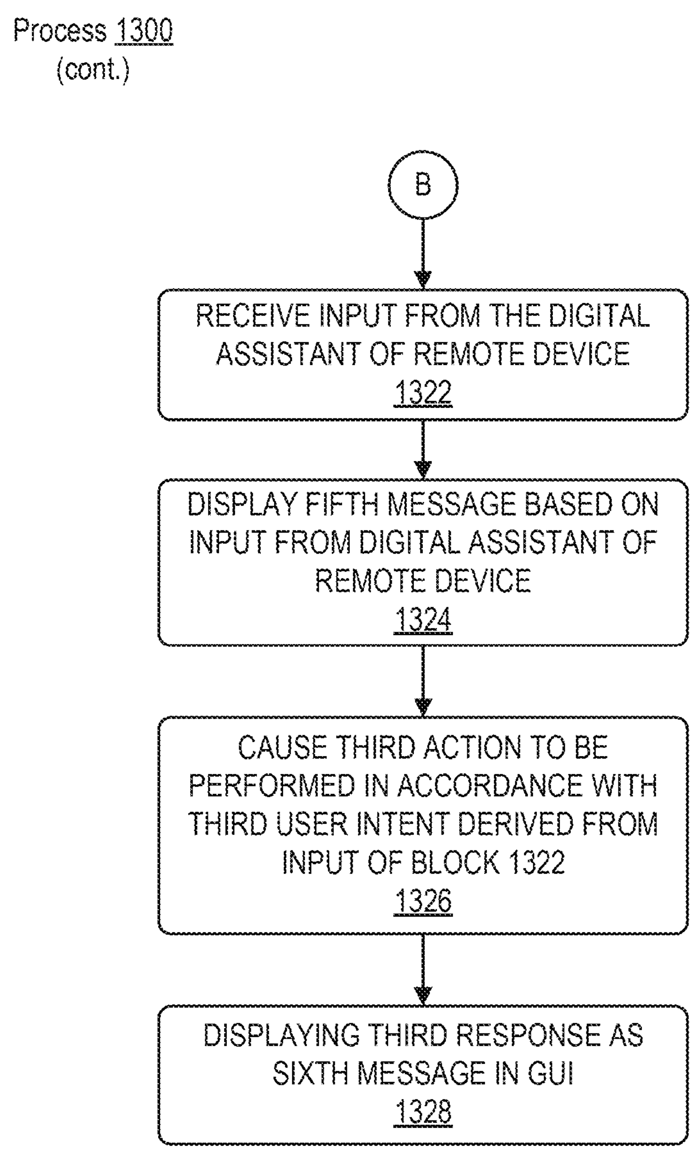

In the example illustrated in FIG. 12G, the media object displayed in message 1214 (e.g., at block 1106) can be an audio clip of a media item (e.g., a song, movie, soundtrack, etc.). In the present example, the audio clip can be a sung portion of the United States national anthem. The text of the second user input displayed in message 1216 (e.g., at block 1112) can be a request to perform a search based on the song corresponding to the audio clip (e.g., "What's this song?", "Who sang this?", "When was this song released?", etc.). Based on the audio clip and the text, it can be determined at block 1114 that the user intent includes performing audio recognition on the media item to identify the song in the audio clip. In this example, a determination can be obtained at block 1132 that the user intent requires performing audio processing (e.g., audio recognition) on the media object. In response to obtaining a determination that the user intent requires performing audio processing on the media object, block 1134 can be performed.

At block 1134, the electronic device can cause audio processing to be performed on the media object to be performed. In some examples, audio processing can include audio recognition (e.g., speaker recognition, music recognition, sound recognition, etc.). In some examples, the media object can be transmitted to a separate server to perform the audio recognition. In other examples, at least a portion of the audio recognition can be performed on the electronic device. Audio recognition can include extracting a sound print from the media object. The sound print can then be compared against a plurality of reference sound prints in a database to obtain a best matched reference sound print. Each reference sound print can be associated with reference information. The audio recognition results can be based on the reference information of the best matching reference sound print. In the present example, the best matched reference sound print can be associated with the United States national anthem. The audio recognition results can thus include reference information identifying the media object. For example, the reference information can include “Star Spangled Banner” or “United States national anthem.”

At block 1136, information associated with the media object can be obtained based on the audio processing of block 1134. In the present example, the obtained information can include the audio recognition results (e.g., United States national anthem). In other examples, information related to the audio recognition results can be obtained. For example, a search can be performed using the text information identifying the media object of block 1134 to obtain additional information to satisfy the user intent. In particular, additional information about the identified song, such as the artist, composer, release date, album name, album price, and the like, can be obtained.

At block 1138, a response based on the information associated with the media object can be displayed as a sixth message in the GUI. The response can be indicative of the user intent being satisfied. Block 1138 can be similar to block 1122. In the present example shown in FIG. 12G, the response can be displayed as message 1218 and can identify the song in the media object as being “the United States national anthem.” In some examples, the sixth message (e.g., message 1218) can be configured to be selectable by the user such that in response to detecting a user selection of the sixth message, the electronic device can cause additional information related to the media object (e.g., retail information) to be displayed. In particular, in response to detecting a user selection of the sixth message, a music search application (e.g., iTunes application) of the electronic device can be caused to search for media items (e.g., songs, albums, movies, games, etc.) corresponding to the identified media object and to displayed these media items for the user to browse or purchase.

It should be recognized that in some examples, the audio processing of block 1134 can include speech-to-text recognition. For example, speech-to-text recognition can be performed on speech in the media object to obtain text corresponding to the speech. In some examples, the information obtained at block 1136 can be based on the text corresponding to the speech in the media object. For example, a search can be performed using one or more words in the text corresponding to the speech in the media object in accordance with the user intent of block 1114. In other examples, the user may wish to store a transcription of the speech in the media object for future reference. In these examples, the text corresponding to the speech in the media object can be stored in association with an application (e.g., document manager application or a word processing application) of the electronic device in accordance with the user intent.

With reference back to block 1132, in response to obtaining a determination that the user intent does not require performing audio processing on the media object, block 1140 can be performed. At block 1140, the electronic device can cause an action to be performed in accordance with the user intent of block 1114. At block 1142, a response based on the action performed at block 1140 can be displayed as the seventh message in the GUI.

In some examples, process 1100 can be implemented to identify and store pertinent information for future retrieval. In these examples, the text of block 1110 can define an attribute related to the media object of block 1104. The attribute may not be explicitly indicated in the media object. For example, the media object can represent an entity and the attribute defined by the text of block 1110 can be a characteristic of the entity. In some examples, the attribute defined by the text of block 1110 can describe a relationship between the user and the contents of the media object. For example, as shown in FIG. 12H, the media object of block 1106 can be a picture of a bottle of wine (e.g., displayed as message 1220) and the text of block 1110 (e.g., displayed as message 1222) can define the user's opinion or preference for the wine (e.g., “I like this wine” or “This wine has vivid flavors of ground spice with hints of raspberry fruit and lemon zest”). In another example, the media object can be a picture of the parking space number at which the user parked his or her car and the text of block 1110 can indicate that the user parked at the location associated with the contents of the media object (e.g., “I parked here.”). In the examples described above, it can be determined that the user intent is to store data that associated the defined attribute to the media object for future retrieval. Based on this user intent, it can be determined at block 1132 that the user intent does not require performing audio processing on the media object. In response to obtaining a determination that the user intent does not require performing audio processing on the media object, the electronic device can cause an action to be performed at block 1140 in accordance with the user intent of block 1114.

In these examples, the action of block 1140 can include storing data associating the attribute defined in the text of block 1110 to the media object of block 1104. In particular, the data can indicate that the attribute is a characteristic of the media object. For instance, in the example shown in FIG. 12H, the picture of the wine bottle in message 1220 can be stored (e.g., on the electronic device or on a remote device) in connection with a first attribute indicating that the picture is that of a bottle of wine and a second attribute indicating that the user likes the wine depicted in the picture.

In some examples, the data and/or the media object can be stored in association with an application of the electronic device. For example, the media object of block 1104 can be a picture of a person and the text of block 1110 can define the name of the person (e.g., “This is John Woo.”) In this example, the picture of the person can be stored in association with the contacts application of the electronic device. If an existing contact entry is associated with the defined name, the picture can be auto-populated into the existing contact entry. If no existing contact entry is associated with the defined name, a new contact entry can be created. The picture and the defined name can then be auto-populated in the new contact entry. The contact entry thus associates the defined name with the picture.

In the present example shown in FIG. 12H, the response of block 1142 can be displayed as message 1224 and can confirm that the defined attribute is stored in association with the media object. Storing media items in association with user defined attributes can be desirable to help the user store and organize information deemed relevant to the user. For example, the user may ask the digital assistant to recommend a good wine in the future. The digital assistant can then refer back to the media object of message 1224 based on the stored attributes of "wine" and "like" associated with the media object and display the media object as a wine recommendation.

Figure 14B:
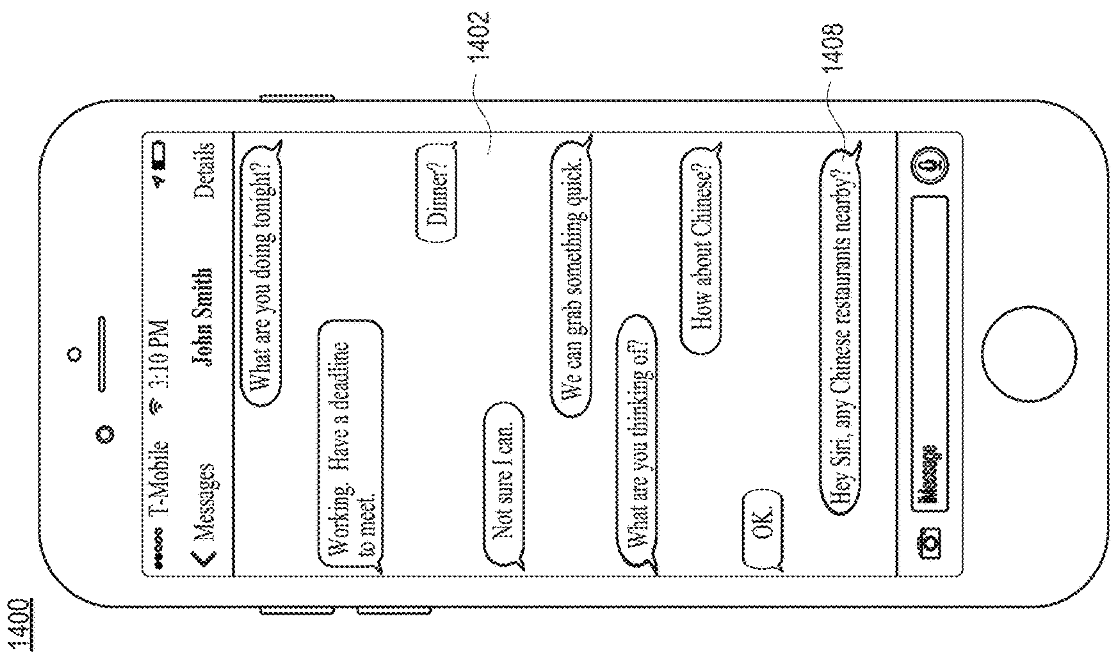
FIGS. 14A-I illustrate user interfaces of an electronic device for operating a digital assistant in a messaging environment according to various examples.
Figure 14A:
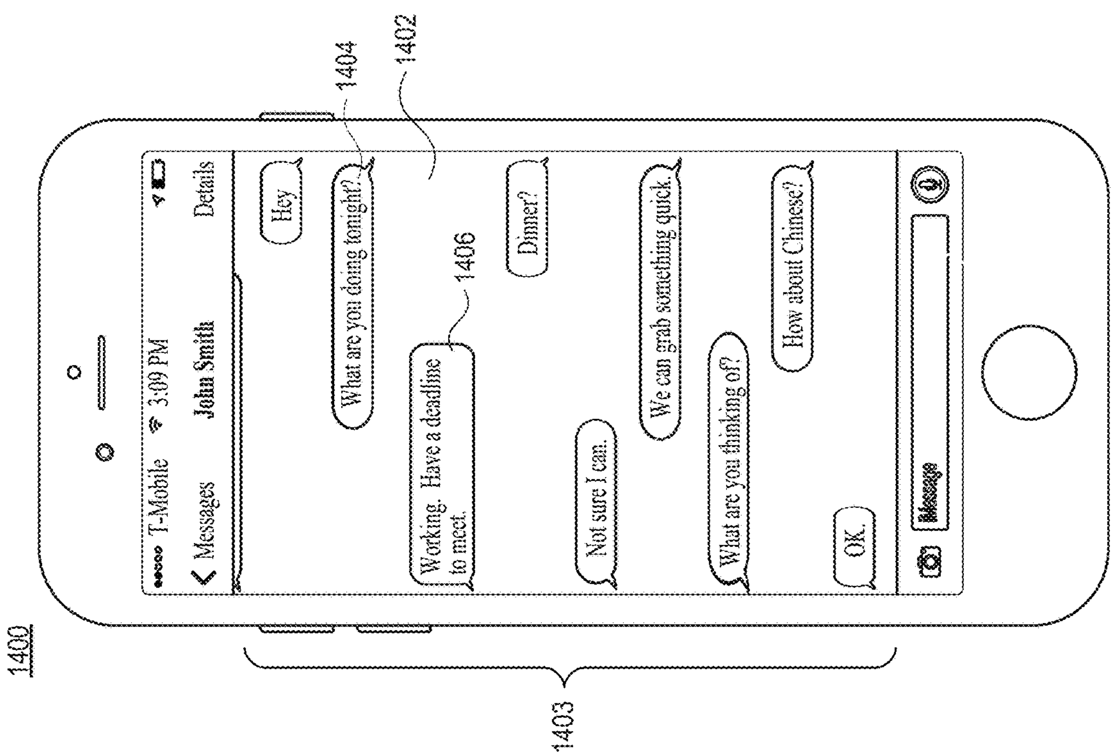

Process 1300 is described below with simultaneous reference to FIGS. 13A-C and 14A-I. At block 1302, a graphical user interface (GUI) having a plurality of previous messages between a user of the electronic device and a user of a remote device can be displayed on the display of an electronic device. For example, as shown in FIG. 14A, GUI 1402 of electronic device 1400 can be displayed. GUI 1402 can be a GUI of a messaging application of electronic device 1400. As shown, GUI 1402 can include plurality of previous messages 1403 between the user of electronic device 1400 and a user of a remote device (not shown). For example, previous message 1404 can be generated from user input via GUI 1402 of electronic device 1400 and addressed to the user of the remote device. Previous message 1406 can be sent from the remote device and addressed to the user of electronic device 1400 in response to previous message 1404. Plurality of previous messages 1403 are presented in a conversational view. Electronic device 1400 can be similar to one or more of devices 104, 200, 400, 600, 900, or 1100. Electronic device 1400 and the remote device can be different devices. Block 1302 can be similar to block 802 of process 800, except that the plurality of previous messages are between two users of different devices rather than between the user of the electronic device and the digital assistant implemented on the electronic device. In particular, similar to plurality of previous message 903 of block 802, plurality of previous message 1403 of block 1302 can each be associated with a previous contextual state of electronic device 1400 at the time the respective previous message was generated.

At block 1304, a first user input addressed to the digital assistant can be received. The first user input can be similar to the user input of block 806. In particular, the first user input can be received from the user of the electronic device. The first user input can represent a user request and can include text input and/or a media object. The first user input can be received via a user input interface (e.g., user input interface 910) of electronic device 1400. Text input of the first user input can be in natural language form. Further, in some examples, the first user input can include a predetermined trigger phrase associated with the digital assistant of electronic device 1400. The predetermined trigger phrase can indicate that the first user input is addressed to the digital assistant. In the present example shown in FIG. 14B, the first user input includes the text "Hey Siri, any Chinese restaurants nearby?" In this example, the predetermined trigger phrase can be "Hey Siri."

At block 1306, the first user input can be displayed as a first message in the GUI. For example, with reference to FIG. 14B, the first user input can be displayed as first message 1408 in GUI 1402. Block 1306 can be performed in response to receiving the first user input at block 1304. In some examples, the first user input and first message 1408 can be associated with a contextual state of electronic device 1400. The contextual state can be similar to the contextual state of block 810 and can include the state of the electronic device at the time first user input was received or at the time first message 1408 was generated. In some examples, the contextual state can be stored in association with first message 1408 in response to receiving the first user input at block 1304.

At block 1308, a determination can be made as to whether the first user input includes a predetermined trigger phrase to invoke the digital assistant. In some examples, the determination can be made by electronic device 1400. In other examples, the determination can be obtained from a remote server (e.g., DA server 106). Block 1308 can include parsing the first user input of first message 1408 to identify any word or sequence of words corresponding to a predetermined trigger phrase. In response to determining that the first user input includes a predetermined trigger phrase, the digital assistant can be invoked and first message 1408 can be processed but the digital assistant. In particular, block 1310 can be performed in response to determining that the first user input includes a predetermined trigger phrase. In response to determining that the first user input does not include a predetermined trigger phrase, the digital assistant is not invoked and no further action is taken by the electronic device.

It should be recognized that in some examples, the digital assistant may still be invoked without a predetermined trigger phrase in the first user input. In these examples, the messages of GUI 1402 can be continuously processed by the digital assistant to determine whether a message from the user is intended to be addressed to the digital assistant or whether any action associated with a message can be taken by the digital assistant to assist the user. In particular, natural language processing can be performed on the first user input to attempt to determine an actionable intent. If an actionable intent can be determined from the first user input, then block 1310 can be performed. If an actionable intent cannot be determined from the first user input, then no action would be taken by the digital assistant. In the present example, the actionable intent of searching for a Chinese restaurant can be determined from first message 1408 and thus block 1310 can be performed.

At block 1310, the electronic device can cause an action to be performed in accordance with a user intent derived from the first user input. Block 1310 can include causing the user intent (e.g., actionable intent) to be determined (e.g., using natural language processing module 732) based on the first user input of block 1304 and causing a task flow corresponding to the user intent to be generated (e.g., using task flow processing module 736). Block 1310 can further include causing the task flow to be executed to perform the action in accordance with the user input. In some examples, performing the action can at least partially satisfy the derived user intent. In particular, results that at least partially satisfy the derived user intent can be obtained by performing the action.

In some examples, receiving the user input at block 1304 (or displaying the first message at block 1306) can cause the electronic device to determine the user intent, generate the task flow, and the action. Alternatively, the electronic device can transmit a representation of the first user input to a digital assistant server (e.g., DA server 106) and cause the digital assistant server to determine the user intent, generate the task flow, and perform the action.

In some examples, the contextual state of the electronic device associated with first message 1408 can be utilized to determine the user intent and thus the response displayed at block 1312 can be based on the stored contextual state. For example, location information stored in association with first message 1408 can indicate that the electronic device was located near Union Square in San Francisco at the time the first user input was received. Based on this location information, it can be determined that "nearby" in the first user input refers to near Union Square in San Francisco. Thus, in this example, the user intent corresponding to the first user input can be determined to be a search for Chinese restaurants near Union Square in San Francisco. The action caused to be performed in accordance with this user intent can be obtaining search results for Chinese restaurants near Union Square in San Francisco.

Figure 14C:
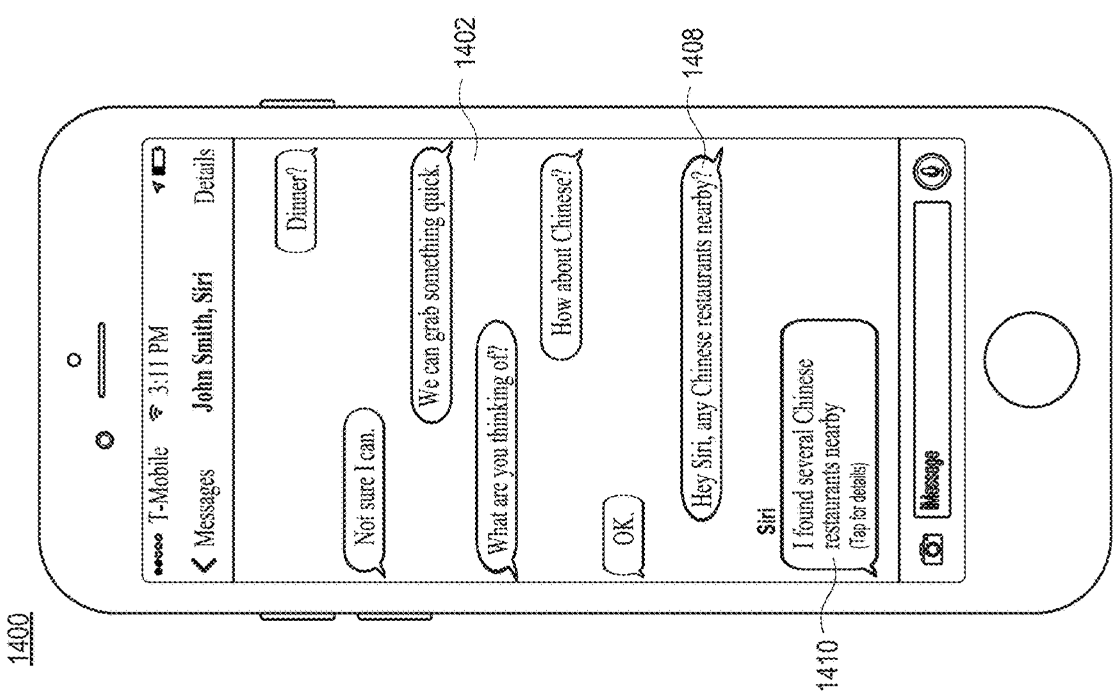

At block 1312, a response based on the action of block 1310 can be displayed as a second message in the GUI. For example, as shown in FIG. 14C, second message 1410 can be displayed in GUI 1402. Second message 1410 can include a response based on the search results obtained at block 1310. In particular, second message 1410 can include or provide access to the search results of Chinese restaurants located near Union Square in San Francisco. The response can be in natural language form and can at least partially satisfy the user request represented by the first user input of block 1304. In the present example, second message 1410 can be configured to provide additional details in accordance with the user input in response to a user selection of second message 1410. In particular, selection of second message 1410 by the user of electronic device 1400 can cause an application of electronic device 1400 to display detailed search results of Chinese restaurants near Union Square in San Francisco.

In some examples, block 1312 can further include transmitting the response (or causing the response to be transmitted) to the remote device and causing display of the response in a GUI of the remote device. Thus, electronic device 1400 can cause messages 1408 and 1410 to be displayed in the GUI of the remote device. Further message 1410 displayed in the GUI of the remote device can be configured to cause detailed search results to be displayed on the remote device in response to user selection of the message. In this way, the user of the remote device can view the conversation between the user of electronic device 1400 and the digital assistant of electronic device 1400. As described below, this will enable the user of the remote device to also participate in the conversation and thus benefit the assistance provided by the digital assistant of electronic device 1400. Blocks 1310 and 1312 can be performed automatically without additional human intervention in response to receiving the first user input of block 1304 (or in response to displaying the first user input as message 1408 at block 1306).

At block 1314, a second user input addressed to the digital assistant of electronic device 1400 can be received from the user of the remote device via the remote device. The second user input can include text input and/or a media object. In some examples, the second user input can be related to the first user input. In the present example shown in FIG. 14D, the second user input can include the text "How about just the cheap ones?"

Figure 14D:
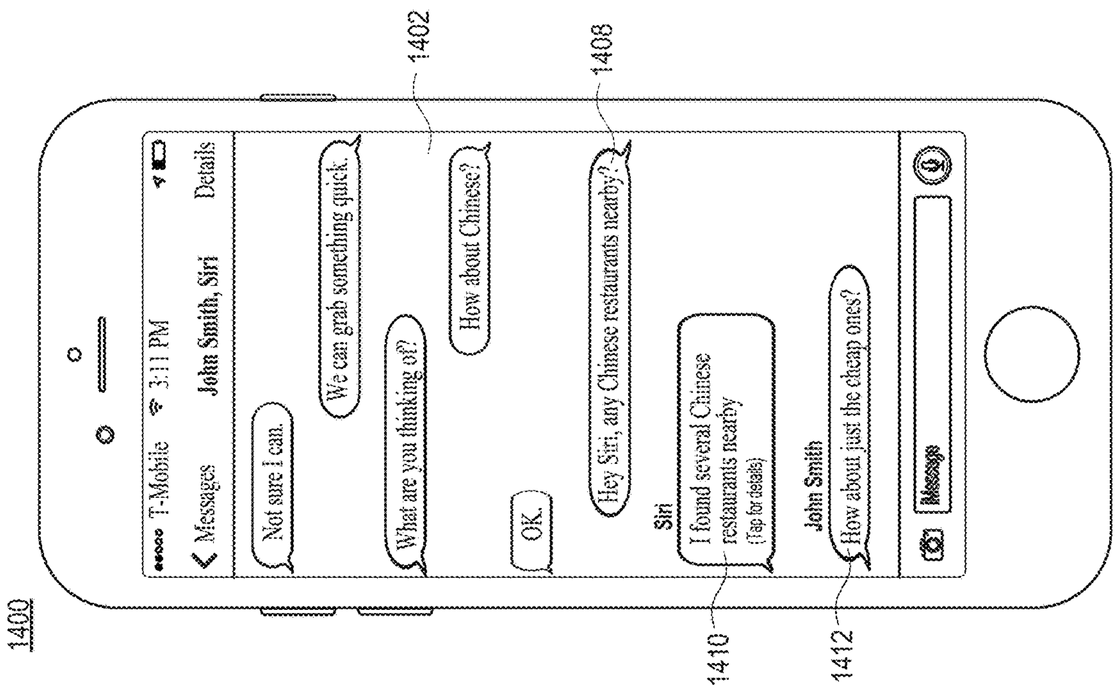
Figure 14F:
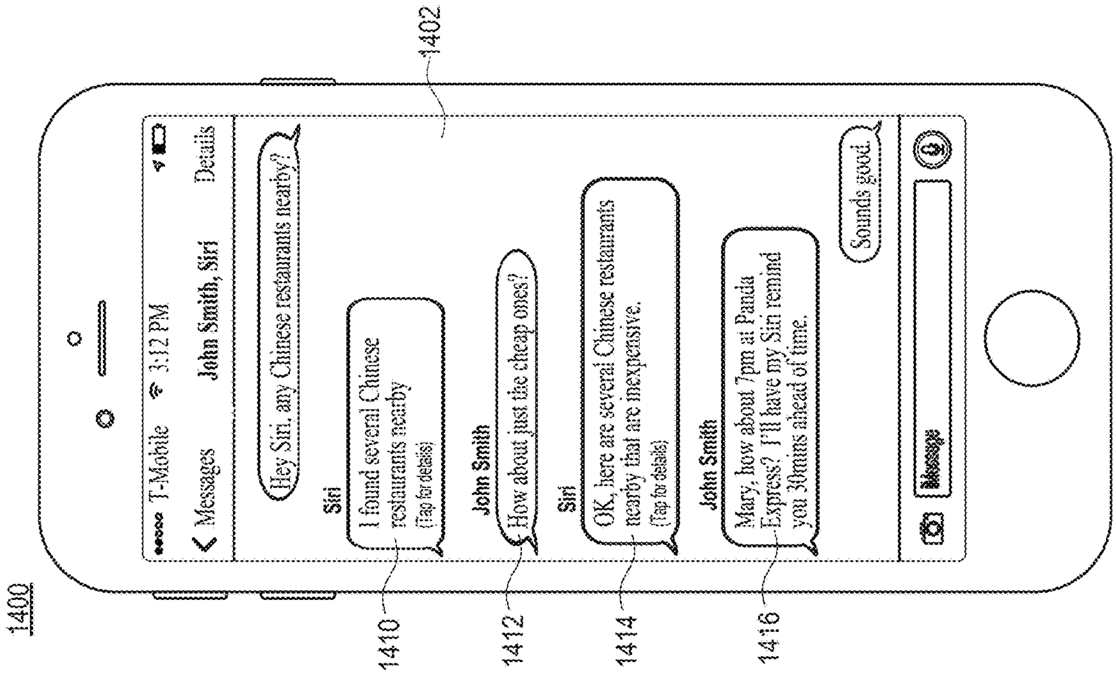

At block 1316, the second user input can be displayed as a third message in the GUI. For example, as shown in FIG. 14D, the second user input can be displayed as third message 1412 in GUI 1402. Block 1316 can be performed in response to receiving the second user input.

At block 1318, the electronic device can cause a second action to be performed in accordance with a second user intent derived from the second user input and the user intent of block 1310. Block 1318 can be similar to block 1310 except that the second user input is derived from both the second user input and the user intent of block 1308. In particular, the electronic device can cause the second user intent to be initially determined based on the second user input. In particular, a determination can be made as to whether the second user input is a request to refine the user intent of block 1308. The determination can be based on one or more predetermined words in the second user input. In the present example, it can be determined based on the word "just" in the second user input that the second user input is a request to refine the user intent of block 1308. Other predetermined words can include "only," "filter," "narrow," and the like. Additionally or alternatively, the determination of whether the second user input is a request to refine the user intent of block 1308 can be based on the domain corresponding to the second user input. For example, if the domain corresponding to the second user input is the same as the domain corresponding to the first user input, then the second user input can be determined to be a request to refine the user intent of block 1308.

In response to determining that the second user input is a request to refine the user intent of block 1308, the second user intent can be determined based on the second user input and the user intent of block 1308. In the present example, the second user intent can be determined to include obtaining search results for Chinese restaurants near Union Square that are rated the least expensive. The second action in accordance with the second user intent can thus be performing a search for Chinese restaurants that are rated the least expensive. It should be appreciated that in the present example, the first user intent and the second user intent can correspond to the same domain of an ontology (e.g., the "search restaurant" domain). Further, the second user intent can include a parameter (e.g., rated the least expensive) that is not included in the user intent of block 1310.

Figure 14E:
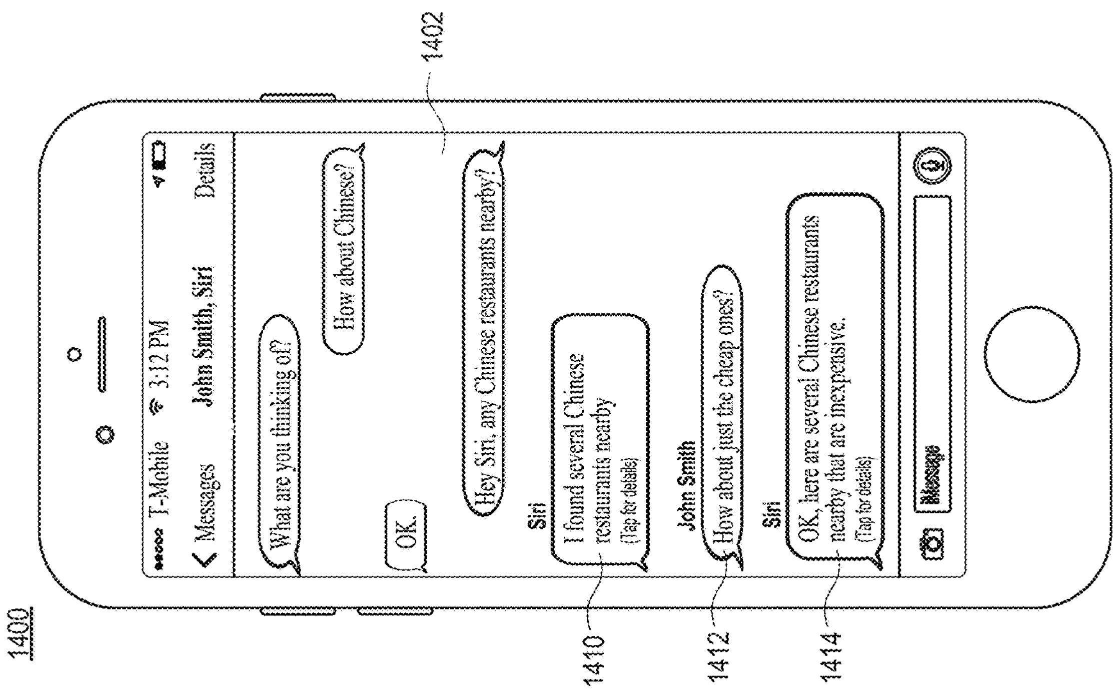

At block 1320, a second response based on the second action can be displayed as a fourth message in the GUI. In the present example as shown in FIG. 14E, message 1414 is displayed in GUI 1402. Message 1414 can include a second response based on the second action of block 1318. Block 1320 can be similar to block 1314. In this example, the second response can present search results of Chinese restaurants near Union Square in San Francisco that are rated least expensive.

In some examples, block 1320 can include transmitting the second response to the remote device and causing display of the second response in the GUI of the remote device. In this way, the results requested by the user of the remote device can be made accessible to the user of the remote device. The user of the remote device can thus become a participant of the conversation between the user of electronic device 1400 and the digital assistant of electronic device 1400.

In some examples, the digital assistant of the remote device can interact with the user of electronic device 1400 and/or with the digital assistant of the electronic device 1400 in the messaging environment. Blocks 1322-1328 of process 1300 and FIGS. 14F-I illustrate examples of such interactions. In the examples described below, the digital assistant of the remote device can be utilized to send the user of electronic device 1400 a reminder. In particular, as indicated in message 1416 of FIG. 14F, the user of the remote device can have the digital assistant of the remote device send a reminder to the user of electronic device 1400 thirty minutes prior to their 7:00 pm dinner appointment. Further, the user of the remote device can have the digital assistant of the remote device request that the user of electronic device 1400 call the user of the remote device upon arrival at the dinner location (e.g., Panda Express).

At block 1322, input from the digital assistant of the remote device can be received. The input can be generated automatically (e.g., in response to the time being 6:30 pm) by the digital assistant of the remote device and can include text input and/or a media object. In the present example shown in FIGS. 14G-H, the input can be received at 6:30 pm and can include text reminding the user of electronic device 1400 about the 7:00 pm dinner appointment at Panda Express. The input can further include text requesting the user of electronic device 1400 to call the user of the remote device upon arriving at the dinner venue (e.g., Panda Express). In response to receiving the input, block 1324 can be performed.

Figure 14G:
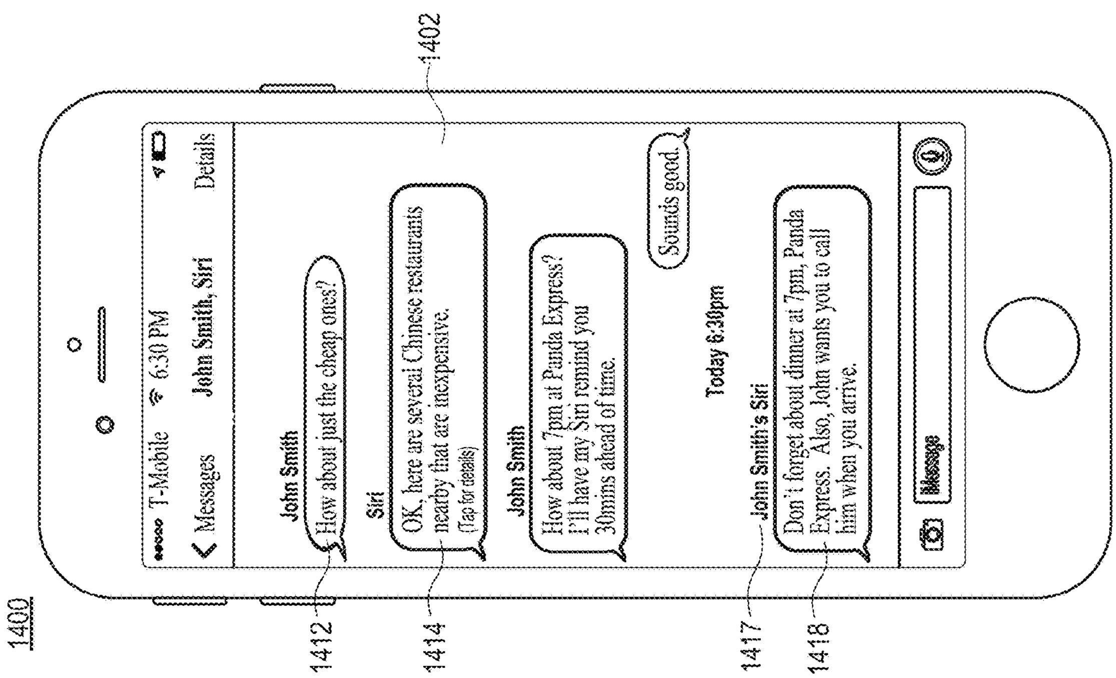

At block 1324, a fifth message based on the input of block 1322 can be displayed in the GUI. In some examples, the input from the digital assistant of the remote device can be directly displayed as the fifth message in the GUI. For example, as shown in FIG. 14G, fifth message 1418 displayed in GUI 1402 can include text of the input generated by the digital assistant of the remote device. Fifth message 1418 is thus directly addressed to the user of electronic device 1400 from the digital assistant of the remote device. Further, in some examples, indication 1417 that the content of fifth message 1418 was generated by the digital assistant of the remote device can be displayed. In this example, indication 1417 is text indicating that fifth message 1418 was created and sent by the digital assistant of the remote device.

Figure 14H:
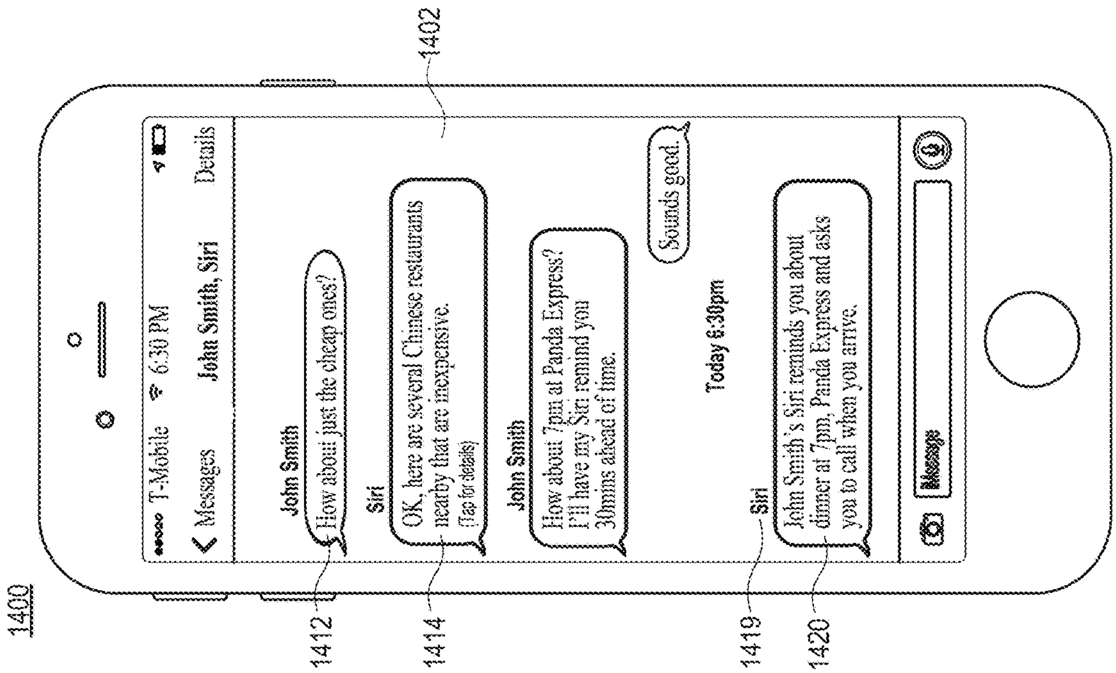

In other examples, the input of block 1322 can be processed by the digital assistant of electronic device 1400 and a representation of the input can be generated and displayed as the fifth message in the GUI. For example, as shown in FIG. 14H, fifth message 1420 displayed in GUI 1402 can convey the information represented by the input of block 1322. In particular, receiving the input from the digital assistant of the remote device at block 1322 can cause the digital assistant of electronic device 1400 to generate and display fifth message 1420. The content of fifth message 1420 can thus be generated by the digital assistant of electronic device 1400 based on the input of block 1322. The input of block 1322 is thus conveyed indirectly to the user of electronic device 1400 through the digital assistant of electronic device 1400. As shown in FIG. 14H, indication 1419 that the content of the fifth message was generated by the digital assistant of electronic device 1400 can be displayed. In this example, indication 1419 is text indicating that fifth message 1420 was created and displayed by the digital assistant of electronic device 1400. Although conveying the input of block 1322 indirectly to the user of electronic device 1400 through the digital assistant of electronic device 1400 can require additional processing by electronic device 1400, it can improve user experience by reducing the number of participants in the conversation and thus reducing confusion.

In some examples, the input of block 1322 can cause the digital assistant of electronic device 1400 to perform an action. At block 1326, in response to receiving the input of block 1322, the electronic device can cause a third action to be performed in accordance with a third user intent derived from the input of block 1322. Block 1326 can be similar to block 1310. Block 1326 can include causing the third user intent corresponding to the input of block 1322 to be determined using natural language processing. More specifically, a determination can be made as to whether the input of block 1322 corresponds to an actionable intent. In the present example, the input of block 1322 can be determined to correspond to the actionable intent of creating a reminder. Specifically, the third user intent can include creating a reminder to call John Smith upon arriving at the location corresponding to Panda Express. Block 1326 can further include causing a third task flow corresponding to the third user intent to be generated and causing the task flow to be executed to perform the third action. In the present example, the third action can include creating a reminder to call John Smith upon arriving at location corresponding to Panda Express. The created reminder can be configured to cause a notification to be displayed on electronic device 1400 in response to detecting that electronic device 1400 is located within a predetermined distance of the location corresponding to Panda Express.

Figure 14I:
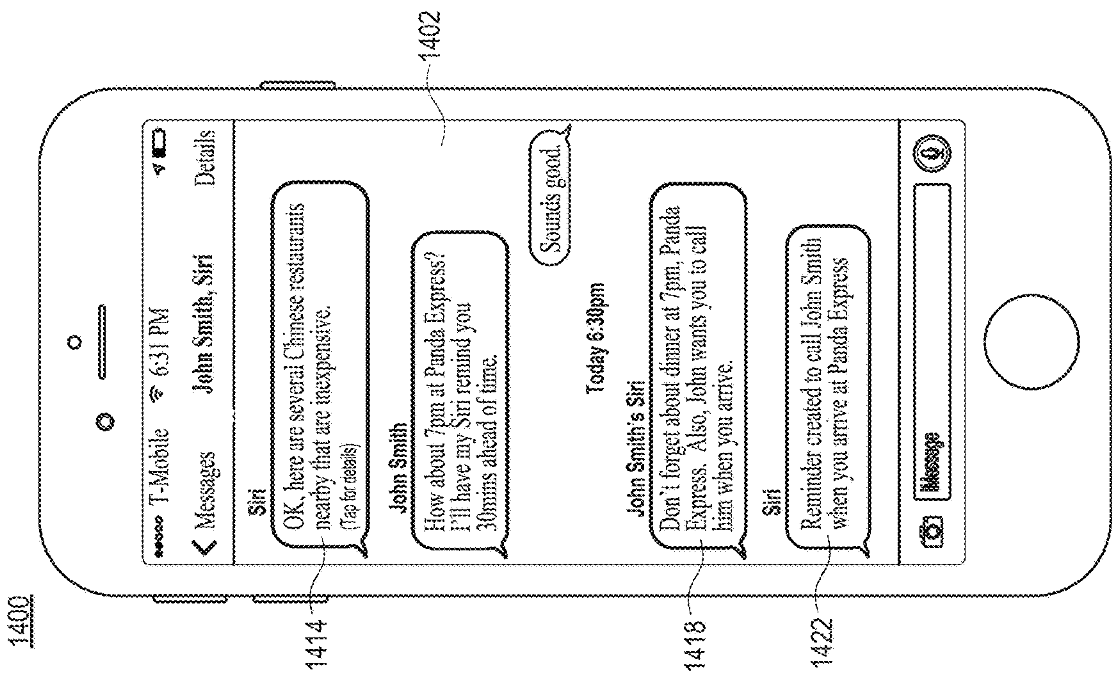

At block 1328, a third response based on the third action can be displayed as a sixth message in the GUI. For example, as shown in FIG. 14I, sixth message 1422 can be displayed in GUI 1402. Sixth message 1422 can include a third responses confirming that the reminder has been created. Sixth message 1422 can be generated and displayed by the digital assistant of electronic device 1400. In other examples, sixth message 1422 can include information obtained from performing the third action at block 1326.

Although in the examples described above, the digital assistant of the electronic device is a participant in the conversation between the users of only two electronic devices, it should be recognized that in other examples, the conversation can include the users of any number of electronic devices. Further, the digital assistants of any one of the participating electronic devices can participate in the conversation. Moreover, it should be recognized that the aspects of operating a digital assistant in a messaging environment in processes 800 and 1100 can be applied during the multi-participant conversations between the users of different devices.

5. Electronic Devices

Figure 15:
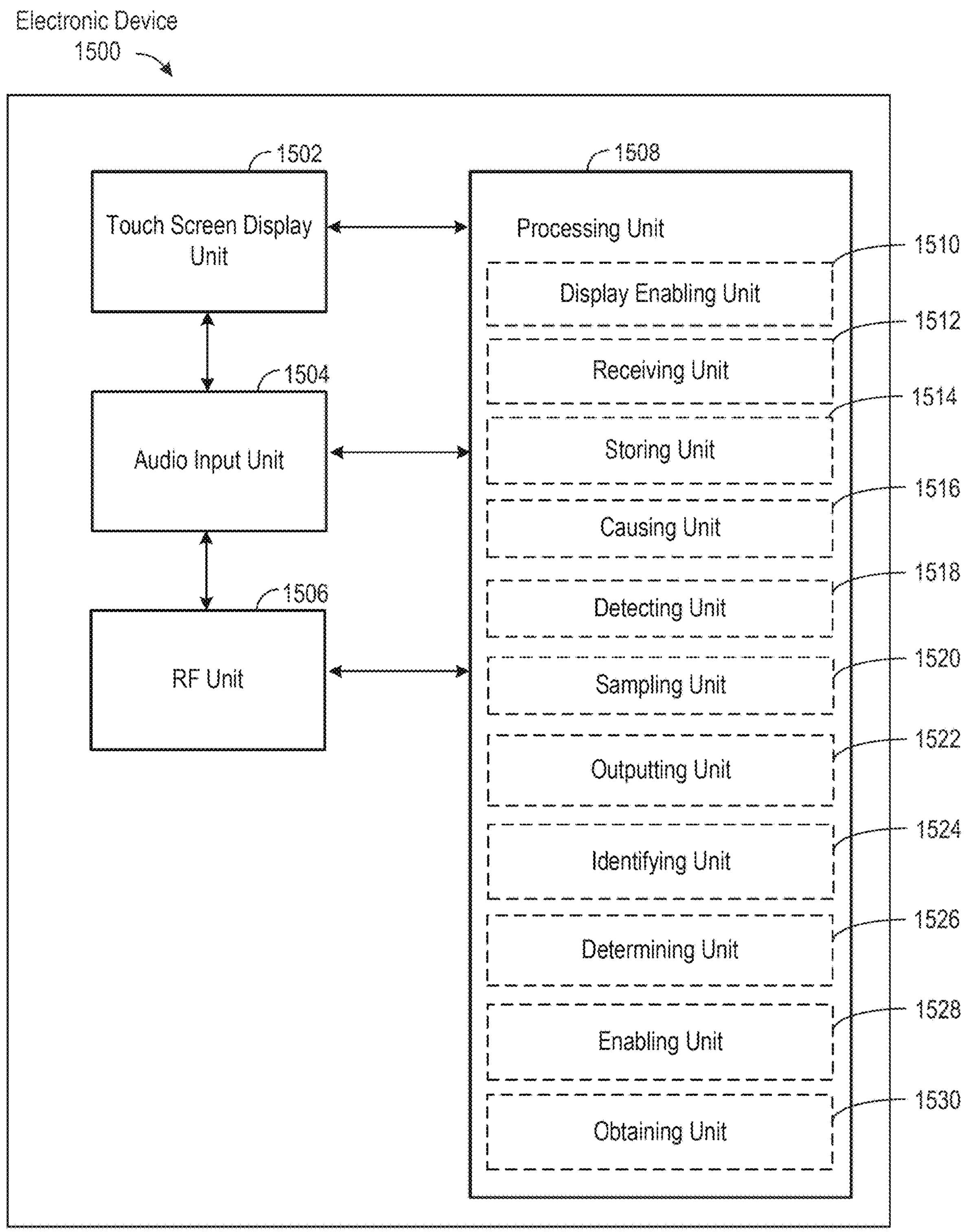
FIG. 15 illustrates a functional block diagram of an electronic device according to various examples.

FIG. 15 shows a functional block diagram of electronic device 1500 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 15 can be optionally combined or separated into sub-blocks to implement the principles of the various described examples. Therefore, the description herein optionally supports any possible combination, separation, or further definition of the functional blocks described herein.

As shown in FIG. 15, electronic device 1500 can include touch screen display unit 1502 configured to display a graphical user interface and to receive input from the user, audio input unit 1504 configured to receive audio input (e.g., speech input), and optionally, RF unit 1506 configured to transmit and receive information. Electronic device 1500 can further include processing unit 1508 coupled to touch screen display unit 1502, audio input unit 1504, and RF unit 1506. In some examples, processing unit 1508 can include display enabling unit 1510, receiving unit 1512, storing unit 1514, causing unit 1516, detecting unit 1518, sampling unit 1520, outputting unit 1522, identifying unit 1524, determining unit 1526, enabling unit 1528, and obtaining unit 1530.

In accordance with some embodiments, processing unit 1508 is configured to display (e.g., with display enabling unit 1510) on touch screen display unit 1502, a graphical user interface (GUI) having a plurality of previous messages between a user of the electronic device and the digital assistant. The plurality of previous messages is presented in a conversational view. Processing unit 1508 is further configured to receive (e.g., with receiving unit 1512) user input via touch screen display unit 1502. Processing unit 1508 is further configured to, in response to receiving the user input, display (e.g., with display enabling unit 1510 and on touch screen display unit 1510) the user input as a first message in the GUI. Processing unit 1508 is further configured to store (e.g., with storing unit 1514) a contextual state of the electronic device corresponding to the displayed user input. Processing unit 1508 is further configured to cause (e.g., with causing unit 1516) an action to be performed in accordance with a user intent derived from the user input. Processing unit 1508 is further configured to display (e.g., with display enabling unit 1510 and on touch screen display unit 1502) a response as a second message in the GUI, the response based on the action.

In some examples, each of the plurality of previous messages are associated with a previous contextual state of the electronic device.

In some examples, processing unit 1508 is further configured to prior to displaying the user input, detect (e.g., with detecting unit 1518) a user selection of a first previous message of the plurality of previous messages, where the first previous message is associated with a first previous contextual state of the electronic device. Causing the action to be performed can further comprises obtaining results using the first previous contextual state of the electronic device, where the results are based on the user intent.

In some examples, processing unit 1508 is further configured to, prior to receiving the user input, detect (e.g., with detecting unit 1518) a second user input. In some examples, processing unit 1508 is further configured to, in response to detecting the second user input, sample (e.g., with sampling unit 1520) audio data (e.g., via audio input unit 1504). The audio data contains a user utterance. Processing unit 1508 is further configured to cause (e.g., with causing unit 1516) a second action to be performed in accordance with a second user intent derived from the user utterance. Processing unit 1508 is further configured to output (e.g., with outputting unit 1522) a second response based on the second action, where a second previous message of the plurality of previous messages includes a text representation of the user utterance, and where a third previous message of the plurality of previous messages is based on the second response.

In some examples, processing unit 1508 is further configured to receive (e.g., with receiving unit 1512 and via touch screen display unit) a third user input associated with a fourth previous message of the plurality of previous messages. Processing unit 1508 is further configured to, in response to receiving the third user input, store (e.g., with storing unit 1514) a bookmark of the fourth previous message in association with an affordance. Processing unit 1508 is further configured to display (e.g., with display enabling unit 1510 and on touch screen display unit 1502) the affordance on the GUI, where selecting the affordance causes a focus of the GUI to change to the fourth previous message.

In some examples, processing unit 1508 is further configured to, in response to displaying the user input as a first message in the GUI of the electronic device, cause (e.g., with causing unit 1516) display of the first message in a GUI of a second electronic device. Processing unit 1508 is further configured to, in response to displaying the response as a second message in the GUI of the electronic device, cause (e.g., with causing unit 1516) display of the second message in the GUI of the second electronic device.

In some examples, processing unit 1508 is further configured to detect (e.g., with detecting unit 1518) a user selection of the first message in the GUI. The first message is generated from user input received at a separate electronic device. The first message is associated with a contextual state of the separate electronic device. Processing unit 1508 is further configured to receive (e.g., with receiving unit 1512 and via touch screen display unit 1502) a fourth user input. Processing unit 1508 is further configured to, in response to receiving the fourth user input, display (e.g., with display enabling unit 1510 and on touch screen display unit 1502) the fourth user input as a third message in the GUI. Processing unit 1508 is further configured to cause (e.g., with causing unit 1516) a third action to be performed in accordance with a third user intent, the third user intent derived from the fourth user input and the contextual state of the separate electronic device. Processing unit 1508 is further configured to display (e.g., with display enabling unit 1510 and on touch screen display unit 1502) a third response as a fourth message, the third response based on the third action.

In some examples, processing unit 1508 is further configured to identify (e.g., with identifying unit 1524), based on the contextual state of the electronic device and the derived user intent, one or more words in the displayed response corresponding to an entity. Processing unit 1508 is further configured to determine (e.g., with determining unit 1526) an action associated with the entity. Processing unit 1508 is further configured to enable (e.g., with enabling unit 1528) selection of one or more words in the displayed response, where detecting a user selection of the one or more words causes the action associated with the entity to be performed.

In some examples, the GUI of the electronic device includes a text input field. In these examples, processing unit 1508 is further configured to detect (e.g., with detecting unit 1518) a fifth user input associated with a first previous message of the plurality of previous messages. Processing unit 1508 is further configured to, in response to detecting the fifth user input, display (e.g., with display enabling unit 1510 and on touch screen display unit 1502) text of the first previous message in the text input field of the GUI.

In some examples, processing unit 1508 is further configured to receive (e.g., with receiving unit 1512 and using touch screen display unit 1502), via the GUI of the electronic device, a user selection of the second message. Processing unit 1508 is further configured to, in response to receiving the user selection of the second message, obtain (e.g., with obtaining unit 1530), using an application of the electronic device, detailed results based on the user intent. Processing unit 1508 is further configured to display (e.g., with display enabling unit 1510 and on touch screen display unit 1502) the detailed result in a GUI of the application.

In some examples, displaying the response as the second message includes displaying an indication in the second message that a more detailed response is available in response to selecting the second message. In some examples, the second message includes only text.

In some examples, processing unit 1508 is further configured to, display (e.g., with display enabling unit 1510 and on touch screen display unit 1502), based on the user intent, a media object in the GUI of the electronic device, the media object associated with an application of the electronic device.

In some examples, processing unit 1508 is further configured to detect (e.g., with detecting unit 1518) a user selection of the media object. In response to detecting the user selection of the media object, processing unit 1508 is further configured to obtain (e.g., with obtaining unit 1530), using an application of the electronic device, expanded results corresponding to the media object. Processing unit 1508 is further configured to display (e.g., with display enabling unit 1510 and on touch screen display unit 1502) the expanded results in a GUI of the application.

In some examples, processing unit 1508 is further configured to receive (e.g., with receiving unit 1512 and via touch screen display unit 1502) a notification from an application of the electronic device. Processing unit 1508 is further configured to, in response to receiving the notification, display (e.g., with display enabling unit 1510 and on touch screen display unit 1502) the notification as a fifth message in the GUI.

In some examples, the GUI of the electronic device includes a user input interface, where the displayed response includes a request for additional information. In these examples, processing unit 1508 is further configured to display (e.g., with display enabling unit 1510 and on touch screen display unit 1502) two or more suggested character strings in the user input interface, each of the two or more suggested character string responsive to the request for additional information. Processing unit 1508 is further configured to detect (e.g., with detecting unit 1518) a user selection of a suggested character string of the two or more suggested character strings. Processing unit 1508 is further configured to, in response to detecting a user selection of a suggested character string, display (e.g., with display enabling unit 1510 and on touch screen display unit 1502) the selected suggested character string as a sixth message in the GUI of the electronic device. Processing unit 1508 is further configured to display (e.g., with display enabling unit 1510 and on touch screen display unit 1502) a fourth response as a seventh message in the GUI of the electronic device, the fourth response based on the selected suggested character strings.

In some examples, the user input includes an ambiguous term. The displayed response includes a displayed request for additional information related to the ambiguous term. The displayed request for additional information includes a list of possible interpretations for the ambiguous term.

In some examples, processing unit 1508 is further configured to receive (e.g., with receiving unit 1512) a sixth user input indicating a selection of one of the list of possible interpretations. Processing unit 1508 is further configured to, in response to receiving the sixth user input, display (e.g., with display enabling unit 1510 and on touch screen display unit 1502) the sixth user input as an eighth message in the GUI. Processing unit 1508 is further configured to cause (e.g., with causing unit 1516) a sixth action to be performed in accordance with a user intent derived from the sixth user input. Processing unit 1508 is further configured to display (e.g., with display enabling unit 1510 and on touch screen display unit 1502) a sixth response as a ninth message in the GUI, the sixth response based on the sixth action.

In some examples, the contextual state includes a time the user input is received and data defining the location of the electronic device at the time the user input is received.

In some examples, the GUI of the electronic device is a GUI of a messaging application of the electronic device, the messaging application configured to send and receive messages from one or more recipients. In some examples, the plurality of previous messages are displayed in chronological order. In some examples, the first message and the second message are justified on opposite sides of the GUI. In some examples, the second message is displayed without providing any audio output.

In some examples, causing the action to be performed and displaying the response are performed automatically in response to receiving the user input and without additional human intervention.

In some examples, processing unit 1508 is further configured to cause (e.g., with causing unit 1516) the user intent to be determined based on the user input. Processing unit 1508 is further configured to cause (e.g., with causing unit 1516) a task flow to be determined based on the user intent. Processing unit 1508 is further configured to cause (e.g., with causing unit 1516) the task flow to executed to obtain results, where the displayed response is based on the obtained results.

The operations described above with reference to FIG. 8 can be optionally implemented by components depicted in FIGS. 1-4, 6A-B, and 7A. For example, the operations of process 800 may be implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes can be implemented based on the components depicted in FIGS. 1-4, 6A-B, and 7A.

Figure 16:
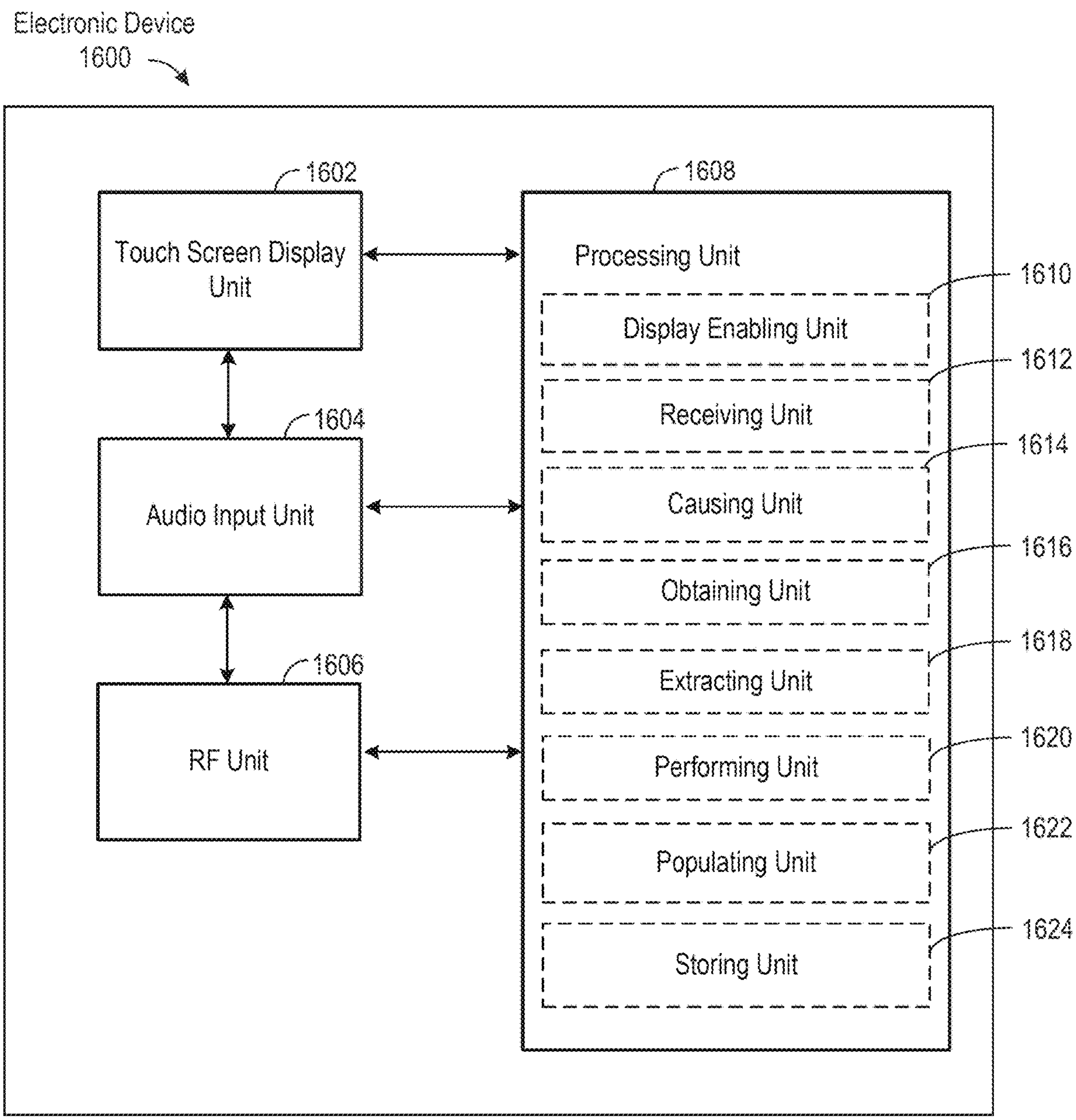
FIG. 16 illustrates a functional block diagram of an electronic device according to various examples.

FIG. 16 shows a functional block diagram of electronic device 1600 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 16 can be optionally combined or separated into sub-blocks to implement the principles of the various described examples. Therefore, the description herein optionally supports any possible combination, separation, or further definition of the functional blocks described herein.

As shown in FIG. 16, electronic device 1600 can include touch screen display unit 1602 configured to display a graphical user interface and to receive input from the user, audio input unit 1604 configured to receive audio input (e.g., speech input), and optionally, RF unit 1606 configured to transmit and receive information. Electronic device 1600 can further include processing unit 1608 coupled to touch screen display unit 1602, audio input unit 1604, and RF unit 1606. In some examples, processing unit 1608 can include display enabling unit 1610, receiving unit 1612, causing unit 1614, obtaining unit 1616, extracting unit 1618, performing unit 1620, populating unit 1622, and storing unit 1624.

In accordance with some embodiments, processing unit 1608 is configured to displayed (e.g., with display enabling unit 1610), on the display unit 1602, a graphical user interface (GUI) having a plurality of previous messages between a user and the digital assistant, the plurality of previous messages presented in a conversational view. Processing unit 1608 is further configured to receive (e.g., with receiving unit 1612) a first user input including a media object. Processing unit 1608 is further configured to, in response to receiving the first user input, display (e.g., with display enabling unit 1610 and on display unit 1602) the media object as a first message in the GUI. Processing unit 1608 is further configured to receive (e.g., with receiving unit 1612) a second user input including text. Processing unit 1608 is further configured to, in response to receiving the second user input, display (e.g., with display enabling unit 1610 and on display unit 1602) the text as a second message in the GUI. Processing unit 1608 is further configured to cause (e.g., with causing unit 1614) a user intent corresponding to the first user input and the second user input to be determined. Processing unit 1608 is further configured to obtain (e.g., with obtaining unit 1616) a determination of whether the user intent requires extracting text from the media object. Processing unit 1608 is further configured to, in response to obtaining a determination that the user intent requires extracting text from the media object: extract (e.g., with extracting unit 1618) text from the media object, perform (e.g., with performing unit 1620) a task in accordance with the user intent using the extracted text, and display (e.g., with display enabling unit 1610 and on display unit 1602), as a third message in the GUI, a response indicative of the user intent being satisfied.

In some examples, processing unit 1608 is further configured to, in accordance with the user intent, populate (e.g., with populating unit 1622) the extracted text into a text field of an application of the electronic device.

In some examples, the user intent comprises creating, using the media object, a contact entry in a contacts application of the electronic device. In these examples, the media object is an image depicting contact information of an entity, the extracted text includes the contact information, and performing the task in accordance with the user intent further comprises populating a text field of the contact entry with the extracted text, the contact entry associated with the entity.

In some examples, the user intent comprises creating, using the media object, a calendar entry in a calendar application of the electronic device. In these examples, the media object is an image depicting event information, the extracted text includes the event information, and performing the task in accordance with the user intent further comprises populating a text field of the calendar entry with the extracted text.

In some examples, the user intent comprises creating, using the media object, a reminder entry in a reminder application of the electronic device. In these examples, the media object is an image depicting a reminder task, the extracted text includes the reminder task, and performing the task in accordance with the user intent further comprises populating a text field of the reminder entry with the extracted text.

In some examples, the user intent comprises translating text of a first language in the media object to text of a second language. In these examples, the media object is an image depicting the text of the first language, the extracted text includes the text of the first language, performing the task in accordance with the user intent further comprises obtaining the text of the second language corresponding to the text of the first language, and the displayed response includes the text of the second language.

In some examples, processing unit 1608 is further configured to, in response to obtaining a determination that the user intent does not require extracting text from the media object, obtain (e.g., with obtaining unit 1616) a determination of whether the user intent requires performing image recognition on the media object. Processing unit 1608 is further configured to, in response to obtaining a determination that the user intent requires performing image recognition on the media object: cause (e.g., with causing unit 1614) image recognition on the media object to be performed, obtain (e.g., with obtaining unit 1616), based on the image recognition, information associated with the media object, and display (e.g., with display enabling unit 1610 and on display unit 1602), as a fourth message in the GUI, a response indicative of the user intent being satisfied. The response is based on the information associated with the media object.

In some examples, the media object depicts a retail object, and the information associated with the media object includes price information of the retail object. In some examples, the media object depicts a location, and the information associated with the media object includes the identity of the location. In some examples, the media object depicts an entity, and the information associated with the media object includes the identity of the entity.

In some examples, processing unit 1608 is further configured to in response to obtaining a determination that the user intent does not require performing image recognition on the media object, obtain (e.g., with obtaining unit 1616) a determination of whether the user intent requires performing audio processing on the media object. Processing unit 1608 is further configured to, in response to obtaining a determination that the user intent requires performing audio processing on the media object: cause (e.g., with causing unit 1614) audio processing on the media object to be performed, obtain (e.g., with obtaining unit 1616), based on the audio processing, information associated with the media object, and display (e.g., with displaying enabling unit 1610 and on display unit 1602), as a fifth message in the GUI, a response indicative of the user intent being satisfied. The response is based on the information associated with the media object.

In some examples, causing audio processing on the media object to be performed further comprises causing speech-to-text recognition to be performed on the media object to obtain text corresponding to speech in the media object. In some examples, the information is obtained using the text corresponding to the speech in the media object. In some examples, the text corresponding to the speech in the media object is stored in association with an application of the electronic device in accordance with the user intent.

In some examples, causing audio processing on the media object to be performed further comprises causing audio recognition to be performed using the media object to obtain text identifying the media object. In some examples, the information is obtained using the text identifying the media object. In some examples, processing unit 1608 is further configured to, in response to detecting a user selection of the fifth message in the GUI, cause (e.g., with causing unit 1614) retail information related to the media object to be displayed.

In some examples, the second user input defines an attribute related to the media object, the attribute not explicitly indicated in the media object. In these examples, processing unit 1608 is further configured to, in response to obtaining a determination that the user intent does not require performing audio processing on the media object, store (e.g., with storing unit 1624) data that associates the attribute to the media object.

In some examples, the attribute describes a relationship between the user and the media object. In some examples, processing unit 1608 is further configured to store (e.g., with storing unit 1624), based on the attribute, the media object in association with an application of the electronic device.

In some examples, processing unit 1608 is further configured to after displaying the media object as the first message and before receiving the second user input, display (e.g., with display enabling unit 1610 and on display unit 1602), as a sixth message in the GUI, a request for additional information regarding the media object.

In some examples, causing the user intent to be determined further comprises causing a domain among a plurality of domains of an oncology to be determined based on the first user input and the second user input.

The operations described above with reference to FIGS. 11A-D can be optionally implemented by components depicted in FIGS. 1-4, 6A-B, and 7A. For example, the operations of process 1100 may be implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes can be implemented based on the components depicted in FIGS. 1-4, 6A-B, and 7A.

Figure 17:
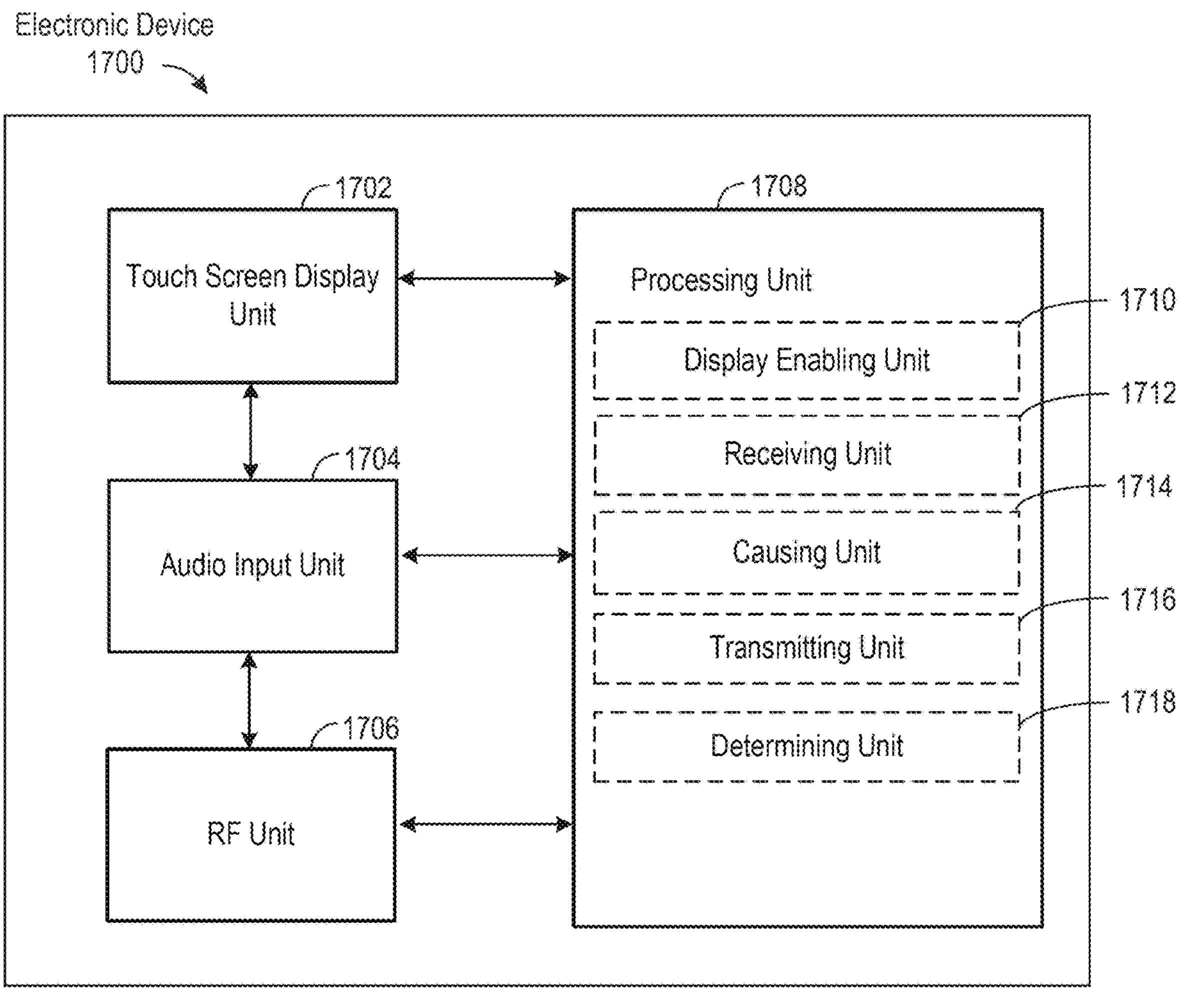
FIG. 17 illustrates a functional block diagram of an electronic device according to various examples.

FIG. 17 shows a functional block diagram of electronic device 1700 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 17 can be optionally combined or separated into sub-blocks to implement the principles of the various described examples. Therefore, the description herein optionally supports any possible combination, separation, or further definition of the functional blocks described herein.

As shown in FIG. 17, electronic device 1700 can include touch screen display unit 1702 configured to display a graphical user interface and to receive input from the user, audio input unit 1704 configured to receive audio input (e.g., speech input), and optionally, RF unit 1706 configured to transmit and receive information. Electronic device 1700 can further include processing unit 1708 coupled to touch screen display unit 1702, audio input unit 1704, and RF unit 1706. In some examples, processing unit 1708 can include display enabling unit 1710, receiving unit 1712, causing unit 1714, transmitting unit 1717, and determining unit 1718.

In accordance with some embodiments, processing unit 1708 is configured to display (e.g., with display enabling unit 1710) on display unit 1702, a graphical user interface (GUI) having a plurality of previous messages between a user of the electronic device and a user of a remote device. The plurality of previous messages is presented in a conversational view. Processing unit 1708 is further configured to receive (e.g., with receiving unit 1712), from the user of the electronic device, a first user input addressed to a digital assistant of the electronic device. Processing unit 1708 is further configured to, in response to receiving the first user input, display (e.g., with display enabling unit 1710 and on display unit 1702) the first user input as a first message in the GUI. Processing unit 1708 is further configured to cause (e.g., with causing unit 1714) an action to be performed in accordance with a user intent derived from the first user input. Processing unit 1708 is further configured to display (e.g., with display enabling unit 1710 and on display unit 1702) a response as a second message in the GUI, the response based on the action.

In some examples, processing unit 1708 is further configured to receive (e.g., with receiving unit 1712), from the user of the remote device, a second user input addressed to the digital assistant. Processing unit 1708 is further configured to, in response to receiving the second user input, display (e.g., with display enabling unit 1710 and on display unit 1702) the second user input as a third message in the GUI. Processing unit 1708 is further configured to cause (e.g., with causing unit 1714) a second action to be performed in accordance with a second user intent derived from the second user input and the user intent. Processing unit 1708 is further configured to display (e.g., with display enabling unit 1710 and on display unit 1702) a second response as a fourth message in the GUI, the second response based on the second action.

In some examples, the second user intent comprises refining the user intent.

In some examples, the user intent and the second user intent both include a same domain, and the second user intent includes a parameter that the user intent does not include.

In some examples, processing unit 1708 is further configured to transmit (e.g., with transmitting unit 1716 and using RF unit 1706) the second response to the remote device. Processing unit 1708 is further configured to cause (e.g., with causing unit) display of the second response in a GUI of the remote device.

In some examples, processing unit 1708 is further configured to determine (e.g., with determining unit 1718) whether the first user input includes a predetermined trigger phrase to invoke the digital assistant. Processing unit 1708 is further configured to cause (e.g., with causing unit 1714) the action to be performed and display (e.g., with display enabling unit 1710 and on display unit 1702) the response as the second message in response to determining that the first user input includes a predetermined trigger phrase.

In some examples, processing unit 1708 is further configured to receive (e.g., with receiving unit 1712) input from a digital assistant of the remote device. Processing unit 1708 is further configured to, in response to receiving the input, display (e.g., with display enabling unit 1710 and on display unit 1702) the input as a fifth message in the GUI.

In some examples, processing unit 1708 is further configured to display (e.g., with display enabling unit 1710 and on display unit 1702) an indication in the GUI that a content of the fifth message was generated by the digital assistant of the remote device.

In some examples, processing unit 1708 is further configured to, in response to receiving the input from the digital assistant of the remote device, cause (e.g., with causing unit 1714) the digital assistant of the electronic device to generate a content of the fifth message, where the content of the fifth message includes the input from the digital assistant of the remote device. Processing unit 1708 is further configured to display (e.g., with display enabling unit 1710 and on display unit 1702) in the GUI, an indication that the content of the fifth message was generated by the digital assistant of the electronic device.

In some examples, processing unit 1708 is further configured to, in response to receiving the input from the digital assistant of the remote device: cause (e.g., with causing unit 1714) a third action to be performed in accordance with a third user intent derived from the input from the digital assistant of the remote device, and display (e.g., with display enabling unit 1710 and on display unit 1702) a third response as a sixth message in the GUI, the third response based on the third action.

In some examples, processing unit 1708 is further configured to transmit (e.g., with transmitting unit 1716) the response to the remote device. Processing unit 1708 is further configured to cause (e.g., with causing unit 1714) display of the response in a GUI of the remote device.

In some examples, causing the action to be performed and displaying the response are performed automatically in response to receiving the first user input and without additional human intervention.

The operations described above with reference to FIGS. 13A-C can be optionally implemented by components depicted in FIGS. 1-4, 6A-B, and 7A. For example, the operations of process 1300 may be implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes can be implemented based on the components depicted in FIGS. 1-4, 6A-B, and 7A.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium storing one or more programs, the one or more programs comprising instructions, which when executed by one or more processors of an electronic device with a display, cause the electronic device to:

display, on the display, a graphical user interface (GUI) having a plurality of previous messages between a user and a digital assistant, the plurality of previous messages presented in a conversational view;

receive a first user input including a media object;

in response to receiving the first user input, display the media object as a first message in the GUI;

receive a second user input including text;

in response to receiving the second user input, display the text as a second message in the GUI;

cause a user intent to be determined based on a combination of the media object and the text; and after the user intent is determined:

obtain a determination of whether the user intent requires extracting text from the media object; and in response to obtaining a determination that the user intent requires extracting text from the media object:

extract text from the media object;

perform, using the extracted text, a task in accordance with the user intent; and display, as a third message in the GUI, a response indicative of the user intent being satisfied.

2. The non-transitory computer-readable storage medium of claim 1, wherein the one or more programs comprise further instructions, which when executed by the one or more processors of the electronic device, cause the electronic device to:

in accordance with the user intent, populate the extracted text into a text field of an application of the electronic device.

3. The non-transitory computer-readable storage medium of claim 1, wherein the user intent comprises creating, using the media object, a contact entry in a contacts application of the electronic device.

4. The non-transitory computer-readable storage medium of claim 3, wherein:

the media object is an image depicting contact information of an entity;

the extracted text includes the contact information; and performing the task in accordance with the user intent further comprises populating a text field of the contact entry with the extracted text, the contact entry associated with the entity.

5. The non-transitory computer-readable storage medium of claim 1, wherein the user intent comprises creating, using the media object, a calendar entry in a calendar application of the electronic device.

6. The non-transitory computer-readable storage medium of claim 5, wherein:

the media object is an image depicting event information;

the extracted text includes the event information; and performing the task in accordance with the user intent further comprises populating a text field of the calendar entry with the extracted text.

7. The non-transitory computer-readable storage medium of claim 1, wherein the user intent comprises creating, using the media object, a reminder entry in a reminder application of the electronic device.

8. The non-transitory computer-readable storage medium of claim 7, wherein:

the media object is an image depicting a reminder task;

the extracted text includes the reminder task; and performing the task in accordance with the user intent further comprises populating a text field of the reminder entry with the extracted text.

9. The non-transitory computer-readable storage medium of claim 1, wherein the user intent comprises translating text of a first language in the media object to text of a second language.

10. The non-transitory computer-readable storage medium of claim 9, wherein:

the media object is an image depicting the text of the first language;

the extracted text includes the text of the first language;

performing the task in accordance with the user intent further comprises obtaining the text of the second language corresponding to the text of the first language; and the displayed response includes the text of the second language.

11. The non-transitory computer-readable storage medium of claim 1, wherein the one or more programs comprise further instructions, which when executed by the one or more processors of the electronic device, cause the electronic device to:

in response to obtaining a determination that the user intent does not require extracting text from the media object, obtain a determination of whether the user intent requires performing image recognition on the media object; and in response to obtaining a determination that the user intent requires performing image recognition on the media object:

cause image recognition on the media object to be performed;

obtain, based on the image recognition, information associated with the media object; and display, as a fourth message in the GUI, a response indicative of the user intent being satisfied, the response based on the information associated with the media object.

12. The non-transitory computer-readable storage medium of claim 11, wherein the media object depicts a retail object, and wherein the information associated with the media object includes price information of the retail object.

13. The non-transitory computer-readable storage medium of claim 11, wherein the media object depicts a location, and wherein the information associated with the media object includes an identity of the location.

14. The non-transitory computer-readable storage medium of claim 11, wherein the media object depicts an entity, and wherein the information associated with the media object includes an identity of the entity.

15. The non-transitory computer-readable storage medium of claim 11, wherein the one or more programs comprise further instructions, which when executed by the one or more processors of the electronic device, cause the electronic device to:

in response to obtaining a determination that the user intent does not require performing image recognition on the media object, obtain a determination of whether the user intent requires performing audio processing on the media object; and in response to obtaining a determination that the user intent requires performing audio processing on the media object:

cause audio processing on the media object to be performed;

obtain, based on the audio processing, information associated with the media object; and display, as a fifth message in the GUI, a response indicative of the user intent being satisfied, the response based on the information associated with the media object.

16. The non-transitory computer-readable storage medium of claim 15, wherein causing audio processing on the media object to be performed further comprises:

causing speech-to-text recognition to be performed on the media object to obtain text corresponding to speech in the media object.

17. The non-transitory computer-readable storage medium of claim 16, wherein the information is obtained using the text corresponding to the speech in the media object.

18. The non-transitory computer-readable storage medium of claim 16, wherein the text corresponding to the speech in the media object is stored in association with an application of the electronic device in accordance with the user intent.

19. The non-transitory computer-readable storage medium of claim 15, wherein causing audio processing on the media object to be performed further comprises:

causing audio recognition to be performed using the media object to obtain text identifying the media object.

20. The non-transitory computer-readable storage medium of claim 19, wherein the information is obtained using the text identifying the media object.

21. The non-transitory computer-readable storage medium of claim 19, wherein the one or more programs comprise further instructions, which when executed by the one or more processors of the electronic device, cause the electronic device to:

in response to detecting a user selection of the fifth message in the GUI, cause retail information related to the media object to be displayed.

22. The non-transitory computer-readable storage medium of claim 15, wherein the second user input defines an attribute related to the media object, the attribute not explicitly indicated in the media object, and wherein the one or more programs comprise further instructions, which when executed by the one or more processors of the electronic device, cause the electronic device to:

in response to obtaining a determination that the user intent does not require performing audio processing on the media object, store data that associates the attribute to the media object.

23. The non-transitory computer-readable storage medium of claim 22, wherein the attribute describes a relationship between the user and the media object.

24. The non-transitory computer-readable storage medium of claim 22, wherein the one or more programs comprise further instructions, which when executed by the one or more processors of the electronic device, cause the electronic device to:

store, based on the attribute, the media object in association with an application of the electronic device.

25. The non-transitory computer-readable storage medium of claim 1, wherein the one or more programs comprise further instructions, which when executed by the one or more processors of the electronic device, cause the electronic device to:

after displaying the media object as the first message and before receiving the second user input, display, as a sixth message in the GUI, a request for additional information regarding the media object.

26. The non-transitory computer-readable storage medium of claim 1, wherein causing the user intent to be determined comprises causing a domain among a plurality of domains of an ontology to be determined based on the first user input and the second user input.

27. The non-transitory computer-readable storage medium of claim 1, wherein the one or more programs comprise further instructions, which when executed by the one or more processors of the electronic device, cause the electronic device to:

in response to displaying the media object as the first message in the GUI, and before extracting text from the media object, display, as a fourth message in the GUI, a request for clarification of the user intent with respect to the media object.

28. A method for operating a digital assistant, the method comprising:

at an electronic device with a display, one or more processors, and a memory:

displaying, on the display, a graphical user interface (GUI) having a plurality of previous messages between a user and the digital assistant, the plurality of previous messages presented in a conversational view;

receiving a first user input including a media object;

in response to receiving the first user input, displaying the media object as a first message in the GUI;

receiving a second user input including text;

in response to receiving the second user input, displaying the text as a second message in the GUI;

causing a user intent to be determined based on a combination of the media object and the text; and after the user intent is determined:

obtaining a determination of whether the user intent requires extracting text from the media object; and in response to obtaining a determination that the user intent requires extracting text from the media object:

extracting text from the media object;

performing, using the extracted text, a task in accordance with the user intent; and displaying, as a third message in the GUI, a response indicative of the user intent being satisfied.

29. The method of claim 28, further comprising:

in accordance with the user intent, populating the extracted text into a field of an application of the electronic device.

30. The method of claim 28, wherein the user intent comprises creating, using the media object, a contact entry in a contacts application of the electronic device.

31. The method of claim 30, wherein:

the media object is an image depicting contact information of an entity;

the extracted text includes the contact information; and performing the task in accordance with the user intent further comprises populating a text field of the contact entry with the extracted text, the contact entry associated with the entity.

32. The method of claim 28, wherein the user intent comprises creating, using the media object, a calendar entry in a calendar application of the electronic device.

33. The method of claim 32, wherein:

the media object is an image depicting event information;

the extracted text includes the event information; and performing the task in accordance with the user intent further comprises populating a text field of the calendar entry with the extracted text.

34. The method of claim 28, wherein the user intent comprises creating, using the media object, a reminder entry in a reminder application of the electronic device.

35. The method of claim 34, wherein:

the media object is an image depicting a reminder task;

the extracted text includes the reminder task; and performing the task in accordance with the user intent further comprises populating a text field of the reminder entry with the extracted text.

36. The method of claim 28, wherein the user intent comprises translating text of a first language in the media object to text of a second language.

37. The method of claim 36, wherein:

the media object is an image depicting the text of the first language;

the extracted text includes the text of the first language;

performing the task in accordance with the user intent further comprises obtaining the text of the second language corresponding to the text of the first language; and the displayed response includes the text of the second language.

38. The method of claim 28, further comprising:

in response to obtaining a determination that the user intent does not require extracting text from the media object, obtaining a determination of whether the user intent requires performing image recognition on the media object; and in response to obtaining a determination that the user intent requires performing image recognition on the media object:

causing image recognition on the media object to be performed;

obtaining, based on the image recognition, information associated with the media object; and displaying, as a fourth message in the GUI, a response indicative of the user intent being satisfied, the response based on the information associated with the media object.

39. The method of claim 38, wherein:

the media object depicts a retail object; and the information associated with the media object includes price information of the retail object.

40. The method of claim 38, wherein:

the media object depicts a location; and the information associated with the media object includes an identity of the location.

41. The method of claim 38, wherein:

the media object depicts an entity; and the information associated with the media object includes an identity of the entity.

42. The method of claim 38, further comprising:

in response to obtaining a determination that the user intent does not require performing image recognition on the media object, obtaining a determination of whether the user intent requires performing audio processing on the media object; and in response to obtaining a determination that the user intent requires performing audio processing on the media object:

causing audio processing on the media object to be performed;

obtaining, based on the audio processing, information associated with the media object; and displaying, as a fifth message in the GUI, a response indicative of the user intent being satisfied, the response based on the information associated with the media object.

43. The method of claim 42, wherein causing audio processing on the media object to be performed includes causing speech-to-text recognition to be performed on the media object to obtain text corresponding to speech in the media object.

44. The method of claim 43, wherein the information is obtained using the text corresponding to the speech in the media object.

45. The method of claim 43, wherein the text corresponding to the speech in the media object is stored in association with an application of the electronic device in accordance with the user intent.

46. The method of claim 42, wherein causing audio processing on the media object to be performed includes causing audio recognition to be performed using the media object to obtain text identifying the media object.

47. The method of claim 46, wherein the information is obtained using the text identifying the media object.

48. The method of claim 46, further comprising:

in response to detecting a user selection of the fifth message in the GUI, causing retail information related to the media object to be displayed.

49. The method of claim 42, wherein the second user input defines an attribute related to the media object, the attribute not explicitly indicated in the media object, the method further comprising:

in response to obtaining a determination that the user intent does not require performing audio processing on the media object, storing data that associates the attribute to the media object.

50. The method of claim 49, wherein the attribute describes a relationship between the user and the media object.

51. The method of claim 49, further comprising:

storing, based on the attribute, the media object in association with an application of the electronic device.

52. The method of claim 28, further comprising:

after displaying the media object as the first message and before receiving the second user input, displaying, as a sixth message in the GUI, a request for additional information regarding the media object.

53. The method of claim 28, wherein causing the user intent to be determined comprises:

causing a domain among a plurality of domains of an ontology to be determined based on the first user input and the second user input.

54. The method of claim 28, further comprising:

in response to displaying the media object as the first message in the GUI, and before extracting text from the media object, displaying, as a fourth message in the GUI, a request for clarification of the user intent with respect to the media object.

55. An electronic device, comprising:

a display;

one or more processors;

a memory; and one or more programs, wherein the one or more programs are stored in the memory and are configured to be executed by the one or more processors, wherein the one or more programs include instructions for:

displaying, on the display, a graphical user interface (GUI) having a plurality of previous messages between a user and a digital assistant, the plurality of previous messages presented in a conversational view;

receiving a first user input including a media object;

in response to receiving the first user input, displaying the media object as a first message in the GUI;

receiving a second user input including text;

in response to receiving the second user input, displaying the text as a second message in the GUI;

causing a user intent to be determined based on a combination of the media object and the text; and after the user intent is determined:

obtaining a determination of whether the user intent requires extracting text from the media object; and in response to obtaining a determination that the user intent requires extracting text from the media object:

extracting text from the media object;

performing, using the extracted text, a task in accordance with the user intent; and displaying, as a third message in the GUI, a response indicative of the user intent being satisfied.

56. The electronic device of claim 55, wherein the one or more programs further include instructions for:

in accordance with the user intent, populating the extracted text into a field of an application of the electronic device.

57. The electronic device of claim 55, wherein the user intent comprises creating, using the media object, a contact entry in a contacts application of the electronic device.

58. The electronic device of claim 57, wherein:

the media object is an image depicting contact information of an entity;

the extracted text includes the contact information; and performing the task in accordance with the user intent further comprises populating a text field of the contact entry with the extracted text, the contact entry associated with the entity.

59. The electronic device of claim 55, wherein the user intent comprises creating, using the media object, a calendar entry in a calendar application of the electronic device.

60. The electronic device of claim 59, wherein:

the media object is an image depicting event information;

the extracted text includes the event information; and performing the task in accordance with the user intent further comprises populating a text field of the calendar entry with the extracted text.

61. The electronic device of claim 55, wherein the user intent comprises creating, using the media object, a reminder entry in a reminder application of the electronic device.

62. The electronic device of claim 61, wherein:

the media object is an image depicting a reminder task;

the extracted text includes the reminder task; and performing the task in accordance with the user intent further comprises populating a text field of the reminder entry with the extracted text.

63. The electronic device of claim 55, wherein the user intent comprises translating text of a first language in the media object to text of a second language.

64. The electronic device of claim 63, wherein:

the media object is an image depicting the text of the first language;

the extracted text includes the text of the first language;

performing the task in accordance with the user intent further comprises obtaining the text of the second language corresponding to the text of the first language; and the displayed response includes the text of the second language.

65. The electronic device of claim 55, wherein the one or more programs further include instructions for:

in response to obtaining a determination that the user intent does not require extracting text from the media object, obtaining a determination of whether the user intent requires performing image recognition on the media object; and in response to obtaining a determination that the user intent requires performing image recognition on the media object:

causing image recognition on the media object to be performed;

obtaining, based on the image recognition, information associated with the media object; and displaying, as a fourth message in the GUI, a response indicative of the user intent being satisfied, the response based on the information associated with the media object.

66. The electronic device of claim 65, wherein:

the media object depicts a retail object; and the information associated with the media object includes price information of the retail object.

67. The electronic device of claim 65, wherein:

the media object depicts a location; and the information associated with the media object includes an identity of the location.

68. The electronic device of claim 65, wherein:

the media object depicts an entity; and the information associated with the media object includes an identity of the entity.

69. The electronic device of claim 65, wherein the one or more programs further include instructions for:

in response to obtaining a determination that the user intent does not require performing image recognition on the media object, obtaining a determination of whether the user intent requires performing audio processing on the media object; and in response to obtaining a determination that the user intent requires performing audio processing on the media object:

causing audio processing on the media object to be performed;

obtaining, based on the audio processing, information associated with the media object; and displaying, as a fifth message in the GUI, a response indicative of the user intent being satisfied, the response based on the information associated with the media object.

70. The electronic device of claim 69, wherein causing audio processing on the media object to be performed further comprises:

causing speech-to-text recognition to be performed on the media object to obtain text corresponding to speech in the media object.

71. The electronic device of claim 70, wherein the information is obtained using the text corresponding to the speech in the media object.

72. The electronic device of claim 70, wherein the text corresponding to the speech in the media object is stored in association with an application of the electronic device in accordance with the user intent.

73. The electronic device of claim 69, wherein causing audio processing on the media object to be performed further comprises:

causing audio recognition to be performed using the media object to obtain text identifying the media object.

74. The electronic device of claim 73, wherein the information is obtained using the text identifying the media object.

75. The electronic device of claim 73, wherein the one or more programs further include instructions for:

in response to detecting a user selection of the fifth message in the GUI, causing retail information related to the media object to be displayed.

76. The electronic device of claim 69, wherein the second user input defines an attribute related to the media object, the attribute not explicitly indicated in the media object, and wherein the one or more programs further include instructions for:

in response to obtaining a determination that the user intent does not require performing audio processing on the media object, storing data that associates the attribute to the media object.

77. The electronic device of claim 76, wherein the attribute describes a relationship between the user and the media object.

78. The electronic device of claim 76, wherein the one or more programs further include instructions for:

storing, based on the attribute, the media object in association with an application of the electronic device.

79. The electronic device of claim 55, wherein the one or more programs further include instructions for:

after displaying the media object as the first message and before receiving the second user input, displaying, as a sixth message in the GUI, a request for additional information regarding the media object.

80. The electronic device of claim 55, wherein causing the user intent to be determined comprises causing a domain among a plurality of domains of an ontology to be determined based on the first user input and the second user input.

81. The electronic device of claim 55, wherein the one or more programs further include instructions for:

in response to displaying the media object as the first message in the GUI, and before extracting text from the media object, displaying, as a fourth message in the GUI, a request for clarification of the user intent with respect to the media object.

* * * * *